US010742475B2

(12) United States Patent
Lai et al.

(10) Patent No.: US 10,742,475 B2
(45) Date of Patent: Aug. 11, 2020

(54) METHOD, APPARATUS, AND SYSTEM FOR OBJECT TRACKING SENSING USING BROADCASTING

(71) Applicant: ORIGIN WIRELESS, INC., Greenbelt, MD (US)

(72) Inventors: Hung-Quoc Duc Lai, Parkville, MD (US); David N. Claffey, Somerville, MA (US); Chen Chen, Burlingame, CA (US); Feng Zhang, Greenbelt, MD (US); Chenshu Wu, Greenbelt, MD (US); Chau-Wai Wong, Raleigh, NC (US); Beibei Wang, Clarksville, MD (US); Oscar Chi-Lim Au, San Jose, CA (US); K. J. Ray Liu, Potomac, MD (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/446,589

(22) Filed: Jun. 19, 2019

(65) Prior Publication Data

US 2019/0327124 A1 Oct. 24, 2019

Related U.S. Application Data

(63) Continuation-in-part of application No. 15/326,112, filed as application No. PCT/US2015/041037 on Jul.

(Continued)

(51) Int. Cl.

| | |
|---|---|
| ***G01S 5/06*** | (2006.01) |
| ***H04L 27/36*** | (2006.01) |

(Continued)

(52) U.S. Cl.

CPC ............ *H04L 27/362* (2013.01); *H04B 1/38* (2013.01); *H04W 72/0413* (2013.01); *G01S 5/06* (2013.01)

(58) Field of Classification Search

USPC .......................................... 342/458; 704/230

See application file for complete search history.

(56) References Cited

U.S. PATENT DOCUMENTS 6,353,807 B1 * 3/2002 Tsutsui .................. H04B 1/665 704/201

2011/0173235 A1 * 7/2011 Aman ............... A63B 24/0021 707/792

(Continued)

*Primary Examiner* — Eva Y Puente

(74) *Attorney, Agent, or Firm* — Yingxin Xiao

(57) ABSTRACT

Method, apparatus and systems for object tracking are disclosed. In one example, a system for tracking a plurality of objects in a venue is disclosed. The system comprises a transmitter configured for transmitting a series of probe signals in a broadcasting manner through a wireless multipath channel, wherein the wireless multipath channel is impacted by a movement of at least one of the plurality of objects in the venue; and a plurality of heterogeneous target wireless receivers each of which is associated with an object of the plurality of objects in the venue. Each of the plurality of heterogeneous target wireless receivers is configured for: receiving the series of probe signals through the wireless multipath channel between the heterogeneous target wireless receiver and the transmitter, obtaining at least one time series of channel information (TSCI) of the wireless multipath channel based on the series of probe signals received by the heterogeneous target wireless receiver, and tracking the object associated with the heterogeneous target wireless receiver based on the at least one TSCI.

28 Claims, 22 Drawing Sheets

Related U.S. Application Data

17, 2015, which is a continuation-in-part of application No. 14/605,611, filed on Jan. 26, 2015, now Pat. No. 10,168,414, application No. 16/446,589, filed on Jun. 19, 2019, which is a continuation-in-part of application No. 15/584,052, filed on May 2, 2017, application No. 16/446,589, filed on Jun. 19, 2019, which is a continuation-in-part of application No. 15/434,813, filed on Feb. 16, 2017, now Pat. No. 10,129,862, application No. 16/446,589, filed on Jun. 19, 2019, which is a continuation-in-part of application No. 16/127,151, filed on Sep. 10, 2018, which is a continuation-in-part of application No. PCT/US2017/021963, filed on Mar. 10, 2017, application No. 16/446,589, filed on Jun. 19, 2019, which is a continuation-in-part of application No. 16/127,092, filed on Sep. 10, 2018, which is a continuation-in-part of application No. PCT/US2017/021957, filed on Mar. 10, 2017, application No. 16/446,589, filed on Jun. 19, 2019, which is a continuation-in-part of application No. PCT/US2017/027131, filed on Apr. 12, 2017, application No. 16/446,589, filed on Jun. 19, 2019, which is a continuation-in-part of application No. 15/384,217, filed on Dec. 19, 2016, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, said application No. 15/384,217 is a continuation-in-part of application No. 14/615,984, filed on Feb. 6, 2015, now Pat. No. 9,686,054, said application No. 15/384,217 is a continuation-in-part of application No. 15/004,314, filed on Jan. 22, 2016, now Pat. No. 10,014,982, said application No. 15/384,217 is a continuation-in-part of application No. 15/061,059, filed on Mar. 4, 2016, said application No. 15/384,217 is a continuation-in-part of application No. PCT/US2015/041037, filed on Jul. 17, 2015, which is a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, which is a continuation-in-part of application No. 15/200,429, filed on Jul. 1, 2016, now Pat. No. 9,781,700, said application No. 15/200,429 is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, now Pat. No. 10,327,213, said application No. 15/384,217 is a continuation-in-part of application No. PCT/US2016/066015, filed on Dec. 9, 2016, application No. 16/446,589, filed on Jun. 19, 2019, which is a continuation-in-part of application No. 16/125,748, filed on Sep. 9, 2018, which is a continuation-in-part of application No. PCT/US2017/015909, filed on Jan. 31, 2017, which is a continuation-in-part of application No. PCT/US2016/066015, filed on Dec. 9, 2016, application No. 16/446,589, filed on Jun. 19, 2019, which is a continuation-in-part of application No. 15/861,422, filed on Jan. 3, 2018, and a continuation-in-part of application No. 16/060,710, filed as application No. PCT/US2016/066015 on Dec. 9, 2016, now Pat. No. 10,380,881, application No. 16/446,589, filed on Jun. 19, 2019, which is a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, and a continuation-in-part of application No. 16/200,608, filed on Nov. 26, 2018, and a continuation-in-part of application No. 16/200,616, filed on Nov. 26, 2018, and a continuation-in-part of application No. 16/203,299, filed on Nov. 28, 2018, now Pat. No. 10,374,863, and a continuation-in-part of application No. 16/203,317, filed on Nov. 28, 2018, now Pat. No. 10,397,039.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 6, 2016, provisional application No. 62/734,224, filed on Sep. 20, 2018, provisional application No. 62/744,093, filed on Oct. 10, 2018, provisional application No. 62/753,017, filed on Oct. 30, 2018, provisional application No. 62/806,688, filed on Feb. 15, 2019, provisional application No. 62/806,694, filed on Feb. 15, 2019, provisional application No. 62/846,686, filed on May 12, 2019, provisional application No.

62/846,688, filed on May 12, 2019, provisional application No. 62/849,853, filed on May 18, 2019.

(51) Int. Cl.

| | |
|---|---|
| ***H04W 72/04*** | (2009.01) |
| ***H04B 1/38*** | (2015.01) |

(56) References Cited

U.S. PATENT DOCUMENTS

| | | | | |
|---|---|---|---|---|
| 2014/0253388 | A1* | 9/2014 | Jalali | G01S 5/06<br>342/458 |
| 2016/0226677 | A1* | 8/2016 | Margon | H04L 67/12 |
| 2017/0188188 | A1* | 6/2017 | Kang | H04W 4/029 |
| 2018/0103351 | A1* | 4/2018 | Emmanuel | H04W 28/04 |
| 2018/0183650 | A1* | 6/2018 | Zhang | G01S 13/00 |
| 2019/0234744 | A1* | 8/2019 | Wang | G01C 21/206 |
| 2019/0246242 | A1* | 8/2019 | Tamilin | H04W 4/029 |

* cited by examiner

Algorithm: Motion Detection

Initialization: The most recent $T$ amplitudes for each subcarrier $f$:

$[G(f;1), \ldots, G(f;T)]$;

Output: The human motion status inside a venue;

for $f = 1:F$ do

Motion statistic computation for each subcarrier $f$:

$\bar{G}_{(1)}(f) \leftarrow \frac{1}{T-1}\sum_{t=1}^{T-1} G(f;t)$; $\bar{G}_{(2)}(f) \leftarrow \frac{1}{T-1}\sum_{t=2}^{T} G(f;t)$;

$\psi(f) \leftarrow \frac{\sum_{t=2}^{T}(G(f;t)-\bar{G}_{(1)}(f))(G(f;t-1)-\bar{G}_{(2)}(f))}{\left(\sum_{t=2}^{T}(G(f;t)-\bar{G}_{(1)}(f))^2\right)^{\frac{1}{2}}\left(\sum_{t=2}^{T}(G(f;t-1)-\bar{G}_{(2)}(f))^2\right)^{\frac{1}{2}}}$;

Motion detection for each subcarrier f:

if $\psi(f) > \frac{-1+\gamma\sqrt{T-2}}{T-1}$ then

$D(f) \leftarrow 1$;

else $D(f) \leftarrow 0$;

end if end for

Final motion detection:

if $\frac{1}{F}\sum_{f=1}^{F} D(f) > 0.5$ then

Motion is detected!

else

No Motion is detected.

end if

FIG.20

E.g., Υ =25 for RSSI, and Υ =-70 for SSL; M=200 (200 Hz); The lengths of the median filter and moving average filter are 5 and 20, respectively.

METHOD, APPARATUS, AND SYSTEM FOR OBJECT TRACKING SENSING USING BROADCASTING

CROSS-REFERENCE TO RELATED APPLICATIONS

The present application hereby incorporates by reference the entirety of the disclosures of, and claims priority to, each of the following cases:

(a) U.S. patent application Ser. No. 15/326,112, entitled "WIRELESS POSITIONING SYSTEMS", filed on Jan. 13, 2017,
 (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
  a. which claims priority to U.S. Provisional patent application 62/148,019, entitled "WIRELESS POSITIONING SYSTEMS", filed on Apr. 15, 2015,
  b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016, issued as U.S. Pat. No. 10,168,414 on Jan. 1, 2019,
   1. which claims priority to U.S. Provisional patent application 62/025,795, entitled "TIME-REVERSAL POSITIONING SYSTEMS", filed on Jul. 17, 2014, and
   2. which claims priority to U.S. Provisional patent application 62/069,090, entitled "TIME-REVERSAL POSITIONING SYSTEMS", filed on Oct. 27, 2014, (b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
 (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016, (c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017, issued as U.S. Pat. No. 10,129,862 on Nov. 13, 2018,
 (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
 (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016, (d) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
 (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  a. which claims priority to U.S. Provisional patent application 62/307,081, entitled "TR-BREATH: TIME REVERSAL BREATHING RATE ESTIMATION AND DETECTION", filed on Mar. 11, 2016,
  b. which claims priority to U.S. Provisional patent application 62/316,850, entitled "TR-BREATH: TIME-REVERSAL BREATHING RATE ESTIMATION AND DETECTION", filed on Apr. 1, 2016, (e) U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
 (1) Which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
  a. which claims priority to U.S. Provisional patent application 62/307,172, entitled "RADIO SHOT: THROUGH-THE-WALL HUMAN IDENTIFICATION", filed on Mar. 11, 2016,
  b. which claims priority to U.S. Provisional patent application 62/334,110, entitled "TIME-REVERSAL TRACKING WITHOUT MAPPING", filed on May 10, 2016, (f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
 (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
 (2) which claims priority to U.S. Provisional patent application 62/334,110, entitled "TIME-REVERSAL TRACKING WITHOUT MAPPING", filed on May 10, 2016, and
 (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016, (g) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
 (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
 (2) which is a Continuation-in-Part of U.S. patent application Ser. No. 13/969,271, entitled "TIME- REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018, (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017, (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/0164669A1 on Jun. 9, 2016, issued as U.S. Pat. No. 9,794,156 on Oct. 17, 2017, (5) which is a Continuation-in-Part of U.S. patent application Ser. No. 15/200,430, entitled. "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
   a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016, (6) which is a Continuation-in-Part of U.S. patent application Ser. No. 15/200,429, entitled "TIME-REVERSAL WIRELESS PARADIGM FOR INTERNET OF THINGS", tiled on Jul. 1, 2016, issued as U.S. Pat. No. 9,781,700 on Oct. 3, 2017,
   a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
      1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015, (7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016, issued as U.S. Pat. No. 10,168,414 on Jan. 1, 2019,
   a. which claims priority to U.S. Provisional patent application 62/069,090, entitled "TIME-REVERSAL POSITIONING SYSTEMS", filed on Oct. 27, 2014,
   b. which claims priority to U.S. Provisional patent application 62/025,795, entitled "TIME-REVERSAL POSITIONING SYSTEMS", filed on Jul. 17, 2014, (8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
   a. which claims priority to U.S. Provisional patent application 62/025,795, entitled "TIME-REVERSAL POSITIONING SYSTEMS", filed on Jul. 17, 2014, (9) which is a Continuation-in-Part of U.S. patent application Ser. No. 15/004,314, entitled "TI ME-REVERSAL TECHNOLOGIES FOR HYBRID WIRELESS NETWORKS", filed on Jan. 22, 2016, issued as U.S. Pat. No. 10,014,982 on Jul. 3, 2018,
   a. which claims priority to U.S. Provisional patent application 62/106,395, entitled "TIME-REVERSAL TECHNOLOGIES FOR HYBRID WIRELESS NETWORKS", filed on Jan. 22, 2015,

(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
   a. which claims priority to U.S. Provisional patent application 62/128,574, entitled "TIME-REVERSAL SCALABILITY FOR HIGH NETWORK DENSIFICATION", filed on Mar. 5, 2015,

(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
   a. which claims priority to U.S. Provisional patent application 62/148,019, entitled "WIRELESS POSITIONING SYSTEMS", filed on Apr. 15, 2015,
   b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016, issued as U.S. Pat. No. 10,168,144 on Jan. 1, 2019,
      1. which claims priority to U.S. Provisional patent application 62/025,795 entitled "TIME-REVERSAL POSITIONING SYSTEMS", filed on Jul. 17, 2014, and
      2. which claims priority to U.S. Provisional patent application 62/069,090 entitled "TIME-REVERSAL POSITIONING SYSTEMS", filed on Oct. 27, 2014,

(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018,
   a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
   b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
      1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016, i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,

(13) which is a Continuation-in-Part of U.S. patent application Ser. No. 15/284,496, entitled "TIME-REVERSAL COMMUNICATION SYSTEMS", filed on Oct. 3, 2016, issued as U.S. Pat. No. 10,327,213 on Jun. 18, 2019, a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018, a. which claims priority to U.S. Provisional patent application 62/265,155, entitled "INDOOR EVENTS DETECTION SYSTEM", filed on Dec. 9, 2015, b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, c. which claims priority to U.S. Provisional patent application 62/383,235, entitled "TIME REVERSAL MONITORING SYSTEM", filed on Sep. 2, 2016, d. which claims priority to U.S. Provisional patent application 62/307,081, entitled "TR-BREATH: TIME-REVERSAL BREATHING RATE ESTIMATION AND DETECTION", filed on MARCH 11, 2016, e. which claims priority to U.S. Provisional patent application 62/316,850, entitled "TR-BREATH: TIME-REVERSAL BREATHING RATE ESTIMATION AND DETECTION", filed on Apr. 1, 2016,

(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,

(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,

(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,

(18) which claims priority to U.S. Provisional patent application 62/307,081, entitled "TR-BREATH: TIME-REVERSAL BREATHING RATE ESTIMATION AND DETECTION", filed on Mar. 11, 2016,

(19) which claims priority to U.S. Provisional patent application 62/316,850, entitled "TR-BREATH: TIME-REVERSAL BREATHING RATE ESTIMATION AND DETECTION", filed on Apr. 1, 2016,

(20) which claims priority to U.S. Provisional patent application 62/307,172, entitled "RADIO SHOT: THROUGH-THE-WALL HUMAN IDENTIFICATION", filed on Mar. 11, 2016,

(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,

(22) which claims priority to U.S. Provisional patent application 62/334,110, entitled "TIME-REVERSAL TRACKING WITHOUT MAPPING", filed on May 10, 2016,

(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,

(24) which claims priority to U.S. Provisional patent application 62/383,235, entitled "TIME REVERSAL MONITORING SYSTEM", filed on Sep. 2, 2016,

(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,

(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, (h) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018, (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017, a. which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016, b. which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016, c. which claims priority to U.S. Provisional patent application 62/307,081, entitled "TR-BREATH: TIME-REVERSAL BREATHING RATE ESTIMATION AND DETECTION", filed on Mar. 11, 2016, d. which claims priority to U.S. Provisional patent application 62/316,850, entitled "TR-BREATH: TIME-REVERSAL BREATHING RATE ESTIMATION AND DETECTION", filed on Apr. 1, 2016, e. which claims priority to U.S. Provisional patent application 62/322,575, entitled "TIME-REVERSAL RESONATING EFFECT AND ITS APPLICATION IN WALKING SPEED ESTIMATION", tiled on Apr. 14, 2016, f. which claims priority to U.S. Provisional patent application 62/334,110, entitled "TIME-REVERSAL TRACKING WITHOUT MAPPING", filed on May 10, 2016, g. which claims priority to U.S. Provisional patent application 62/409,796, entitled "METHODS, DEVICES, SERVERS, AND SYSTEMS OF TIME REVERSAL BASED TRACKING", filed on Oct. 18, 2016, h. which claims priority to U.S. Provisional patent application 62/383,235, entitled "TIME REVERSAL MONITORING SYSTEM", filed on Sep. 2, 2016, i. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, j. which claims priority to U.S. Provisional patent application 62/307,172, entitled "RADIO SHOT: THROUGH-THE-WALL HUMAN IDENTIFICATION", filed on Mar. 11, 2016, k. which claims priority to PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is U.S. patent application Ser. No. 16/060,710, entitled "METHOD, APPARATUS, AND SYSTEMS FOR WIRELESS EVENT DETECTION AND MONITORING", filed on Jun. 8, 2018, (i) U.S. patent application Ser. No. 15/861,422, entitled "METHOD, APPARATUS, SERVER, AND SYSTEMS OF TIME-REVERSAL TECHNOLOGY", filed on Jan. 3, 2018, (j) U.S. patent application Ser. No. 16/060,710, entitled "METHOD, APPARATUS, AND SYSTEMS FOR WIRELESS EVENT DETECTION AND MONITORING", filed on Jun. 8, 2018, (1) which is a national stage entry of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, (k) U.S. patent application Ser. No. 15/873,806, entitled "METHOD, APPARATUS, AND SYSTEM FOR OBJECT TRACKING AND NAVIGATION", filed on Jan. 17, 2018, issued as U.S. Pat. No. 10,270,642 on Apr. 23, 2019.

(l) U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019.

(m) U.S. Provisional Patent application 62/734,224, entitled "METHOD, APPARATUS, AND SYSTEM FOR WIRELESS SLEEP MONITORING", filed on Sep. 20, 2018.

(n) U.S. Provisional Patent application 62/744,093, entitled "METHOD, APPARATUS, AND SYSTEM FOR WIRELESS PROXIMITY AND PRESENCE MONITORING", filed on Oct. 10, 2018.

(o) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018.

(p) U.S. patent application Ser. No. 16/200,608, entitled "METHOD, APPARATUS, SERVER AND SYSTEM FOR VITAL SIGN DETECTION AND MONITORING", filed on Nov. 26, 2018.

(q) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018.

(r) U.S. patent application Ser. No. 16/203,299, entitled "APPARATUS, SYSTEMS AND METHODS FOR EVENT RECOGNITION BASED ON A WIRELESS SIGNAL", filed on Nov. 28, 2018.

(s) U.S. patent application Ser. No. 16/203,317, entitled "APPARATUS, SYSTEMS AND METHODS FOR FALL-DOWN DETECTION BASED ON A WIRELESS SIGNAL", filed on Nov. 28, 2018.

(t) U.S. Provisional Patent application 62/806,688, entitled "METHOD, APPARATUS, AND SYSTEM FOR WIRELESS GAIT RECOGNITION", filed on Feb. 15, 2019, (u) U.S. Provisional Patent application 62/806,694, entitled "METHOD, APPARATUS, AND SYSTEM FOR OUTDOOR TARGET TRACKING", filed on Feb. 15, 2019.

(v) U.S. Provisional Patent application 62/846,686, entitled "METHOD, APPARATUS, AND SYSTEM FOR WIRELESS INERTIAL MEASUREMENT", filed on May 12, 2019.

(w) U.S. Provisional Patent application 62/846,688, entitled "Method, Apparatus, and System for Processing and Presenting Life Log based on a Wireless Signal", filed on May 12, 2019.

(x) U.S. Provisional Patent application 62/849,853, entitled "Method, Apparatus, and System for Wireless Artificial Intelligent in Smart Car", filed on May 18, 2019.

TECHNICAL FIELD

The present teaching generally relates to object tracking. More specifically, the present teaching relates to object tracking and monitoring (including periodic object motion monitoring) based on time-reversal technology in a rich-scattering environment.

BACKGROUND

Regarding object tracking and monitoring, indoor location-based service is becoming more and more important nowadays. One popular approach is to use dead-reckoning method to estimate the location of a moving object in real time. Usually, the moving direction and the moving distance are estimated by inertia measurement unit (IMU). However, the performance of moving distance estimation in the dead-reckoning based approach is far from satisfactory, which is the main reason that such indoor navigation systems are still not popular now. Estimating the speed of a moving object in an indoor environment, which can assist the location-based service, is also an open problem and no satisfactory results appear yet. The Doppler effect has been widely applied to different speed estimation systems using sound wave, microwave, or laser light. However, low speed such as human walking speed is very difficult to be estimated using Doppler shift, especially using electromagnetic (EM) waves. This is because the maximum Doppler shift is about $\Delta_f = v/cf_0$, where $f_0$ is the carrier frequency of the transmitted signal, c is the speed of light, and v is the human walking speed. Under normal human walking speed v=5.0 km/h and $f_0$=5.8 GHz, $\Delta_f$ is around 26.85 Hz and it is extremely difficult to estimate this tiny amount with high accuracy. In addition, these methods need line-of-sight (LOS) condition and perform poorly in a complex indoor environment with rich multi path reflections.

Most of the existing speed estimation methods that work well for outdoor environments fail to offer satisfactory performance for indoor environments, since the direct path signal is disturbed by the multipath signal in indoor environments and the time-of-arrival (or Doppler shift) of the direct path signal cannot be estimated accurately. Then, researchers focus on the estimation of the maximum Doppler frequency which can be used to estimate the moving speed. Various methods have been proposed, such as level crossing rate methods, covariance based methods, and wavelet based methods. However, these estimators provide results that are unsatisfactory because the statistics used in these estimators have a large variance and are location-dependent in practical scenarios. For example, the accuracy of one existing speed estimation method can only differentiate whether a mobile station moves with a fast speed (above30 km/h) or with a slow speed (below 5 km/h).

Another kind of indoor speed estimation method based on the traditional pedestrian dead reckoning algorithm is to use accelerometers to detect steps and to estimate the step length. However, pedestrians often have different stride lengths that may vary up to 40% at the same speed, and 50% with various speeds of the same person. Thus, calibration is required to obtain the average stride lengths for different individuals, which is impractical in real applications and thus has not been widely adopted. Object motion detection becomes more and more important nowadays. For example, for security and/or management purposes, a user may want to detect any object motion in the user's house; a manager of a supermarket may want to detect any object motion in the supermarket; and a nurse in a hospital may want to detect any motion of a patient in the hospital.

Existing systems and methods for detecting object motions cannot provide enough accuracy and often lead to false alarms. Existing approaches include those based on passive infrared (PIR), active infrared (AIR) and Ultrasonic. PIR sensors are the most widely used motion sensor in home security systems, which detect human motions by sensing the difference between background heat and the heat emitted by moving people. However, solutions based on PIR sensors are prone to false alarms due to its sensitivity to environmental changes, like hot/cold air flow and sunlight. They are easily defeated by blocking the body heat emission (wearing a heat-insulating full-body suit). Also, their range is limited and need line-of-sight (LOS), and thus multiple devices are needed. In AIR based approaches, an IR emitter sends a beam of IR which will be received by an IR receiver. When the beam is interrupted, a motion is detected. However, this kind of approaches can be easily seen using a regular camera or any IR detection mechanism and also has limited range and thus need LOS. Ultrasonic sensors detect human motion by sending out ultrasonic sound waves into a space and measuring the speed at which they return, and motion can be detected if there exist frequency changes. However, this kind of approaches can be defeated by wearing an anechoic suit. Also, ultrasound cannot penetrate solid objects such as furniture or boxes and cause gaps in detection field. Slow movements by a burglar may not trigger an alarm, too. Thus, existing systems and methods for detecting object motions are not entirely satisfactory.

SUMMARY

The present teaching generally relates to object tracking. More specifically, the present teaching relates to object tracking based on time-reversal technology in a rich-scattering environment, e.g. an indoor environment or urban metropolitan area, enclosed environment, underground environment, open-air venue with barriers such as parking lot, storage, yard, square, forest, cavern, valley, etc.

In one embodiment, a method of an object tracking system includes obtaining one or more time series of channel information (CI) of a wireless multipath channel using a processor, a memory communicatively coupled with the processor and a set of instructions stored in the memory. The one or more time series of channel information (TSCI) is extracted from a wireless signal transmitted between a Type1 heterogeneous wireless device at a first position in a venue and a Type2 heterogeneous wireless device at a second position in the venue through the wireless multipath channel. The wireless multipath channel is impacted by a current movement of an object in the venue. The method also determines a spatial-temporal information of the object based on the at least one TSCI, a time parameter associated with the current movement, and/or a past spatial-temporal information (info) of the object. The one or more TSCI is preprocessed. The spatial-temporal information (info) includes a location, a horizontal location, a vertical location, a length, an area, a volume, a capacity, a distance, a direction, a displacement, a speed, a velocity, an acceleration, a rotational speed, a rotational acceleration, a gait cycle, a motion type, a motion classification, a motion characteristics, a sudden motion, a transient motion, a periodic motion, a period of the periodic motion, a frequency of the periodic motion, a transient motion, a time trend, a timestamp, a time period, a time window, a sliding time window, a history, a frequency trend, a spatial-temporal trend, a spatial-temporal change, an event and/or another information. Computation associated with the method is shared among the processor, the Type1 heterogeneous wireless device and the Type2 heterogeneous wireless device.

A distance of the current movement of the object may be determined (e.g. by an object tracking server, the processor, the Type1 heterogeneous device, the Type2 heterogeneous device, and/or another device) based on the one or more time series of the CI. An estimated direction of the current movement of the object may be obtained. The spatial-temporal information (info) of the object may be determined based on the distance and/or the estimated direction of the current movement of the object. At least one similarity score may be computed (e.g. by an object tracking server, the processor, the Type1 heterogeneous device, the Type2 heterogeneous device, and/or another device). Each similarity score may be based on a pair of temporally adjacent CI of the TSCI associated with the current movement of the object. A characteristic similarity score may be computed based on the at least one similarity score. A distance of the current movement of the object may be determined based on comparing the characteristic similar score to a reference decay curve. The spatial-temporal information of the object may be determined based on the distance of the current movement of the object.

At least one most recent CI may be determined (e.g. by an object tracking server, the processor, the Type1 heterogeneous device, the Type2 heterogeneous device, and/or another device). Each most recent CI may be most recent in one of the one or more TSCI. One or more time series of similarity scores may be computed. Each similarity score may be computed based on two CI of a particular time series associated with the similarity score. The two CI may be the most recent CI and a temporally adjacent CI within a time window associated with the current movement of the object. At least one curve may be determined. Each curve may be determined based on a time series of similar scores. At least one feature point of a curve may be identified. The spatial-temporal information of the object may be determined/computed based on the at least one feature point. The at least one feature point may include: a local maximum, a local minimum, a first maximum, a second maximum, another maximum, a first minimum, a second minimum, another minimum, a zero-crossing, a first zero-crossing, a second zero-crossing, another zero-crossing, a point having a predetermined relationship with a second feature point, and/or another feature point. At least one second similarity score may be computed (e.g. by an object tracking server, the processor, the Type1 heterogeneous device, the Type2 heterogeneous device, and/or another device). Each similarity score may be computed based on an initial CI and a current CI. The initial CI may be temporally close to a beginning of the current movement. The current CI may be temporally close to an end of the current movement, and/or a current moment. A characteristic second similarity score may be determined based on the at least one second similar score. If the characteristic second similarity score is greater than (or "greater than or equal to", or "less than" or "less than or equal to") a threshold, the object may be determined to be stationary and the current movement may be determined to be a null movement, a small movement, and/or a negligibly small movement.

An initial spatial-temporal information of the object at an initial time prior to the current movement of the object may be determined (e.g. by an object tracking server, the processor, the Type1 heterogeneous device, the Type2 heterogeneous device, and/or another device) based on another time series of another CI associated with a prior movement of the object. The another time series of the another CI may be extracted from a second wireless signal transmitted between a second Type1 heterogeneous device at a third position (e.g. 408) in the venue and a second Type2 heterogeneous device at a fourth position in the venue through the wireless multipath channel. The wireless multipath channel may be impacted by the prior movement of the object. The initial spatial-temporal information of the object at the initial time may be determined to be a known location associated with the second Type1 heterogeneous device and/or the second Type2 heterogeneous device. A time period may be determined. Within the time period, essentially all (e.g. all except a few, or all without the outliers) corresponding CI of the another time series of the another CI may be larger than a first adaptive threshold and smaller than a second adaptive threshold. The initial time may be determined as a characteristic point of the time period. The spatial-temporal information of the object may be determined based on the initial spatial-temporal information of the object at the initial time. The characteristic point of the time period may be: a mid-point, a quartile point, a percentile point, a starting point, an ending point, a point at which the another CI is locally maximum, a point at which the another CI is locally minimum, a point at which the another CI has a certain characteristics, and/or another characteristic point.

At the initial time during the prior movement of the object, one of the second Type1 heterogeneous device and the second Type2 heterogeneous device may be spatially close to and may move with the object during the prior movement of the object. At the initial time, the other one of the second Type1 heterogeneous device and the second Type2 heterogeneous device may have a directional antenna. The initial spatial-temporal information of the object at the initial time may be determined (e.g. by an object tracking server, the processor, the Type1 heterogeneous device, the Type2 heterogeneous device, and/or another device) to be a known location associated with the other one of the second Type1 heterogeneous device and the second Type2 heterogeneous device with the directional antenna.

One of the first Type1 heterogeneous device and the first Type2 heterogeneous device may be spatially close to and may move with the object during the movement of the object. One of the first Type1 heterogeneous device and the first Type2 heterogeneous device may be communicatively coupled with a network server, and/or communicatively coupled with a local device that may be communicatively coupled with the network server. The local device may be: a smart phone, a smart device, a smart speaker, a smart watch, a smart glasses, a smart clock, a smart television, a smart oven, a smart refrigerator, a smart air-conditioner, a smart chair, a smart table, a smart accessory, a smart utility, a smart appliance, a smart machine, a smart vehicle, an internet-of-thing (IoT) device, an internet-enabled device, a computer, a portable computer, a tablet, a smart house, a smart office, a smart building, a smart parking lot, a smart system, and/or another device.

One or more time series of power information (PI) may be computed (e.g. by an object tracking server, the processor, the Type1 heterogeneous device, the Type2 heterogeneous device, and/or another device) based on the one or more TSCI. Each PI may be associated with a CI. The PI may be a complex quantity. The real part of the power information (PI) may be computed based on: magnitude, square of magnitude, phase, real part, imaginary part and another function, of the CI. A first function of the one or more time series of PI may be computed. The first function may include an operation on/of: an autocorrelation function, a square of autocorrelation function, an auto-covariance function, a square of auto-covariance function, an inner product, an auto-correlation-like function, and/or a covariance-like function.

In another embodiment, an object tracking server includes a processor, a memory communicatively coupled with the processor, and a set of instructions stored in the memory and executed by the processor. When the set of instructions is executed by the processor using the memory, the object tracking server is configured to obtain one or more TSCI of a wireless multipath channel. The at least one TSCI is extracted from a wireless signal transmitted between a Type1 heterogeneous wireless device at a first position in a venue and a Type2 heterogeneous wireless device at a second position (e.g. 406) in the venue through the wireless multipath channel. The wireless multipath channel is impacted by a current movement of an object in the venue. The object tracking server determines a spatial-temporal information of the object based on: the at least one TSCI, a time parameter associated with the current movement, and/ or a past spatial-temporal information of the object. The one or more TSCI is preprocessed.

In yet another embodiment, a system of an object tracking server includes a Type1 heterogeneous wireless device at a first position in a venue, a Type2 heterogeneous wireless device at a second position (e.g. 406) in the venue wirelessly coupled with the Type1 heterogeneous device through a wireless multipath channel associated with the venue, and/or the object tracking server. The object tracking server has a processor, a memory communicatively coupled with the processor and a set of instructions stored in the memory executed by the processor.

The object tracking server, the Type1 heterogeneous device and the Type2 heterogeneous device are configured to: obtain at least one TSCI of the wireless multipath channel. The at least one TSCI is extracted from a wireless signal transmitted between the Type1 heterogeneous device and the Type2 heterogeneous device through the wireless multipath channel. The wireless multipath channel is impacted by a current movement of an object in the venue. A spatial-temporal information of the object is determined based on: the at least one TSCI, a time parameter associated with the current movement, and/or a past spatial-temporal information of the object.

Other concepts relate to software for implementing the present teaching on object tracking and monitoring (including periodic object motion monitoring) based on time-reversal technology in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

The present teaching generally relates to object motion detection and monitoring. More specifically, the present teaching relates to detecting and monitoring motions of an object based on wireless CI in a rich-scattering environment, e.g. an indoor environment or urban metropolitan area, enclosed environment, underground environment, open-air venue with barriers such as parking lot, storage, yard, square, forest, cavern, valley, etc.

In one embodiment, a system having at least a processor and a memory with a set of instructions stored therein for detecting object motion in a venue is disclosed. The system comprises: a first wireless device configured for transmitting a wireless signal through a wireless multipath channel impacted by a motion of an object in the venue; and a second wireless device that has a different type from that of the first wireless device and is configured for: receiving the wireless signal through the wireless multipath channel impacted by the motion of the object in the venue, and obtaining a TSCI of the wireless multipath channel based on the wireless signal; and a motion detector configured for detecting the motion of the object in the venue based on motion information related to the motion of the object, wherein the motion information associated with the first and second wireless devices is computed based on the TSCI by at least one of: the motion detector and the second wireless device.

In another embodiment, a method of a wireless monitoring system is disclosed. The wireless monitoring system comprises at least one asynchronous heterogeneous Type1 wireless device and at least one asynchronous heterogeneous Type2 wireless device. The wireless monitoring system comprises at least one pair of Type1 and Type2 devices. Each pair comprises: one of the at least one asynchronous heterogeneous Type1 wireless device, and one of the at least one asynchronous heterogeneous Type2 wireless device. Each of the at least one Type2 wireless device is in at least one respective particular pair of Type1 and Type2 devices. Each Type2 wireless device is associated with at least one respective particular Type1 wireless device through the at least one respective particular pair of Type1 and Type2 devices. For each Type2 wireless device, and for each of the at least one respective particular pair of Type1 and Type2 devices comprising the Type2 wireless device, the method comprises obtaining asynchronously at least one respective TSCI of a wireless multipath channel impacted by a motion of an object in a venue, wherein the at least one respective TSCI (TSCI) associated with the particular pair of Type1 and Type2 wireless devices is extracted asynchronously from a respective asynchronous heterogeneous wireless signal, wherein the respective asynchronous heterogeneous wireless signal is transmitted asynchronously from a respective one of the at least one respective particular Type1 wireless device using a respective first heterogeneous processor, a respective first heterogeneous memory and a respective first heterogeneous set of instructions of the Type1 wireless device to at least one asynchronous heterogeneous Type2 wireless device through the wireless multipath channel. The method further comprises at least one of: monitoring the motion of the object in the venue individually and asynchronously, using a third processor, a third memory and a third set of instructions of a Type 3 device, based on TSCI associated with a pair of Type1 and Type2 devices comprising a particular Type2 device, monitoring the motion of the object jointly and asynchronously based on TSCI associated with any of the at least one pair of Type1 and Type2 devices associated with the particular Type2 wireless device, monitoring the motion of the object jointly and asynchronously based on TSCI associated with any of the at least one pair of Type1 and Type2 devices associated with one of the at least one respective particular Type1 wireless device, and monitoring the motion of the object globally and asynchronously based on TSCI associated with any of the at least one pair of Type1 and Type2 devices.

In yet another embodiment, a particular asynchronous heterogeneous Type2 device of a radio monitoring system is disclosed. The radio monitoring system comprises at least one asynchronous heterogeneous Type1 device and at least one asynchronous heterogeneous Type2 device. The radio monitoring system comprises at least one pairing of Type1 and Type2 devices, each pairing comprising one of the at least one Type1 device, and one of the at least one Type2 device. The particular asynchronous heterogeneous Type2 device is in at least one particular pairing of Type1 and Type2 devices of the radio monitoring system. The particular Type2 device is grouped with at least one particular Type1 device through the at least one particular pairing of Type1 and Type2 devices. The particular asynchronous heterogeneous Type2 device comprises: a wireless circuitry to receive asynchronously at least one asynchronous heterogeneous radio signal, wherein each asynchronous heterogeneous radio signal is transmitted asynchronously by one of the at least one particular Type1 device using a respective first heterogeneous processor, a respective first heterogeneous memory and a respective first heterogeneous set of instructions of the Type1 device to at least one asynchronous heterogeneous Type2 device through a wireless multipath channel influenced by a movement of a mass in a site; a second heterogeneous processor communicatively coupled with the wireless circuitry; a second heterogeneous memory communicative coupled with the second heterogeneous processor; a second heterogeneous set of instructions stored in the second heterogeneous memory which, when executed, cause the second heterogeneous processor to, for each of the at least one particular pairing of Type1 and Type2 devices, secure asynchronously at least one respective series of CI (TSCI) of the wireless multipath channel, wherein the at least one respective TSCI associated with the particular pairing of Type1, and Type2 devices is being derived asynchronously from the respective asynchronous heterogeneous radio signal received asynchronously by the wireless circuitry; wherein at least one of the following is included: the movement of the mass in the site is monitored individually and asynchronously, using a third processor, a third memory and a third set of instructions of a Type 3 device, based on TSCI associated with a pairing of Type1 and Type2 devices comprising the particular Type2 device, the movement of the mass is monitored jointly and asynchronously based on TSCI associated with any pairings of Type1 and Type2 devices comprising the particular Type2 device, the movement of the mass is monitored jointly and asynchronously based on TSCI associated with any pairings of Type1 and Type2 devices comprising one of the at least one particular Type1 device, and the movement of the mass is monitored globally and asynchronously based on TSCI associated with any pairings of Type1 and Type2 devices.

In yet another embodiment, a particular asynchronous heterogeneous Type1 device of a radio monitoring system is disclosed. The radio monitoring system comprises at least one asynchronous heterogeneous Type1 device and at least one asynchronous heterogeneous Type2 device. The radio monitoring system comprises at least one combination of Type1 and Type2 devices, each combination comprising one of the at least one Type1 device, and one of the at least one Type2 device. The particular asynchronous heterogeneous Type1 device is in at least one particular combination of Type1 and Type2 devices of the radio monitoring system. The particular Type1device is paired with at least one particular Type2 device through the at least one particular combination of Type1 and Type2 devices. The particular asynchronous heterogeneous Type1 device comprises: a wireless circuitry; a first processor communicatively coupled with the wireless circuitry; a first memory communicative coupled with the first processor; and a first set of instructions stored in the first memory. The first set of instructions, when executed, cause the first processor to: transmit asynchronously using the wireless circuitry an asynchronous heterogeneous wireless signal from the particular Type1 device to the at least one particular Type2 device through a wireless multipath channel impacted by a dynamics of a substance in a site, wherein, for each of the at least one particular Type2 device, at least one series of CI (TSCI) of the wireless multipath channel gleaned from the asynchronous heterogeneous wireless signal transmitted by the wireless circuitry is fetched by the Type2 device using a second processor, a second memory and a second set of instructions of the Type2 device. At least one of the following is included: the dynamics of the substance in the site is tracked individually and asynchronously, using a third processor, a third memory and a third set of instructions of a Type 3 device, based on TSCI associated with a combination of Type1 and Type2 devices comprising the particular Type1 device; the dynamics of the substance is tracked jointly and asynchronously based on TSCI associated with any combinations of Type1 and Type2 devices comprising the particular Type1 device; the dynamics of the substance is tracked jointly and asynchronously based on TSCI associated with any combinations of Type1 and Type2 devices comprising one of the at least one particular Type2 device; and the dynamics of the substance is tracked globally and asynchronously based on TSCI associated with any combinations of Type1 and Type2 devices.

In still another embodiment, a particular asynchronous heterogeneous Type 3 device of a radio monitoring system is disclosed. The radio monitoring system comprises at least one asynchronous heterogeneous Type1 device and at least one asynchronous heterogeneous Type2 device. The radio monitoring system comprises at least one doublet of Type1 and Type2 devices, each doublet comprising one of the at least one asynchronous heterogeneous Type1 device, and one of the at least one asynchronous heterogeneous Type2 device. The particular asynchronous heterogeneous Type 3 comprises: a third processor communicatively coupled with at least one of: at least one asynchronous heterogeneous Type1 device, and at least one asynchronous heterogeneous Type2 device; a third memory communicative coupled with the third processor; and a third set of instructions stored in the third memory. The third set of instructions, when executed, causes the third processor to: for each Type2 device, and for each of the at least one doublet of Type1 and Type2 devices comprising the Type2 device: receive asynchronously at least one respective TSCI (TSCI) of a wireless multipath channel influenced by a motion of an item in a place received asynchronously by the Type2 device using a respective second processor, a respective second memory and a respective second set of instructions of the Type2 device, wherein the at least one respective TSCI associated with the respective doublet of Type1 and Type2 devices is obtained asynchronously from a respective asynchronous heterogeneous radio signal transmitted from a respective Type1 device of the respective doublet using a respective first processor, a respective first memory and a respective first set of instructions of the respective Type1 device to at least one asynchronous heterogeneous Type2 device through the wireless multipath channel; and at least one of: track the motion of the item in the place individually and asynchronously, based on TSCI associated with a particular doublet of Type1 and Type2 devices comprising a particular Type2 device and a particular Type1 device, track the motion of the item jointly and asynchronously based on TSCI associated with any of the at least one doublet of Type1 and Type2 devices associated with the particular Type2 device, track the motion of the item jointly and asynchronously based on TSCI associated with any of the at least one doublet of Type1 and Type2 devices associated with the particular Type1 device, track the motion of the item globally and asynchronously based on TSCI associated with any of the at least one doublet of Type1 and Type2 devices.

111B) used to determine an initial position, according to one embodiment of the present teaching.

Figure 4A:
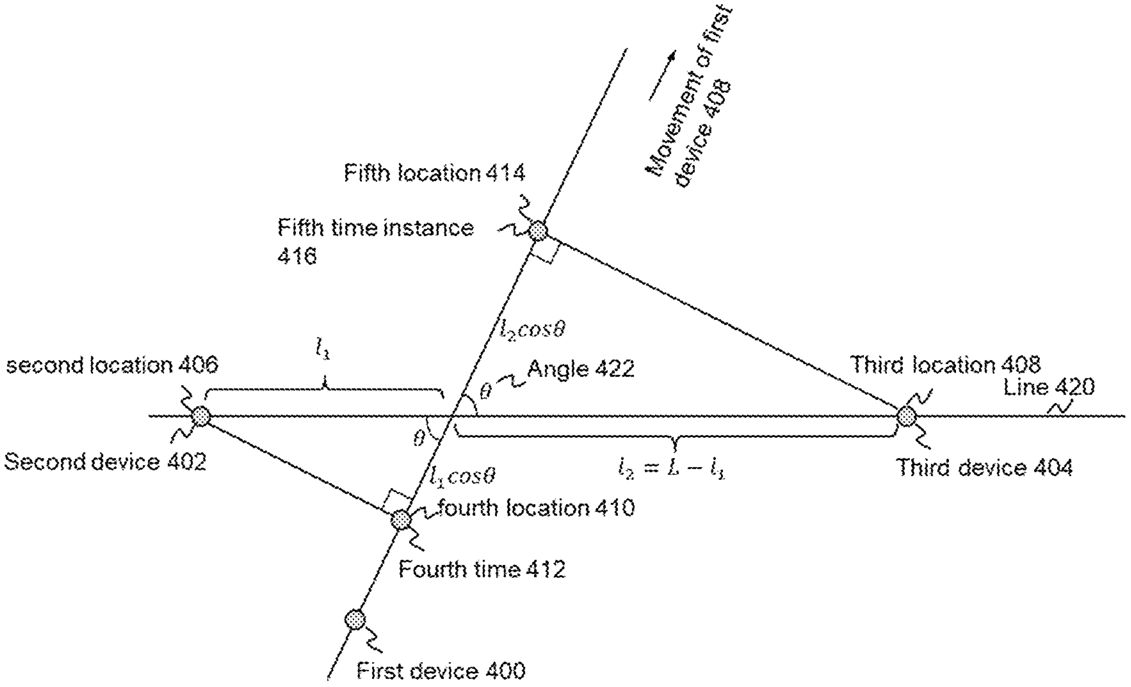

FIG. 4A is a diagram showing a first device moving between a second device and a third at an angle less than 90 degrees, with an initial direction, an initial position and an initial time (e.g. 116) of the first device to be determined, according to one embodiment of the present teaching.

Figure 4B:
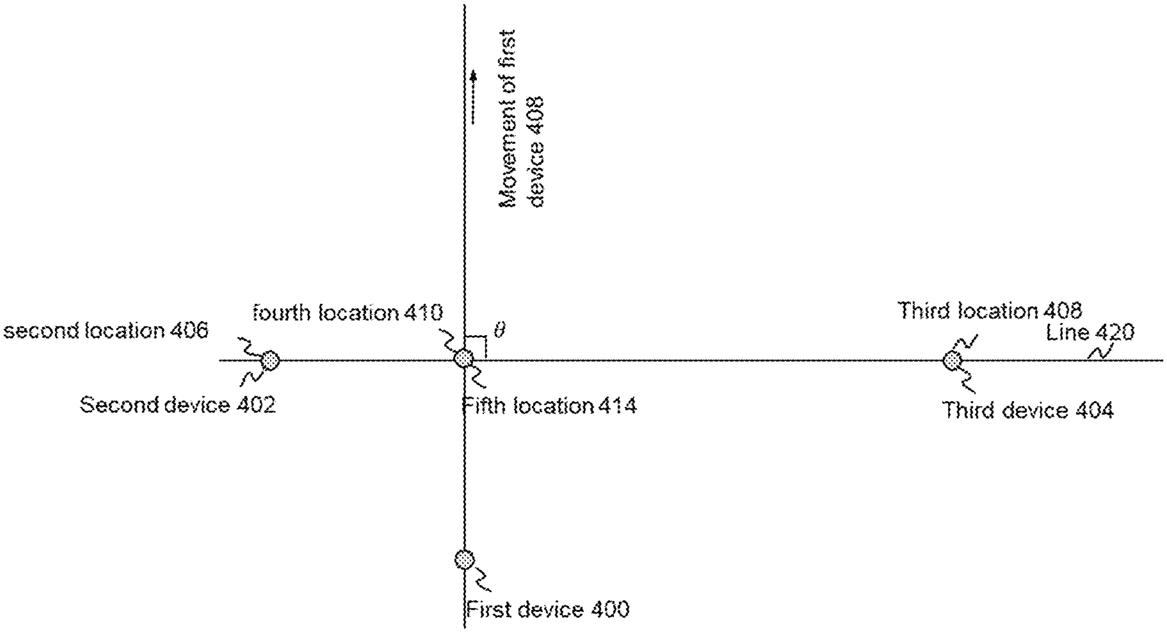

FIG. 4B is a diagram showing a first device moving between a second device and a third at an angle of 90 degrees, with an initial direction, an initial position and an initial time (e.g. 116) of the first device to be determined, according to one embodiment of the present teaching.

Figure 4C:
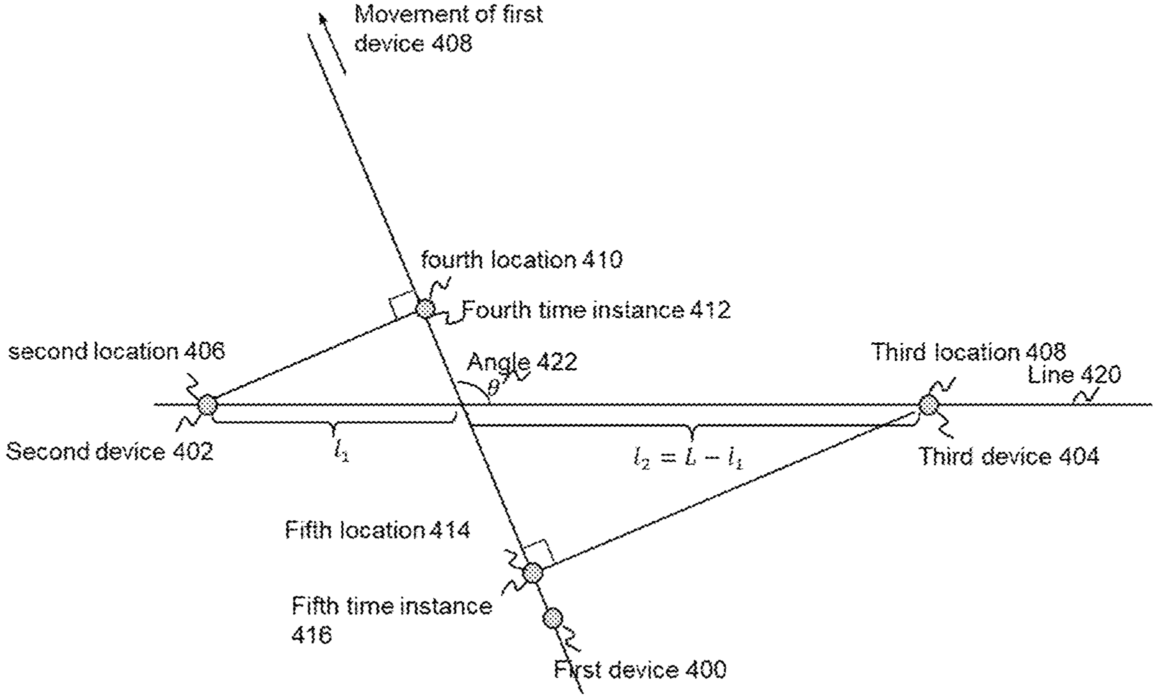

FIG. 4C is a diagram showing a first device moving between a second device and a third at an angle greater than 90 degrees, with an initial direction, an initial position and an initial time (e.g. 116) of the first device to be determined, according to one embodiment of the present teaching.

Figure 5:
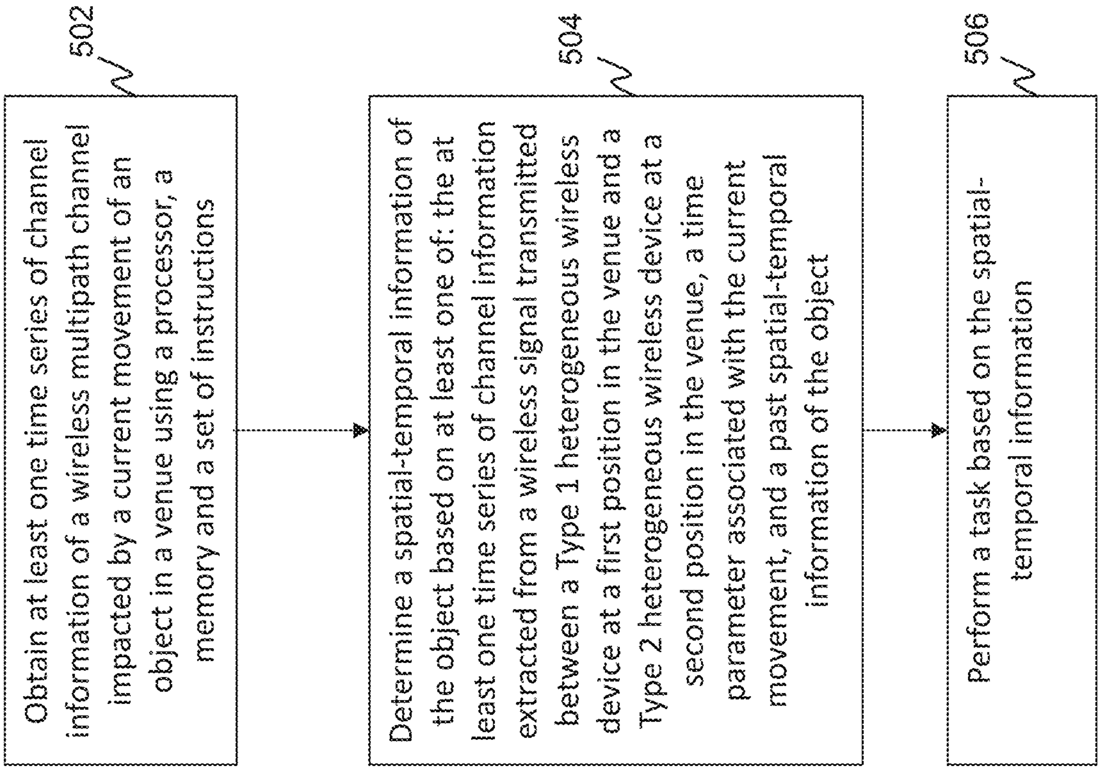

FIG. 5 illustrates an exemplary method for object tracking, according to one embodiment of the present teaching.

Figure 6:
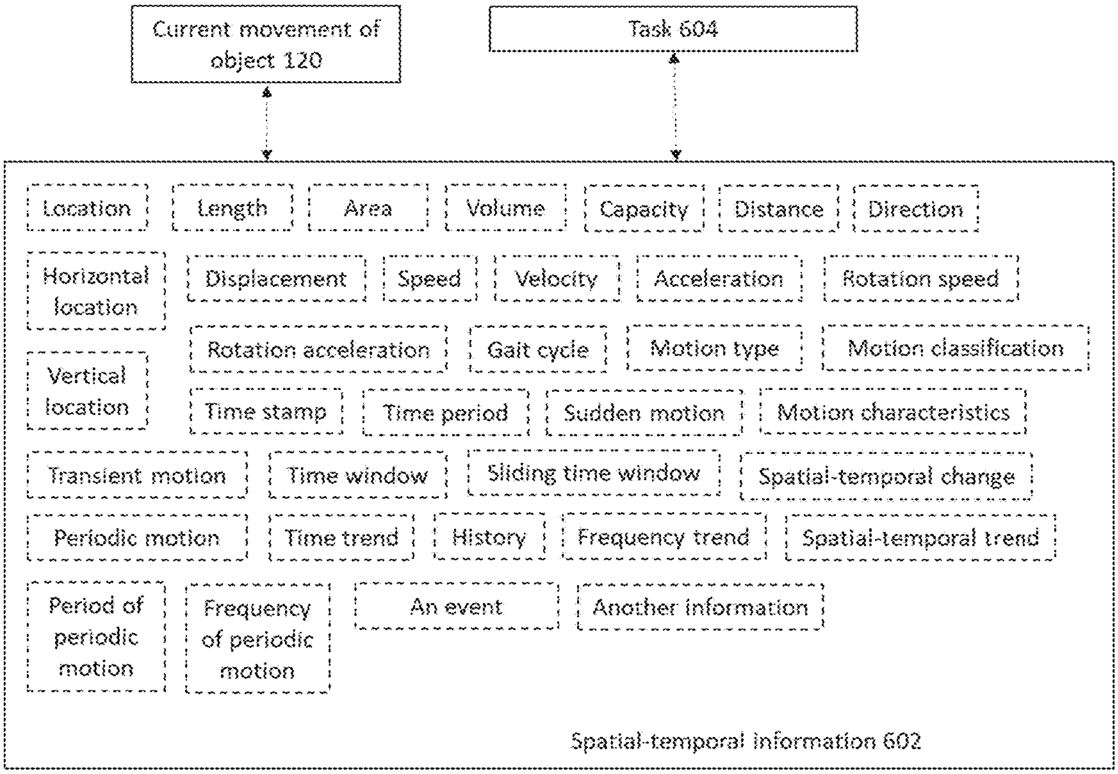

FIG. 6 illustrates examples of spatial-temporal information, according to one embodiment of the present teaching.

Figure 7:
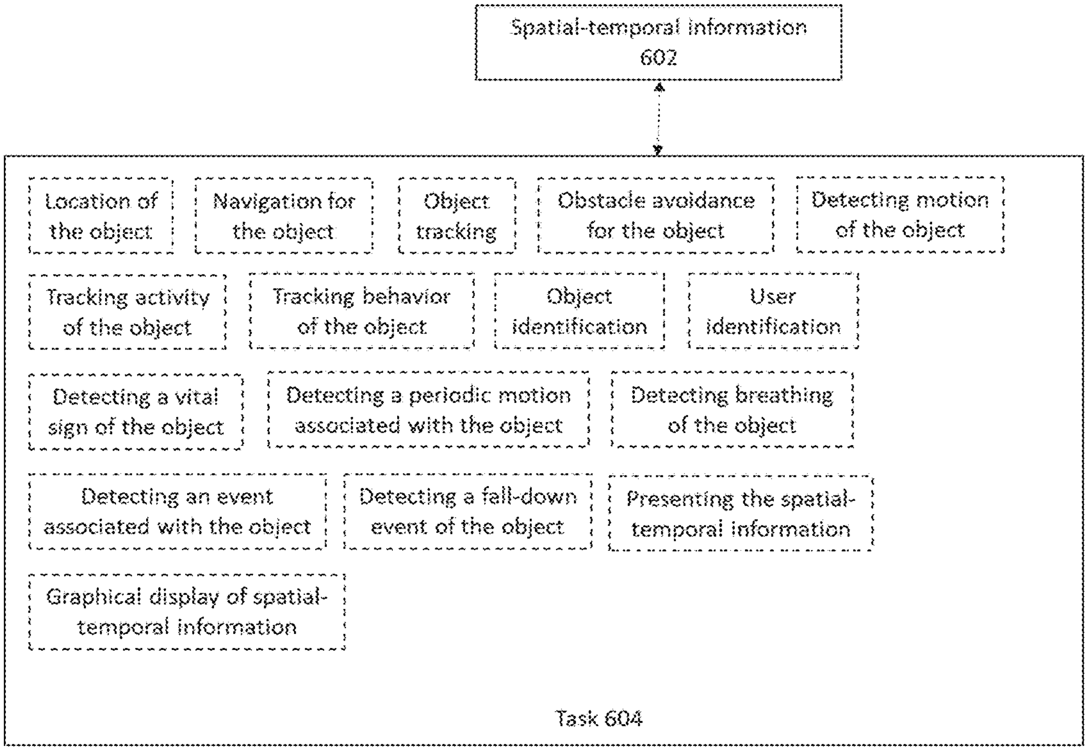

FIG. 7 illustrates examples of tasks performed based on spatial-temporal information, according to one embodiment of the present teaching.

Figure 8:
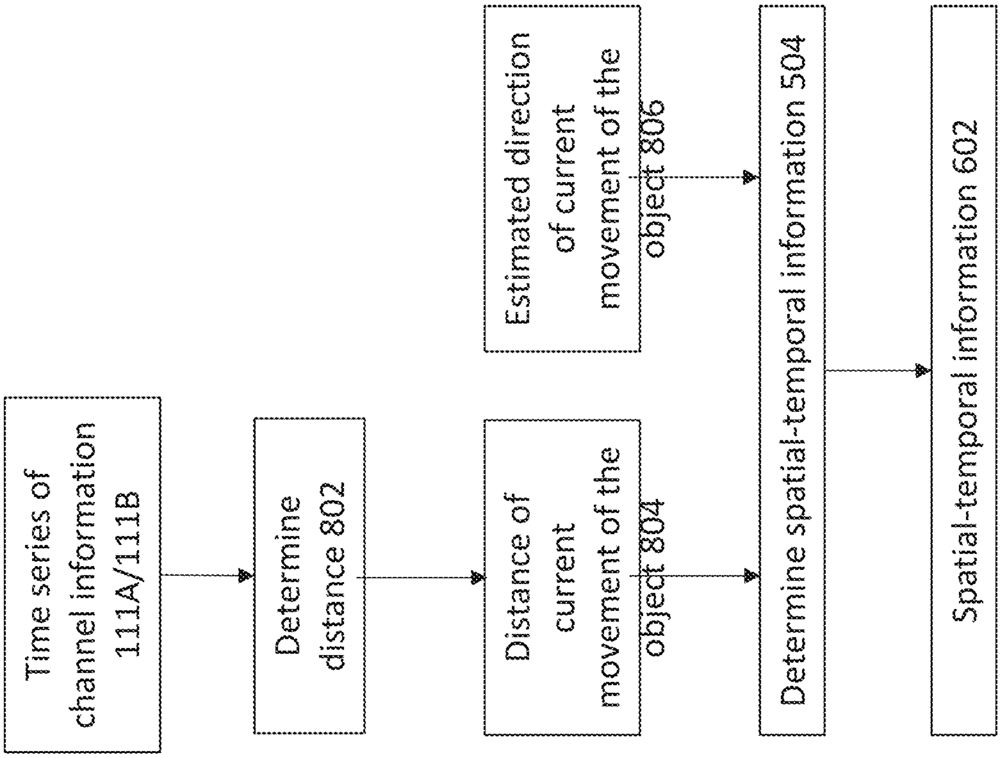

FIG. 8 illustrates another exemplary method for object tracking, according to one embodiment of the present teaching.

Figure 9:
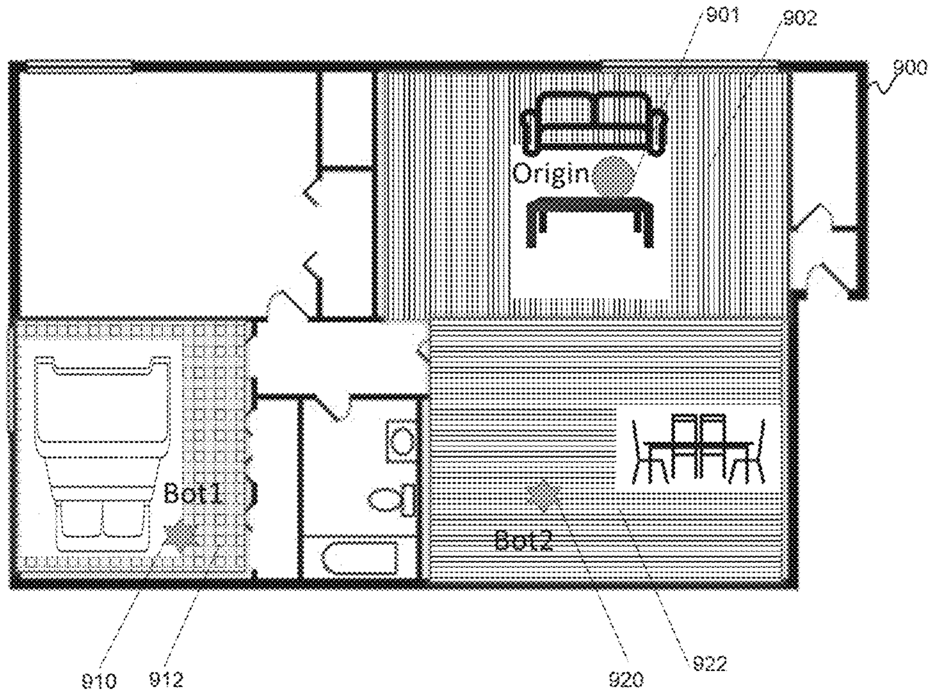

FIG. 9 illustrates an exemplary presentation of the spatial-temporal information in a venue, according to one embodiment of the present teaching. FIG. 9 also illustrates an exemplary scenario where object motion is detected based on spatial-temporal information in a venue, according to one embodiment of the present teaching.

Figure 10:
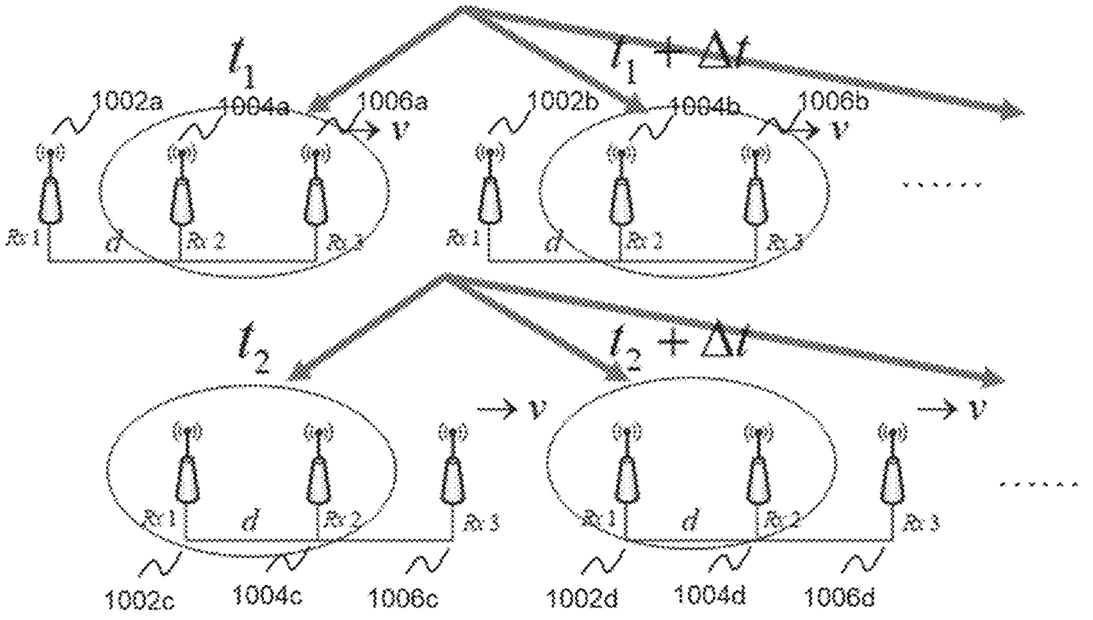

FIG. 10 is an exemplary illustration of antenna matching based speed estimation, according to one embodiment of the present teaching.

Figure 11:
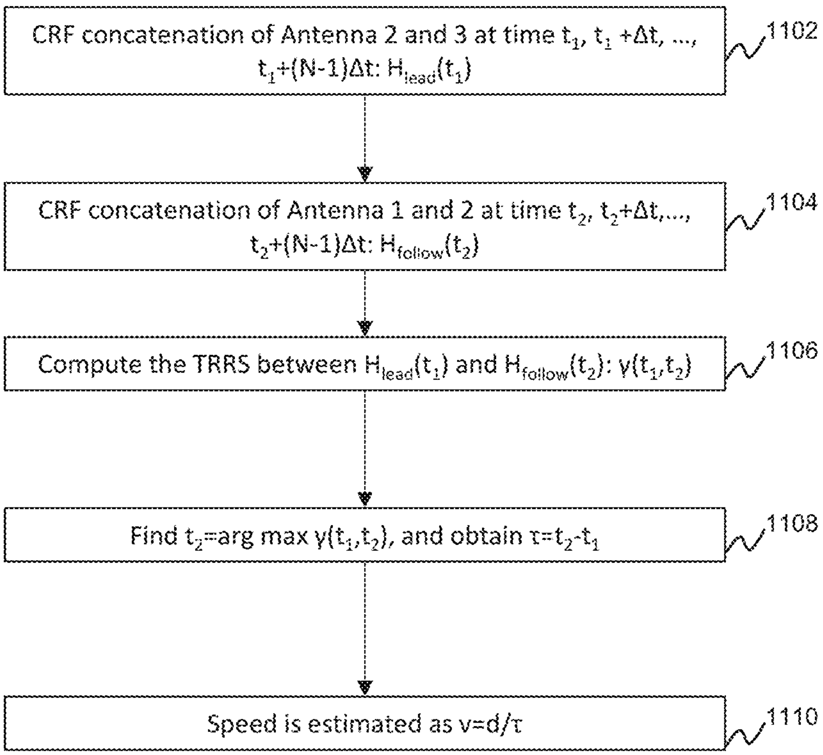

FIG. 11 is a flowchart illustrating a method for antenna matching based speed estimation, according to one embodiment of the present teaching.

Figure 12:
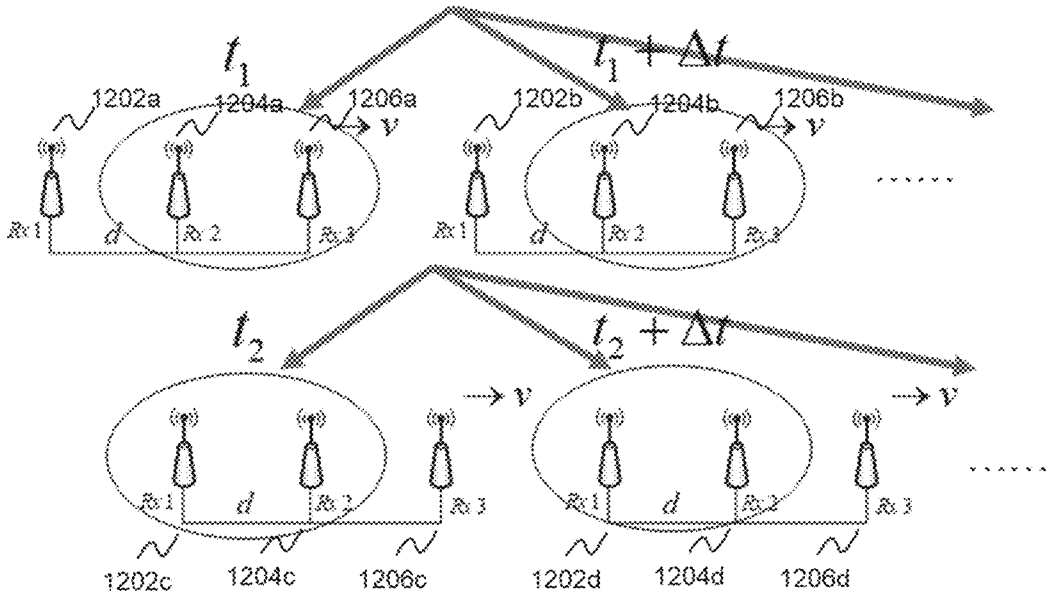

FIG. 12 shows an exemplary illustration of antenna matching based speed estimation, according to one embodiment of the present teaching.

Figure 13:
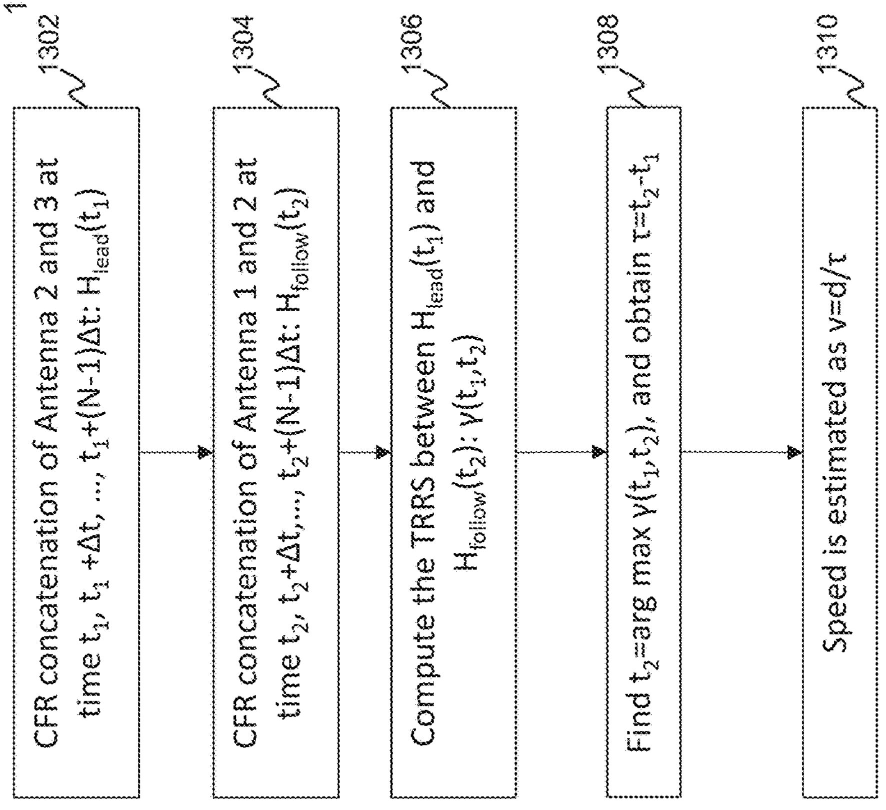

FIG. 13 shows an exemplary flowchart of antenna matching based speed estimation.

Figure 14:
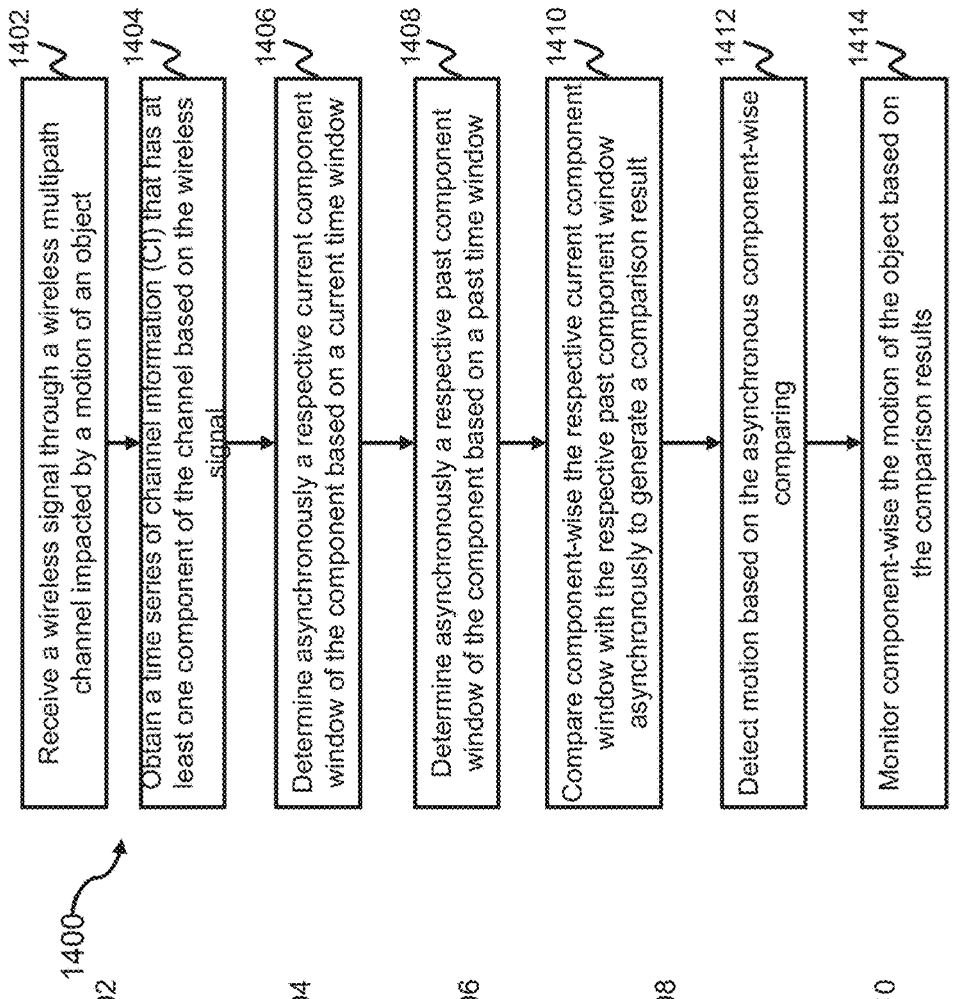

FIG. 14 illustrates a flowchart of an exemplary method for motion detection, according to one embodiment of the present teaching.

Figure 15:
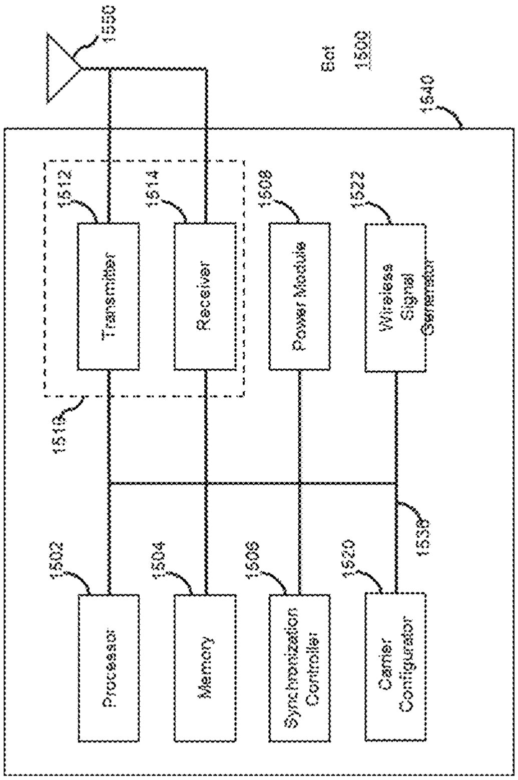

FIG. 15 illustrates an exemplary block diagram of a first wireless device, according to one embodiment of the present teaching.

Figure 16:
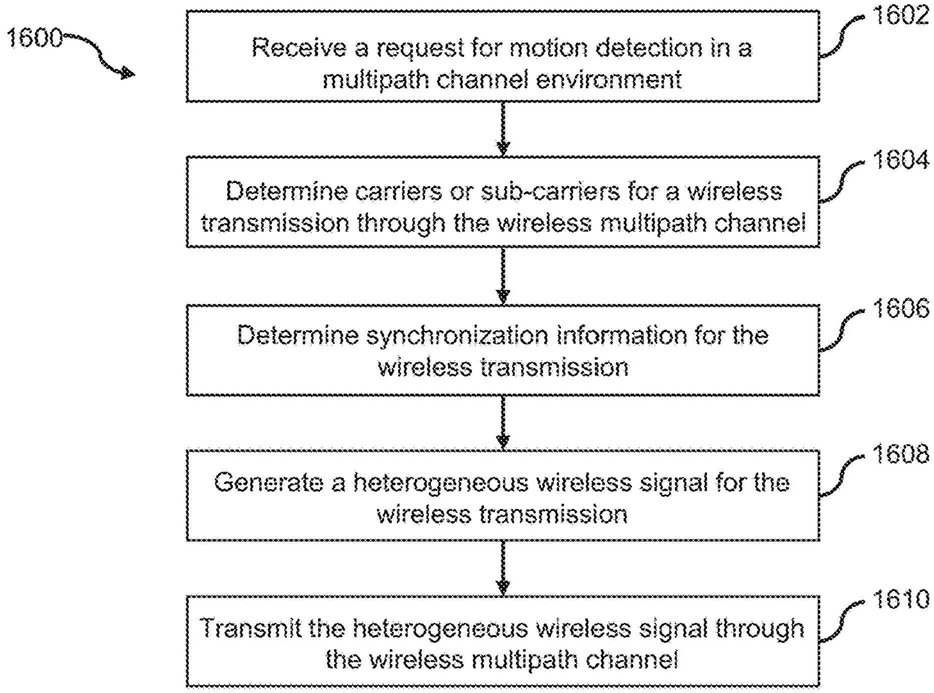

FIG. 16 illustrates a flowchart of an exemplary method performed by a first wireless device, according to one embodiment of the present teaching.

Figure 17:
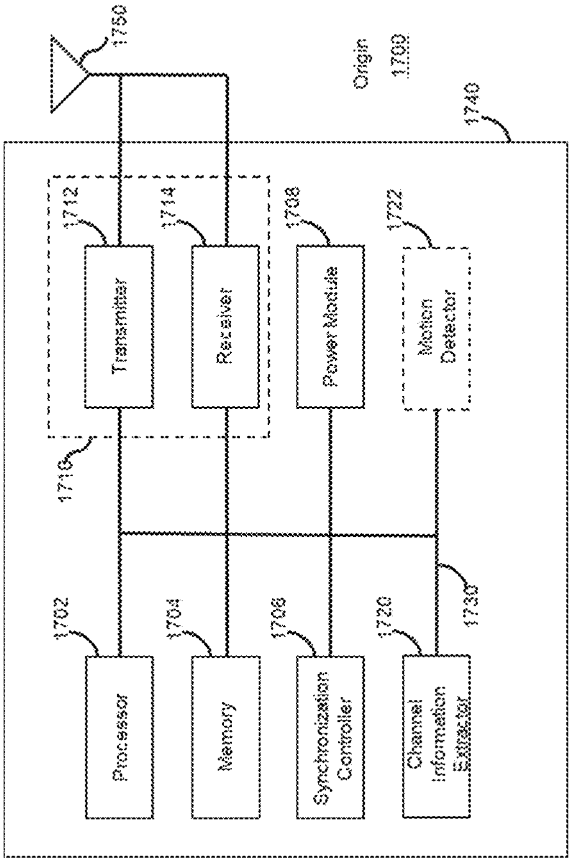

FIG. 17 illustrates an exemplary block diagram of a second wireless device, according to one embodiment of the present teaching.

Figure 18:
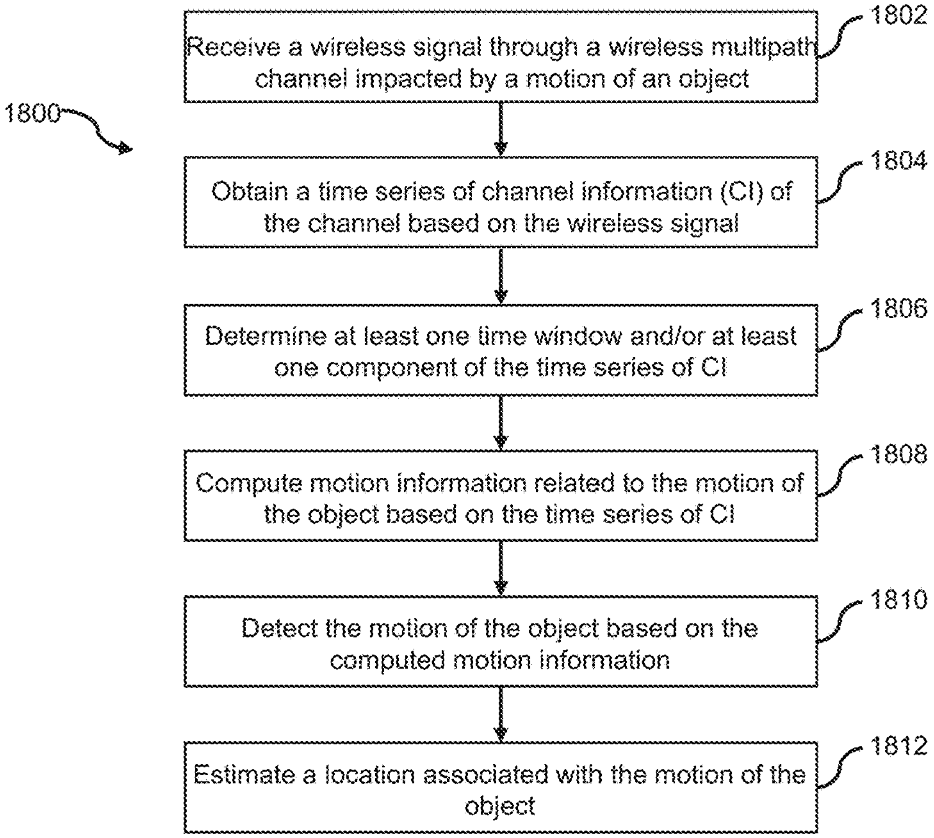

FIG. 18 illustrates a flowchart of an exemplary method performed by a second wireless device, according to one embodiment of the present teaching.

Figure 19:
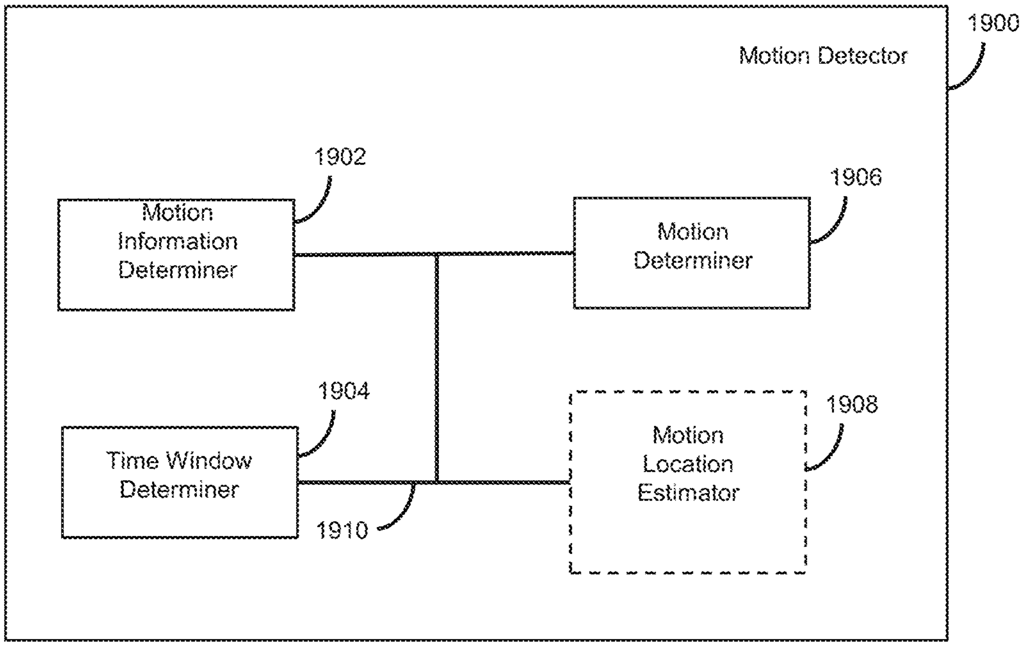

FIG. 19 illustrates an exemplary motion detector, according to one embodiment of the present teaching.

FIG. 20 illustrates an exemplary algorithm of motion detection, according to one embodiment of the present teaching.

Figure 21:
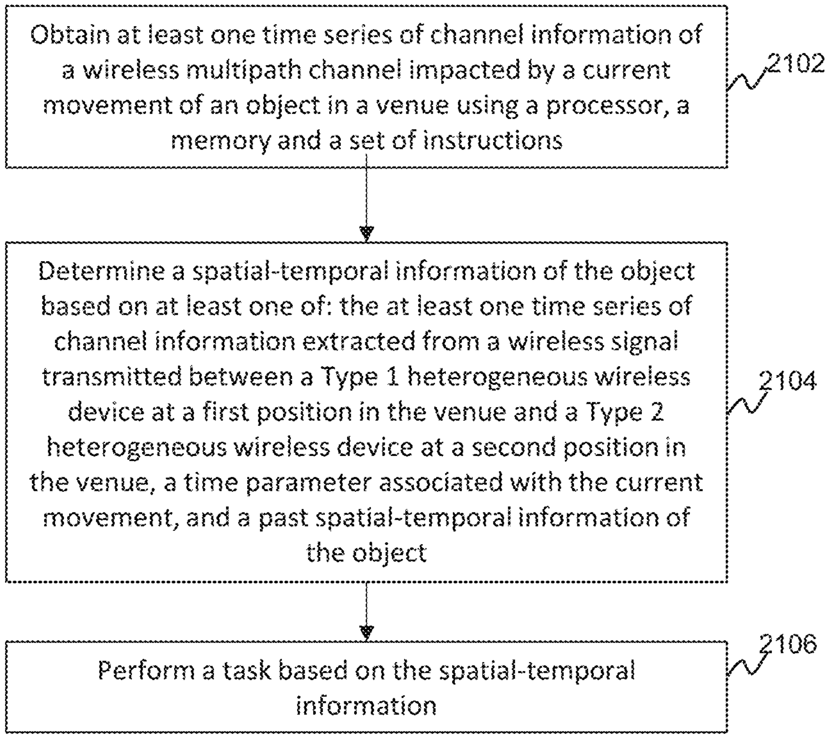

FIG. 21 illustrates an exemplary method for object motion detection, according to one embodiment of the present teaching.

Figure 22:
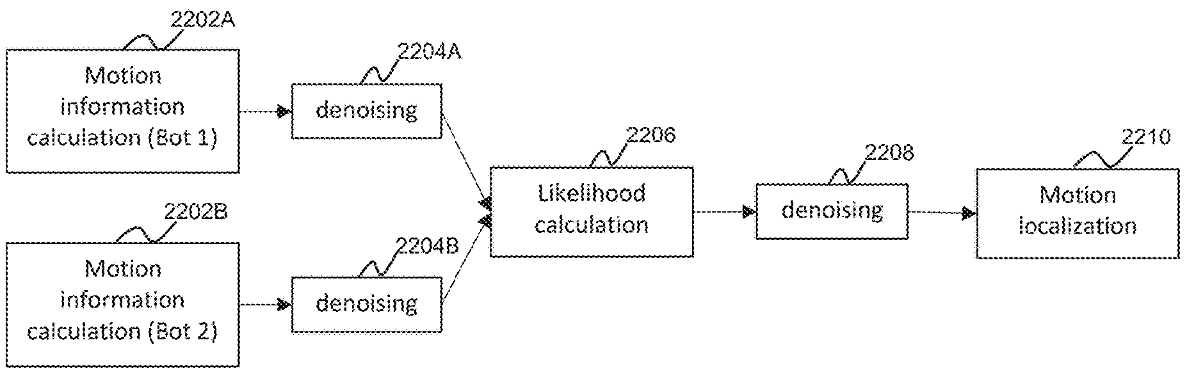

FIG. 22 illustrates an exemplary flowchart for a method of object motion localization, according to one embodiment of the present teaching.

Figure 23:
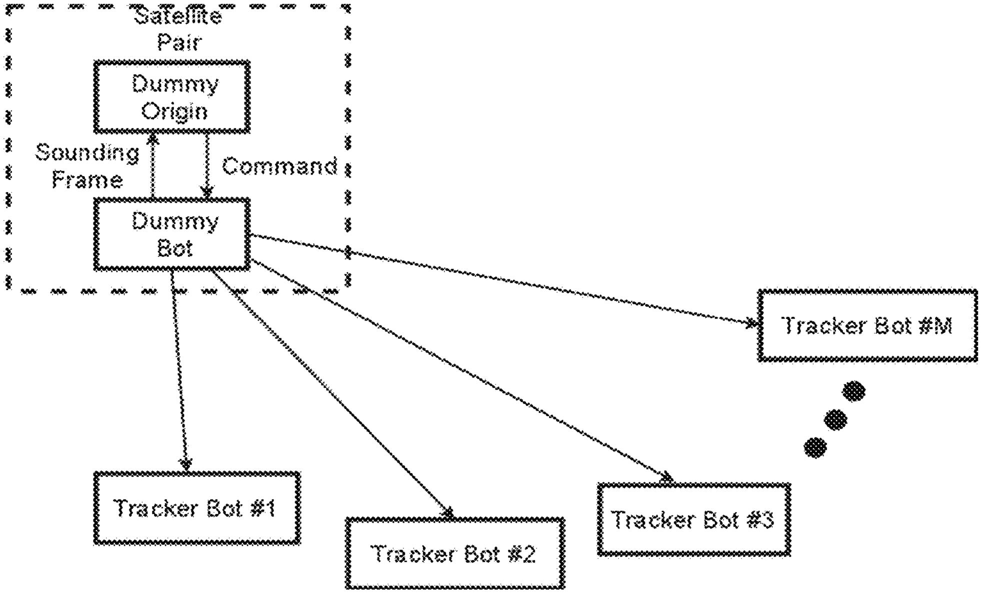

FIG. 23 is a diagram showing an exemplary topology of Origin Satellite. One dummy Origin and a dummy Bot act as the satellite pair, and multiple tracker bots listen to the same predetermined MAC address, according to one embodiment of the present teaching.

Figure 24:
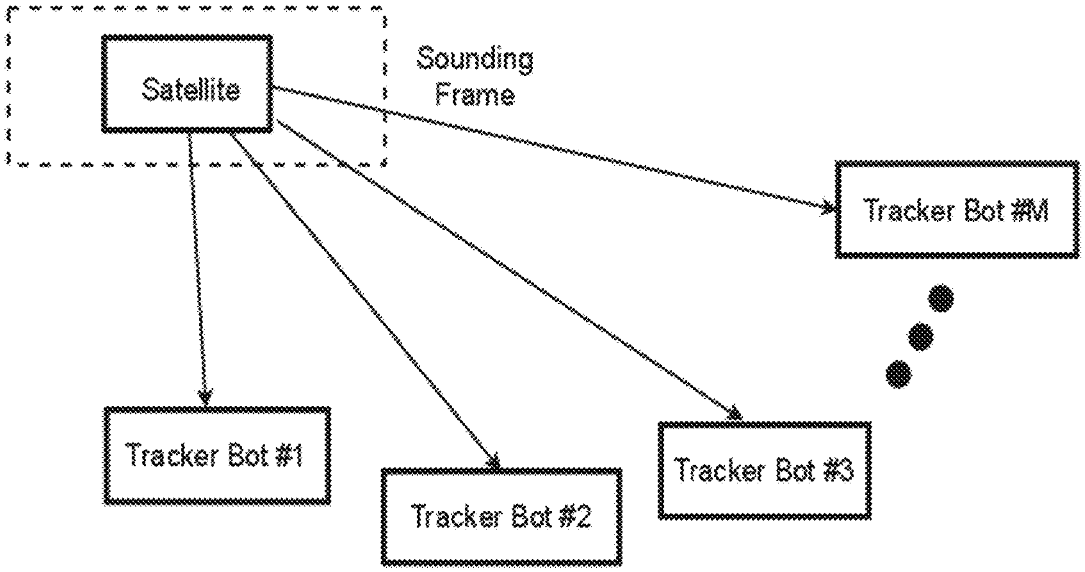

FIG. 24 is a diagram showing an exemplary topology of Origin Satellite. One dummy bot act as the standalone device for the satellite, and multiple tracker bots listen to the same globally unique MAC address, according to one embodiment of the present teaching.

Figure 25:
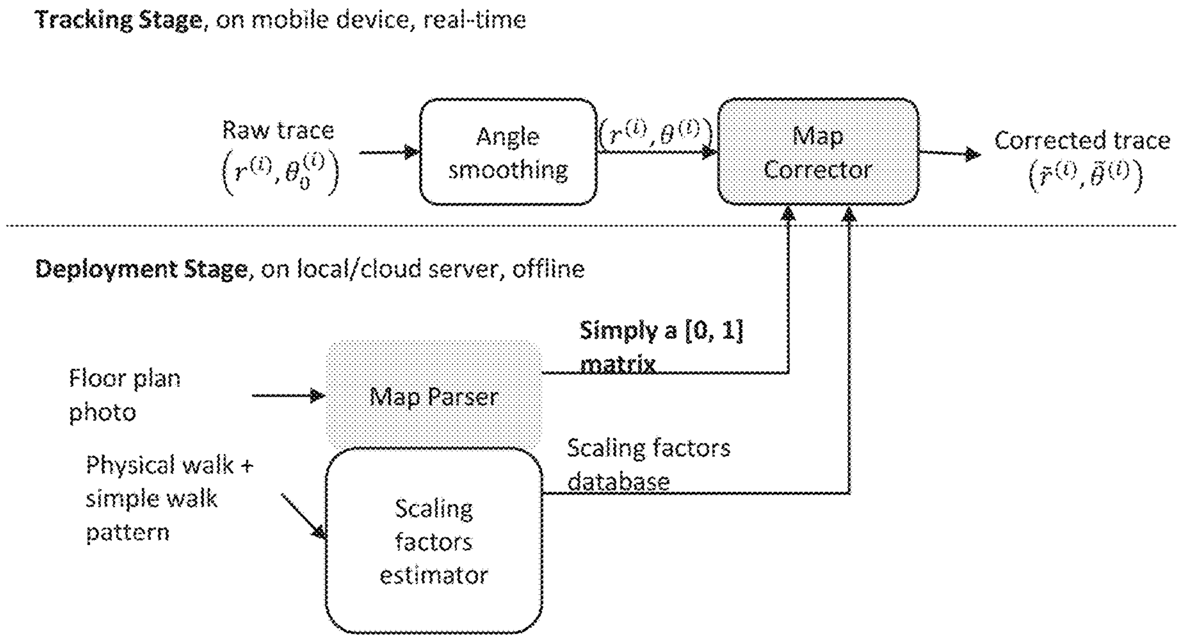

FIG. 25 is a diagram showing an exemplary flow of estimating position information of moving object in indoors, according to one embodiment of the present teaching.

Figure 26:
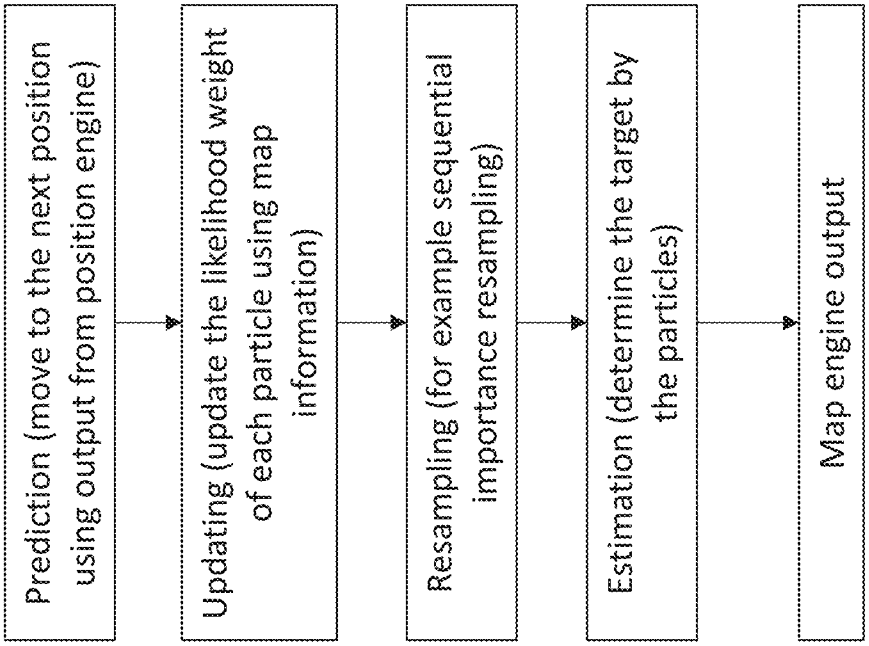

FIG. 26 is a diagram showing an exemplary flow of estimating position information of moving object in indoors using particle-filter based approaches, according to one embodiment of the present teaching.

Figure 27:
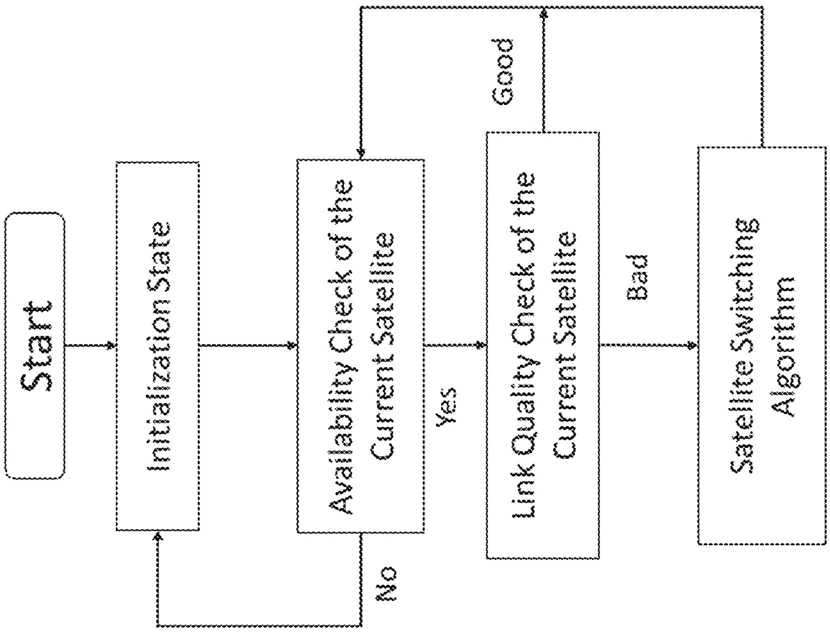

FIG. 27 is a diagram showing an exemplary flow of handover between more than one Origin Satellites, according to one embodiment of the present teaching.

Figure 28:
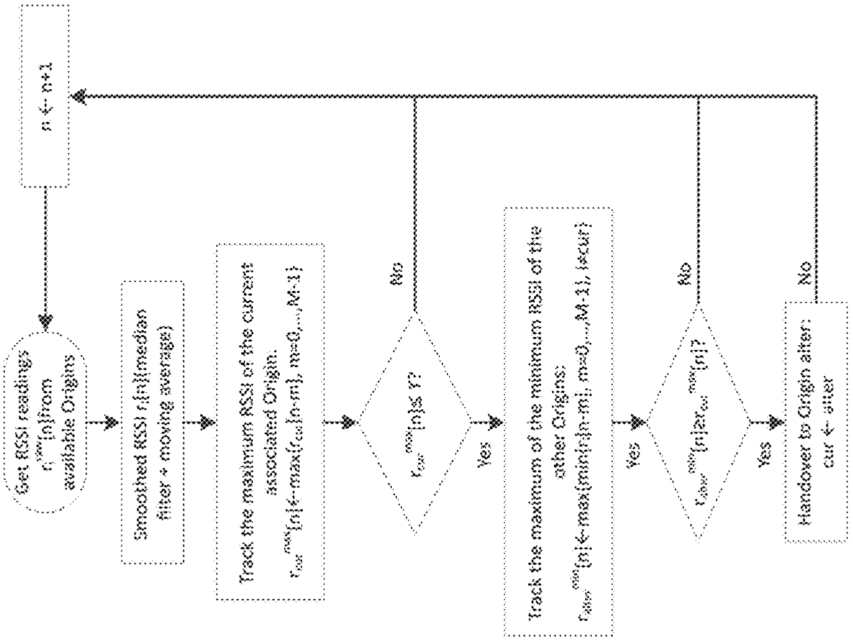

FIG. 28 is a diagram showing an exemplary flow of handover algorithm between more than one Origin Satellites, according to one embodiment of the present teaching.

Figure 29:
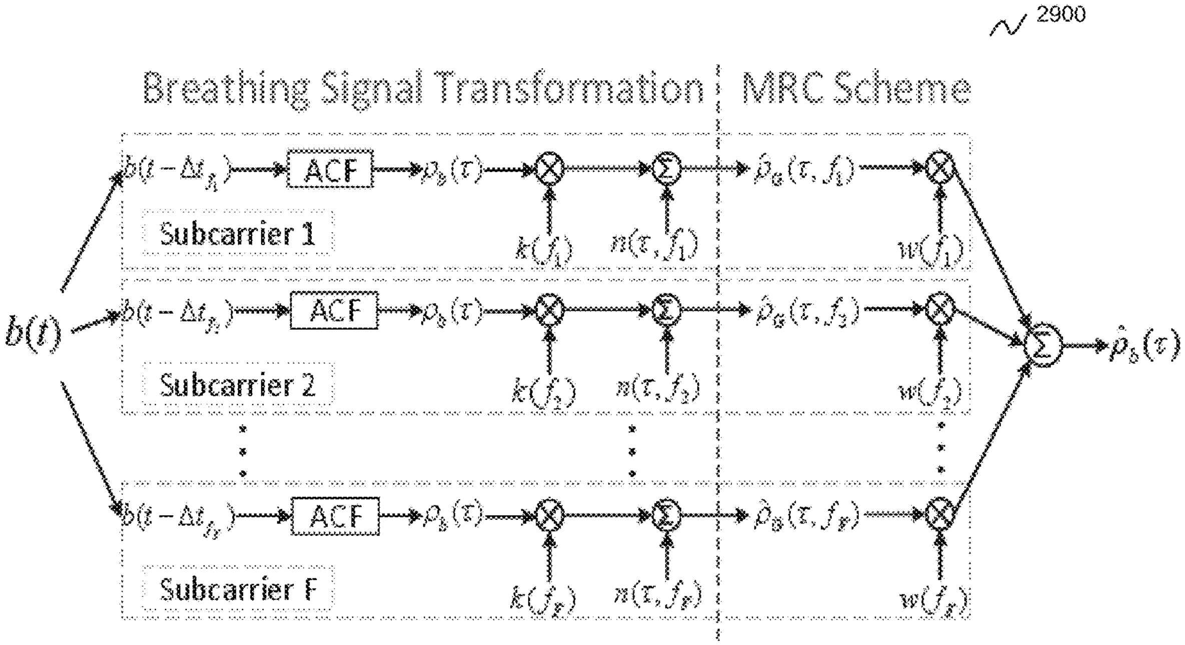

FIG. 29 illustrates an exemplary scheme for breathing signal extraction and maximization, according to one embodiment of the present teaching.

Figure 30:
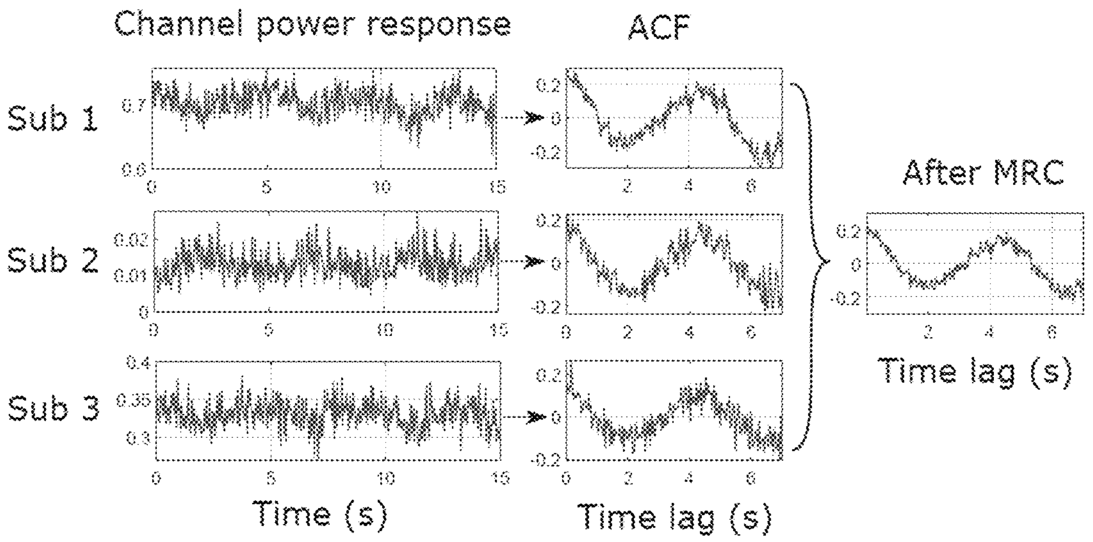

FIG. 30 illustrates an exemplary breathing signal based on real-world measurements, according to one embodiment of the present teaching.

Figure 31:
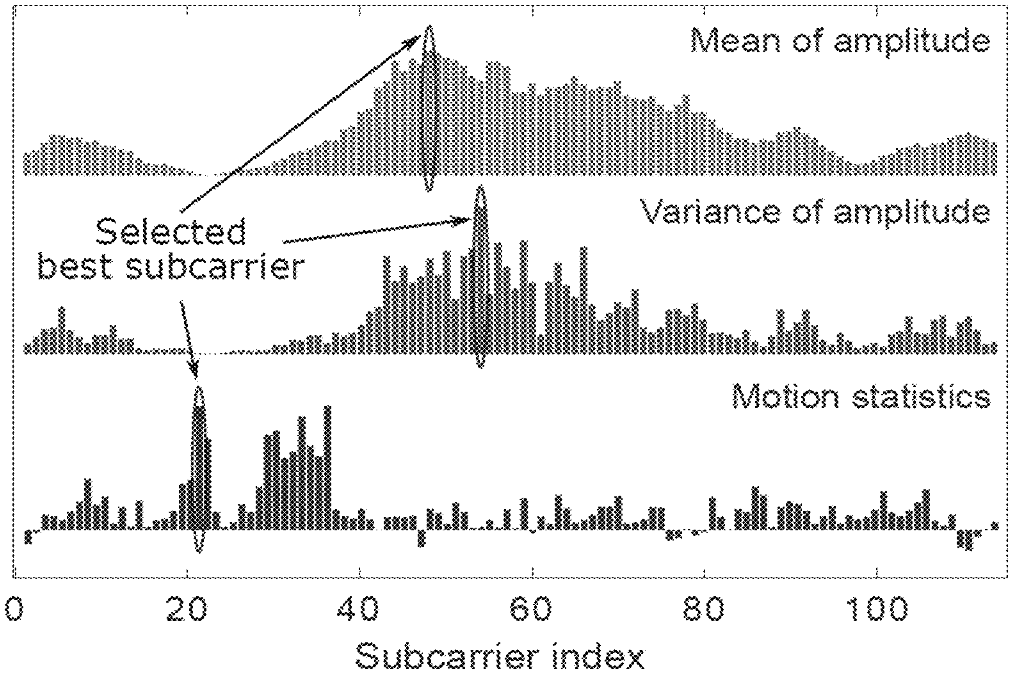

FIG. 31 demonstrates gains of a disclosed scheme for breathing signal extraction and maximization, according to one embodiment of the present teaching.

Figure 32A:
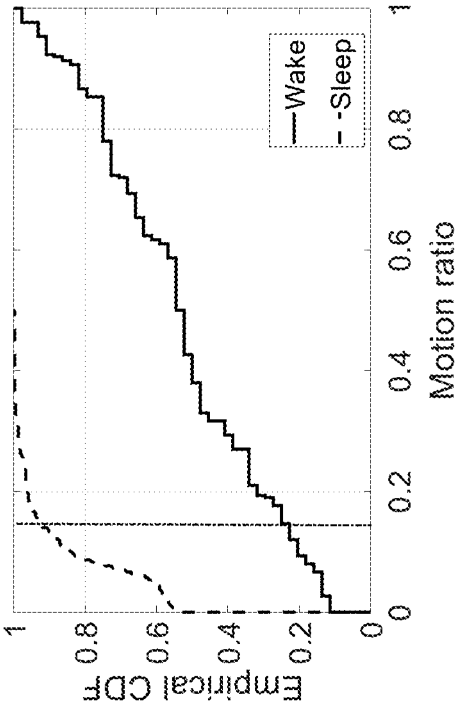
Figure 32B:
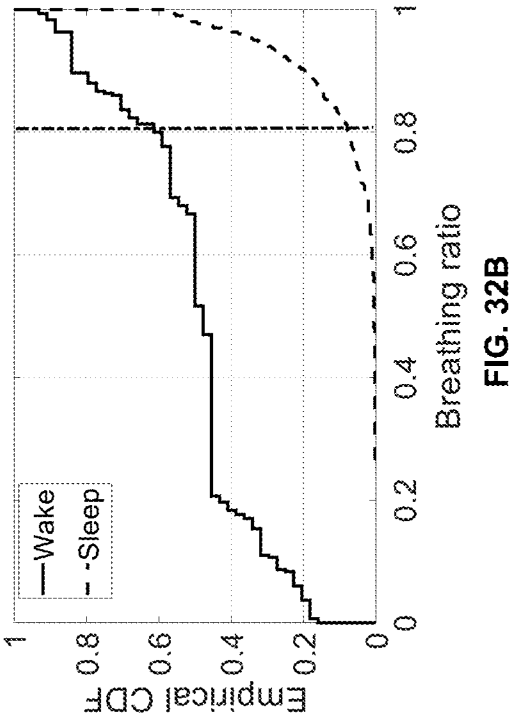

FIG. 32A and FIG. 32B illustrate comparison results between a wake state and a sleep state, according to one embodiment of the present teaching.

Figure 33A:
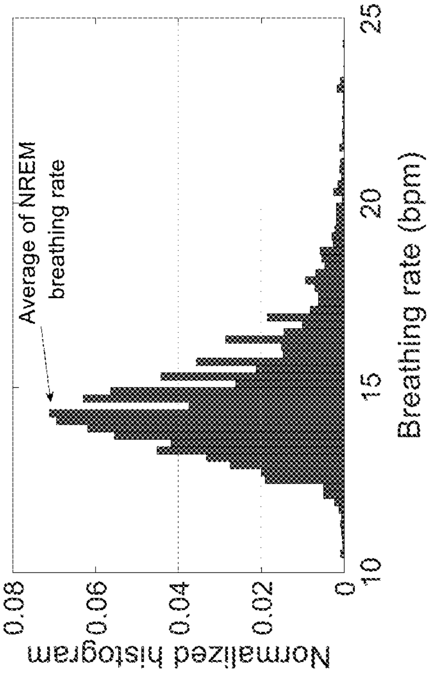
Figure 33B:
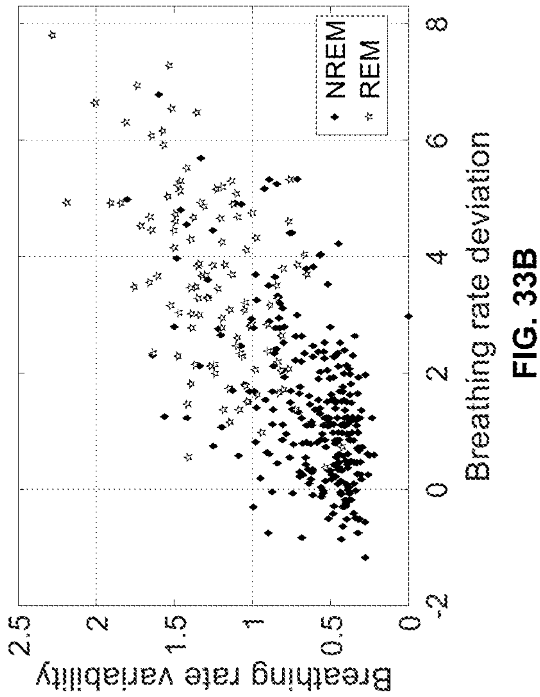

FIG. 33A and FIG. 33B illustrate breathing rate performances of different sleep stages, according to one embodiment of the present teaching.

Figure 34:
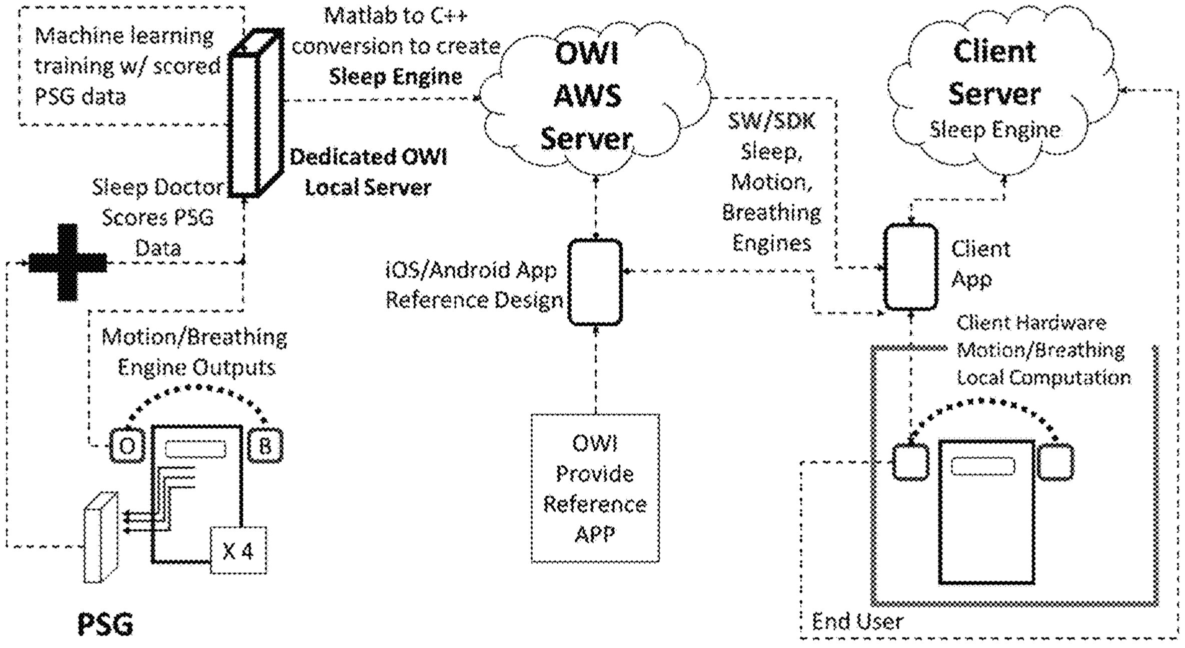

FIG. 34 illustrates an exemplary network environment for sleep monitoring, according to one embodiment of the present teaching.

Figure 35:
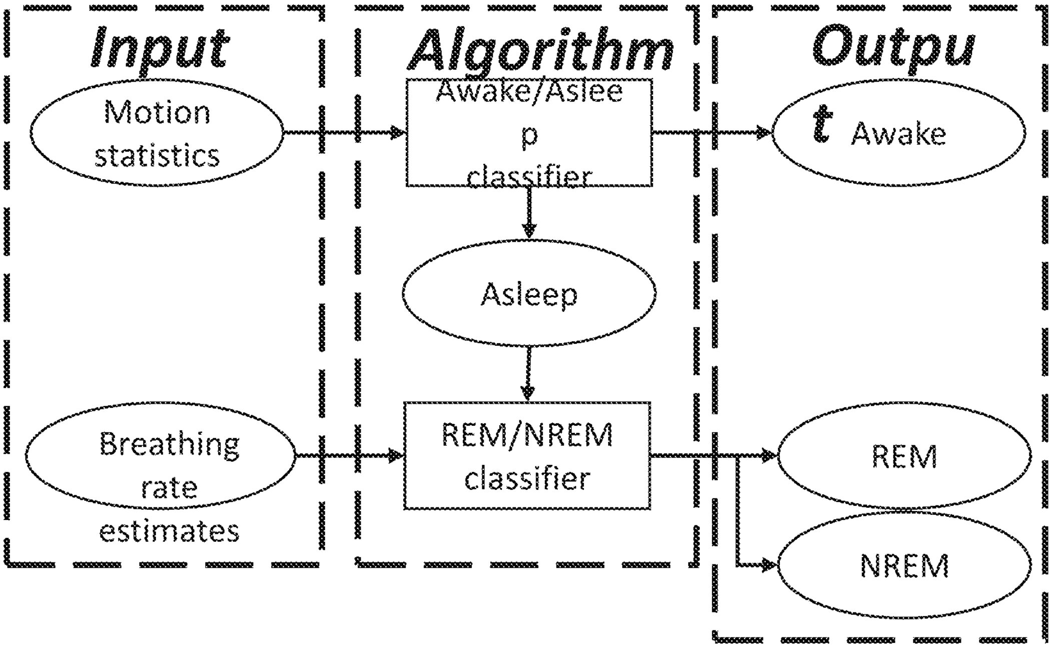

FIG. 35 illustrates an exemplary algorithm design for sleep monitoring, according to one embodiment of the present teaching.

Figure 36:
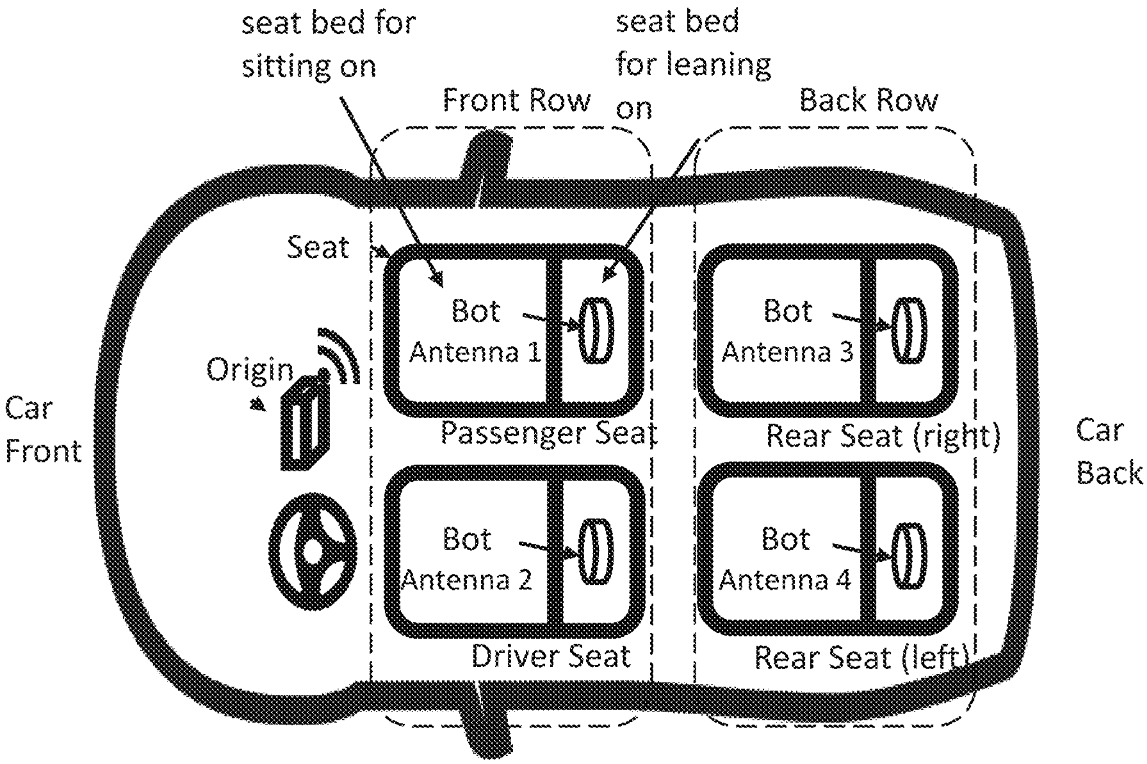

FIG. 36 illustrates an exemplary interior bird-view of a car for seat occupancy detection and people counting, according to one embodiment of the present teaching.

FIGS. 37A-37D illustrate changes of CI according to various seat occupancy situations in a car, according to one embodiment of the present teaching.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

System/Interconnection

In one embodiment, the present teaching discloses a method, apparatus, device, system, and/or software (method/apparatus/device/system/software) of a wireless monitoring system. A time series of channel information (CI) of a wireless multipath channel (channel) may be obtained using a processor, a memory communicatively coupled with the processor and a set of instructions stored in the memory. The time series of CI (TSCI) may be extracted from a wireless signal (signal) transmitted between a Type1 (Type1) heterogeneous wireless device and a Type2 (Type2) heterogeneous wireless device in a venue through the channel. The channel may be impacted by a motion of an object in the venue. A characteristics and/or a spatial-temporal information (e.g. motion information) of the object and/or of the motion of an object may be monitored based on the TSCI. A task may be performed based on the characteristics and/or the spatial-temporal information (e.g. motion information). A presentation associated with the task may be generated in a user-interface (UI) on a device of a user. The TSCI may be preprocessed.

The Type1 device may comprise at least one heterogeneous wireless transmitter. The Type2 device may comprise at least one heterogeneous wireless receiver. The Type1 device and the Type2 device may be the same device. Any device may have a processor, a memory communicatively coupled with the processor, and a set of instructions stored in the memory to be executed by the processor. Some processors, memories and sets of instructions may be coordinated. There may be multiple Type1 devices interacting with the same Type2 device (or multiple Type2 devices), and/or there may be multiple Type2 devices interacting with the same Type1 device. The multiple Type1 devices/Type2 devices may be synchronized and/or asynchronous, with same/different window width/size and/or time shift. Wireless signals sent by the multiple Type1 devices may be synchronous and/or contemporaneous. The multiple Type1 devices/Type2 devices may operate independently and/or collaboratively. A Type1 and/or Type2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server). Operation of one device may be based on operation, state, internal state, storage, processor, memory output, physical location, computing resources, network of another device. Difference devices may communicate directly, and/or via another device/server/cloud server. The devices may be associated with one or more users, with associated settings. The settings may be chosen once, pre-programmed, and/or changed over time. There may be additional steps in the method. The steps and/or the additional steps of the method may be performed in the order shown or in another order. Any steps may be performed in parallel, iterated, or otherwise repeated or performed in another manner. A user may be a human, an adult, an older adult, a man, a woman, a juvenile, a child, a baby, a pet, an animal, a creature, a machine, a computer module/software, etc. In the case of one or multiple Type1 devices interacting with one or multiple Type2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type2 device) may receive the signal and/or another signal from the wireless transmitter (e.g. Type1 device). The wireless receiver may receive another signal from another wireless transmitter (e.g. a second Type1 device). The wireless transmitter may transmit the signal and/or another signal to another wireless receiver (e.g. a second Type2 device). The wireless transmitter, wireless receiver, another wireless receiver and/or another wireless transmitter may be moving with the object and/or another object. The another object may be tracked.

The Type1 and/or Type2 device may be capable of wirelessly coupling with at least two Type2 and/or Type1 devices. The Type1 device may be caused to switch/establish wireless coupling from the Type2 device to a second Type2 device at another location in the venue. Similarly, the Type2 device may be caused to switch/establish wireless coupling from the Type1 device to a second Type1 device at yet another location in the venue. The switching may be controlled by a server, the processor, the Type1 device, the Type2 device, and/or another device. The radio used before and after switching may be different. A second wireless signal (second signal) may be caused to be transmitted between the Type1 device and the second Type2 device (or between the Type2 device and the second Type1 device) through the channel. A second TSCI of the channel extracted from the second signal may be obtained. The second signal may be the first signal. The characteristics, spatial-temporal information and/or another quantity of the object may be monitored based on the second TSCI. The Type1 device and the Type2 device may be the same. The characteristics, spatial-temporal information and/or another quantity with different time stamps may form a waveform. The waveform may be displayed in the presentation.

The signal and/or another signal may have data embedded. The signal may be a series of probe signals. A probe signal may have data embedded. A probe signal may be replaced by a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the spatial-temporal information (e.g. motion information), initial spatial-temporal information, initial time, direction, instantaneous location, instantaneous angle, and/or speed, of the object. The processor, the memory and/or the set of instructions may be associated with the Type1 heterogeneous wireless transceiver, one of the at least one Type2 heterogeneous wireless transceiver, the object, a device associated with the object, another device associated with the venue, a cloud server, and/or another server.

The Type1 device may transmit the signal in a broadcasting manner to at least one Type2 device(s) through the channel in the venue. The signal is transmitted without the Type1 device establishing wireless connection (connection) with any Type2 device. The Type1 device may transmit to a particular media access control (MAC) address common for more than one Type2 devices. Each Type2 device may adjust its MAC address to the particular MAC address.

The particular MAC address may be associated with the venue. The association may be recorded in an association table of an Association Server. The venue may be identified by the Type1 device, a Type2 device and/or another device based on the particular MAC address, the series of probe signals, and/or the at least one TSCI extracted from the probe signals. For example, a Type2 device may be moved to a new location in the venue (e.g. from another venue) The Type1 device may be newly set up in the venue such that the Type1 and Type2 devices are not aware of each other. During set up, the Type1 device may be instructed/guided/caused/controlled (e.g. using a dummy receiver, using a hardware pin setting/connection, using a stored setting, using a local setting, using a remote setting, using a downloaded setting, or using a server) to send the series of probe signals to the particular MAC address. Upon power up, the Type2 device may scan for probe signals according to a table of MAC addresses (e.g. stored in a designated source, server, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type2 device detects the probe signals sent to the particular MAC address, the Type2 device can use the table to identify the venue based on the MAC address. A location of a Type2 device in the venue may be computed based on the particular MAC address, the series of probe signals, and/or the at least one TSCI obtained by the Type2 device from the probe signals. The computing may be performed by the Type2 device.

The particular MAC address may be changed over time. It may be changed according to a time table, rule, policy, mode, condition, situation and/or change. The particular MAC address may be selected based on availability of the MAC address, a pre-selected list, collision pattern, traffic pattern, data traffic between the Type1 device and another device, effective bandwidth, random selection, and/or a MAC address switching plan. The particular MAC address may be the MAC address of a second wireless device (e.g. a dummy receiver, or a receiver that serves as a dummy receiver). The Type1 device may transmit the probe signals in a channel selected from a set of channels. At least one CI of the selected channel may be obtained by a respective Type2 device from the probe signal transmitted in the selected channel. The selected channel may be changed over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type1 device and another device, effective bandwidth associated with channels, security criterion, channel switching plan, a criterion, and/or consideration. The particular MAC address and/or an information of the selected channel may be communicated between the Type1 device and a server through a network. The particular MAC address and/or the information of the selected channel may also be communicated between a Type2 device and a server through another network. The Type2 device may communicate the particular MAC address and/or the information of the selected channel to another Type2 device (e.g. via mesh network, Bluetooth, WiFi, NFC, ZigBee, etc.). The particular MAC address and/or selected channel may be chosen by a server. The particular MAC address and/or selected channel may be signaled in an announcement channel by the Type1 device, the Type2 device and/or a server. Before being communicated, any information may be pre-processed.

Wireless connection between the Type1 device and another wireless device may he established (e.g. using a signal handshake). The Type1 device may send a first handshake signal (e.g. sounding frame, probe signal, request-to-send RTS) to the another device. The another device may reply by sending a second handshake signal (e.g. a command, or a clear-to-send CTS) to the Type1 device, triggering the Type1 device to transmit the signal (e.g. series of probe signals) in the broadcasting manner to multiple Type2 devices without establishing connection with any Type2 device. The second handshake signals may be a response or an acknowledge (e.g. ACK) to the first handshake signal. The second handshake signal may contain a data with information of the venue, and/or the Type1 device.

The another device may be a dummy device with a purpose (e.g. primary purpose, secondary purpose) to establish the wireless connection with the Type1 device, to receive the first signal, and/or to send the second signal. The another device may be physically attached to the Type1 device. In another example, the another device may send a third handshake signal to the Type1 device triggering the Type1 device to broadcast the signal (e.g. series of probe signals) to multiple Type2 devices without establishing connection with any Type2 device. The Type1 device may reply to the third special signal by transmitting a fourth handshake signal to the another device. The another device may be used to trigger more than one Type1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) parallel to the another device. The another device may not communicate (or suspend communication) with the Type1 device after establishing connection with the Type1 device. Suspended communication may be resumed. The another device may enter an inactive mode, hibernation mode, sleep mode, stand-by mode, low-power mode, OFF mode and/or power-down mode, after establishing the connection with the Type1 device. The another device may have the particular MAC address so that the Type1 device sends the signal to the particular MAC address. The Type1 device and/or the another device may be controlled and/or coordinated by a first processor associated with the Type1 device, a second processor associated with the another device, a third processor associated with a designated source and/or a fourth processor associated with another device. The first and second processors may coordinate with each other.

A first series of probe signals may be transmitted by a first antenna of the Type1 device to at least one first Type2 device through a first channel in a first venue. A second series of probe signals may be transmitted by a second antenna of the Type1 device to at least one second Type2 device through a second channel in a second venue. The first series and the second series may/may not be different. The at least one first Type2 device may/may not be different from the at least one second Type2 device. The first and/or second series of probe signals may be broadcasted without connection established between the Type1 device and any Type2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings. Each Type2 device may obtain at least one TSCI from the respective series of probe signals, the CI being of the respective channel between the Type2 device and the Type1 device. Some first Type2 device(s) and some second Type2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed over time. The change may be according to a time table, rule, policy, mode, condition, situation, and/or change. Any rate may be changed over time. The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), household, house, physical address, location, geographic coordinate, IP subnet, SSID, home device, office device, and/or manufacturing device. Each Type1 device may be a signal source of a set of respective Type2 devices (i.e. it sends a respective signal (e.g. respective series of probe signals) to the set of respective Type2 devices). Each respective Type2 device chooses the Type1 device from among all Type1 devices as its signal source. Each Type2 device may choose asynchronously. At least one TSCI may be obtained by each respective Type2 device from the respective series of probe signals from the Type1 device, the CI being of the channel between the Type2 device and the Type1 device.

The respective Type2 device chooses the Type1 device from among all Type1 devices as its signal source based on identity (ID) of Type1/Type2 device, task to be performed, past signal source, history (e.g. of past signal source, Type1 device, another Type1 device, respective Type2 receiver, and/or another Type2 receiver), threshold for switching signal source, and/or information of a user, account, access info, parameter, characteristics, and/or signal strength (e.g. associated with the Type1 device and/or the respective Type2 receiver). Initially, the Type1 device may be signal source of a set of initial respective Type2 devices (i.e. the Type1 device sends a respective signal (series of probe signals) to the set of initial respective Type2 devices) at an initial time. Each initial respective Type2 device chooses the Type1 device from among all Type1 devices as its signal source.

The signal source (Type1 device) of a particular Type2 device may be changed when (1) time interval between two adjacent probe signals (e.g. between current probe signal and immediate past probe signal, or between next probe signal and current probe signal) received from current signal source of the Type2 device exceeds a first threshold; (2) signal strength associated with current signal source of the Type2 device is below a second threshold; (3) a processed signal strength associated with current signal source of the Type2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type2 device is below a fourth threshold for a significant percentage of a recent time window (e.g. 70%, 80%, 90%, etc.). The percentage may exceed a fifth threshold. The first, second, third, fourth and/or fifth thresholds may be time varying. Condition (1) may occur when the Type1 device and the Type2 device become progressively far away from each other, such that some probe signal from the Type1 device becomes too weak and is not received by the Type2 device. Conditions (2)-(4) may occur when the two devices become far from each other such that the signal strength becomes very weak. The signal source of the Type2 device may not change if other Type1 devices have signal strength weaker than a factor (e.g. 1, 1.1, 1.2, or 1.5, etc.) of the current signal source. If the signal source is changed, the new signal source may take effect at a near future time (e.g. the respective next time). The new signal source may be the Type1 device with strongest signal strength, and/or processed signal strength. The current and new signal source may be same/different. A list of available Type1 devices may be initialized and maintained by each Type2 device. The list may be updated by examining signal strength and/or processed signal strength associated with the respective set of Type1 devices.

A Type2 device may choose between a first series of probe signals from a first Type1 device and a second series of probe signals from a second Type1 device based on: respective probe signal rate, MAC addresses, channels, characteristics/properties/states, task to be performed by the Type2 device, signal strength of first and second series, and/or another consideration. The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed. The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type1 device or Type2 device (e.g. a task may need 100 Hz normally and 1000 Hz momentarily for 20 seconds). In one example, the transmitters (Type1 devices), receivers (Type2 device), and associated tasks may be associated adaptively to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed. When a receiver has critically low power, the rate may be reduced to reduce power consumption of the receiver to respond to the probe signals. In one example, probe signals may be used to transfer power wirelessly to a receiver (Type2 device), and the rate may be adjusted to control the amount of power transferred to the receiver. The rate may be changed by (or based on): a server, the Type1 device and/or the Type2 device. Control signals may be communicated between them. The server may monitor, track, forecast and/or anticipate the needs of the Type2 device and/or the tasks performed by the Type2 device, and may control the Type1 device to change the rate. The server may make scheduled changes to the rate according to a time table. The server may detect an emergency situation and change the rate immediately. The server may detect a developing condition and adjust the rate gradually.

The characteristics and/or spatial-temporal information (e.g. motion information) may be monitored individually based on a TSCI associated with a particular Type1 device and a particular Type2 device, and/or monitored jointly based on any TSCI associated with the particular Type1 device and any Type2 device, and/or monitored jointly based on any TSCI associated with the particular Type2 device and any Type1 device, and/or monitored globally based on any TSCI associated with any Type1 device and any Type2 device. Any joint monitoring may be associated with: a user, user account, profile, household, map of venue, and/or user history, etc.

A first channel between a Type1 device and a Type2 device may be different from a second channel between another Type1 device and another Type2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g. two of the following: WiFi, LTE, LTE-A, LTE-U, 2.5G, 3G, 3.5G, 4G, beyond 4G, 5G, 6G, 7G, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system, etc.). For example, one is WiFi and the other is LTE. The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. For each of the multiple known events happening in the venue in a respective training time period associated with the known event, a respective training wireless signal (e.g. a respective series of training probe signals) may be transmitted by an antenna of a first Type1 heterogeneous wireless device using a processor, a memory and a set of instructions of the first Type1 device to at least one first Type2 heterogeneous wireless device through a wireless multipath channel in the venue in the respective training time period. At least one respective time series of training CI (training TSCI) may be obtained asynchronously by each of the at least one first Type2 device from the (respective) training signal. The CI may be CI of the channel between the first Type2 device and the first Type1 device in the training time period associated with the known event. The at least one training TSCI may be preprocessed.

For a current event happening in the venue in a current time period, a current wireless signal (e.g. a series of current probe signals) may be transmitted by an antenna of a second Type1 heterogeneous wireless device using a processor, a memory and a set of instructions of the second Type1 device to at least one second Type2 heterogeneous wireless device through the channel in the venue in the current time period associated with the current event. At least one time series of current CI (current TSCI) may be obtained asynchronously by each of the at least one second Type2 device from the current signal (e.g. the series of current probe signals). The CI may be CI of the channel between the second Type2 device and the second Type1 device in the current time period associated with the current event. The at least one current TSCI may be preprocessed.

The classifier may be applied to classify at least one current TSCI obtained from the series of current probe signals by the at least one second Type2 device, to classify at least one portion of a particular current TSCI, and/or to classify a combination of the at least one portion of the particular current TSCI and another portion of another TSCI. The classifier may also be applied to associate the current event with a known event, an unknown event and/or another event. Each TSCI may comprise at least one CI each associated with a respective timestamp. Two TSCI associated with two Type2 devices may be different with different: starting time, duration, stopping time, amount of CI, sampling frequency, sampling period. Their CI may have different features. The first and second Type1 devices may be at same location in the venue. They may be the same device. The at least one second Type2 device (or their locations) may be a permutation of the at least one first Type2 device (or their locations). A particular second Type2 device and a particular first Type2 device may be the same device.

A subset of the first Type2 device and a subset of the second Type2 device may be the same. The at least one second. Type2 device and/or a subset of the at least one second. Type2 device may be a subset of the at least one first Type2 device. The at least one first Type2 device and/or a subset of the at least one first Type2 device may be a permutation of a subset of the at least one second Type2 device. The at least one second Type2 device and/or a subset of the at least one second Type2 device may be a permutation of a subset of the at least one first Type2 device. The at least one second Type2 device and/or a subset of the at least one second Type2 device may be at same respective location as a subset of the at least one first Type2 device. The at least one first Type2 device and/or a subset of the at least one first Type2 device may be at same respective location as a subset of the at least one second Type2 device.

The antenna of the Type1 device and the antenna of the second Type1 device may be at same location in the venue. Antenna(s) of the at least one second Type2 device and/or antenna(s) of a subset of the at least one second Type2 device may be at same respective location as respective antenna(s) of a subset of the at least one first Type2 device. Antenna(s) of the at least one first Type2 device and/or antenna(s) of a subset of the at least one first Type2 device may be at same respective location(s) as respective antenna(s) of a subset of the at least one second Type2 device.

A first section of a first time duration of the first TSCI and a second section of a second time duration of the second section of the second TSCI may be aligned. A map between items of the first section and items of the second section may be computed. The first section may comprise a first segment of the first TSCI with a first starting lending time, and/or another segment of a processed first TSCI. The processed first TSCI may be the first TSCI processed by a first operation. The second section may comprise a second segment of the second TSCI with a second starting time and a second ending time, and another segment of a processed second TSCI. The processed second. TSCI may be the second. TSCI processed by a second operation.

The first operation and/or the second operation may comprise: subsampling, re-sampling, interpolation, filtering, transformation, feature extraction, pre-processing, and/or another operation. A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive upper threshold and lower-bounded by an adaptive lower threshold. The first section may be the entire first TSCI. The second section may be the entire second TSCI. The first time duration may be equal to the second time duration. A section of a time duration of a TSCI may be determined adaptively. A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time. In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion associated with the at least one activity measure is satisfied.

The at least one criterion associated with the activity measure may comprise at least one of: (a) the activity measure is smaller than an adaptive upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion.

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. F(X, Y, . . . )) with at least two arguments: X and Y. The two arguments may be scalars. The function (e.g. F) may be a function of at least one of: X, Y, (X−Y), (Y−X), abs(X−Y), X^a, Y^b, abs(X^a−Y^b), (X−Y)^a, (X/Y), (X+a)/(Y+b), (X^a/Y^b), and ((X/Y)^a−b), wherein a and b may be some predetermined quantities. For example, the function may simply be abs(X−Y), or (X−Y)^2, (X−Y)^4, The function may be a robust function. For example, the function may be (X−Y)^2 when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X-y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X=(x_1, x_2, . . . , x_n) and Y=(y_1, y_2, . . . , y_n). The function may be a function of at least one of: x_i, y_i, (x_i−y_i), (y_i−x_i), abs(x_i−y_i), x_i ^a, y_i ^b, abs(x_i−^a−y_i ^b), (x_i−y_i)^a,(x_i/y_i), (x_i+a)/(y_i+b), (x_i ^a/y_i ^b), and ((x_i/y_i)^a−b), wherein i is a component index of the n-tuple X and Y, and 1<=i<=n. E.g. component index of x_1 is i=1, component index of x_2 is i=2. The function may comprise a component-by-component summation of another function of at least one of the following: x_i, y_i, (x_i−y_i), (y_i,−x_i), abs(x_i−y_i), x_i ^a, y_i ^b, abs(x_i ^a−y_i ^b), (x_i−y_i)^a, (x_i/y_i), (x_i+a)/y_i+b), (x_i ^a/y_i ^b), and ((x_i/y_i)^a−b), wherein i is the component index of the n-tuple X and Y. For example, the function may be in a form of sum_{i=1}^n (abs(x_i/y_i)−1)/n, or sum_{i=1}^n w_i* (abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the i^{th} domain item is mapped to the j^{th} range item. The constraint may be on admissible combination of i and j (constraint on relationship between i and j). Mismatch cost between a first section of a first time duration of a first TSCI and a second section of a second time duration of a second TSCI may be computed. The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, quantity based on covariance, discriminating score, distance, Euclidean distance, absolute distance, Lk distance (e.g. L1, L2,), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCI. The second section of the second time duration of the second TSCI may be a sliding section of the second TSCI. A first sliding window may be applied to the first TSCI and a corresponding second sliding window may be applied to the second TSCI. The first sliding window of the first TSCI and the corresponding second sliding window of the second TSCI may be aligned. Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section. The current event may be associated with at least one of: the known event, the unknown event and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieve smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event. A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one events, and/or the current TSCI, for the classifier. The classifier of the at least one event may be trained based on the projection and the training TSCI associated with the at least one event. The at least one current TSCI may be classified based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI. Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-temporal Info/Motion/Object

The channel information (CI) may be associated with/may comprise signal strength, signal amplitude, signal phase, received signal strength indicator (RSSI), channel state information (CSI), channel impulse response (CIR), channel frequency response (CFR), channel characteristics, channel filter response, timestamp, auxiliary information, data, meta data, user data, account data, access data, security data, session data, status data, supervisory data, household data, identity (ID), device data, network data, neighborhood data, environment data, real-time data, sensor data, stored data, encrypted data, compressed data, protected data, and/or another channel information. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of a gain setting, an RF filter setting, an RF front end switch setting, a DC offset setting, or an IQ compensation setting for a radio subsystem, or a digital DC correction setting, a digital gain setting, or a digital filtering setting for a baseband subsystem.

The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type1 device and a Type2 device. Each CI may be associated with an antenna of the Type1 device and an antenna of the Type2 device. The CI may be obtained from a communication hardware that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc.

The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/spatial-temporal information of the motion of the object may be monitored based on the component time series.

A component-wise characteristics of a component-feature time series of a TSCI may be computed. The component-wise characteristics may be a scalar (e.g. energy) or a function with a domain and a range (e.g. an autocorrelation function, transform, inverse transform). The characteristics/spatial-temporal information of the motion of the object may be monitored based on the component-wise characteristics. A total characteristics of the TSCI may be computed based on the component-wise characteristics of each component time series of the TSCI. The total characteristics may be a weighted average of the component-wise characteristics. The characteristics/spatial-temporal information of the motion of the object may be monitored based on the total characteristics.

The Type1 device and Type2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system. A common wireless system and/or a common wireless channel may be shared by the Type1 transceiver and/or the at least one Type2 transceiver. The at least one Type2 transceiver may transmit respective signal contemporaneously using the common wireless system and/or the common wireless channel. The Type1 transceiver may transmit a signal to the at least one Type2 transceiver using the common wireless system and/or the common wireless channel. A Type1 device may temporarily function as a Type2 device, and vice versa. A device may function as both a Type1 device (wireless transmitter) and a Type2 device (wireless receiver concurrently. Each Type1 device and Type2 device may have at least one transmitting/receiving antenna. Each CI may be associated with one of the transmitting antenna of the Type1 device and one of the receiving antenna of the Type2 device.

The at least one TSCI may correspond to various antenna pairs between the Type1 device and the Type2 device. The Type1 device may have at least one antenna. The Type2 device may also have at least one antenna. Each TSCI may be associated with an antenna of the Type1 device and an antenna of the Type2 device. Averaging or weighted averaging over antenna links may be performed. The averaging or weighted averaging may be over the at least one TSCI. The averaging may optionally be performed on a subset of the at least one TSCI corresponding to a subset of the antenna pairs. Timestamps of CI of a portion of a TSCI may be irregular and may be corrected so that corrected timestamps of time-corrected CI may be uniformly spaced in time. In the case of multiple Type1 devices and/or multiple Type2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or spatial-temporal information (e.g. motion information) may comprise: location, location coordinate, change in location, position (e.g. initial position, new position), position on map, height, horizontal location, vertical location, distance, displacement, speed, acceleration, rotational speed, rotational acceleration, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, change in frequency, change in timing, change of gait cycle, timing, starting time, ending time, duration, history of motion, motion type, motion classification, frequency, frequency spectrum, frequency characteristics, presence, absence, proximity, approaching, receding, identity of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement of the object, tool motion, machine motion, complex motion, and/or combination of multiple motions, event, motion statistics, motion magnitude, motion phase, similarity score, distance score, Euclidean distance, weighted distance, L_1 norm, L_2 norm, L_k norm for k>2, statistical distance, correlation, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion internal organ motion, motion trend, size, length, area, volume, capacity, shape, form, tag, starting location, ending location, starting quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, and/or another information. The processor shares computational workload with the Type1 heterogeneous wireless device and Type2 heterogeneous wireless device.

The Type1 device and/or Type2 device may be a local device. The local device may be: a smart phone, smart device, TV, sound bar, set-top box, access point, router, repeater, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, smart home device, smart vehicle device, smart office device, smart building device, smart manufacturing device, smart watch, smart glasses, smart clock, smart television, smart oven, smart refrigerator, smart air-conditioner, smart chair, smart table, smart accessory, smart utility, smart appliance, smart machine, smart vehicle, internet-of-thing (IoT) device, internet-enabled device, computer, portable computer, tablet, smart house, smart office, smart building, smart parking lot, smart system, and/or another device. Each Type1 device may be associated with a respective identify (ID). Each Type2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server, in the cloud, stored locally, stored remotely, stored permanently, stored temporarily) and may be retrieved. The ID may be associated with at least one record, account, user, household, address, phone number, social security number, customer number, another ID, timestamp, and/or collection of data. The ID and/or part of the ID of a Type1 device may be made available to a Type2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type1 device and/or the Type2 device.

The object may be person, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement. For example, the object may be a person walking forward. While walking, his left hand and right hand may move in different direction, with different instantaneous speed, acceleration, motion, etc.

The wireless transmitter (e.g. Type1 device), the wireless receiver (e.g. Type2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server and/or other server via internet, wired internet connection and/or wireless internet connection. The nearby device may be portable. The portable device, the nearby device, a local server and/or a cloud server may share the computation and/or storage for a task (e.g. obtain TSCI, determine characteristics/spatial-temporal information of the object associated with the movement of the object, computation of time series of power information, determining/computing the particular function, searching for local extremum, classification, identifying particular value of time offset, de-noising, processing, simplification, cleaning, wireless smart sensing task, extract CI from signal, switching, segmentation, estimate trajectory, process the map, correction, corrective adjustment, adjustment, map-based correction, detecting error, checking for boundary hitting, thresholding, etc.) and information (e.g. TSCI).

The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device.

The nearby device and/or at least one processor associated with the wireless receiver, the wireless transmitter, the another wireless receiver, the another wireless transmitter and/or a cloud server (in the cloud) may determine the initial spatial-temporal information of the object. Two or more of them may determine the initial spatial-temporal info jointly. Two or more of them may share intermediate information in the determination of the initial spatial-temporal information (e.g. initial position). In one example, the wireless transmitter (e.g. Type1 device, or Tracker Bot) may move with the object. The wireless transmitter may send the signal to the wireless receiver (e.g. Type2 device, or Origin Register) or determining the initial spatial-temporal information (e.g. initial position) of the object. The wireless transmitter may also send the signal and/or another signal to another wireless receiver (e.g. another Type2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type2 device, or Tracker Bot) may move with the object. The wireless receiver may receive the signal transmitted from the wireless transmitter (e.g. Type1 device, or Origin Register) for determining the initial spatial-temporal info (e.g. initial position) of the object. The wireless receiver may also receive the signal and/or another signal from another wireless transmitter (e.g. another Type1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type2 device, or another Tracker Bot) for monitoring the motion of the object. The location of the wireless transmitter and/or the another wireless transmitter may be known.

The venue may be a space such as a room, house, office, workplace, hallway, walkway, lift, lift well, escalator, elevator, sewage system, air ventilations system, staircase, gathering area, duct, air duct, pipe, tube, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space. The venue may include both the inside and outside of the space. For example, the venue may include both the inside of a building and the outside of the building. For example, the venue can be a building that has one floor or multiple floors, and a portion of the building can be underground. The shape of the building can be, e.g. round, square, rectangular, triangle, or irregular-shaped. These are merely examples. The disclosure can be used to detect events in other types of venue or spaces.

The wireless transmitter Type1 device) and/or the wireless receiver e.g. Type2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), LTE, NFC, ZigBee, etc.). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dangle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID) as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball, etc.), two-body action (e.g. a person letting go a balloon, catching a fish, molding a clay, writing a paper, person typing on a computer, etc.), car moving in a garage, person carrying a smart phone and walking around an airport/mall/government building/office/etc., autonomous moveable object/machine moving around (e.g. vacuum cleaner, utility vehicle, car, drone, self-driving car, etc.)

The task or the wireless smart sensing task may comprise: object detection, presence detection, object recognition, object verification, tool detection, tool recognition, tool verification, machine detection, machine recognition, machine verification, human detection, human recognition, human verification, baby detection, baby recognition, baby verification, human breathing detection, motion detection, motion estimation, motion verification, periodic motion detection, periodic motion estimation, periodic motion verification, stationary motion detection, stationary motion estimation, stationary motion verification, cyclo-stationary motion detection, cyclo-stationary motion estimation, cyclo-stationary motion verification, transient motion detection, transient motion estimation, transient motion verification, trend detection, trend estimation, trend verification, breathing detection, breathing estimation, breathing estimation, human biometrics detection, human biometrics estimation, human biometrics verification, environment informatics detection, environment informatics estimation, environment informatics verification, gait detection, gait estimation, gait verification, gesture detection, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, tracking, multiple object tracking, indoor tracking, indoor position, indoor navigation, power transfer, wireless power transfer, object counting, car tracking in parking garage, patient detection, patient monitoring, patient verification, wireless communication, data communication, signal broadcasting, networking, coordination, administration, encryption, protection, cloud computing, other processing and/or other task. The task may be performed by the Type1 device, the Type2 device, another Type1, device, another Type2 device, a nearby device, a local server, edge server, a cloud server, and/or another device.

A first part of the task may comprise at least one of: preprocessing, signal conditioning, signal processing, post-processing, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, breathing rate detection, breathing rate estimation, breathing pattern detection, breathing pattern estimation, breathing pattern recognition, heartbeat detection, heartbeat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room, etc.), monitor/detect location of a user/pet, do something automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system, etc.).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/cloud server/fog server/edge server/home network/mesh network, using messaging tool/notification tool/communication tool/scheduling tool/email, using user interface/GUI, using scent/smell/fragrance/taste, using neural tool/nervous system tool, using a combination, etc.) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, deterministic motion, transient motion, fall-down motion, repeating motion, periodic motion, pseudo-periodic motion, periodic motion associated with breathing, periodic motion associated with heartbeat, periodic motion associated with living object, periodic motion associated with machine, periodic motion associated with man-made object, periodic motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for period of time, random motion of which an instantaneous ACF has pseudo-periodic element for period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement. The heterogeneous IC of the Type1 device and/or any Type2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio.

The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802,11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol. The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read. Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded. The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text, etc.), symbolic way (e.g. emoticon, signs, hand gesture, etc.), or mechanical way (e.g. vibration, actuator movement, haptics, etc.).

Basic Computation

Computational workload associated with the method is shared among the processor, the Type1 heterogeneous wireless device, the Type2 heterogeneous wireless device, a local server, a cloud server, and another processor. An operation, pre-processing, processing and/or postprocessing may be applied to data (e.g. TSCI, autocorrelation). An operation may be preprocessing, processing and/or postprocessing. The preprocessing, processing and/or postprocessing may be an operation. An operation may comprise preprocessing, processing, post-processing, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARM A) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, frequency transform, inverse frequency transform, Fourier transform, wavelet transform, Laplace transform, Hilbert transform, Hadamard transform, trigonometric transform, sine transform, cosine transform, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, variance, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, variance function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, upsampling, interpolation, extrapolation, importance sampling, Monte Carlo sampling, compressive sensing, statistics, short term statistics, long term statistics, mean, variance, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure. A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic. An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity from a TSCI may be computed. The quantity may comprise statistic of at least one of: motion, location, map coordinate, height, speed, acceleration, movement angle, rotation, size, volume, time trend, time trend, time profile, periodic motion, frequency, transient, breathing, gait, action, event, suspicious event, dangerous event, alarming event, warning, belief, proximity, collision, power, signal, signal power, signal strength, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heartbeat, cardiopulmonary statistics/analytics, daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or spatial-temporal information to be monitored. Even in steady state, the window size may be adaptively changed based on battery life, power consumption, available computing power, change in amount of targets, the nature of motion to be monitored, etc. The time shift between two sliding time windows at adjacent time instance may be constant/variable/locally adaptive over time. When shorter time shift is used, the update of any monitoring may be more frequent which may be used for fast changing situations, object motions, and/or objects. Longer time shift may be used for slower situations, object motions, and/or objects. The window width/size and/or time shift may be changed upon a user request/choice. The time shift may be changed automatically (e.g. as controlled by processor/computer/server/cloud server) and/or adaptively.

At least one characteristics of a function (e.g. auto-correlation function, auto-covariance function, cross-correlation function, cross-covariance function, power spectral density, time function, frequency domain function, frequency transform) may be determined (e.g. by an object tracking server, the processor, the Type1 heterogeneous device, the Type2 heterogeneous device, and/or another device). The at least one characteristics of the function may include: a local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained (with argument within constraint) maximum, minimum, constrained maximum, constrained minimum, constrained extremum, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, statistics, duration, timing, trend, periodic characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude, etc.) of the local maximum over the same quantity of the local minimum. It may also be the function of a difference between the quantity of the local maximum and the same quantity of the local minimum.

Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach. A set of selected significant local peaks may be selected from the set of identified significant local peaks based on a selection criterion. The characteristics/spatial-temporal information of the object may be computed based on the set of selected significant local peaks and frequency values associated with the set of selected significant local peaks.

In one example, the selection criterion may always correspond to select the strongest peaks in a range. While the strongest peaks may be selected, the unselected peaks may still be significant (rather strong). Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected, in such case, the back-traced peak may replace a previously selected peak in an early time. The replaced peak may be the relatively weakest, or a peak that appear in isolation in time (i.e. appearing only briefly in time). In another example, the selection criterion may not correspond to select the strongest peaks in the range. Instead, it may consider not only the "strength" of the peak, but the "trace" of the peak—peaks that may have happened in the past, especially those peaks that have been identified for a long time. For example, if a finite state machine (FSM) is used, it may select the peak(s) based on the state of the FSM. Decision thresholds may be computed adaptively based on the state of the FSM.

A similarity score and/or component similarity score may be computed (e.g. by a server, the processor, the Type1 device, the Type2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, covariance, cross-covariance, auto-covariance, inner product of two vectors, distance score, norm, metric, statistical characteristics, discrimination score, metric, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or spatial-temporal information may be determined/computed based on the similarity score. Any threshold may be pre-determined, adaptively determined and/or determined by a finite state machine. The adaptive determination may be based on time, space, location, antenna, path, link, state, battery life, remaining battery life, available power, available computational resources, available network bandwidth, etc. A threshold to be applied to a test statistics to differentiate two events (or two conditions, or two situations, or two states), A and B, may be determined. Data (e.g. CI, channel state information (CSI)) may be collected under A and/or under B in a training situation. The test statistics may be computed based on the data. Distributions of the test statistics under A may be compared with distributions of the test statistics under B, and the threshold may be chosen according to some criteria. The criteria may comprise: maximum likelihood (ML), maximum aposterior probability (MAP), discriminative training, minimum Type1 error for a given Type2 error, minimum Type2 error for a given Type1 error, and/or other criteria. The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, occasionally, sporadically, and/or on demand. The threshold adjustment may be adaptive. The threshold adjustment may depend on the object, object movement/location/direction/action, object characteristics/spatial-temporal information/size/property/trait/habit/behavior, the venue, feature/fixture/furniture/barrier/material/machine/living thing/thing/object/boundary/surface/medium that is in/at/of the venue, map, constraint of the map, the event/state/situation/condition, time, timing, duration, current state, past history, user, and/or a personal preference, etc.

A stopping criterion of an iterative algorithm may be that change of a current parameter (e.g. offset value) in the updating in an iteration is less than a threshold. The threshold may be 0.5, 1, 1.5, 2, or another number. The threshold may be adaptive. It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number. The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function. Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize an absolute error, square error, higher order error (e.g. third order, fourth order, etc.), robust error (e.g. square error for smaller error magnitude and absolute error for larger error magnitude, or first kind of error for smaller error magnitude and second kind of error for larger error magnitude), another error, weighted sum of absolute error (e.g. for wireless transmitter with multiple antennas and wireless receiver with multiple antennas, each pair of transmitter antenna and receiver antenna form a link. Error associated with different links may have different weights. One possibility is that some links and/or some components with larger noise may have smaller or bigger weight), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error. The time offset associated with maximum regression error (or minimum regression error) of the regression function with respect to the particular function in the regression window may become the updated current time offset in the iteration. A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error. The quantity may be compared with an F-distribution, central F-distribution, another statistical distribution, threshold, threshold associated with probability, threshold associated with probability of finding false peak, threshold associated with the F-distribution, threshold associated the central F-distribution, and/or threshold associated with the another statistical distribution.

The regression window may be determined based on at least one of: the movement of the object, quantity associated with the object, the at least one characteristics and/or spatial-temporal information of the object associated with the movement of the object, estimated location of the local extremum, noise characteristics, estimated noise characteristics, F-distribution, central F-distribution, another statistical distribution, threshold, preset threshold, threshold associated with probability, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition. The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the movement of the object, at least one characteristics and/or spatial-temporal information of the object associated with the movement of object, positional quantity of the object, initial speed of the object associated with the movement of the object, predefined value, initial width of the regression window, time duration, value based on carrier frequency of the signal, bandwidth of the signal, amount of antennas associated with the channel, noise characteristics, and/or an adaptive value. The current time offset may be at the center, on the left side, on the right side, and/or at another fixed relative location, of the regression window.

In the presentation, information may be displayed with a map of the venue. The information may comprise: location, zone, region, area, corrected location, approximate location, location with respect to (w.r.t.) a map of the venue, location w.r.t. a segmentation of the venue, direction, a path, a path w.r.t. the map and/or the segmentation, a trace (e.g. location within a time window such as the past 5 seconds, or past 10 seconds; the time window duration may be adjusted adaptive; the time window duration may be adaptively adjusted w.r.t. speed, acceleration, etc.), a history of a path, approximate regions/zones along a path, a history/summary of past locations, a history of past locations of interest, frequentlyvisited areas, customer traffic, crowd distribution, crowd behavior, crowd control information, speed, acceleration, motion statistics, breathing rate, heart rate, presence/absence of motion, presence/absence of people, presence/absence of vital sign, gesture, gesture control (control of devices using gesture), location-based gesture control, information of a location-based operation, an identity (ID) of the respect object (e.g. a pet, a person, an self-guided machine/device, a vehicle, a drone, a car, a boat, a bicycle, a self-guided vehicle, a machine with a fan, an air-conditioner, a TV, a machine with a movable part), an identification of a user (e.g. a person), an information of the user, a location/speed/acceleration/direction/motion/gesture/gesture control/motion trace of the user, an ID of the user, an activity of the user, a state of the user, a sleeping/resting characteristics of the user, an emotional state of the user, a vital sign of the user, an environment information of the venue, a weather information of the venue, an earthquake, an explosion, a storm, a rain, a fire, a temperature, a collision, an impact, a vibration, a event, a door-open event, a door-close event, a window-open event, a window-close event, a fall-down event, a burning event, a freezing event, a water-related event, a wind-related event, an air-movement event, an accident event, a pseudo-periodic event (e.g. running on a treadmill, jumping up and down, skipping rope, somersault, etc), a crowd event, a vehicle event, a gesture of the user (e.g. a hand gesture, an arm gesture, a foot gesture, a leg gesture, a body gesture, a head gesture, a face gesture, a mouth gesture, an eye gesture, etc).

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc). The location may be expressed in rectangular coordinate, polar coordinate, and/or another representation. The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, a status of a device/machine, remaining power of a device, a status of the device, etc). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map may be 2-dimensional, 3-dimensional and/or higher-dimensional. (e.g. a time varying 2D/3D map) Walls, windows, doors, entrances, exits, forbidden areas may be marked on the map. The map may comprise floor plan of a facility. The map may have one or more layers (overlays). The map may be a maintenance map comprising water pipes, gas pipes, wiring, cabling, air ducts, crawl-space, ceiling layout, and/or underground layout. The venue may be segmented into multiple zones such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map. Different regions may be color-coded. Different regions may be presented with a characteristic (e.g. color, brightness, color intensity, texture, animation, flashing, flashing rate, etc). Logical segmentation of the venue may be done using the at least one heterogeneous Type2 device, or a server, or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type2 device (named A) and two Type1 devices (named B and C) in the ground floor. His ground floor has predominantly three rooms: kitchen, dining room and living room arranged in a straight line, with the dining room in the middle. The kitchen and the living rooms are on opposite end of the house. He put the Type2 device (A) in the dining room, and put one Type1 device (B) in the kitchen and the other Type1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc). If Stephen pays a monthly fee (e.g. $10/month), a service company (e.g. security company) will receive the warning signal through wired network (e.g. broadband) or wireless network (e.g. home WiFi, LTE, 3G, 2.5G, etc) and perform a security procedure for Stephen (e.g. call him to verify any problem, send someone to check on the house, contact the police on behalf of Stephen, etc). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 am. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 am, or she stayed in the kitchen for too long, or she remains motionless for too long, etc), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that our wireless motion detection system can really detect motion with very high accuracy and very low alarm, and he really can use the mobile app to monitor the motion in the ground floor. He decides to install a similar setup (i.e. one Type2 device and two Type1 devices) in the second floor to monitor the bedrooms in the second floor. Once again, he finds that the system set up is extremely easy as he simply needs to plug the Type2 device and the Type1 devices into the AC power plug in the second floor. No special installation is needed. And he can use the same mobile app to monitor motion in the ground floor and the second floor. Each Type2 device in the ground floor/second floor can interact with all the Type1 devices in both the ground floor and the second floor. Stephen is happy to see that, as he doubles his investment in the Type1 and Type2 devices, he has more than double the capability of the combined systems.

According to various embodiments, each CI (CI) may comprise at least one of: a channel state information (CSI), a frequency domain CSI, a frequency domain CSI associated with at least one sub-band, a time domain CSI, a CSI in a domain, a channel impulse response (CIR), a channel frequency response (CFR), a channel characteristics, a channel filter response, a CSI of the wireless multipath channel, an information of the wireless multipath channel, a timestamp, an auxiliary information, a data, a meta data, a user data, an account data, an access data, a security data, a session data, a status data, a supervisory data, a household data, an identity (ID), a device data, a network data, a neighborhood data, an environment data, a real-time data, a sensor data, a stored data, an encrypted data, a compressed data, a protected data, and/or another CI. In one embodiment, the disclosed system has hardware components (e.g. wireless transmitter/receiver with antenna, analog circuitry, power supply, processor, memory, etc.) and corresponding software components. According to various embodiments of the present teaching, the disclosed system includes a Bot (referred to as a Type1 device) and an Origin (referred to as a Type2 device) for vital sign detection and monitoring. Each device comprises a transceiver, a processor and a memory.

The disclosed system can be applied in many cases. In one example, the Type1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type1 device and Type2 devices may be placed in/near a conference room to count people. The Type1 device and Type2 devices may be in a well-being monitoring system for older adults to monitor their daily activities and any sign of symptoms (e.g. dementia, Alzheimer's disease). The Type1 device and Type2 device may be used in baby monitors to monitor the vital signs (breathing) of a living baby. The Type1 device and Type2 devices may be placed in bedrooms to monitor quality of sleep and any sleep apnea. The Type1 device and Type2 devices may be placed in cars to monitor well-being of passengers and driver, detect any sleeping of driver and detect any babies left in a car. The Type1 device and Type2 devices may be used in logistics to prevent human trafficking by monitoring any human hidden in trucks and containers. The Type1 device and Type2 devices may be deployed by emergency service at disaster area to search for trapped victims in debris. The Type1 device and Type2 devices may be deployed in an area to detect breathing of any intruders. There are numerous applications of wireless breathing monitoring without wearables.

Hardware modules may be constructed to contain either the Type1 transceiver and the Type2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise at least one of: an analytics, a selected time window, a subsampling, a transform, a projection, etc. The presenting may comprise presenting at least one of: a monthly view, a weekly view, a daily view, a simplified view, a detailed view, a cross-sectional view, a small form-factor view, a large form-factor view, a color-coded view, a comparative view, a summary view, an animation, a web view, a voice announcement, and another presentation related to the periodic characteristics of the repeating motion.

A Type1 device and/or a Type2 device may be an antenna, a device with antenna, device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, Internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant, etc), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA, etc.), cellular device, mobile network base station, mobile network hub, mobile network compatible device, LTE device, device with LTE module, mobile module (e.g. circuit board with mobile-enabling chip (IC) such as Wi-Fi chip, LTE chip, BLE chip, etc), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart clock, smart stationary, smart pen, smart user-interface, smart paper, smart mat, smart camera, smart television (TV), set-top-box, smart microphone, smart speaker, smart refrigerator, smart oven, smart machine, smart phone, smart wallet, smart furniture, smart door, smart window, smart ceiling, smart floor, smart wall, smart table, smart chair, smart bed, smart night-stand, smart air-conditioner, smart heater, smart pipe, smart duct, smart cable, smart carpet, smart decoration, smart gadget, smart USB device, smart plug, smart dongle, smart lamp/light, smart tile, smart ornament, smart bottle, vehicle, smart car, smart AGV, drone, smart robot, laptop, tablet, computer, harddisk, network card, smart instrument, smart racket, smart ball, smart shoe, smart wearable, smart clothing, smart glasses, smart hat, smart necklace, smart food, smart pill, small device that moves in the body of creature (e.g. in blood vessels, in lymph fluid, digestive system, etc.). The Type1 device and/or Type2 device may be communicatively coupled with: the internet, another device with access to internet (e.g. smart phone), cloud server, edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a method/device/system of an object tracking system including obtaining one or more TSCI (CI, e.g. 111A, 111B of FIG. 1) of a wireless multipath channel (e.g. 144 of FIG. 1) using a processor (e.g. 100A, 100B of FIG. 1), a memory (e.g. 102A, 102B of FIG. 1) communicatively coupled with the processor (e.g. 100A, 100B) and a set of instructions (e.g. 104A, 104B of FIG. 1) stored in the memory (e.g. 102A, 102B). The one or more TSCI (e.g. 300, 111A, 111B) is extracted/derived/obtained from a wireless signal (e.g. 140 of FIG. 1) transmitted between a Type1 heterogeneous wireless device (e.g. 106A, 106B, 108, 109, 113A, 113B of FIG. 1) at a first position (e.g. 114, 115B, 115A, 117, 119, 406, 408, 410, 414) in a venue (e.g. 142 of FIG. 1) and a Type2 heterogeneous wireless device (e.g. 106A, 106B, 108, 109, 113A, 113B of FIG. 1) at a second position (e.g. 114, 115B, 115A, 117, 119, 406, 408, 410, 414) in the venue (e.g. 142) through the wireless multipath channel (e.g. 144). The wireless multipath channel (e.g. 144) is impacted by a current movement (e.g. 120) of an object (e.g. 112) in the venue (e.g. 142). The method/device/system also determines a spatial-temporal information (e.g. location, speed, velocity, acceleration, a periodic motion, a time trend, a transient motion, a period, etc.) of the object (e.g. 112) based on the at least one TSCI (e.g. 300, 111A, 111B), a time parameter associated with the current movement (e.g. 120), and/or a past spatial-temporal information of the object (e.g. 112). The one or more TSCI (e.g. 300, 111A, 111B) is preprocessed.

The Type1 heterogeneous wireless device (e.g. 106A, 106B, 108, 109, 113A, 113B, 400, 402, 404) and the Type2 heterogeneous wireless device (e.g. 106A, 106B, 108, 109, 113A, 113B, 400, 402, 404) may be different. Different Type1 heterogeneous wireless devices (e.g. 106A, 106B, 108, 109, 113A, 113B, 400, 402, 404) may be different. Different Type2 heterogeneous devices (e.g. 106A, 106B, 108, 109, 113A, 113B, 400, 402, 404) may be different. They may have different amount of antennas (e.g. 200A, 200B, 200C, 200D, 200E, 200F). Their antennas (e.g. 200A, 200B, 200C, 200D, 200E, 200F) may be different. They may use different circuit boards, different chips, and/or different logic with different power consumption and/or different prices. Each may have different additional functionalities and/or upgraded functionalities. They may be from different manufacturers, different factories, and/or from different brands. They may share some common components (e.g. hardware, antenna, circuit, processor (e.g. 100A, 100B), memory (e.g. 102A, 102B), storage, network), some common software (e.g. in the device (e.g. 106A, 106B, 108, 109, 113A, 113B, 400, 402, 404), in the cloud, etc.), and/or some common modules.

A distance (e.g. 122) of the current movement (e.g. 120) of the object (e.g. 112) may be determined (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device) based on the one or more time series of the CI (e.g. 300, 111A, 111B). An estimated direction (e.g. 123) of the current movement (e.g. 120) of the object (e.g. 112) may be obtained. The spatial-temporal information of the object (e.g. 112) may be determined based on the distance (e.g. 122) and/or the estimated direction (e.g. 123) of the current movement (e.g. 120) of the object (e.g. 112).

At least one similarity score may be computed (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device). Each similarity score may be based on a pair of temporally adjacent CI (e.g. 111A, 111B) of the TSCI (e.g. 300) associated with the current movement (e.g. 120) of the object (e.g. 112). A characteristic similarity score (e.g. representative similarity score such as a mean, a medium, a mode, a weight average, a centroid, a percentile, a quartile, a trimmed mean, etc.) may be computed based on the at least one similarity score. A distance (e.g. 122) of the current movement (e.g. 120) of the object e.g. 112) may be determined based on comparing the characteristic similar score to a reference decay curve (e.g. a curve generated by a mathematic formula, a curve learned by some learning algorithm, or a combination of both, etc.). The spatial-temporal information of the object (e.g. 112) may be determined based on the distance (e.g. 122) of the current movement (e.g. 120) of the object (e.g. 112). At least one most recent CI (e.g. 111A, 111B) may be determined (e.g. by an object tracking server, the processor (e.g. 100A, 10013), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device). Each most recent CI (e.g. 111A, 111B) may be most recent in one of the one or more TSCI (e.g. 300). "Most recent" may be "current." A most recent CI may be a CI with a most recent time index. One or more time series of similarity scores may be computed. Each similarity score may be computed based on two CI (e.g. 111A, 111B) (CIs) of a particular time series associated with the similarity score. The two CI (e.g. 111A, 111B) may be the most recent CI (e.g. 111A, 111B) and a temporally adjacent CI (e.g. 111A, 111B) within a time window associated with the current movement (e.g. 120) of the object (e.g. 112). The set of temporally adjacent CI used to compute the time series of similarity scores may include all recent-past CI within a time window. At least one curve may be determined. Each curve may be determined based on a time series of similar scores. At least one feature point of a curve may be identified. The spatial-temporal information of the object (e.g. 112) may be determined/computed based on the at least one feature point. The at least one feature point may include: a local maximum, a local minimum, a first maximum, a second maximum, another maximum, a first minimum, a second minimum, another minimum, a zero-crossing, a first zero-crossing, a second zero-crossing, another zero-crossing, a point having a pre-determined relationship with a second feature point, and/or another feature point.

At least one second similarity score may be computed (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device). Each similarity score may be computed based on an initial CI (e.g. 111A, 111B) and a current CI (e.g. 111A, 111B). The initial CI (e.g. 111A, 111B) may be temporally close to a beginning of the current movement (e.g. 120). The current CI (e.g. 111A, 111B) may be temporally close to an end of the current movement (e.g. 120), and/or a current moment. A characteristic second similarity score may be determined based on the at least one second similar score. If the characteristic second similarity score is greater than (or "greater than or equal to", or "less than" or "less than or equal to") a threshold, the object (e.g. 112) may be determined to be stationary and the current movement (e.g. 120) may be determined to be a null movement, a small movement, and/or a negligibly small movement.

Obtaining Initial Location with Origin Register

An initial spatial-temporal information (e.g. initial position 114) of the object (e.g. 112) at an initial time (e.g. 116) prior to the current movement (e.g. 120) of the object (e.g. 112) may be determined (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device) based on another time series of another CI (e.g. 111A, 111B) (CI) associated with a prior movement of the object (e.g. 112). The another time series of the another CI (e.g. 300) may be extracted from a second wireless signal (e.g. 140) transmitted between a second Type1 heterogeneous device (e.g. 106A, 106B, 108, 109, 113A, 113B, 400, 402, 404) at a third position (e.g. 408) in the venue (e.g. 142) and a second Type2 heterogeneous device (e.g. 106A, 106B, 108, 109, 113A, 113B, 400, 402, 404) at a fourth position (e.g. 410) in the venue (e.g. 142) through the wireless multipath channel (e.g. 144). The wireless multipath channel (e.g. 144) may be impacted by the prior movement of the object (e.g. 112). The initial spatial-temporal information (e.g. initial position 114) of the object (e.g. 112) at the initial time 116) may be determined to be a known location associated with the second Type1 heterogeneous device (e.g. 106A, 106B, 108, 109, 113A, 113B, 400, 402, 404) and/or the second Type2 heterogeneous device (e.g. 106A, 106B, 108, 109, 113A, 113B, 400, 402, 404). A time period may be determined. Within the time period, essentially all (e.g. all except a few, or all without the outliers) corresponding CI (e.g. 111A, 111B) of the another time series of the another CI (e.g. 111A, 111B) may be larger than a first adaptive threshold and smaller than a second adaptive threshold. The initial time (e.g. 116) may be determined as a characteristic point of the time period. The spatial-temporal information of the object (e.g. 112) may be determined based on the initial spatial-temporal information (e.g. initial position 114) of the object (e.g. 112) at the initial time (e.g. 116). The characteristic point of the time period may be: a mid-point, a quartile point, a percentile point, a starting point, an ending point, a point at which the another CI (e.g. 111A, 111B) is locally maximum, a point at which the another CI (e.g. 111A, 111B) is locally minimum, a point at which the another CI (e.g. 111A, 111B) has a certain characteristics, and/or another characteristic point.

At the initial time (e.g. 116) during the prior movement of the object (e.g. 112), "one" of the second Type1 heterogeneous device (e.g. 106A, 106B, 108, 109, 113A, 113B, 400, 402, 404) and the second Type2 heterogeneous device (e.g. 106A, 106B, 108, 109, 113A, 113B, 400, 402, 404) may be spatially close to and may move with the object (e.g. 112) during the prior movement of the object (e.g. 112). At the initial time (e.g. 116), the "other one" of the second Type1 heterogeneous device (e.g. 106A, 106B, 108, 109, 113A, 113B, 400, 402, 404) and the second Type2 heterogeneous device (e.g. 106A, 106B, 108, 109, 113A, 113B, 400, 402, 404) may have a directional antenna. The initial spatial-temporal information (e.g. initial position 114) of the object (e.g. 112) at the initial time (e.g. 116) may be determined (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device) to be a known location associated with the other one of the second Type1 heterogeneous device (e.g. 106A, 106B, 108, 109, 113A, 113B, 400, 402, 404) and the second Type2 heterogeneous device (e.g. 1.06A, 106B, 108, 109, 113A, 113B, 400, 402, 404) with the directional antenna.

As an example, the "one" of the second Type1 heterogeneous device (e.g. 106A, 106B, 108, 109, 113A, 113B, 400, 402, 404) and the second Type2 heterogeneous device (e.g. 106A, 106B, 108, 109, 113A, 113B, 400, 402, 404) may be module1 106A and/or wireless transmitter (e.g. 108) while the "other one" of the second Type1 heterogeneous device (e.g. 106A, 106B, 108, 109, 113A, 113B, 400, 402, 404) and the second Type2 heterogeneous device (e.g. 106A, 106B, 108, 109, 113A, 113B, 400, 402, 404) may be module2 106B and/or wireless receiver (e.g. 109). The "one" may be a smart phone and/or other portable gadget. The object (e.g. 112) may be a person. The object (e.g. 112) (the person) may be carrying the "one" (the smart phone, spatially close to the person) as the object (e.g. 112) (the person) moves around. The prior movement (e.g. walking) may be the person with the smart phone entering the venue (e.g. 142) (e.g. an airport, a terminal, a mall, a supermarket, etc.). Thus the "one" may be spatially close to the object (e.g. 112) and may move with the object (e.g. 112) during the prior movement of the object (e.g. 112), and may be a smart phone or another portable device spatially close to the object (e.g. 112) (e.g. a person).

The "other one" may be installed at the top or at the side or at the bottom or around or near the entrance. The directional antenna of the "other one" may be aiming/pointing at the entrance such that a special signal would be pick up when the "one" carried by the object (e.g. 112) passes through the entrance. The initial time (e.g. 116) may be the moment the person passes through the entrance. As the beam (the cone-shape coverage) of the directional antenna may be narrow (e.g. compared with the speed of the human movement), the special signal may be strong for a short period of time (e.g. 0.2 second). The initial time (e.g. 116) may be determined as a characteristics point of the time period (e.g. mid-point). The initial spatial-temporal information (e.g. initial position 114) of the person at the initial time (e.g. 116) may be the location of the entrance, or a predefined location near the entrance.

At a current time during the movement of the object (e.g. 112), "one" of the first Type1 heterogeneous device (e.g. 106A, 106B, 108, 109, 113A, 113B, 400, 402, 404) and the first Type2 heterogeneous device (e.g. 106A, 106B, 108, 109, 113A, 113B, 400, 402, 404) may be spatially close to and may move with the object (e.g. 112) during the movement of the object (e.g. 112). The "one" may be a smart phone. The object (e.g. 112) may be a person. The person may be carrying the smart phone. The movement of the object (e.g. 112) may be the person walk around a venue (e.g. 142) (e.g. a mall). The "one" (e.g. the smart phone) may be spatially close to and/or may move with the object (e.g. 112) (e.g. the person) during the movement of the object (e.g. 112).

The current time may be real time during the movement of the object (e.g. 112). For example, the initial time (e.g. 116) may be seconds, minutes, hours, days, weeks, months, and/or years before the current time. At the current time, "one" of the first Type1 heterogeneous device (e.g. 106A, 106B, 108, 109, 113A, 113B, 400, 402, 404) and the first Type2 heterogeneous device (e.g. 106A, 106B, 108, 109, 113A, 113B, 400, 402, 404) may be communicatively coupled with a network server, and/or may be communicatively coupled with a local device (e.g. 106A, 106B, 108, 109, 113A, 113B, 400, 402, 404) that may be communicatively coupled with the network server. The "one" and/or the local device (e.g. 106A, 106B, 108, 109, 113A, 113B, 400, 402, 404) may be connected to a cloud server in the internet using 2.5G/3G/4G/LTE/5G/6G, WiFi, WiMax, Zigbee, Bluetooth, BLE, wireless network, etc. The "one" may connect to the cloud server via the local device (e.g. 106A, 106B, 108, 109, 113A, 113B, 400, 402, 404) by connecting to the local device (e.g. 106A, 106B, 108, 109, 113A, 113B, 400, 402, 404) which is in turn connected to the cloud server.

When the "one" (e.g. smart phone, portable/moveable device, portable gadget communicatively coupled with the smart phone via. WiFi and/or BLE and/or other communication channels or a portable device) moves with the object (e.g. 112) (e.g. a person) in the venue (e.g. 142) (e.g. a mall), the movement of the object (e.g. 112) and/or the "one" may impact the wireless signal (e.g. 140) passing through the wireless multipath channel (e.g. 144) associated with the venue (e.g. 142) such that the object (e.g. 112) position (e.g. 114, 115B, 115A, 117, 119, 406, 408, 410, 414) may be tracked based on the CI (e.g. 111A, 111B) derived/extracted/obtained/computed from the wireless signal (e.g. 140).

Tracking with Antenna Matching

As an example, the object (e.g. 112) may be at a current location L1 (e.g. new position 115B) at a current time T1 (e.g. current time t_N 130). Immediately before the current time T1 (e.g. 130), the object (e.g. 112) may be at an immediately past location L0 (e.g. immediately past position 115A) at an immediately past time T0 (e.g. immediately past time t_{N−1} 132). "One" of the Type1 heterogeneous device (e.g. 106A, 106B, 108, 109, 113A, 113B, 400, 402, 404) and the Type2 heterogeneous device (e.g. 106A, 106B, 108, 109, 113A, 113B, 400, 402, 404) may be spatially close to the object (e.g. 112) and may move with the object (e.g. 112). The "one" may comprise two antennas A1 and A2 spatially close to each other. The distance between A1 and A2 may be d. The time difference between T1 and T0 may be t=T1−T0. The line connecting A1 and A2 is a direction theta.

At the immediately past time T0 (e.g. 132) when the object (e.g. 112) may be at the immediately past location L0 (e.g. 115A), the two antennas A1 and A2 may be at locations L0A1 and L0A2 respectively, both of which may be close to L0 (e.g. 115A). At time T0, a CI CI0A1 associated with the antenna A1 may be obtained, and a CI CI0A2 associated with the antenna A2 may be obtained.

At the current time T1 (e.g. 130) when the object (e.g. 112) may be at the current location L1 (E.g. 115B), the two antennas A1 and A2 may be at locations L1A1 and L1A2 respectively, both of which may be close to L1 (e.g. 115B). At time T1, a CI CI1A1 associated with the antenna A1 may be obtained, and a CI CI1A associated with the antenna A2 may be obtained. The spatial-temporal information of the object may be determined based on CI0A1, C10A2, CI1A1, and CI1A2. The spatial-temporal information may comprise at least one of: a displacement, a distance, a direction, a speed, an acceleration of a current movement (e.g. current movement 120). The CI1A1 and CI1A2 may be compared with CI0A1 and CI0A2.

If CI1A1 may match CI0A2 (e.g. with a similarity score larger than some threshold), it may be an indication that the antenna A2 (and the "one" and the object itself) may have moved from location L0A2 at time T0 to location L1A1 at time T1. The distance (i.e. the spatial-temporal information) may be determined as d, the distance between the antennas A1 and A2, i.e. distance between L0A2 and L1A1. The speed may be determined as the distance d divided by the time t=T1−T0, i.e. speed=d/(T1−T0). The axis of motion may be determined as the axis connecting antennas A1 and A2. The direction may be determined as the direction from antenna A2 to A1 (e.g. theta).

If CI1A2 may match CI0A1 (e.g. with similarity score larger than some threshold), it may be an indication that the antenna A1 (and the "one" and the object itself) may have moved from location L0A1 at time T0 to location L1A2 at time T1. The distance (i.e. the spatial-temporal information) may be determined as d, the distance between the antennas A1 and A2, i.e. distance between L0A1 and L1A2, The speed may be determined as the distance d divided by the time t=T1−T0, i.e. speed=d/(T1−T0). The axis of motion may be determined as the axis connecting antennas A1 and A2. The direction may be determined as the direction from antenna A1 to A2.

The "one" may have more than two antennas. For example, they may be an antenna at a center surrounded by a number of other antennas (e.g. N antennas). The center antenna may be antenna A1. One of the other antennas may be antenna A2. Or, two of the other antennas may be the antennas A1 and A2. The other antennas may be uniformly spaced (e.g. uniformly spaces on a circle with angle=90 degrees for N=4, angle=60 degree for N=6, angle=45 degrees for N=8, angle=30 for N=12 etc.) and/or non-uniformly spaced (e.g. randomly space, or locally uniformly spaced). The angle sustained by adjacent antennas at the center antenna may be uniformed spaced and/or non-uniformed spaced. For example, the other antennas may be at equal distance from the center antenna (i.e. on a circle), at vertices of one or more polyhedron (e.g. square, pentagon, hexagon, heptagon, octagon, non-convex polyhedron, etc.), and/or randomly spaced.

In one example, the "one" may have 9 antennas arranged in a tic-tac-toe configuration (on a square lattice or rectangular lattice), with the center antenna being in the center. The "one" may have 9 (or any other number of) antennas, with one being in the center and the rest arranged in a circle or ellipse or other shape (e.g. concave shape, convex shape, non-convex shape, non-concave shape, irregular shape) around the center. In one example, the "one" may have antennas arranged in a 3-dimensional arrangement (or constellation). E.g. antennas may be arranged in a 3-dimensional square and/or rectangular lattice, and/or in a sphere (like GPS satellites surrounding the earth). Or, 9 antennas with 1 at center and 8 at vertices of a cube. In one example, the "one" may have a center antenna, a set of antennas (e.g. N1 antennas) arranged in one way around the center antenna, and another set of antennas (e.g. N2 antennas) arranged in another way around the center antenna. In one example, the "one" may have multiple center antennas, in one example, the "one" may have movable antennas such that the relative spacing and placement of the antennas can be changed over time. The adaptive spacing and placement of the antennas may depend on a current motion, a past motion and/or a predictive future motion. In one example, the "one" may have at least one movable/adjustable barrier around the antennas so that the wireless multipath signals may be controlled and/or steered. The barriers may be moved/adjusted so that the multipath signals may be focused/steered in some directions. In an example, the "one" may comprise M antennas $A_1, A_2, \ldots, M$ (or $A_i$, for $i=1, \ldots, M$) arranged in a co-linear manner. Due to the co-linear placement, there is an inherent "direction", "orientation", and/or "axis" associated with the M antennas. Let the distances between adjacent antennas be $d_1, d_2, \ldots, d_{M-1}$, wherein $d_i$ is the distance between antennas $A_i$ and $A_{i+1}$, for $i=1, \ldots, M-1$. The distances $d_1, d_2, \ldots, d_{M-1}$ may/may not be all equal. If the antennas are uniformly spaced, the distances $d_1, d_2, \ldots, d_{M-1}$ may be all equal.

Consider N ascending time instances: $T_1, T_2, \ldots, T_N$ (or $T_i$, for $i=1, \ldots, N$). Let the time difference between adjacent time instances be $t_1, t_2, \ldots, t_{N-1}$, wherein $t_i=T_{i-1}-T_i$ for $i=1, 2, \ldots, N-1$. The time differences $t_1, t_2, \ldots, t_{N-1}$ may/may not be equal over time. If the time instances $t_1, t_2, \ldots, t_{N-1}$ are uniformly space, the time difference may be all equal. The object (e.g. 112) may be at location $L_1$ at $T_1$, $L_2$ at $T_2, \ldots$, and $L_N$ at $T_N$. At time $T_i$, the object may be at location $L_i$. Let the location of the $j^{th}$ antenna $A_j$ at $T_i$ be $L_{i,j}$, for $i=1, \ldots, N$ and $j=1, \ldots, M$. The $d_1, d_2, \ldots, d_{M-1}$ may change over time. The orientation of the M antennas may/may not change over time. At time $T_i$, a CI $CI_{i,j}$ associated with the antenna $A_j$ (for $i=1, \ldots, N$, $j=1, \ldots,$ ) may be obtained. The spatial-temporal information of the object may be determined based on $\{CI_{i,j}: i=1, \ldots N, j=1, \ldots, M\}$. The spatial-temporal information may comprise at least one of: a displacement, a distance, a direction, a speed, an acceleration of a current movement (e.g. current movement 120).

Different time shift k may be studied/tested, wherein k ranges from 1 to N−1. For a time shift k, a $CI_{i,j1}$ may be compared with $CI_{i+k,j2}$, for $j\mathbf{1}=1, \ldots, M$, $j\mathbf{2}=1, \ldots, M$. If $CI_{i,j1}$ may match $CI_{i+k,j2}$ (e.g. with a similarity score larger than some threshold T1), it may be an indication that location $L_{i,j1}$ is the same (or almost the same) as location $L_{i+k,j2}$, and the antenna $A_{j2}$ (and the "one" and the object itself) may have moved from location $L_{i,j2}$ at time $T_i$ to location $L_{i+k,j2}$ (i.e. $L_{i,j1}$) at time $T_{i+k}$. In other words, the object and the "one" (together with its antennas) may have moved in the "direction" or "orientation" or the "axis" of the antennas. For example, for $i=1$, $k=1$, $j\mathbf{1}=1$, $j\mathbf{2}=2$, $CI_{1,1}$ may match $CI_{2,2}$, which may indicate that antenna $A_2$ may have moved from location $L_{1,2}$ at time $T_1$ to location $L_{1,1}$ at time $T_2$. In other words, in one (since k=1) unit of time (assuming uniform time spacing such that 1 unit of time$=T_2-T_1=T_3-T_2$), the object and the "one" together with its antennas may have moved in the direction of the antenna axis by one unit of distance (assuming the antennas are uniformly spaced, such that 1 unit of distance$=d_1=d_2=d_3$).

As another example, for $i=1$, $k=2$, $j\mathbf{1}=3$, $j\mathbf{2}=4$, $CI_{1,3}$ may match $CI_{3,4}$, which may indicate that antenna $A_4$ may have moved from location $L_{1,4}$ at time $T_1$ to location $L_{1,3}$ at time $T_3$. In other words, in two (since k=2) unit of time (assuming uniform time spacing such that 1 unit of time$=T_2-T_1=T_3-T_2$), the object and the "one" together with its antennas may have moved in the direction of the antenna axis by one unit of distance (assuming the antennas are uniformly spaced, such that 1 unit of distance$=d_1=d_2=d_3$).

The similarity score between $CI_{i,j1}$ and $CI_{i+k,j2}$ may comprise an inner product, an inner-product-like quantity, a quantity based on correlation, a quantity based on covariance, a discriminating score, a distance, a Euclidean distance, an absolute distance, an $L_k$ distance, a weighted distance, a distance-like quantity and/or another similarity value, between the first vector and the second vector.

A combined similarity score may be obtained by combining multiple similarity scores, e.g. multiple similarity scores from multiple time instances, multiple antennas, and/or multiple "the other ones." For example, a combined similarity score may be obtained by combining similarity scores, each score being between and $CI_{i+l,j1}$ and $CI_{i+1+k,j2}$, for a set of values of 1. For example, the set may comprise a subset of $\{1: 1=0, 1, 2, \ldots, N-1-k\}$.

The combined similarity score may be normalized. It may be normalized by dividing by the cardinality of the set of values of 1. The combined similarity score may comprise a mean, median, mode, weighted mean, trimmed mean, and/or robust mean of the similarity scores. The combined similarity score may be a combination of mean, median, mode, weighted mean, trimmed mean, and/or robust mean.

The threshold T1 for the similar score may be adaptive determined. The threshold may depend on the cardinality of the set of values of 1. The threshold may be smaller when the cardinality of the set of values of 1 is larger. The threshold may depend on the combination of mean, median, mode, weighted mean, trimmed mean, and/or robust mean. The distance (i.e. a possible spatial-temporal information) may be determined as the distance between and $L_{i,j1}$ and $L_{i,j2}$, which may be the sum of $d_{j1}+d_{j1+1}+\ldots+d_{j2-1}$, if $j\mathbf{2}>j\mathbf{1}$, or $d_{j2}+d_{j2+1}+\ldots+d_{j1-1}$, if $j\mathbf{1}>j\mathbf{2}$.

The speed (i.e. a possible spatial-temporal information) may be determined as the distance divided by the time duration between $T_i$ and $T_{i+k}$. If the time difference is uniformly spaced, the time duration may be k unit of time. The time duration may be equal to $t_i+t_{i+1}+t_{i+k-1}$. The axis of motion may be determined as the axis connecting the antennas. The direction may be determined as the direction from antenna $A_{j2}$ to $A_{j1}$.

Multiple CI (associated with multiple antennas) may be matched for a strong matching. If $CI_{i,j1}$ may match $CI_{i+k,j2}$ (e.g. with a similarity score larger than some threshold T2) and $CI_{i,j\ 1+1}$ match $CI_{i+k,j2}$ and . . . , and $C_{i,j1+P}$ match $CI_{i+k,j2+P}$ simultaneously (i.e. $CI_{i,j1+r}$ may match $CI_{i+k,j2+r}$, for $r=0, 1, \ldots, P$ simultaneously), it may be an indication that location $L_{i,j1+r}$ is the same (or almost the same) as location $L_{i+k,j2+r}$, for $r=0, 1, \ldots, P$, and a strong indication that the antenna $A_{j2+r}$ (and the "one" and the object itself) may have moved from location $L_{i,j2+r}$, at time $T_i$ to location $L_{i+k,j2+r}$ (i.e. $L_{i,j1}$) at time $T_{i+k}$. The threshold T2 for this strong matching may be different from the threshold T1 for individual matching. The multiple CI may be matched (e.g. with a similarity score larger than some threshold T3) for a subset of r=0, 1, . . . , P, (i.e. $CI_{i,j1+r}$ may match $CI_{i+k,j2+r}$, for a subset of r=0, 1, . . . , P simultaneously). This matching is not as strong as the matching for the full set of r=0, 1, . . . , P, but is stronger than the individual CI matching. The threshold T3 may be different from T1 and/or T2.

Multiple CI (associated with multiple time instance) may be compared for a strong matching. If $CI_{i,j1}$ may match $CI_{i+k,j2}$ (e.g. with a similarity score larger than some threshold T4) and $CI_{i,j1}$ may match $CI_{i+2k,j1+2(j2-j1)}$, and . . . , and $CI_{i,j1}$ may match $CI_{i+Pk,j1+P(j2-j1)}$ (i.e. $CI_{i,j1}$ may match $CI_{i+rk,j1+r(j2-j1)}$, for (r=0, 1, . . . , P), it may be an indication that location $L_{i,j1}$ is the same (or almost the same) as locations $L_{o+rk,j1+r(j2-j1)}$, for r=0, 1, . . . , P, and an indication that the antenna $A_{j2}$ (and the "one" and the object itself) may have moved from location $L_{i,j2}$ at time $T_i$ to location $L_{i+k,j2}$ (i.e. $L_{i,j1}$) at time $T_{i+k}$. It is an indication that antenna $A_{j1+r(J2-j1)}$ (and the "one" and the object itself) may have moved from location $L_{i,j1+r(j2-j1)}$ at time $T_i$ to location $L_{i+rk,j1+2(j2-j1)}$ (i.e. $L_{i,j1}$) at time $T_{i+rk}$ for r=0, 1, . . . , P. As the movements of various antennas ($A_{j1+r(J2-j1)}$ for =0, 1, . . . , P) all point to the same speed and direction, this is a strong matching. The threshold T4 for this strong matching may be different from the threshold T1, T2 and/or T3.

The multiple CI may be matched (e.g. with a similarity score larger than sonic threshold T5) for a subset of r=0, 1, . . . , P, (i.e. $CI_{i,j1}$ may match $CI_{i+rk,j1+r(j2-j1)}$, for a subset of r=0, 1, . . . , P). This matching is not as strong as the matching for the full set of r=0, 1, . . . , P, but is stronger than the individual CI matching. The threshold T5 may be different from T1, T2, T3 and/or T4. A method/apparatus/system of an object tracking system comprises obtaining at least two TSCI of a wireless multipath channel using a processor, a memory communicatively coupled with the processor and a set of instructions stored in the memory. The at least one TSCI is extracted from a wireless signal transmitted between a Type1 heterogeneous wireless device at a first position in a venue and a Type2 heterogeneous wireless device at a second position in the venue through the wireless multipath channel. The wireless multipath channel is impacted by a current movement of an object in the venue. The Type1 device is close to the object and moves with the object during the current movement of the object. The Type1 device comprises at least two antennas.

At least two first CI at a first time may be obtained. Each of the first CI may be associated with respective antenna of the Type1 device. At least two second CI at a second time may be obtained. Each of the second CI may be associated with respective antenna of the Type1 device. The first time may be close to the second time. At least one similarity score may be computed. Each similarity score may be between one of the at least two first CI and one of the at least two second CI. A match between a particular first CI associated with a first antenna and a particular second CI associated with a second antenna may be identified. The first antenna and the second antenna may be different. The spatial-temporal information of the object may be determined based on at least one of: the particular first CI, the particular second CI.

A distance, a direction and/or another quantity may be determined based on location of the first antenna and location of the second antenna. The spatial-temporal information of the object may be determined based on at least one of: the distance, the direction, the first time and the second time. The spatial-temporal information of the object may be computed by dividing the distance by time difference between the first time and the second time. The spatial-temporal information may be a speed of the object. At least one combined similarity score may be computed. Each combine similarity score may be based on at least two similarity scores. The spatial-temporal information of the object may be determined based on at least one combined similarity score. The similarity score may comprise: a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score.

The spatial distribution of the at least two antennas may comprise a center antenna placed at a center, and the rest of the antennas arranged around the center antenna in a 2-dimensional configuration and/or a 3-dimensional configuration. The spatial distribution of the at least two antennas may comprise a center antenna placed at a center, and the rest of the antennas uniformly arranged around the center antenna. The spatial distribution of the at least two antennas may comprise a number of antennas forming a rectangular lattice. The spatial distribution of the at least two antennas may comprise: a number of antennas forming a straight line. The spatial distribution of at least two antennas may comprise a number of antennas forming a circular lattice, an elliptical lattice, a convex configuration, a non-convex configuration, a concave configuration, a non-concave configuration, and/or an irregular configuration.

At least two first CI for each of a set of time instance may be obtained, each first CI associated with respective antenna of the Type1 device. At least one similarity score may be computed, each between two CI: a first CI associated with a first time and a first antenna, and a second CI associated with a second time and a second antenna. A match between a particular first CI associated with a particular first antenna and a particular first time, and a particular second CI associated with a particular second antenna and a particular second time may be identified. The spatial-temporal information of the object may be determined based on at least one of: the particular first CI, the particular first antenna, the particular first time, a related first information, the particular second CI, the particular second antenna, the particular second time, and a related second information.

At least one combined similarity score may be computed, each combined similarity score based on at least two similarity scores. The spatial-temporal information of the object may be determined based on at least one combined similarity score. The similarity score may comprise a time reversal resonating strength (TRRS), a correlation, a cross-correlation, an auto-correlation, a covariance, a cross-covariance, an auto-covariance, an inner product of two vectors, a distance score, a discriminating score, a metric, a neural network output, a deep learning network output, and/or another score.

One of the at least two similarity scores may be a similarity score between a first CI associated with a first time, and a second CI associated with a second time. The rest of the at least two similarity scores may be similarity scores between CI associated with the first time and CI associated with the second time. One of the at least two similarity scores may be a similarity score between a first CI associated with a first time, and a second CI associated with a second time. The at least two similarity scores may comprise at least one similarity scores each between third CI and fourth CI. The difference between the time instance associated with the third CI and the time instance associated with the fourth CI may be equal to the difference between the first time and the second time. One or more time series of power information (PI) may be computed (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device) based on the one or more TSCI (e.g. 300). Each PI may be associated with a CI (e.g. 111A, 111B). The PI may be a complex quantity. The real part of the power information (PI) may be computed based on: magnitude, square of magnitude, phase, real part, imaginary part and another function, of the CI (e.g. 111A, 111B). A first function of the one or more time series of PI may be computed. The first function may include an operation on/of: an autocorrelation function, a square of autocorrelation function, an auto-covariance function, a square of auto-covariance function, an inner product, an auto-correlation-like function, and/or a covariance-like function.

At least one characteristics of the first function may be determined(e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device). The Type1 heterogeneous wireless device (e.g. 106A, 106B, 108, 109, 113A, 113B, 400, 402, 404) may be caused to switch (e.g. by an object tracking server, the processor (e.g. 100A, 100B), the Type1 heterogeneous device (e.g. 106A, 106B, 108, 109, 113A, 113B, 400, 402, 404), the Type2 heterogeneous device (e.g. 106A, 106B, 108, 109, 113A, 113B, 400, 402, 404), and/or another device) Tireless coupling from the Type2 heterogeneous wireless device (e.g. 106A, 106B, 108, 109, 113A, 113B, 400, 402, 404) to a second Type2 heterogeneous wireless device (e.g. 106A, 106B, 108, 109, 113A, 113B, 400, 402, 404) at another location in the venue (e.g. 142). The Type1 heterogeneous device (e.g. 106A, 106B, 108, 109, 113A, 113B, 400, 402, 404) may be capable of wirelessly coupling with at least two Type2 heterogeneous devices (e.g. 106A, 106B, 108, 109, 113A, 113B, 400, 402, 404). A second wireless signal (e.g. 140) may be caused to be transmitted between the Type1 heterogeneous device (e.g. 106A, 106B, 108, 109, 113A, 113B, 400, 402, 404) and the second Type2 heterogeneous device (e.g. 106A, 106B, 108, 109, 113A, 113B, 400, 402, 404) through the wireless multipath channel (e.g. 144). The wireless multipath channel (e.g. 144) may be impacted by the current movement (e.g. 120) of the object (e.g. 112) in the venue (e.g. 142). One or more second TSCI (e.g. 300, 111A, 111B) (CI) of the wireless multipath channel (e.g. 144) may be obtained. The one or more second TSCI (e.g. 300, 111A, 111B) may be extracted from the second wireless signal (e.g. 140). The spatial-temporal information of the object (e.g. 112) may be determined based on the one or more second TSCI (e.g. 300, 111A, 111B).

In another embodiment, an object tracking server includes a processor (e.g. 100A, 100B), a memory (e.g. 102A, 102B) communicatively coupled with the processor (e.g. 100A, 100B), and a set of instructions (e.g. 104A, 104B) stored in the memory (e.g. 102A, 102B) and executed by the processor (e.g. 100A, 100B). When the set of instructions (e.g. 104A, 104B) is executed by the processor (e.g. 100A, 100B) using the memory (e.g. 102A, 102B), the object (e.g. 112) tracking server is configured to obtain one or more TSCI (e.g. 300, 111A, 111B) (CI) of a wireless multipath channel (e.g. 144). The at least one TSCI (e.g. 300, 111A, 111B) is extracted from a wireless signal (e.g. 140) transmitted between a Type1 heterogeneous wireless device (e.g. 106A, 106B, 108, 109, 113A, 113B, 400, 402, 404) at a first position (e.g. 114, 115B, 115A, 117, 119, 406, 408, 410, 414) in a venue (e.g. 142) and a Type2 heterogeneous wireless device (e.g. 106A, 106B, 108, 109, 113A, 113B, 400, 402, 404) at a second position (e.g. 114, 115B, 115A, 117, 119, 406, 408, 410, 414) in the venue (e.g. 142) through the wireless multipath channel (e.g. 144). The wireless multipath channel (e.g. 144) is impacted by a current movement (e.g. 120) of an object (e.g. 112) in the venue (e.g. 142). The object (e.g. 112) tracking server determines a spatial-temporal information of the object (e.g. 112) based on: the at least one TSCI (e.g. 300, 111A, 111B), a time parameter associated with the current movement (e.g. 120), and/or a past spatial-temporal information of the object (e.g. 112). The one or more TSCI (e.g. 300, 111A, 111B) is preprocessed. The processor (e.g. 100A, 100B) shares computational workload with the Type1 heterogeneous wireless device (e.g. 106A, 106B, 108, 109, 113A, 113B, 400, 402, 404) and Type2 heterogeneous wireless device (e.g. 106A, 106B, 108, 109, 113A, 113B, 400, 402, 404).

In yet another embodiment, a system of an object tracking server includes a Type1 heterogeneous wireless device (e.g. 106A, 106B, 108, 109, 113A, 113B, 400, 402, 404) at a first position (e.g. 114, 115B, 115A, 117, 119, 406, 408, 410, 414) in a venue (e.g. 142), a Type2 heterogeneous wireless device (e.g. 106A, 106B, 108, 109, 113A, 113B, 400, 402, 404) at a second position (e.g. 114, 115B, 115A, 117, 119, 406, 408, 410, 414) in the venue (e.g. 142) wirelessly coupled with the Type1 heterogeneous device (e.g. 106A, 106B, 108, 109, 113A, 113B, 400, 402, 404) through a wireless multipath channel (e.g. 144) associated with the venue (e.g. 142), and/or the object (e.g. 112) tracking server. The object (e.g. 112) tracking server has a processor (e.g. 100A, 100B), a memory (e.g. 102A, 102B) communicatively coupled with the processor (e.g. 100A, 100B) and a set of instructions (e.g. 104A, 104B) stored in the memory (e.g. 102A, 102B) executed by the processor (e.g. 100A, 100B).

The object (e.g. 112) tracking server, the Type1 heterogeneous device (e.g. 106A, 106B, 108, 109, 113A, 113B, 400, 402, 404) and the Type2 heterogeneous device (e.g. 106A, 106B, 108, 109, 113A, 113B, 400, 402, 404) are configured to: obtain at least one TSCI (e.g. 300, 111A, 111B) (CI) of the wireless multipath channel (e.g. 144). The at least one TSCI (e.g. 300, 111A, 111B) is extracted from a wireless signal (e.g. 140) transmitted between the Type1 heterogeneous device (e.g. 106A, 106B, 108, 109, 113A, 113B, 400, 402, 404) and the Type2 heterogeneous device (e.g. 106A, 106B, 108, 109, 113A, 113B, 400, 402, 404) through the wireless multipath channel (e.g. 144). The wireless multipath channel (e.g. 144) is impacted by a current movement (e.g. 120) of an object (e.g. 112) in the venue (e.g. 142).

Figure 1:
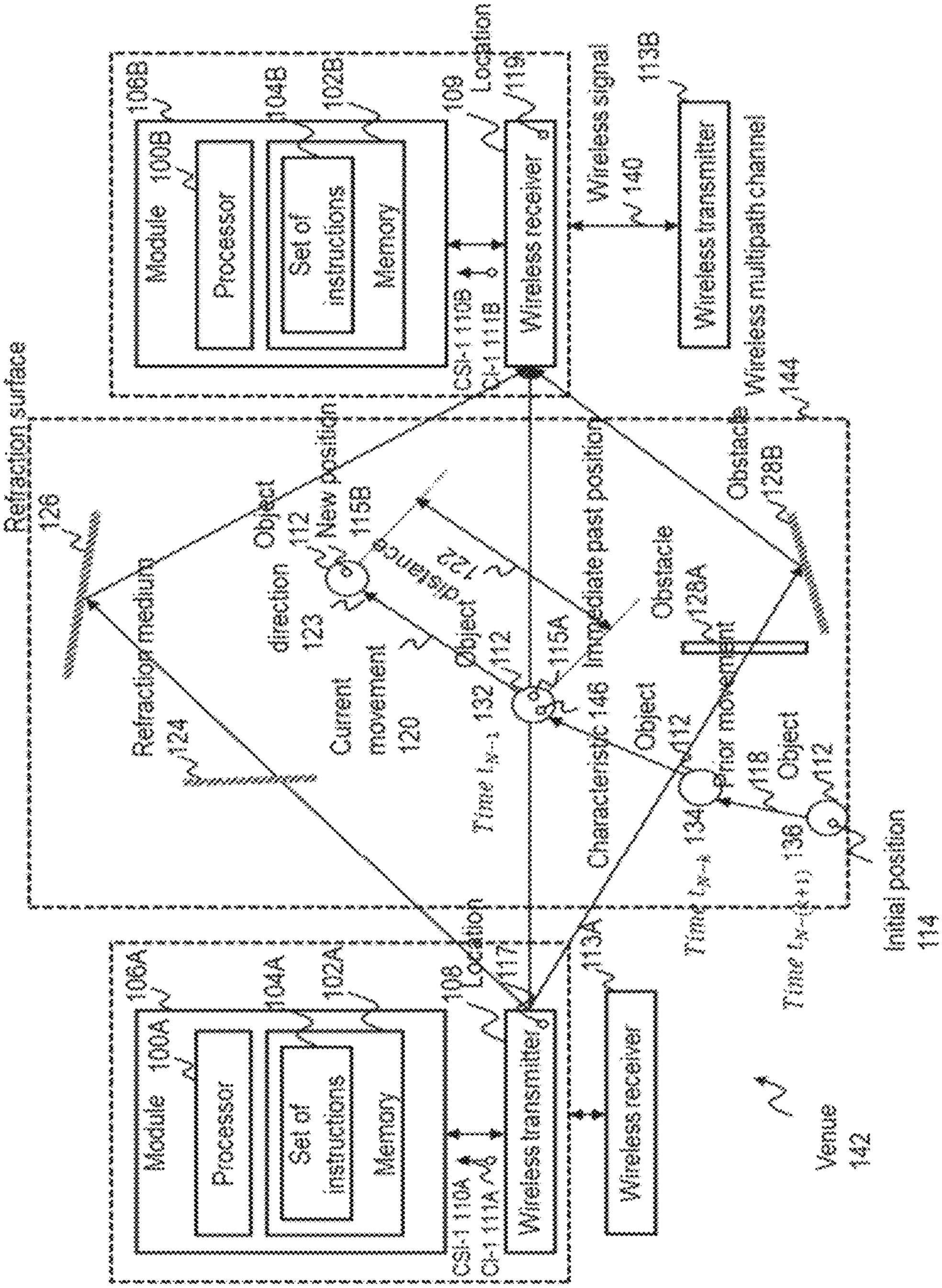
FIG. 1 is a diagram showing an exemplary environment for determining a first position of an object using wireless signal (e.g. 140), according to one embodiment of the present teaching.

In one example, a system, an apparatus, and/or a method for tracking a spatial-temporal information (e.g. current movement 120, prior movement 118, position 115A, initial position 114, of FIG. 1, speed, velocity, acceleration, etc.) of an object (e.g. object 112) in real time (e.g. time t_N 130, t_(N−1) 132, t_(N−k) 134, t_(N−k−1) 136 of FIG. 1) is disclosed. The system, apparatus and/or method may comprise a processor (e.g. 100A, 100B) and a memory (e.g. 102A, 102B) communicatively coupled with the processor (e.g. 100A, 100B). The system, apparatus and/or method comprises obtaining an initial spatial-temporal information (e.g. initial position 114, immediate past position 115A) of the object (e.g. 112) prior to a movement (e.g. 120, 118) of the object (e.g. 112), and obtaining at least one wireless signal (e.g. 140) from a multipath channel (e.g. 144) that is impacted by the movement (e.g. 120, 118) of the object (e.g. 112). The system, apparatus and/or method further comprises extracting a TSCI (e.g. 111A, 111B, or channel state information (CSI) 110A/110B) for the multipath channel (e.g. 144) from the at least one wireless signal (e.g. 140) and determining a distance (e.g. 122) of the movement (e.g. 120) of the object (e.g. 112) based on the time series of CSI (e.g. 300, 110A, 110B). The system, apparatus and/or method comprises estimating a direction (e.g. 123) of the movement (e.g. 120) of the object (e.g. 112), and determining a new spatial-temporal information (e.g. position 115B associated with time t_N 130) of the object (e.g. 112) after the movement (e.g. current movement 120) based on the distance (e.g. 122), the direction (e.g. 123), and the initial spatial-temporal information (e.g. initial position 114).

In another example, a system, an apparatus and/or a method is disclosed. The system, apparatus and/or method is for determining an initial spatial-temporal information (e.g. initial position 114) of an object (e.g. 112) prior to a current movement (e.g. 120) of the object (e.g. 112). The system, apparatus and/or method obtains at least one wireless signal (e.g. 140) from a wireless multipath channel (e.g. 144) that is impacted by a prior movement (e.g. 118) of the object (e.g. 112) before the current movement (e.g. 120) of the object (e.g. 112) using a processor (e.g. 100A and/or 100B), a memory (e.g. 102A and/or 102B) communicatively coupled with the processor (e.g. 100A, 100B) and a set of instructions (e.g. 104A, 104B) stored in the memory (e.g. 102A, 102B). The system, apparatus and/or method extracts at least one TSCI (e.g. 300, 111A, 111B) of the wireless multipath channel (e.g. 144) from the wireless signal (e.g. 140), and determines the initial spatial-temporal information (e.g. initial position 114) of the object (e.g. 112) prior to the current movement (e.g. 120) of the object (e.g. 112) based on CI (e.g. 300, 111A, 111B) associated with the prior movement (e.g. 118) of the object (e.g. 112). The spatial-temporal information (e.g. current movement 120) of the object (e.g. 112) may be tracked. The system, apparatus and/or method may make the spatial-temporal information (e.g. 114, 115A) available for the tracking of another spatial-temporal information (e.g. current movement 120) of the object (e.g. 112).

The wireless multipath channel (e.g. 144) may be associated with at least one wireless transmitter (e.g. 108) and at least one wireless receiver (e.g. 109). The processor (e.g. 100A, 100B), the memory (e.g. 102A, 102B) and the set of instructions (e.g. 104A, 104B) may be associated with one of the at least one wireless transmitter (e.g. 108, 113B) and/or one of the at least one wireless receiver 109, 113A). The object (e.g. 112) may be associated with one of the at least one wireless transmitter (e.g. 108, 113B) and/or one of the at least one wireless receiver (e.g. 109, 113A).

A wireless transmitter (e.g. 108, 113B), a wireless receiver (e.g. 109, 113A), a first device (e.g. 106A/B, 108, 109, 113A, 113B, 400, 402, 404) comprising the wireless transmitter/receiver, and/or a second device (e.g. 106A, 106B, 108, 109, 113A, 113B, 400, 402, 404) coupled (e.g. via Bluetooth, Zigbee, BLE, WiFi, LTE, 3G/4G/5G/6G/7G/8G, etc.) with a first device (e.g. 106A/B, 108, 109, 113A, 113B, 400, 402, 404) comprising the wireless transmitter/receiver, may each be associated with an identity (ID).

Figure 2:
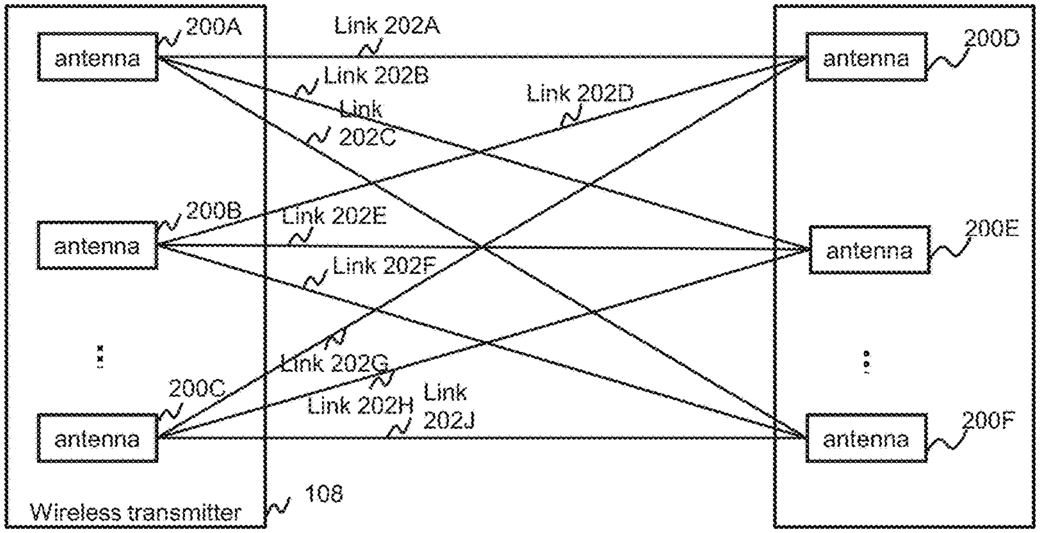
FIG. 2 is a diagram showing multiple links each formed by one antenna of a wireless transmitter (e.g. 108) with at least one antenna and one antenna of a wireless receiver (e.g. 109) with at least one antenna, according to one embodiment of the present teaching.

One of the at least one wireless transmitter (e.g. 118) may have at least one transmitting antenna (e.g. antenna 200A, 200B, 200C, etc. of FIG. 2). One of the at least one wireless receiver (e.g. 109) may have at least one receiving antenna (e.g. antenna 202A, 202B, 202C). A TSCI (e.g. 300, 111A and/or 111B) of the wireless multipath channel (e.g. 144) may be extracted from the wireless signal (e.g. 140) for each link (e.g. link 202A, 202B, 202C, 202D, 202E, 202F, 202G, 202G, 202J) between one of the at least one transmitting antenna (e.g. 200A, 200B, 200C) and one of the at least one receiving antenna (e.g. 202A, 202B, 202C). Each CI (e.g. 111A, 111B) (CI) of the time series (e.g. 300) may be associated with a time instance (e.g. time 130, 132, 134, 136) and/or the link (e.g. link 202A, 202B, 202C, 202D, 202E, 202F, 202G, 202G, 202J) between the corresponding transmitting antenna 200A, 200B, 200C) and the corresponding receiving antenna (e.g. 202A, 202B, 202C).

The initial spatial-temporal information (e.g. initial position 114) may be determined based on at least one local characteristics (e.g. temporally local or local in terms of time, spatially local or local in terms of space, local in terms of frequency, and/or local in terms of some decomposition, etc.) of the at least one TSCI (e.g. 300, 111A, 111B). A time collection of the at least one time series comprising a set of time instances (e.g. time 130, 132, 134, 136, etc.) may be identified. At (or around) each time instance of the time collection, CI (e.g. 111A, 111B) (of one of the at least one time series) may have a certain local characteristics local in terms of time, space, frequency, and/or some decomposition, etc.). The local characteristics may be that each of the CI (e.g. 111A, 111B) (e.g. CI may be quantities associated with time, space, frequency and/or some decomposition) is larger than a first threshold, and/or smaller than a second threshold. The local characteristics may be that each of the CI (e.g. 111A, 111B) belongs to a set of allowable information. The local characteristics may also be that some function of one and/or more CI (e.g. 111A, 111B) is larger than the first threshold, and/or smaller than the second threshold. The first threshold and/or the second threshold may be locally adaptive, with different values at different time instances. The first threshold and/or the second threshold may be locally adaptive, with different values at different time instances. The time collection may be a contiguous time period. The time collection may also be a combination of disjoint contiguous time periods and/or individual time instances. The allowable information may be continuous and/or discrete. The local characteristics may comprise other elements.

Figure 3:
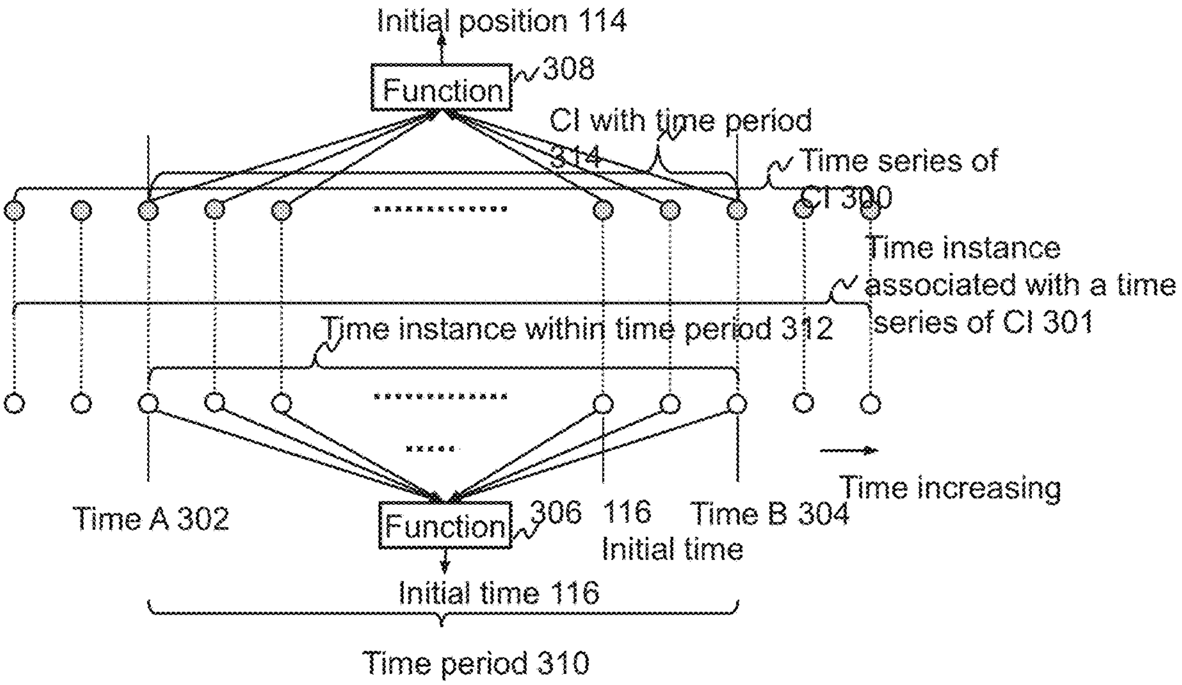
FIG. 3 is a diagram showing a time period associated with at least one time instance used to determine an initial time (e.g. 116) and with at least one associated CI (e.g. 111A.

Each CI (e.g. 111A, 111B) of a time series (e.g. 300) may be associated with a time instance (e.g. 301). The initial spatial-temporal information (e.g. initial position 114) may be associated with an initial time (e.g. 116) and/or a time period (e.g. 310 of FIG. 3). The initial time (e.g. 116) may be a function (e.g. 306 of FIG. 3) of time instances (e.g. 301 of FIG. 3) in the time period. The time period may include all the time from time A to time B, such that the initial time (e.g. 116) is between A and B. Within the time period (e.g. 310), there may be many time instance (e.g. 301) of the at least one TSCI (e.g. 300). The function (e.g. 306) may be mean, median, mode, a quartile, a percentile, and/or another function. The initial spatial-temporal information (e.g. initial position 114) may be determined based on the CI (e.g. 111A, 111B) in the time period (e.g. 314) associated with corresponding time instance in the period (e.g. 312).

The initial spatial-temporal information (e.g. initial position 114) may be determined based on at least one known spatial-temporal information (e.g. location 117, 119) associated with at least one of the wireless transmitter (e.g. 108) and the wireless receiver (e.g. 109). The initial position (e.g. 114) may be determined based on a map of the venue (e.g. 142). The initial time (e.g. 116) may be long before (i.e. large difference between time t_N 132 and time t_(N−k) 134) and/or shortly before (i.e. small difference between time t_N 132 and time t_(N−k) 134) the current movement (e.g. 120). The difference between time t_N 132 and time t_(N−k) 134 may be less than 1 second, between 1 second and 1 minute, between 1 minute to 1 hour, and/or larger than 1 hour.

The initial spatial-temporal information (e.g. initial position 114) may be associated with multiple initial time (e.g. 116) instances (e.g. 301, 312, 116) with multiple corresponding position (e.g. 114, 115B, 115A, 117, 119, 406, 408, 410, 414). The initial spatial-temporal information (e.g. initial position 114) associated with an initial time (e.g. 116) may be determined based on the multiple initial time (e.g. 116) instances (e.g. 301) and/or the multiple corresponding position (e.g. 114, 115B, 115A, 117, 119, 406, 408, 410, 414). The multiple initial time (e.g. 116) instances (e.g. 301) and the multiple corresponding spatial-temporal information (e.g. positions 114, 115B, 115A, 117, 119, 406, 408, 410, 414) may be processed with at least one of: linear regression, some regression, optimization, joint optimization, cost minimization, and/or curve fitting, etc. The initial time (e.g. 116) may be determined based on the multiple initial time (e.g. 116) instances and/or the multiple corresponding spatial-temporal info (e.g. 114, 115B, 115A, 117, 119, 406, 408, 410, 414).

The wireless multipath channel (e.g. 144) may be associated with at least one wireless transmitter (e.g. 108) and at least one wireless receiver (e.g. 109). The at least one wireless transmitter (e.g. 108) may transmit the wireless signal (e.g. 140) to the at least one wireless receiver e.g. 109). The processor (e.g. 100A/B), the memory (e.g. 102A/B) and the set of instructions (e.g. 104A/B) may be associated with a particular wireless transmitter (e.g. 108) and/or a particular wireless receiver (e.g. 109). The particular wireless transmitter (e.g. 108) and/or the particular wireless receiver (e.g. 109) may move with the object (e.g. 112) in the prior movement (e.g. 118) of the object (e.g. 112), the current movement (e.g. 120) of the object (e.g. 112) and/or a future movement of the object (e.g. 112).

The particular wireless transmitter (e.g. 108) and/or the particular wireless receiver (e.g. 109) may be associated with at least one known spatial-temporal information (e.g. location 117, 119). The initial spatial-temporal information (e.g. initial location) may be determined based on the at least one known spatial-temporal information (e.g. location) associated with the particular wireless transmitter (e.g. 108) and/or the particular wireless receiver (e.g. 109). The initial spatial-temporal information (e.g. initial location 114) may be one of the at least one known spatial-temporal information (e.g. location).

The initial spatial-temporal information (e.g. initial position 114) and/or the initial time (e.g. 116) may further be determined based on another particular wireless receiver (e.g. 113A) and/or another particular wireless transmitter (e.g. 113B) associated with another known spatial-temporal information (e.g. another known location). The initial spatial-temporal information (e.g. initial location 114, the initial time 116) may be determined jointly based on both the particular wireless receiver (e.g. 109), the particular wireless transmitter (e.g. 108), the another particular wireless receiver (e.g. 113A), and/or the another particular wireless transmitter (e.g. 113B). The particular wireless receiver (e.g. 109), the particular wireless transmitter (e.g. 108), the another particular wireless receiver (e.g. 113A), and/or the another particular wireless transmitter (e.g. 113B) may be associated with at least one time series chosen from the at least one TSCI. (e.g. 300) based on at least one criteria. For example, one criteria may be that some CI (e.g. 111A, 111B) of the time series is larger than a third threshold, and/or smaller than a fourth threshold.

The initial spatial-temporal information (e.g. initial location) may also be determined based on at least one representative CI (e.g. 111A, 111B) in the time series associated with the particular wireless receiver (e.g. 109), the particular wireless transmitter (e.g. 108), the another particular wireless receiver (e.g. 113A), and/or the another particular wireless transmitter (e.g. 113B). The wireless receiver (e.g. 109) and/or the wireless transmitter (e.g. 108) may each have at least one directional antenna (e.g. 200A, 200B, 200C, 200D, 200E, 200F). The initial spatial-temporal information (e.g. initial position 114) of the object (e.g. 112) may be determined based on at least one characteristics of the at least one directional antenna. The characteristics may be an orientation, an angle, a beam width, a reference signal strength, a decaying characteristics of the directional antenna, a gain characteristics of the directional antenna and/or another characteristics.

The initial spatial-temporal information (e.g. initial position 114) of the object (e.g. 112) may be determined based on a comparison of a particular TSCI (e.g. 300, 111A, 111B) with a stored reference TSCI (e.g. 300, 111A, 111B) of heterogeneous time duration. The stored reference time series may be obtained and/or collected in the past (before the initial time 116). The stored reference time series may/may not be associated with the object (e.g. 112) and/or another past movement (e.g. 118) of the object (e.g. 112). The stored reference time series may/may not be associated with the wireless receiver (e.g. 109) and/or the wireless transmitter (e.g. 108). The comparison may involve aligning the particular time series and the stored reference time series, and identifying at least one particular special moment of the particular time series aligned to at least one reference special moment of the stored reference time series. The aligning may be based on dynamic programming, a variation of dynamic programming, dynamic time warping (DTW) and/or a variation of DTW with respect to at least one mismatch measure. The initial spatial-temporal information (e.g. initial position 114) of the object (e.g. 112) may be determined based on the CI (e.g. 111A, 111B) at or around the at least one particular special moment of the particular time series. The initial spatial-temporal information (e.g. initial position 114) of the object (e.g. 112) may be determined based on at least one function (e.g. 308 of FIG. 3) of the CI (e.g. 111A, 111B) at the at least one particular special moment of the particular time series. The initial spatial-temporal information (e.g. initial position 114) of the object (e.g. 112) may be determined based on comparing the at least one function of the CI (e.g. 111A, 111B) at the at least one particular special moment of the particular time series with at least one threshold. The comparing may comprise hard threshold and/or soft thresholding. At least one other special moment of the at least one time series may be identified. The initial spatial-temporal information (e.g. 114, 115B, 115A, 117, 119, 406, 408, 410, 414) of the object (e.g. 112) may be determined based on the at least one other special moment of the at least one time series.

The initial spatial-temporal information (e.g. 114, 115B, 115A, 117, 119, 406, 408, 410, 414) may be in the vicinity of one of at leak one predetermined location (e.g. 117 and/or 119). In one example, the at least one wireless receiver (e.g. 109) and/or the at least one wireless transmitter (e.g. 108) may move with the object (e.g. 112) in the prior movement (e.g. 118), the current movement (e.g. 120) and/or a future movement of the object (e.g. 112). The at least one wireless receiver (e.g. 109) and/or the at least one wireless transmitter (e.g. 108) may be located at the at least one predetermined location (e.g. 117 and/or 119). The initial spatial-temporal information (e.g. 114, 115B, 115A, 117, 119, 406, 408, 410, 414) may be associated with multiple predetermined spatial-temporal information (e.g. locations). The initial spatial-temporal info (e.g. 114, 115B, 115A, 117, 119, 406, 408, 410, 414) may be determined based on the multiple predetermined spatial-temporal information (e.g. locations). The initial spatial-temporal information (e.g. 114, 115B, 115A, 117, 119, 406, 408, 410, 414) may be determined by triangulation and/or other fusion technique based on the multiple predetermined spatial-temporal information (e.g. locations). The at least one wireless receiver (e.g. 109) and/or at least one wireless transmitter (e.g. 108) may be associated with the at least one predetermined spatial-temporal information (e.g. location).

In another example, a first device (e.g. 106A, 106B, 108, 109, 113A, 113B of FIG. 1, 400 of FIG. 4) with one of a wireless receiver (e.g. 109) and a wireless transmitter (e.g. 108) may move with the object (e.g. 112) in the prior movement (e.g. 118), current movement (e.g. 120) and/or a future movement. The first device (e.g. 106A, 106B, 108, 109, 113A, 113B, 400) may be associated with a first spatial-temporal information (e.g. location) which changes with the object (e.g. 112) location (e.g. 114, 115B, 115A) as the object (e.g. 112) moves. A second device (e.g. 106A, 106B, 108, 109, 113A, 113B, 400, 402, 404), being the other one of the wireless receiver (e.g. 109) and the wireless transmitter (e.g. 108), may be located at, above, and/or around a second location (e.g. 406 of FIG. 4). When the object (e.g. 112) moves close to the second location (e.g. 406), the first device (e.g. 400) and the second device (e.g. 402) will be very close such that the CI (e.g. 111A, 111B) such as RSSI would exhibit a maximum at the second location (e.g. 117, 119), with the maximum value of CI (e.g. 111A, 111B) larger than a threshold. The initial location 114 of the object (e.g. 112) may be determined to be the second location (e.g. 406) at a corresponding initial time (e.g. 116), wherein the initial time (e.g. 116) is the time instance (e.g. one of 301) associated with the maximum.

In another example, the first device (e.g. 400), being one of a wireless receiver (e.g. 109) and a wireless transmitter (e.g. 108) may move with the object (e.g. 112) in the prior movement (e.g. 118), current movement (e.g. 120) and/or a future movement. The object (e.g. 112) may move between two devices (e.g. 106A, 106B, 108, 109, 113A, 113B, 402, 404): the second device (e.g. 402) and a third device (e.g. 404). The first device (e.g. 400) may be communicatively coupled with the second device (e.g. 402) and the third device (e.g. 404) wirelessly. In other words, wireless signals (e.g. 140) may be sent between the first device (e.g. 400) and the second device (e.g. 402). Similarly, wireless signals (e.g. 140) may be sent between the first device (e.g. 400) and the third device (e.g. 404). The second device (e.g. 402), being the other one of the wireless receiver (e.g. 109) and the wireless transmitter (e.g. 108), may be located at, above, and/or around a second location (e.g. 406). The third device (e.g. 404), being another instance of the other one of the wireless receiver (e.g. 109) and the wireless transmitter (e.g. 108), may be located at, above, and/or around a third location (e.g. 408).

When the object (e.g. 112) with the first device (e.g. 400) moves between the second location (e.g. 406) and the third location (e.g. 408), the first device (e.g. 400) and the second device (e.g. 402) may be very close such that the CI (e.g. 111A and/or 111B) such as RSSI corresponding to the second device (e.g. 402) may exhibit a maximum at a fourth time instance (e.g. 412) at a fourth location (e.g. 410) somewhere between the second location (e.g. 406) and the third location (e.g. 408). Meanwhile, the first device (e.g. 400) and the third device (e.g. 404) may be very close such that the CI (e.g. 111A and/or 111B) such as RSSI corresponding to the third device (e.g. 404) may also exhibit a maximum at a fifth time instance (e.g. 416) at a fifth location (e.g. 414) somewhere between the second location (e.g. 406) and the third location (e.g. 408). If the movement (e.g. 418) of the object (e.g. 112) is perpendicular to a straight line (e.g. 420) connecting the second location (e.g. 406) and the third location (e.g. 408) (i.e. if the angle (e.g. 422) is 90 degrees as shown in FIG. 4B), the fourth time instance (e.g. 412) may be equal to the fifth time instance (e.g. 416), and/or the fourth location (e.g. 410) may be the same as the fifth location (e.g. 414). If the movement (e.g. 418) of the object (e.g. 112) is at an angle (e.g. 422) with the straight line (e.g. 420) connecting the second location (e.g. 406) and the third location (e.g. 408) such that the angle (e.g. 422) is less than 90 degrees as shown in FIG. 4A, the fourth time instance (e.g. 412) may be before the fifth time instance (e.g. 416). If the angle (e.g. 422) is greater than 90 degrees as shown in FIG. 4C, the fourth time instance (e.g. 412) may be after the fifth time instance (e.g. 416). Thus the direction (e.g. 123) of the movement 418 of the first device (e.g. 400) may be estimated roughly based on whether the fourth time instance (e.g. 412) is equal to, before or after the fifth time instance (e.g. 416). The direction of the movement 418 of the first device (e.g. 400) may further be estimated by estimating angle (e.g. 422) based. on the equation: $\cos \theta = (v \Delta t / L)$, where v is the instantaneous speed of the first device (e.g. 400), t is the fifth time instance (e.g. 416) minus the fourth time instance (e.g. 412), and L is the distance between the second location (e.g. 406) of the second device (e.g. 402) and the third location (e.g. 408) of the third device (e.g. 404).

The CI (e.g. 111A, 111B) may comprise channel state information (CSI, e.g. 110A, 110B). The instantaneous speed v of the first device (e.g. 400) may be obtained by comparing an instantaneous time reversal resonating strength (TRRS) between two adjacent CSI against a model function, as described in our previous patent application. The two adjacent CSI may be CSI between the first device (e.g. 400) and the second device (e.g. 402). The two adjacent CSI may also be CSI between the first device (e.g. 400) and the third device (e.g. 404).

The initial location (e.g. 114) and the initial time (e.g. 116) of the object (e.g. 112) may be determined based on the fourth location (e.g. 410), the fourth time instance (e.g. 412), the fifth location (e.g. 414) and/or the fifth time instance (e.g. 416). The initial location 114 may also be determined based on the CI (e.g. 111A, 111B) associated with the first device (e.g. 400), the second device (e.g. 402) and the third device (e.g. 404). For example, the CI (e.g. 111A, 111B) may comprise RSSI. A reference function of CI (e.g. 111A, 111B) may be obtained. The instantaneous CI (e.g. 111A, 111B) between the first device (e.g. 400) and the second device 402) may be compared with the RSSI to estimate an instantaneous distance between the first device (e.g. 400) and the second device (e.g. 402). Similarly, the instantaneous CI (e.g. 111A, 111B) between the first device (e.g. 400) and the third device (e.g. 404) may be compared with the RSSI to estimate an instantaneous distance between the first device (e.g. 400) and the third device (e.g. 404). The instantaneous location of the object (e.g. 112) may be computed based on the two instantaneous distance. The instantaneous location of the object (e.g. 112) may be computed based on triangulation, trigonometry and another method.

The initial time (e.g. 116) may be chosen to be the fourth time instance (e.g. 412) such that the instantaneous location of the object (e.g. 112) at the fourth time instance (e.g. 412) is computed and chosen as the initial location 114. The initial time (e.g. 116) may be chosen to be the fifth time instance (e.g. 416) such that the instantaneous location of the object (e.g. 112) at the fifth time instance (e.g. 412) is computed and chosen as the initial location 114. The initial time (e.g. 116) may be chosen to be a time around the fourth time instance (e.g. 412) and/or the fifth time instance (e.g. 416) such that the instantaneous location of the object (e.g. 112) at the initial time (e.g. 116) is computed and chosen as the initial location 114. Interpolation and/or extrapolation may be used to compute the instantaneous location of the object (e.g. 112) at the initial time (e.g. 116). Interpolation may be used for the case of the initial time (e.g. 116) being between the fourth time instance 412) and the fifth time instance (e.g. 416), and extrapolation may be used otherwise.

Apart from the second device (e.g. 402) and the third device (e.g. 404), additional similar devices (e.g. 106A, 106B, 108, 109, 113A, 113B, 400, 402, 404) at nearby locations may be coupled with the first device (e.g. 400) wirelessly and used to determine the initial location 114 and the initial time (e.g. 116) of the first device (e.g. 400). The second device (e.g. 402), the third device (e.g. 404) and/or the additional similar devices (e.g. 106A, 106B, 108, 109, 113A, 113B, 400, 402, 404) may be communicatively coupled also.

The second device (e.g. 402) may have two or more antennas (e.g. 200A, 200B, 200C, 200D, 200E, 200F) at different locations around the second location (e.g. 406). The third device (e.g. 404) may also have two or more antennas (e.g. 200A, 200B, 200C, 200D, 200E, 200F) at different locations around the third location (e.g. 408). Multiple straight lines can be drawn each between an antenna of the second device (e.g. 402) and an antenna of the third device (e.g. 404). Similar to the line (e.g. 420), each of these straight lines can give a corresponding estimated distance, estimated instantaneous location and/or estimated angle (e.g. 422) of the movement of the first device (e.g. 418), which may be combined to achieve higher precision for the estimated values.

The wireless receiver (e.g. 109) may receive the wireless signal (e.g. 140) and/or another wireless signal (e.g. 140) from the wireless transmitter (e.g. 108). The wireless receiver (e.g. 109) may receive another wireless signal (e.g. 140) from another wireless transmitter (e.g. 113B). The wireless transmitter (e.g. 108) may transmit the wireless signal (e.g. 140) and/or another wireless signal (e.g. 140) to another wireless receiver (e.g. 113A). The wireless transmitter (e.g. 108), the wireless receiver (e.g. 109), the another wireless receiver (e.g. 113A) and/or the another wireless transmitter (e.g. 113B) may be moving with the object (e.g. 112) and/or another object. The another object may be tracked. The wireless receiver (e.g. 109) may switch from the wireless transmitter (e.g. 108) to the another wireless transmitter (e.g. 113B) at some time. The transmitter (e.g. 108) may switch from the wireless receiver (e.g. 109) to the another wireless receiver (e.g. 113A) at another time. The wireless transmitter (e.g. 108) and the another wireless transmitter (e.g. 113B) may use same and/or different radio. The wireless receiver (e.g. 109) and the another wireless receiver (e.g. 113A) may use same and/or different radio. The wireless signal (e.g. 140) and/or the another wireless signal (e.g. 140) may have data embedded. The wireless receiver (e.g. 109), the wireless transmitter (e.g. 108), the another wireless receiver (e.g. 113A) and/or the another wireless transmitter (e.g. 113B) may be associated with at least one processor (e.g. 100A and/or 100B), memory (e.g. 102A, 102B) communicatively coupled with respective processor (e.g. 100A and/or 100B), and/or respective set of instructions (e.g. 104A, 104B) stored in the memory (e.g. 102A, 102B) which when executed cause the processor (e.g. 100A and/or 100B) to perform any and/or all steps needed to determine the spatial-temporal information (e.g. 114, 115B, 115A, 117, 119, 406, 408, 410, 414), the initial spatial-temporal information (e.g. 114, 115B, 115A, 117, 119, 406, 408, 410, 414), the initial time (e.g. 116), the direction (e.g. 123), the instantaneous location (e.g. 115B, 406, 408, 410, 414), the instantaneous angle (e.g. 422), and/or the speed, of the object (e.g. 112).

The wireless transmitter (e.g. 108), the wireless receiver (e.g. 109), the another wireless transmitter (e.g. 113B) and/or the another wireless receiver (e.g. 113A) may move with the object (e.g. 112) and/or another object in the prior movement (e.g. 118), the current movement (e.g. 120) and/or some future movement.

The wireless receiver (e.g. 109), the wireless transmitter (e.g. 108), the another wireless receiver (e.g. 113A) and/or the another wireless transmitter (e.g. 113B) may be communicatively coupled to one or more nearby device (e.g. 106A, 106B, 108, 109, 113A, 113B, 400, 402, 404). The nearby device (e.g. 106A, 106B, 108, 109, 113A, 113B, 400, 402, 404) may/may not move with the object (e.g. 112). The wireless receiver (e.g. 109), the wireless transmitter (e.g. 108), the another wireless receiver (e.g. 113A) and/or the another wireless transmitter (e.g. 113B) may transmit the at least one TSCI (e.g. 111A, 111B) and/or information associated with the at least one TSCI (e.g. 300) to the nearby device (e.g. 106A, 106B, 108, 109, 113A, 113B, 400, 402, 404), the wireless transmitter (e.g. 108), the wireless receiver (e.g. 109), the another wireless transmitter (e.g. 113B) and/or the another wireless receiver (e.g. 113A). The another wireless transmitter (e.g. 113B) and/or the another wireless receiver (e.g. 113A) may be with the nearby device (e.g. 106A, 106B, 108, 109, 113A, 113B, 400, 402, 404).

The nearby device (e.g. 106A, 106B, 108, 109, 113A, 113B, 400, 402, 404) may be portable/not portable/moveable/non-moveable. The nearby device (e.g. 106A, 106B, 108, 109, 113A, 113B, 400, 402, 404) may use battery power, solar power, AC power and/or other power source. The nearby device (e.g. 106A, 106B, 108, 109, 113A, 113B, 400, 402, 404) may have replaceable/non-replaceable battery, and/or rechargeable/non-rechargeable battery. The nearby device (e.g. 106A, 106B, 108, 109, 113A, 113B, 400, 402, 404) may be similar to the object (e.g. 112). The nearby device (e.g. 106A, 106B, 108, 109, 113A, 113B, 400, 402, 404) may have identical (and/or similar) hardware and/or software to the object (e.g. 112). The nearby device (e.g. 106A, 106B, 108, 109, 113A, 113B, 400, 402, 404) may be a smart device, a network enabled device, a device with connection to WiFi/3G/4G/5G/6G/Zigbee/Bluetooth/adhoc network/other network, a smart speaker, a smart watch, a smart clock, a smart appliance, a smart machine, a smart equipment, a smart tool, a smart vehicle, an internet-of-thing (IoT) device, an internet-enabled device, a computer, a portable computer, a tablet, and another device.

The nearby device (e.g. 106A, 106B, 108, 109, 113A, 113B, 400, 402, 404) and/or at least one processor (e.g. 100A, 100B) associated with the wireless receiver (e.g. 109), the wireless transmitter (e.g. 108), the another wireless receiver (e.g. 113A), the another wireless transmitter 113B and/or a cloud server (in the cloud) may determine the initial spatial-temporal information (e.g. 114, 115B, 115A, 117,

119, 406, 408, 410, 414) of the object (e.g. 112). Two or more of them may determine the initial spatial-temporal info (e.g. 114, 115B, 115A, 117, 119, 406, 408, 410, 414) jointly. Two or more of them may share intermediate information in the determination of the initial spatial-temporal information (e.g. initial position 114).

In one example, the wireless transmitter (e.g. 108) may move with the object (e.g. 112) in the prior movement (e.g. 118) and/or the current movement (e.g. 120). The wireless transmitter (e.g. 108) may send the wireless signal (e.g. 140) to the wireless receiver (e.g. 109) for the determining of the initial spatial-temporal information (e.g. initial position 114) of the object (e.g. 112). The wireless transmitter (e.g. 108) may also send the wireless signal (e.g. 140) and/or another wireless signal (e.g. 140) to another wireless receiver (e.g. 113A) for the tracking of the current movement (e.g. 120) of the object (e.g. 112). The wireless receiver (e.g. 109) may also receive the wireless signal (e.g. 140) and/or another wireless signal (e.g. 140) from the wireless transmitter (e.g. 108) and/or the another wireless transmitter 113B for the tracking of the current movement (e.g. 120) of the object (e.g. 112).

In another example, the wireless receiver (e.g. 109) may move with the object (e.g. 112) in the prior movement (e.g. 118) and/or the current movement (e.g. 120). The wireless receiver (e.g. 109) may receive the wireless signal (e.g. 140) from the wireless transmitter (e.g. 108) for the determining of the initial spatial-temporal info (e.g. initial position 114) of the object (e.g. 112). The wireless receiver (e.g. 109) may also receive the wireless signal (e.g. 140) and/or another wireless signal (e.g. 140) from another wireless transmitter (e.g. 113B) for the tracking of current movement (e.g. 120) of the object (e.g. 112).

Coin-sized Bot

This disclosure is also related to object tracking using a small (e.g. coin-size, cigarette box size, or even smaller, etc.) bot/origin. In this disclosure, the wireless transmitter (e.g. 108, 113B of FIG. 1) and/or the wireless receiver (e.g. 109, 113A) may be part of a small light-weight first portable device 106A, 106B, 108, 109, 113A, 113B, 400, 402, 404). The first portable device (e.g. 106A, 106B, 108, 109, 113A, 113B, 400, 402, 404) may be wirelessly coupled with a second device (e.g. 106A, 106B, 108, 109, 113A, 113B, 400, 402, 404).

The second device (e.g. 106A, 106B, 108, 109, 113A, 113B, 400, 402, 404) may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The second device (e.g. 106A, 106B, 108, 109, 113A, 113B, 400, 402, 404) may be connected to a cloud server, a local server and/or other server via internet, wired internet connection and/or wireless internet connection. The second device may be portable.

The first portable device (e.g. 106A, 106B, 108, 109, 113A, 113B, 400, 402, 404), the second device (e.g. 106A, 106B, 108, 109, 113A, 113B, 400, 402, 404), a local server and/or a cloud server may share the computation and/or storage for any of the tasks (e.g. obtain TSCI (e.g. 300, 111A, 111B), determine characteristics of the object (e.g. 112) associated with the movement of the object (e.g. 112), computation of time series of power information, determining/computing the particular function, searching for local extremum, classification, identifying particular value of time offset, de-noising, processing, simplification, cleaning, wireless smart sensing task, extract CI (e.g. 111A, 111B) from wireless signal (e.g. 140), switching, segmentation, estimate trajectory, process the map, correction, corrective adjustment, adjustment, map-based correction, detecting error, checking for boundary hitting, thresholding, etc.) and information (e.g. TSCI (e.g. 300, 111A, 111B)) associated with this disclosure.

CSI Ready Chip

This disclosure is also related to communication hardware that is capable of providing the CI. The communication hardware may be a WiFi-capable chip (e.g. integrated circuit or IC), a next generation WiFi-capable chip, a LTE-capable chip, a 5G-capable chip, a 6G/7G/8G-capable chip, etc. The communication hardware computes the CI (e.g. 111A, 111B) and stores the CI (e.g. 111A, 111B) in a buffer memory (e.g. 102A, 102B) and make the CI (e.g. 111A, 111B) available for extraction. The CI (e.g. 111A, 111B) may comprise data and/or at least one matrices related to channel state information (e.g. CSI, 110A, 110B of FIG. 1). The at least one matrices may be used for channel equalization, and/or beam forming, etc.

Passive Speed Estimation

Another aspect of the disclosure is related to the estimation of one or more characteristics and/or spatial-temporal information (e.g. 144) of the object (e.g. 112) such as speed, acceleration, gait cycle, a gait, an object motion, and an event. More specifically, the present teaching is related to determining at least one characteristics and/or spatial-temporal information (e.g. 144) of the object (e.g. 112) based on time reversal technology in a rich scattering environment.

In one example, a system, apparatus and/or method for determining at least one characteristics and/or spatial-temporal information (e.g. characteristics 146) of an object (e.g. object (e.g. 112)) associated with a movement of the object (e.g. 112) (e.g. current movement 120, and/or prior movement (e.g. 118)) comprises obtaining one or more TSCI (e.g. CI 111A and/or 111B) of a wireless multipath channel (e.g. wireless multipath channel 144) using a processor (e.g. processor 100A, and/or 100B), a memory (e.g. memory 102A,and/or 102B) communicatively coupled with the processor (e.g. 100A, and/or 100B) and a set of instructions (e.g. set of instructions 104A, and/or 104B) stored in the memory (e.g. 102A, and/or 102B). The at least one TSCI (e.g. CI 111A, and/or 111B, or channel state information 110A and/or 110B) is obtained from a wireless signal (e.g. wireless signal 140) sent through the wireless multipath channel (e.g. 144). The wireless multipath channel (e.g. 144) is impacted by the movement (e.g. 120) of the object (e.g. 112). The system, apparats and/or method further comprises determining the one or more characteristics and/or spatial-temporal information (e.g. 146) of the object (e.g. 112) associated with the movement (e.g. 120) of the object (e.g. 112) based on the one or more TSCI (e.g. 110A, 110B, 111A, and/or 111B). The CI (e.g. 111A and/or 111B) may include channel state information (CSI) (e.g. 110A and/or 110B) of the wireless multipath channel (e.g. 144). Each CSI of the wireless multipath channel (e.g. 144) may be associated with a time. Each CSI may include time domain element, frequency domain element, and/or time-frequency domain element. Each CSI may contain one or more elements. Each element of the CSI may be a real quantity, an imaginary quantity, a complex quantity, a magnitude, a phase, a flag, and/or a set. Each CI (e.g. 111A, 111B) (CI) may include a vector of complex numbers, a matrix of complex numbers, a set of mixed quantities, and/or a multi-dimensional collection of at least one complex numbers.

One or more time series of power information may be computed based on the one or more TSCI (e.g. 300, 111A, 111B) of the wireless multipath channel (e.g. 144). Each power information may be associated with a CI (e.g. 111A, 111B) of the wireless multipath channel (e.g. 144), Both the power information and the CI (e.g. 111A, 111B) may be associated with a time. The vector of the CI (e.g. 111A, 111B) and the vector of the power information may have the same number of elements. Each real element of the power information vector may be computed based on respective magnitude, phase, real part, imaginary part and/or another function of corresponding complex element of the CI (e.g. 111A, 111B). In particular, the real element of the power information vector may be based on square of magnitude of corresponding complex element of the channel info (e.g. 111A/B).

A particular function may be determined based on a first time, a time offset, a first window of power information and a second window of power information. Although power information is mentioned here, the particular function may be applied to CI (e.g. 111A, 111B) and/or other information. The first window of power information may be a first subset of a particular time series of power information associated with the first time. The second window of power information may be a second subset of the particular time series of power information associated with a second time which is at the time offset from the first time. The first window and the second window may be of the same size. The second window is at the time offset from the first window. The first window and the second window may both be windows of the same particular time series of power information (and/or or CI (e.g. 111A, 111B), and/or other information). The cardinality of the first subset may be equal to the cardinality of the second subset. The particular function may be computed for at least one value of the first time and for at least one value of the time offset for each of the first time. The one or more characteristics and/or spatial-temporal information of the object (e.g. 112) associated with the movement of the object (e.g. 112) may be determined based on the articular function computed for the at least one value of time offset. A particular value of the first time may be associated with the movement of the object (e.g. 112) and the at least one characteristics and/or spatial-temporal information of the object (e.g. 112). The particular function may be a second function of at least one of: a covariance function, a covariance-like function, an auto-covariance function, an auto-covariance-like function, a correlation function, a correlation-like function, an auto-correlation function, an auto-correlation-like function, an inner product, another function, a combination of any of these functions with a preprocessing function, a combination of any of these functions with a post-processing function, and a combination of any of these functions with at least one of: frequency decomposition, time decomposition, time-frequency decomposition, and another decomposition.

The second function may be at least one of: de-noising, smoothing, conditioning, enhancement, restoration, feature extraction, weighted averaging, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, Fourier transform, Laplace, Hadamard transform, transformation, decomposition, selective filtering, adaptive filtering, derivative, first order derivative, second order derivative, higher order derivative, integration, zero crossing, indicator function, absolute conversion, convolution, multiplication, division, preprocessing, post-processing, another transform, another processing, another filter, and a third function, and a third function. The particular function may be an estimate of a weighted sum of square of autocorrelation function (ACF) of electric field components of the received electromagnetic (EM) wave of the wireless signal (e.g. 140).

The power information may include a frequency decomposition, time decomposition, time-frequency decomposition, and/or another decomposition. Another function may be determined based on a frequency of the frequency decomposition (or a variable/index of other decompositions), the first time, the time offset, the first window of power information and the second window of power information. The another function may be computed for at least one value of the frequency of the frequency decomposition. The particular function may be computed by averaging the another function computed for the at least one value of the frequency of the frequency decomposition.

In another example, the power information may include a frequency subband decomposition. Another function is determined based on a frequency subband of the frequency decomposition, the first time, the time offset, the first window of power information and the second window of power information. The another function may be computed for at least one instance of the frequency subband of the frequency decomposition. The particular function may be computed by averaging the another function computed for the at least one instance of the frequency subband of the frequency decomposition. In another example, the power information may comprise a time-frequency decomposition. Another function may be determined based on a time-frequency partition of the time-frequency decomposition, the first time, the time offset, the first window of power information and the second window of power information. The another function may be computed for at least one instance of the time-frequency partition of the time-frequency decomposition. The particular function may be computed by averaging the another function computed for the at least one instance of the time-frequency partition of the time-frequency decomposition.

The computing of the particular function may comprise determining a preliminary function based on the first time, a third time, the time offset, a third window of power information and a fourth window of power information. The third window of power information may be a third subset of the particular time series of power information associated with the third time. The fourth window of power information may be a fourth subset of the particular time series of power information associated with a fourth time at the time offset from the third time. The preliminary function may be computed for a particular value of the first time and a particular value of the time offset for at least one value of the third time close to the first time. The particular function for the particular value of the first time and the particular value of the time offset may be computed by averaging the preliminary function for the particular value of the first time and the particular value of the time offset computed for the at least one value of the third time close to the first time.

At least one special characteristics and/or special spatial-temporal info (e.g. local maximum, local minimum, zero crossing, etc.) may be determined/computed for a particular value of the first time. At least one particular value of the time offset each associated with a respective special characteristics and/or spatial-temporal information (e.g. local maximum, local minimum, zero crossing, etc.) of the particular function for the particular value of the first time may be identified. The at least one special characteristics and/or special spatial-temporal info of the object (e.g. 112) associated with the movement of the object (e.g. 112) may be determined based on the at least one particular value of the time offset.

There may be a search for a local extremum of the particular function for a particular value of the first time. The search may comprise the following steps. (1) A current time offset value may be initialized. This is followed by a recursion. (2) In each iteration of the recursion, a regression window around the current time offset value may be determined. (3) The particular function within the regression window around the current time offset value may be approximated with/by a regression function using regression analysis. (4) Regression error of the regression function with respect to the particular function may be determined. (5) The current time offset value may be updated based on convexity of the regression function, another characteristics and/or spatial-temporal information of the regression function, and/or regression error of the regression function with respect to the particular function in the regression window. (6) Performing the iteration of the recursion until at least one stopping criterion is satisfied.

The local extremum of the particular function may be determined for the particular value of the first time based on the corresponding extremum of the regression function in the regression window. A particular value of the time offset associated with the local extremum of the particular function may be identified in the regression window. At least one characteristics and/or spatial-temporal information of the object (e.g. 112) associated with the movement of the object (e.g. 112) may be computed based on the particular value of the time offset.

The initial current time offset value may be positive, negative and/or zero. In at least one iteration, a length of the regression window and/or a location of the regression window may change. The regression function may be a linear function, a quadratic function, a cubic function, a polynomial function, and/or another function.

The regression analysis may minimize absolute error, square error, higher order error (e.g. third order, fourth order, etc.), robust error (e.g. square error for smaller error magnitude and absolute error for larger error magnitude, or first kind of error for smaller error magnitude and second kind of error for larger error magnitude), another error, weighted sum of absolute error (e.g. for wireless transmitter (e.g. 108) with multiple antennas (e.g. 200A, 200B, 200C, 200D, 200E, 200F) and wireless receiver (e.g. 109) with multiple antennas (e.g. 200A, 200B, 200C, 200D, 200E, 200F), each pair of transmitter antenna (e.g. 200A, 200B, 200C) and receiver antenna (e.g. 200D, 200E, 200F) form a link. Error associated with different links may have different weights. One possibility is that some links and/or some components with larger noise may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The time offset associated with maximum regression error of the regression function with respect to the particular function in the regression window may become the updated current time offset in the iteration.

In one example, if the regression function is locally convex in the regression window, time offset associated with maximum regression error of the regression function with respect to the particular function in the regression window may become the updated current time offset. In another example, if the regression function is locally concave in the regression window, time offset associated with maximum regression error of the regression function with respect to the particular function in the regression window may become the updated current time offset.

If the regression function is locally convex in the regression window, at least one of time offsets associated with two ends of the regression window may become the updated current time offset. If the regression function is locally concave in the regression window, at least one of time offsets associated with two ends of the regression window may become the updated current time offset.

At least one of time offsets associated with two ends of the regression window may become the updated current time offset based on the local convexity of the regression function in the regression window. If the regression is locally convex in part of the window and locally concave in another part of the window, the window size may be reduced. A time offset near time offset associated with maximum regression error of the regression function with respect to the particular function in the regression window may become the updated current time offset based on a condition.

One of the at least one characteristics and/or spatial-temporal information of the object (e.g. 112) associated with the movement of the object (e.g. 112) may be speed of the object (e.g. 112). The speed of the object (e.g. 112) may be computed based on the particular value of time offset associated with the local extremum of the particular function for a particular value of the first time in the regression window.

The speed of the object (e.g. 112) at a time may be computed based on the particular value of time offset associated with the local extremum of the particular function for a particular value of the first time in the regression window. The particular value of the first time may be equal to the time.

An acceleration of the object (e.g. 112) at a particular time may be determined based on at least one value of the speed of the object (e.g. 112) each at a time close to the particular time. The acceleration of the object (e.g. 112) at the particular time may be one of the at least one characteristics and/or spatial-temporal information of the object (e.g. 112) associated with the movement of the object (e.g. 112). An acceleration of the object (e.g. 112) at a particular time may be determined based on at least one value of the speed of the object (e.g. 112) at one or more time each close to the particular time. The determination of the acceleration of the object (e.g. 112) at the particular time may comprise: approximating the speed of the object (e.g. 112) at the one or more time by a time function, determining one or more slopes of the time function close to the particular time, and computing the acceleration based on the one or more slopes of the time function. The acceleration may be computed as a function of the one or more slopes of the time function. The function may be average, weighted average, median, mode, quartile, percentile, robust function, linear function, nonlinear function, and/or another function.

One of the one or more slopes of the time function may be determined as a difference between two values of the speed of the object (e.g. 112) at two adjacent times divided by a difference of the two adjacent time values. The time function may be a piecewise linear function, The acceleration may be computed as a slope of the piecewise linear function at the particular time. The one or more time may be within a time window around the particular time. The one or more time may comprise a time window around the particular time.

The acceleration of the object (e.g. 112) may be the acceleration of the object (e.g. 112) associated with the movement of the object (e.g. 112) at the particular time. An acceleration of the object (e.g. 112) at a particular time may be determined based on a speed of the object (e.g. 112) computed at multiple values of time close to the particular time. The speed of the object (e.g. 112) may be one of the at least one characteristics and/or spatial-temporal information of the object (e.g. 112) associated with the movement of the object (e.g. 112) determined based on the at least one TSCI (e.g. 300, 111A, 111B).

The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time. The speed of the object (e.g. 112) may also be one of the at least one characteristics and/or spatial-temporal information of the object (e.g. 112) associated with the movement of the object (e.g. 112) determined based on the time offset associated with the local extremum of the particular function for the particular value of the first time in the regression window, the particular value of the first time being equal to the time. The speed of the object (e.g. 112) at the particular value of the first time may be computed as a quantity divided by the particular value of time offset associated with the local extremum of the particular function in the regression window.

In another example, one of the at least one characteristics and/or spatial-temporal information may be speed of the object (e.g. 112). The speed of the object (e.g. 112) at the first time may be computed based on the particular value of time offset associated with the local extremum of the particular function in the regression window. The local extremum may be the first local maximum with positive time offset, and/or the first local maximum with negative time offset. The particular function may be a derivative of a characteristic auto-correlation function with respect to the time offset. The CI (e.g. 111A, 111B) may be CSI associated with a frequency decomposition. Each CSI may be a vector of complex components each corresponding to a frequency of the frequency decomposition. Component-wise auto-correlation function may be computed for each frequency of the frequency decomposition based on the particular time series of CSI. The characteristic auto-correlation may be computed as average of the component-wise auto-correlation function over the frequency of the frequency decomposition.

The iteration may be applied at least one time to obtain at least one extremum. Each extremum may be associated with a respective current time offset value, a respective regression window, a respective regression function, and/or a respective particular time offset value in the respective iteration. The at least one characteristics and/or spatial-temporal information of the object (e.g. 112) associated with the movement of the object (e.g. 112) may be computed based on at least one of the respective particular time offset value of the particular function in the regression window. The iteration may be applied two times to obtain a first local extremum and a second local extremum. The first local extremum may be associated with a first current time offset value, first regression window, first regression function, and/or first particular time offset value. The second local extremum may be associated with a second current time offset value, second regression window, second regression function, and/or second particular time offset value. The at least one characteristics and/or spatial-temporal information of the object (e.g. 112) associated with the movement of the object (e.g. 112) may be computed based on the first particular time offset value and/or the second particular time offset value of the particular function in the regression window. The iteration may be applied two times to obtain a first local extremum which is first local maximum with positive time offset, and a second local extremum which is first local maximum with negative time offset. The first local extremum may be associated with a first current time offset value, a first regression window, a first regression function, and/or a first particular time offset value. The second local extremum may be associated with a second current time offset value, a second regression window, a second regression function, and/or a second particular time offset value. The at least one characteristics and/or spatial-temporal information of the object (e.g. 112) associated with the movement of the object (e.g. 112) may be computed based on the first particular time offset value and/or the second particular time offset value, of the particular function in the regression window.

A gait cycle of the object (e.g. 112) may be determined based on at least one value of the speed of the object (e.g. 112), and/or at least one value of acceleration of the object (e.g. 112). At least one gait cycle of the object (e.g. 112) may also be determined based on at least one value of the speed of the object (e.g. 112) and/or at least one value of the acceleration of the object (e.g. 112). The at least one gait cycle may be determined by detecting a succession of a period of positive acceleration and a period of negative acceleration. The at least one gait cycle may be determined by detecting a succession of a period of increasing speed and a period of decreasing speed. The at least one gait cycle may be determined by detecting a succession of a period of positive speed and a period of negative speed. The at least one gait cycle may be determined by detecting an underlying periodic behavior of the speed of the object (e.g. 112), a speed change of the object (e.g. 112), and/or the acceleration of the object (e.g. 112), with an associated time period. The at least one gait cycle may be determined by detecting an underlying periodic behavior of local maximum speed of the object (e.g. 112), local minimum speed of the object (e.g. 112), local maximum acceleration of the object (e.g. 112), local minimum acceleration of the object (e.g. 112), local maximum speed change of the object (e.g. 112), and/or local minimum speed change of the object (e.g. 112), with an associated time period. The at least one gait cycle may be determined to be associated with a time period. A function of the speed of the object (e.g. 112) and/or the acceleration of the object (e.g. 112) may exhibit a local maximum at a location associated with the time period. The at least one gait cycle may be determined to be associated with a time period. A function of the speed of the object (e.g. 112) and/or the acceleration of the object (e.g. 112) may be determined to exhibit peak localization with multiple pairs of local maximum and local minimum with associated multiple pairs of peak location associated with the time period.

The time period may be determined based on a distance between at least one of: two adjacent local maximum, two adjacent local minimum, a pair of adjacent local maximum and local minimum, two local maximums separated by a predetermined number of maximums, two local minimums separated by a predetermined number of minimums, and a pair of local maximum and local minimum separated by a predetermined number of extremum, of the function. The function may comprise an auto-correlation function, an auto-correlation like function, an auto-covariance function, an auto-covariance like function, a product of the speed and a shifted version of the acceleration, a product of the speed and a shifted version of a periodic function with known period, a product of the acceleration and the shifted version of the periodic function with known period, an optimization of a cost function, a constrained optimization of the cost function, a unconstrained optimization of the cost function, a Fourier transform, a Laplace transform, another transform, and/or another function.

At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the at least one TSCI (e.g. 300, 111A, 111B). The acceleration of the object (e.g. 112) may be determined based on the speed of the object (e.g. 112). At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time. The acceleration of the object (e.g. 112) may be determined based on the speed of the object (e.g. 112). At least one gait cycle of the object (e.g. 112) may be determined based on at least one of: at least one value of a speed of the object (e.g. 112) and at least one value of an acceleration of the object (e.g. 112). The speed of the object (e.g. 112) may be one of the at least one characteristics and/or spatial-temporal information of the object (e.g. 112) associated with the movement of the object (e.g. 112) determined based on the time offset associated with the local extremum of the particular function for the particular value of the first time in the regression window, the particular value of the first time being equal to the time. The acceleration of the object (e.g. 112) may be determined based on the speed of the object (e.g. 112). A gait of the object (e.g. 112) and/or an event may be detected based on at least one of: at least one segment of a TSCI (e.g. 300, 111A, 111B), at least one segment of a time series of channel state information (CSI, e.g. 110A, 110B of FIG. 1), at least one value of the particular function, at least one value of the speed of the object (e.g. 112), and/or at least one value of an acceleration of the object (e.g. 112) each based on at least one value of the speed of the object (e.g. 112). The gait of the object (e.g. 112) and/or the event may be detected based on a time trend of at least one of: the CI (e.g. 111A, 111B), the channel state information (CSI, e.g. 110A, 110B of FIG. 1), the particular function, the speed of the object (e.g. 112), and/or the acceleration of the object (e.g. 112). The detection of the gait of the object (e.g. 112) and/or the event may comprise determining the gait of the object (e.g. 112) and/or the event, using an engine based on the time trend of the speed of the object (e.g. 112). Input to the engine may comprise at least one of: at least one segment of a TSCI (e.g. 300, 111A, 111B), at least one segment of a time series of channel state information (CSI, e.g. 110A, 110E of FIG. 1), at least one value of the particular function, at least one value of the speed of the object (e.g. 112), at least one value of an acceleration of the object (e.g. 112). The engine may be a neural network and/or a classification engine. The engine may be trained in a training phase with training input to generate at least one reference time trend associated with known gait of the object (e.g. 112) and known event. The training input of the engine may be associated with the known gait of the object (e.g. 112) and the known event. The training may be at least one of: discriminative training, decision feedback training, machine learning, supervised learning, unsupervised learning, shallow learn, deep learning, and/or another training.

The determination of the gait of the object (e.g. 112) and/or the event using the engine may comprise: obtaining the time trend, comparing the time trend with each of the reference time trend, and aligning the time trend of a first duration with each of the at least one reference time trend of heterogeneous duration. It may further comprise computing at least one similarity score each between the time trend and respective aligned reference time trend, and/or determining the gait of the object (e.g. 112) and/or the event as one of the known gaits of the object (e.g. 112) and/or one of the known events, based on the at least one similarity score.

The speed of the object (e.g. 112) may be one of the at least one characteristics and/or spatial-temporal information of the object (e.g. 112) associated with the movement of the object (e.g. 112) determined based on the at least one TSCI (e.g. 300, 111A, 111B). The speed of the object (e.g. 112) may be one of the at least one characteristics and/or spatial-temporal information of the object (e.g. 112) associated with the movement of the object (e.g. 112) determined based on the particular function computed for the particular value of first time and the at least one value of time offset, with the particular value of the first time being one of the multiple values of time close to the particular time.

At least one threshold may be determined. The at least one characteristics and/or spatial-temporal information of the object (e.g. 112) may be determined based on the at least one threshold. The at least one threshold may be determined based on at least one time series of training CI (e.g. 111A, 111B) (CI) of the wireless multipath channel (e.g. 144) using a second processor (e.g. 100A, 100B), a second memory (e.g. 102A, 102B) communicatively coupled with the second processor (e.g. 100A, 100B) and a second set of instructions (e.g. 104A, 104B) stored in the second memory (e.g. 102A, 102B). The second processor (e.g. 100A, 100B) may be the first processor (e.g. 100A, 100B), part of the first processor (e.g. 100A, 100B), and/or connected with the first processor (e.g. 100A, 100B). Some resources (hardware, network, communication, user-interface, and/or software) of the second processor (e.g. 100A, 100B) may be shared with the first processor (e.g. 100A, 100B). The second memory (e.g. 102A, 102B) may be the first memory (e.g. 102A, 102B), part of the first memory (e.g. 102A, 102B), connected to the first memory (e.g. 102A, 102B), and/or shared with the first memory (e.g. 102A, 102B). The second set of instructions (e.g. 104A, 104B) may be the first set of instructions (e.g. 104A, 104B), and/or part of the first set of instructions (e.g. 104A, 104B). The second set of instructions (e.g. 104A, 104B) and the first set of instructions (e.g. 104A, 104B) may share some software library, some software routine, some hardware resources, some communication resources and/or other resource. The second set of instructions (e.g. 104A, 104B) and the first set of instructions 104A, 104B) may work independently, cooperatively, jointly, sequentially, in parallel, alternately, and/or interactively.

The at least one time series of training CI (e.g. 111A, 111B) (CI) of the wireless multipath channel (e.g. 144) may be obtained from a second wireless signal (e.g. 140) sent through the wireless multipath channel (e.g. 144) in a training phase. The wireless multipath channel (e.g. 144) may be impacted by a training movement of a second object in the training phase. The training phase may be a training session, which may be carried out once, occasionally, regularly, and/or on demand. At least one time series of first training CI (e.g. 111A, 111B) of the wireless multipath channel (e.g. 144) associated with a target positive training movement of the second object in the training phase may be obtained. The positive training movement may be a target movement to be recognized, monitored, measured, studied, processed, detected, estimated, verified, and/or captured. At least one time series of second training CI (e.g. 111A, 111B) of the wireless multipath channel (e.g. 144) associated with a target negative training movement of the second object in the training phase may be obtained. The negative training movement may be a target movement to be ignored, missed, not monitored, not detected, not estimated, not recognized, not verified, not captured, not measured, and/or not studied.

At least one first quantity from the at least one time series of first training CI (e.g. 111A, 111B) and/or at least one second quantity from the at least one time series of second training CI (e.g. 111A, 111B) may be computed. The at least one first quantity and/or the at least one second quantity may comprise motion statistics, location statistics, map coordinate statistics, height statistics, speed statistics, acceleration statistics, movement angle statistics, rotation statistics, size statistics, volume statistics, time trend, time trend statistics, time profile statistics, periodic motion statistics, frequency statistics, transient statistics, breathing statistics, gait statistics, action statistics, event statistics, suspicious event statistics, dangerous event statistics, alarming event statistics, warning statistics, belief statistics, proximity statistics, collision statistics, power statistics, signal statistics, signal power statistics, signal strength statistics, received signal strength indicator (RSSI), signal amplitude, signal phase, signal frequency component, signal frequency band component, channel state information (CSI, e.g. 110A, 110B of FIG. 1) (CSI), CSI statistics, map statistics, time statistics, frequency statistics, time-frequency statistics, decomposition statistics, orthogonal decomposition statistics, non-orthogonal decomposition statistics, tracking statistics, breathing statistics, heart beat statistics, biometric statistics, baby statistics, patient statistics, machine statistics, device statistics, temperature statistics, vehicle statistics, parking lot statistics, venue statistics, lift statistics, elevator statistics, spatial statistics, road statistics, fluid flow statistics, home statistics, room statistics, office statistics, house statistics, building statistics, warehouse statistics, storage statistics, system statistics, ventilation statistics, fan statistics, pipe statistics, duct statistics, people statistics, human statistics, car statistics, boat statistics, truck statistics, airplane statistics, drone statistics, downtown statistics, crowd statistics, impulsive event statistics, cyclo-stationary statistics, environment statistics, vibration statistics, material statistics, surface statistics, 3-dimensional statistics, 2-dimensional statistics, local statistics, global statistics, presence statistics, and/or another statistics.

The at least one threshold may be determined based on the at least one first quantity and/or the at least one second quantity. The at least one threshold may be determined such that a first percentage of the first quantity is larger than, equal to and/or less than a first threshold (not the at least one threshold). The at least one threshold may be determined such that a second percentage of the second quantity is larger than, equal to and/or less than a second threshold (not the at least one threshold). The first threshold may be greater than, equal to and/or less than the second threshold. The first threshold may be the second threshold. The first percentage may be greater than, equal to and/or less than the second percentage.

The at least one time series of first training CI (e.g. 111A, 111B) of the wireless multipath channel (e.g. 144) may be associated with a training movement of the second object inside a monitored area in the training phase. The target positive training movement of the second object may be the training movement of the second object inside the monitored area. The at least one time series of second training CI (e.g. 111A, 111B) of the wireless multipath channel (e.g. 144) may be associated with a training movement of the second object outside the monitored area in the training phase. The target negative training movement of the second object may be the training movement of the second object outside the monitored area.

The second object may be the first object. The second object may be an imitation, a replacement, a backup, and/or a replica of the first object. The second object may be another object similar to the first object. The second object may be similar to the first object in terms of structure, size, shape, functionality, periodicity, deformation characteristics, motion characteristics, speed, acceleration, gait, trend, habit, wireless properties, and other characteristics.

Handover Technology

This disclosure is also about wireless sensing handover. A system, apparatus and/or method of wireless sensing handover comprises a Type1 heterogeneous wireless transceiver capable of wirelessly coupling with at least one Type2 heterogeneous wireless transceiver through a wireless multipath channel (e.g. 144) associated with a venue (e.g. 142), and/or at least one Type2 heterogeneous wireless transceiver each at respective location of the venue (e.g. 142). It (i.e. the system, apparatus and/or method) further comprises a processor (e.g. 100A, 100B), a memory (e.g. 102A, 102B) communicatively coupled with the processor (e.g. 100A, 100B), and/or a set of instructions (e.g. 104A, 104B) stored in the memory (e.g. 102A, 102B) which when executed cause the processor (e.g. 100A, 100B) to do the following. It causes the Type1 transceiver to establish a wireless connection with a first Type2 transceiver at a first location of the venue (e.g. 142) through the wireless multipath channel (e.g. 144) associated with the venue (e.g. 142). The wireless multipath channel (e.g. 144) is impacted by an object in the venue (e.g. 142). It (i.e. the system, apparatus and/or method) further causes the Type1 transceiver to transmit a first wireless signal (e.g. 140) to the first Type2 transceiver, and/or to receive a second wireless signal (e.g. 140) from the first Type2 transceiver. It extracts at least one first CI (e.g. 111A, 111B) from the first wireless signal (e.g. 140) and/or the second wireless signal (e.g. 140). It performs a wireless smart sensing task associated with an object in the venue (e.g. 142) based on the at least one first CI (e.g. 111A, 111B). It further causes the Type1 transceiver to switch the wireless connection from the first Type2 transceiver to a second. Type2 transceiver at a second location of the venue (e.g. 142) based on the at least one first CI (e.g. 111A, 111B). It causes the Type1 transceiver to transmit a third wireless signal (e.g. 140) to the second Type2 transceiver, and/or to receive the fourth wireless signal (e.g. 140) from the second Type2 transceiver. It extracts at least one second CI (e.g. 111A, 111B) from the third wireless sign and/or the fourth wireless signal (e.g. 140), and/or performs the wireless smart sensing task associated with the object (e.g. 112) in the venue (e.g. 142) based on the at least one second CI (e.g. 111A, 111B).

A Type1 transceiver may communicate wirelessly with multiple Type2 transceivers which may be heterogeneous. A Type2 transceiver may communicate wirelessly with multiple Type1 transceivers, which may be heterogeneous. The wireless multipath channel (e.g. 144) may be impacted by the object (e.g. 112) in the venue 142), presence of the object (e.g. 112), position (e.g. 114, 115B, 115A, 117, 119, 406, 408, 410, 414) of the object (e.g. 112) in the venue (e.g. 142), status of the object (e.g. 112), movement of the object (e.g. 112), change of the object (e.g. 112), deformation of the object (e.g. 112), speed of the object (e.g. 112), characteristics of the object (e.g. 112) and/or spatial-temporal information of the object (e.g. 112). The wireless coupling may be based on WiFi, WiMax, 3G/beyond 3G, 4G/beyond 4G, LTE, 5G, 6G, 7G, Bluetooth, Zigbee, a proprietary wireless system, and/or another wireless system.

The processor (e.g. 100A, 100B), the memory (e.g. 102A, 102B) and/or the set of instructions (e.g. 104A, 104B) may be associated with the Type1 heterogeneous wireless transceiver, one of the at least one Type2 heterogeneous wireless transceiver, the object (e.g. 112), a device (e.g. 106A, 106B, 108, 109, 113A, 113B, 400, 402, 404) associated with the object (e.g. 112), another device (e.g. 106A, 106B, 108, 109, 113A, 113B, 400, 402, 404) associated with the venue (e.g. 142), a cloud server, and/or another server.

The switching from the first Type2 transceiver at the first location to the second Type2 transceiver at the second location may be based on: signal strength, signal amplitude, signal phase, received signal strength indicator (RSSI), channel state information (CSI, e.g. 110A, 110B of FIG. 1), a map, a current location of the Type1 transceiver, information associated with at least one of: frequency band, frequency signature, frequency phase, frequency amplitude, frequency trend, frequency characteristics, frequency-like characteristics, orthogonal decomposition characteristics, and/or non-orthogonal decomposition characteristics, information associated with at least one of: time period, time signature, time amplitude, time phase, time trend, and/or time characteristics, information associated with at least one of: time-frequency partition, time-frequency signature, time-frequency amplitude, time-frequency phase, time-frequency trend, and/or time-frequency characteristics, information associated with direction, angle of arrival, angle of directional antenna, and/or phase, and/or another information.

The Type1 transceiver may switch the wireless connection from the first Type2 transceiver at the first location to the second Type2 transceiver at the second location when a quantity derived from the at least one first CI (e.g. 111A, 111B) and/or the at least one second CI (e.g. 111A, 111B) may satisfy a switching condition.

Dummy Origin

A particular Type2 (transceiver) device (e.g. 106A, 106B, 108, 109, 113A, 113B, 400, 402, 404) may broadcast a series of probing signals to one or more Type1 (transceiver) device (e.g. 106A, 106B, 108, 109, 113A, 113B, 400, 402, 404). The particular Type2 device (e.g. 106A, 106B, 108, 109, 113A, 113B, 400, 402, 404) may be WiFi access point, LTE base station, Bluetooth device, and/or BLE device. Initially or periodically or occasionally or at reset, a procedure may be applied to trigger/initiate a broadcasting mode of the particular Type2 device (e.g. 106A, 106B, 108, 109, 113A, 113B, 400, 402, 404) so that the Type2 device (e.g. 106A, 106B, 108, 109, 113A, 113B, 400, 402, 404) may send the series of probing signals in the broadcasting mode. In the initiating procedure, the Type2 device (e.g. 106A, 106B, 108, 109, 113A, 113B, 400, 402, 404) may function temporarily as a Type1 device (e.g. 106A, 106B, 108, 109, 113A, 113B, 400, 402, 404) and communicate with another device (e.g. 106A, 106B, 108, 109, 113A, 113B, 400, 402, 404) that may function temporarily as a Type2 device (e.g. 106A, 106B, 108, 109, 113A, 113B, 400, 402, 404) to send at least one probing signal to the Type2 device (e.g. 106A, 106B, 108, 109, 113A, 113B, 400, 402, 404). The another device (e.g. 106A, 106B, 108, 109, 113A, 113B, 400, 402, 404) may be a dummy device (e.g. 106A, 106B, 108, 109, 113A, 113B, 400, 402, 404) dedicated to communicate with the Type2 device (e.g. 106A, 106B, 108, 109, 113A, 113B, 400, 402, 404) in the initiating procedure. The another device (e.g. 106A, 106B, 108, 109, 113A, 113B, 400, 402, 404) may have other useful function.

Tracker Bot ID

A particular Type2 (transceiver) device (e.g. 106A, 106B, 108, 109, 113A, 113B, 400, 402, 404) may broadcast a series of probing signals to one or more Type1 (transceiver) device (e.g. 106A, 106B, 108, 109, 113A, 113B, 400, 402, 404). The particular Type2 device (e.g. 106A, 106B, 108, 109, 113A, 113B, 400, 402, 404) may be a WiFi access point, an LTE base station, a Bluetooth device, and/or a BLE device. Initially or periodically or occasionally or at a reset, a procedure may be applied to trigger/initiate a broadcasting mode of the particular Type2 device (e.g. 106A, 106B, 108, 109, 113A, 113B, 400, 402, 404) so that the Type2 device (e.g. 106A, 106B, 108, 109, 113A, 113B, 400, 402, 404) may send the series of probing signals in the broadcasting mode. In the initiating procedure, the Type2 device (e.g. 106A, 106B, 108, 109, 113A, 113B, 400, 402, 404) may function temporarily as a Type1 device (e.g. 106A, 106B, 108, 109, 113A, 113B, 400, 402, 404) and communicate with another device (e.g. 106A, 106B, 108, 109, 113A, 113B, 400, 402, 404) that may function temporarily as a Type2 device (e.g. 106A, 106B, 108, 109, 113A, 113B, 400, 402, 404) to send at least one probing signal to the Type2 device (e.g. 106A, 106B, 108, 109, 113A, 113B, 400, 402, 404). The another device (e.g. 106A, 106B, 108, 109, 113A, 113B, 400, 402, 404) may be a dummy device (e.g. 106A, 106B, 108, 109, 113A, 113B, 400, 402, 404) dedicated to communicate with the Type2 device (e.g. 106A, 106B, 108, 109, 113A, 113B, 400, 402, 404) in the initiating procedure. The another device (e.g. 106A, 106B, 108, 109, 113A, 113B, 400, 402, 404) may have other useful function.

Map-based Correction

This disclosure is also about tracking and/or navigation correction (correction for the tracking and/or navigation). A system, apparatus and/or method of tracking and/or navigation correction comprises: a processor (e.g. 100A, 100B), a memory (e.g. 102A, 102B) communicatively coupled with the processor (e.g. 100A, 100B), and a set of instructions (e.g. 104A, 104B) stored in the memory (e.g. 102A, 102B) which when executed cause the processor (e.g. 100A, 100B) to do the following. It (the system, apparatus and/or method of tracking correction) determines a movement of an object along a trajectory in a venue (e.g. 142). A wireless signal (e.g. 140) is sent through a wireless multipath channel (e.g. 144) of the venue (e.g. 142). The wireless multipath channel (e.g. 144) of the venue (e.g. 142) is impacted by the movement of the object (e.g. 112) in the venue (e.g. 142). At least one TSCI (e.g. 300, 111A, 111B) is extracted from the wireless signal (e.g. 140). It (the system, apparatus and/or method of tracking correction) further determines an estimated trajectory path (and/or navigation path) of the object (e.g. 112) in the venue (e.g. 142) associated with the movement of the object (e.g. 112) estimated based on the at least one TSCI (e.g. 300, 111A, 111B), and applies corrective adjustment to the estimated trajectory (and/or navigation path) of the object (e.g. 112).

The wireless signal (e.g. 140) may be sent between two heterogeneous wireless transceivers through the wireless multipath channel (e.g. 144) in the venue (e.g. 142). One of the two heterogeneous wireless transceivers may be associated with the object (e.g. 112) and/or the movement of the object (e.g. 112). The estimated trajectory of the object (e.g. 112) may be estimated based on the at least one TSCI (e.g. 300, 111A, 111B).

A map associated with the venue (e.g. 142) may be obtained. The map may be 2-dimension, 3-dimension and/or higher dimension. Points in the map may be associated with another spatial-temporal information such as longitude coordinate, latitude coordinate. The map associated with the venue (e.g. 142) may be obtained based on: photo of floor plan of the venue (e.g. 142), image of the floor plan of the venue (e.g. 142), picture of the floor plan of the venue (e.g. 142), at least one image of the venue(e.g. 142), at least one video of the venue (e.g. 142), at least one scanned data of the venue (e.g. 142), at least one captured data of the venue (e.g. 142), recorded description of the venue (e.g. 142), audio description of the venue(e.g. 142), infra-red description of the venue (e.g. 142), sonic description of the venue (e.g. 142), subsonic description of the venue (e.g. 142), ultrasonic description of the venue (e.g. 142), visible light description of the venue (e.g. 142), radio frequency description of the venue (e.g. 142), frequency description of the venue (e.g. 142), time-frequency description of the venue (e.g. 142), 2-dimensional description of the venue (e.g. 142), 3-dimensional description of the venue (e.g. 142), higher dimensional description of the venue (e.g. 142), descriptive information of the venue (e.g. 142) comprising at least one of: global coordinate, local coordinate, elevator, inclination, slope, terrain description, main structure description, wall description, door description, floor description, ceiling description, window description, coupling description, multi-storey description, basement description, roof-top description, material description, vegetation description, fixture description, electrical wiring description, lighting description, ventilation description, air-conditioning description, water pipe description, sewage description, installation description, moveable installation description, non-moveable installation description, furniture description, room description, office description, public area description, open area description, closed area description, semi-closed area description, shelving description, walkway description, pedestrian area description, restricted area description, limited access area description, access control description, height description, building layout description, people flow description, wireless installation description, surrounding area description, outside area description, staircase description, lift description, elevator description, fire planning description, catastrophe planning emergency planning description, daily routine description, weekly routine description, monthly routine description, yearly routine description, time pattern description, time-related description, maintenance description, temporary arrangement description, non-temporary arrangement description, event description, future event description, imminent event description, levitation description, floating description, submersing description, weather description, surrounding environment description, and historical description, scanned representation of the venue (e.g. 142), graphics description of the venue (e.g. 142), electronic representation of the venue (e.g. 142), relational description of the venue (e.g. 142) and another venue (e.g. 142), and/or other description of the venue (e.g. 142).

The object (e.g. 112) on the map may be registered. The object (e.g. 112) may be associated with an initial spatial-temporal information (e.g. initial position 114) on the map with corresponding timestamp. The object (e.g. 112) may be a person. A next spatial-temporal information and/or next position (e.g. 114, 115B, 115A, 117, 119, 406, 408, 410, 414) of the object (e.g. 112) may be predicted based on current spatial-temporal information of the object (e.g. 112), current spatial-temporal information and/or position (e.g. 114, 115B, 115A, 119, 406, 408, 410, 414) of the object (e.g. 112), current direction of the object (e.g. 112), current speed of the object (e.g. 112), current acceleration of the object (e.g. 112), current characteristics and/or spatial-temporal information of the object (e.g. 112), capability of the object (e.g. 112), constraint of the object (e.g. 112), status of the object (e.g. 112), limitation of the surrounding on the object (e.g. 112), behavior of the object (e.g. 112), habit of the object (e.g. 112), tendency of the object (e.g. 112), model of the object (e.g. 112), and/or history of the object (e.g. 112).

The map may be processed for the determination of the estimated trajectory of the object (e.g. 112) and the corrective adjustment to the estimated trajectory of the object (e.g. 112). The processing of the map may comprise scaling, resizing, rotation, transformation, deformation, mapping, labelling, coloring, tagging, timestamping, matching with another map, and/or synchronizing with another map. The estimated trajectory of the object (e.g. 112) in the venue (e.g. 142) may be processed. The corrective adjustment may be applied to the estimated trajectory of the object (e.g. 112) based on a map associated with the venue (e.g. 142), and/or at least one constraint associated with the map.

The estimated trajectory of the object (e.g. 112) may be segmented into at least one segment. The corrective adjustment may be applied to the at least one segment. Each of the at least one segment may be associated with a segment identity (ID). The estimated trajectory may be classified such that each segment may be associated with one or more segmentation type. The corrective adjustment may be applied to the at least one segment based on a map of the venue (e.g. 142) and at least one constraints associated with the map. The estimated trajectory of the object (e.g. 112) may be segmented and classified into at least one segment each associated with a segmentation type, a timestamp, and/or a segment identity (ID). The corrective adjustment may be applied to the at least one classified segment based on the segmentation type, the segment ID, a moving distance (e.g.), a moving directional angle, a map of the venue (e.g. 142), and/or at least one constraint associated with the map.

The classification may comprise: a segmentation type of straight line segments, a segmentation type of ARC segments, and/or another segmentation type. The classification may comprise an initial classification and/or a refined classification.

The estimated trajectory of the object (e.g. 112) may be segmented into at least one initial segment each associated with an initial segmentation type and/or an initial segment identity (ID) in the initial classification. The refined classification may be obtained by combining, merging, splitting, reorganizing, re-arranging, refining the map by scaling the map, scaling the map with a scaling factor, refining the map with a local scaling factor, and/or reclassifying the at least one initial segment to obtain at least one refined segment each associated with a refined segmentation type and a refined segment identity (ID).

The map-based correction may comprise a guide-based correction, a low-level correction and/or a high-level correction. The guide-based correction may comprise: correcting an angle of the estimated trajectory of the object (e.g. 112) so that the corrected trajectory may be parallel to a straight path if the object (e.g. 112) may be determined to be moving along the straight path but the estimated trajectory may not parallel to the straight path. The guide-based correction may comprise adjusting the estimated trajectory to be farther away from a forbidden structure if the estimated trajectory may be too close to the forbidden structure.

The straight path may comprise: corridor, road, an alley, lane, path, passage, line, driveway, gap, valley, walkway, pavement, track, duct, pipe, ladder, staircase, tunnel, river, waterway, an aisle, an aisle between shelves, an aisle between goods, an aisle between seats, an aisle between installations, an aisle in shop, an aisle in warehouse, an aisle in vehicle, an aisle in factory, an aisle in an office, an aisle in home, an aisle in building, path in garden, an area partially bounded by two parallel walls, an area partially bounded by two straight walls, an area partially bounded by two roughly straight walls, an area bounded by two parallel boundaries, an area bounded by two locally parallel boundaries, an area bounded by two straight boundaries, an area bounded by two roughly straight boundaries, an area bounded by two flexible straight boundaries, an area bounded by two parallel interfaces, an area bounded by two locally parallel interfaces, an area bounded by two straight interfaces, an area bounded by two roughly straight interfaces, an area bounded by two flexible straight interfaces, an area with an axis of symmetry, an area with an axis of local symmetry, and/or an area with an axis of near symmetry.

The forbidden structure may comprise: wall, boundary, an interface, corridor side, road side, lane side, path side, passage side, line, driveway boundary, gap side, valley side, walkway boundary, pavement boundary, track boundary, duct, pipe, ladder edge, staircase edge, tunnel side, river side, waterway boundary, aisle boundary, row of objects, row of seats, shelf, installation, an assembly line, fenced area, guarded area, off-limit area, fixture, furniture, equipment, machine, door, fence, ceiling, floor, ground, rock, duct, pipe, corner, turning point, curve, an arc, straight line, separation, cliff, shoreline, forbidden area, road structure, and/or another forbidden structure.

The estimated trajectory may be too close to the forbidden structure if a distance between the estimated trajectory and the forbidden structure may be less than a threshold. The estimated trajectory may be adjusted to be farther away by keeping a minimum distance from the forbidden structure. The minimum distance may be: zero, a positive quantity and a negative quantity. The minimum distance may be an adaptive quantity determined based on at least one characteristics and/or spatial-temporal information of the forbidden structure.

After a current segment may be adjusted, at least one previous segment may be checked for discrepancy and/or lack of consistency, between consecutive segments. If discrepancy and/or lack of consistency is detected, additional map-based correction comprising the low-level correction and/or the high-level correction may be applied. The low-level adjustment may comprise: correcting error associated with a current segment of the estimated trajectory locally, wherein an error condition associated with the current segment of the estimated trajectory is determined, and adjusting the current segment and/or an immediate past segment so that the error condition does not occur in the corrected trajectory.

The error condition may comprise: the current segment hitting a forbidden structure, the current segment hitting a boundary associated with the forbidden structure, the current segment hitting an object-dependent forbidden structure of which a property of the object (e.g. 112)-dependent forbidden structure is based on a characteristics and/or spatial-temporal information of the object (e.g. 112), the current segment hitting a temporarily forbidden structure, the current segment going through a non-penetrable structure, the current segment going through at least one of: ceiling, floor, wall, structure, machine, furniture, and fixture, the current segment hitting a boundary of the map, the current segment hitting a watched region, the current segment associating with an unusual behavior, the current segment associating with an unusual behavior of the object (e.g. 112), the current segment reaching an unreasonable height, and/or another error condition.

The high-level adjustment may comprise: correcting error associated with the current segment of the estimated trajectory globally, wherein the error condition associated with the current segment of the estimated trajectory is determined and the error condition is not corrected by a low-level adjustment, and adjusting the current segment and at least one past segment so that the error condition does not occur in the corrected trajectory.

The scaling factor may be obtained by determining an intersection-corridor (IC) graph based on the estimated trajectory, the map and/or the at least one constraints of the map. The intersection-corridor graph may comprise a set of vertices and/or a set of edges. A corridor in the venue (e.g. 142) corresponding to a series of vertices and/or edges of the intersection-corridor (IC) graph and also corresponding to at least one section of the estimated trajectory may be determined. A ground-truth length of the corridor may be computed based on the map and/or the at least one constraints of the map. A second length of the corridor may be computed based on the at least one section of the estimated trajectory, and/or the vertices and/or edges of the IC graph corresponding to the corridor. The scaling factor may be computed based on the ground-truth length and/or the second length. The scaling factor may be further obtained by computing the estimated trajectory based on the wireless signal (e.g. 140) obtained while the object (e.g. 112) moves along the corridor at least one time. The scaling factor may be obtained by: determining a second estimated trajectory of a second object in the venue (e.g. 142) associated with a second movement of the second object along a path at least one time based on at least one time series of second CI (e.g. 111A, 111B) extracted from a second wireless signal (e.g. 140) sent through the wireless multipath channel (e.g. 144) of the venue (e.g. 142). The second estimated trajectory of the second object in the venue (e.g. 142) associated with the second movement of the second object may be computed based on the at least one time series of second CI (e.g. 111A, 111B). An intersection-corridor graph comprising a set of vertices and/or a set of edges may be determined based on the map and/or the at least one constraints of the map. It may be determined that the path may correspond to a series of vertices and/or edges of the intersection-corridor (IC) graph and/or also to at least one section of the second trajectory. A ground-truth length of the path may be computed based on the intersection-corridor graph and/or the map. A second length of the path may be computed based on the at least one section of the second estimated trajectory and/or the vertices and/or edges of the IC graph corresponding to the path. The scaling factor may be computed based on the ground-truth length and/or the second length.

The second object may move along the path multiple times. The second length of the path may be computed based on a weighted average of lengths of the path associated with the multiple times the second object may move along the path. The estimated trajectory, the map and/or the at least one constraint of the map may be scaled using the scaling factor.

The set of vertices may represent: corner, turning point, control point, end point of arc, end point of straight line, check point, gate, exit, door, crossroad, crossing point of two paths, intersection, and/or another point feature. The set of edges may represent: corridor, road, alley, lane, path, line, straight line, arc, curve, driveway, gap, valley, walkway, pavement, track, duct, pipe, ladder, staircase, tunnel, river, waterway, aisle, area partially bounded by two walls, area bounded by two boundaries, area bounded by two interfaces, and area with axis of symmetry.

An edge of the intersection-corridor (IC) graph may be undirected, directed, uni-directed, and/or bi-directed. Each vertex of the intersection-corridor graph may be associated with a vertex cost. Each edge may be associated with at least one edge cost based on the directionality of the edge.

The set of instructions (e.g. 104A, 104B) may further: segment and classify the estimated trajectory of the object (e.g. 112) into at least one segment each associated with a timestamp, a segment identity (ID), and/or at least one segmentation type. The estimated trajectory of the object (e.g. 112) may comprise a time series of trajectory points each associated with a timestamp and an estimated location. Each of the trajectory points may be determined based on: another trajectory point, a moving distance (e.g. 122), a moving direction, the at least one TSCI (e.g. 300, 111A, 111B), and/or another quantity. The set of instructions (e.g. 104A, 104B) may: compute a delta-angle based on a difference between an estimated moving direction angle associated with a new trajectory point and another estimated moving direction angle associated with a past trajectory point. The current segment may comprise at least one trajectory point immediately before the new trajectory point. The current segment may comprise the past trajectory point. The new trajectory point may be associated with an estimated moving distance (e.g. 122) and an estimated moving direction angle. The set of instructions (e.g. 104A, 104B) may segment and classify the new trajectory point based on: the new trajectory point, the delta-angle, the current segment, and/or a past segment. The at least one segmentation type may comprise a STRAIGHT LINE type and/or an ARC type, etc. The set of instructions (e.g. 104A, 104B) may: add the current trajectory point to the current segment if the current segmentation type is the STRAIGHT LINE type and the delta-angle is within a margin around zero.

The set of instructions (e.g. 104A, 104B) may add the current trajectory point to the current segment, change the current segmentation type to the ARC type and reset a valley finder, provided that the current segmentation type is the STRAIGHT LINE type and the delta-angle is outside a margin around zero and the current segment crosses zero at least once. The set of instructions (e.g. 104A, 104B) may split the current segment into a front portion and a latter portion, use the latter portion of the split current segment to form a new segment, add the current trajectory point to the new segment, and reset a valley finder, provided that: the current segmentation type is the STRAIGHT LINE type, and the delta-angle is outside a margin around zero, and the current segment crosses zero at least once. The set of instructions (e.g. 104A, 104B) may start a new segment with segmentation type of STRAIGHT LINE type and add the current trajectory point to the new segment, provided that the current segmentation type is the ARC type and the delta-angle hits a soft zero. The delta-angle may hit the soft zero if the delta-angle is within a margin from zero. The set of instructions (e.g. 104A, 104B) may, if the current segmentation type is the ARC type and the delta-angle does not hit a soft zero, add the current trajectory point to the current segment, add the current trajectory point to a valley finder. If further a valley may be confirmed by the valley finder and/or absolute value of the delta-angle may be larger than a threshold, then the set of instructions (e.g. 104A, 104B) may split the current segment into a front portion and a latter portion, use the latter portion to form a new segment, and reset the valley finder.

If a current segment is of the STRAIGHT LINE type and a length of the current segment is short and a preceding segment immediately before the current segment is of the ARC type, the set of instructions (e.g. 104A, 104B) may temporarily combine the current segment and the preceding segment into a combined segment, apply arc-type-hit-correction recursively to the combined segment based on at least one of: the map and the constraint of the map, and separate the combined segment into a front portion and a latter portion. The front portion may be associated with the preceding segment and the latter portion may be associated with the current segment. If the current segment is of the ARC type, the set of instructions (e.g. 104A, 104B) may get an arc-hitting type, and apply arc-type-hit-correction recursively based on the arc-hitting type, and the map and the at least one constraint of the map. If a current segment is of the STRAIGHT LINE type and at least one of: a length of the current segment is not short and a preceding segment immediately before the current segment is not of the ARC type, the set of instructions (e.g. 104A, 104B) may apply straight-segment-correction to the current segment based on the map and the at least one constraint of the map.

The straight-segment-correction to the current segment may comprise: computing a delta-angle between a direction of a boundary of the map and/or the at least one constraint of the map and a moving direction associated with the current segment. If the delta-angle is less than a threshold, the correction may apply parallel-cut-in-correction. If not, the correction may apply orthogonal-hit-correction.

The parallel-cut-in-correction may comprise correcting the moving direction associated with the current segment based on the delta-angle such that the moving direction is parallel to the direction of the boundary and/or approaching to the direction of the boundary. The orthogonal-hit-correction may comprise shortening a moving distance associated with the current segment by a scaling factor less than 1 without changing the moving direction associated with the current segment. The scaling factor may be 0.9, 0.8, 0.7, 0.6, 0.5, 0.4, 0.3, 0.2, 0.1, 0.0, and/or another number. The arc-hitting type may comprise: an exit-hit type, an entry-hit type, and/or a tangent type. The exit-hit type may be associated with an exit. The exit-hit type may be associated with a straight portion and/or an arc portion. The arc-type-hit correction for the exit-hit type may comprise: adjusting the length of the straight portion towards the exit, and/or shifting the arc portion towards the exit. The length of the straight portion may be decreased if the segment overshoots the exit. The length of the straight portion may be increased if the segment undershoots the exit. The entry-hit type may be associated with a current boundary associated with the current segment of the estimated trajectory and an adjacent boundary adjacent to the current segment on the map at an angle to the current boundary. The arc-type-hit correction for the entry-hit type may comprise: adjusting the length of a straight portion of the current segment towards the adjacent boundary so that the current segment of the estimated trajectory is directed to a path next to the adjacent boundary, provided that the straight portion of the current segment is consistent with the current boundary. The length of the straight portion may be decreased if the segment overshoots the path. The length of the straight portion may be increased if the segment undershoots the path. The tangent-hit type may be associated with a front boundary being hit by the current segment of the estimated trajectory. The arc-type-hit correction for the tangent-hit type may comprise shortening a straight portion of the current segment to avoid hitting the front boundary.

The set of instructions (e.g. 104A, 104B) may apply the corrective adjustment to the estimated trajectory of the object (e.g. 112) when the estimated trajectory on the map hits a boundary associated with the map and the at least one constraint of the map. The set of instructions (e.g. 104A, 104B) may adjust the estimated trajectory such that the adjusted estimated trajectory stay within a distance of the boundary without hitting the boundary. The set of instructions (e.g. 104A, 104B) may adjust a current segment of the estimated trajectory such that the adjusted current segment stay within a distance of the boundary without hitting the boundary.

An opening associated with the map and the at least one constraint of the map may be near a position (e.g. 114, 115B, 115A, 117, 119, 406, 408, 410, 414) when the estimated trajectory may hit the boundary. The set of instructions (e.g. 104A, 104B) may adjust the estimated trajectory such that the adjusted estimated trajectory steers towards the opening without hitting the boundary.

Another boundary associated with the map and/or the at least one constraint of the map may be associated with an opening near a position (e.g. 114, 115B, 115A, 117, 119, 406, 408, 410, 414) when the estimated trajectory hits the boundary. The set of instructions (e.g. 104A, 104B) may adjust the estimated trajectory such that the adjusted estimated trajectory may steer towards the another boundary through the opening without hitting the boundary.

A corner associated with the map and the at least one constraint of the map may be near a position (e.g. 114, 115B, 115A, 117, 119, 406, 408, 410, 414) when the estimated trajectory hits the boundary. The set of instructions (e.g. 104A, 104B) may adjust the estimated trajectory such that the adjusted estimated trajectory may steer around the corner without hitting the boundary.

The corrective adjustment may comprise: changing a length of a current segment of the estimated trajectory, changing a direction of the current segment, changing a local curvature of the current segment, transforming a shape of the current segment, and/or changing a timestamp of the current segment.

A trajectory point of the estimated trajectory may be associated with a statistical region. The trajectory point may be adjusted such that it may stay within the statistical region. Trajectory points of a current segment of the estimated trajectory may each be associated with a respective statistical region. The current segment may become an adjusted current segment after the corrective adjustment. Trajectory points of the adjusted current segment may each be within the statistical region of respective trajectory points of the current segment.

The set of instructions (e.g. 104A, 104B) may adjust a current segment of the estimated trajectory to become an adjusted current segment of the adjusted estimated trajectory. Trajectory points of the current segment of the estimated trajectory may be associated with a set of permissible regions. The set of instructions (e.g. 104A, 104B) may adjust the set of permissible regions to become a set of adjusted permissible regions. The current segment may be adjusted such that trajectory points of the adjusted current segment may each be within an adjusted permissible region. The set of instructions (e.g. 104A, 104B) may adjust a current segment of the estimated trajectory to become an adjusted current segment of the adjusted estimated trajectory. A future segment of the estimated trajectory connected to the current segment of the estimated trajectory may be adjusted to become an adjusted future segment of the adjust estimated trajectory connected to the adjusted current segment of the adjusted estimated trajectory. The set of instructions (e.g. 104A, 104B) may determine an arc-hitting type associated with a current segment of the estimated trajectory hitting a boundary associated with the map and the at least one constraint of the map. The set of instructions (e.g. 104A, 104B) may adjust the current segment to become an adjusted current segment of the adjusted estimated trajectory based on the arc-hitting type, wherein the current segment may be classified as an ARC type. The set of instructions (e.g. 104A, 104B) may determine the arc-hitting type based on a current quantity and a past quantity. The current quantity may be determined based on a current angle between a current normal direction of the boundary and a current direction of the estimated trajectory associated with the current segment. The past quantity may be determined based on a past angle between a past normal direction of the boundary and a past direction of the estimated trajectory.

The arc-hitting type may be a TANGENT HIT type if the current quantity is larger than the past quantity. The arc-hitting type may be a FREE SPACE EXIT HIT type if the current quantity is not larger than the past quantity, and an end point of the current segment where the current segment hits the boundary is not associated with a corridor. The arc-hitting type may be an EXIT HIT type if the current quantity is not larger than the past quantity, the end point of the current segment where the current segment hits the boundary is associated with a first corridor, and the first corridor is the same as a second corridor associated with a beginning point of the current segment. The arc-hitting type may be a DOOR ENTRY HIT type if: the current quantity is not larger than the past quantity, the end point of the current segment where the current segment hits the boundary is associated with the first corridor, the first corridor is not the same as the second corridor associated with the beginning point of the current segment, and the end point of the current segment is near a door associated with the second corridor. The arc-hitting type may be a NON-DOOR ENTRY HIT type if the current quantity is not larger than the past quantity, the end point of the current segment where the current segment hits the boundary is associated with the first corridor, the first corridor is not the same as the second corridor associated with the beginning point of the current segment, and the end point of the current segment is near a non-door associated with the second corridor.

The set of instructions (e.g. 104A, 104B) may determine: a target checkpoint and/or a target direction, for the current segment based on the arc-hitting type. A length of a past segment of the estimated trajectory may be adjusted based on: the target checkpoint, the target direction and/or the arc-hitting type. The past segment may be classified as a STRAIGHT LINE type. A length of a past segment of the estimated trajectory may be adjusted so that the current segment may steer towards: the target checkpoint and/or the target direction.

If the arc-hitting type is TANGENT HIT, the length of the past segment may be shortened by: a fixed amount, an adaptive amount, a percentage amount, and/or another amount, so that the current segment may not hit the boundary. If the arc-hitting type is FREE SPACE EXIT HIT type, the target direction may be determined to be toward a point beyond the boundary not associated with any corridor. The length of the past segment may be adjusted by: a fixed amount, an adaptive amount, a percentage amount, and/or another amount, so that the end of the current segment may steer in general in the target direction. If the arc-hitting type is FREE SPACE EXIT HIT type, the target checkpoint may be determined to be a point beyond the boundary not associated with any corridor. The length of the past segment may be adjusted by: a fixed amount, an adaptive amount, a percentage amount, and/or another amount, so that the end of the current segment may steer in general towards the target checkpoint. If the arc-hitting type is EXIT HIT type, the target direction may be determined to be toward a second corridor different from a first corridor associated with the boundary. The length of the past segment may be adjusted by: a fixed amount, an adaptive amount, a percentage amount, and/or another amount, so that the end of the current segment may steer in general in the target direction. If the arc-hitting type is EXIT HIT type, the target checkpoint may be determined as a point in a second corridor different from a first corridor associated with the boundary. The length of the past segment may be adjusted by at least one of: a fixed amount, an adaptive amount, a percentage amount, and another amount, so that the end of the current segment steers in general towards the target checkpoint. If the arc-hitting type is DOOR ENTRY HIT type, the target direction may be determined to be toward a door associated with an opening of the boundary. The length of the past segment may be adjusted by: a fixed amount, an adaptive amount, a percentage amount, and/or another amount, so that the end of the current segment may steer in general in the target direction. If the arc-hitting type is DOOR ENTRY HIT type, the target checkpoint may be determined as a point associated with a door associated with an opening of the boundary. The length of the past segment may be adjusted by: a fixed amount, an adaptive amount, a percentage amount, and/or another amount, so that the end of the current segment may steer in general towards the target checkpoint. If the arc-hitting type is NON-DOOR ENTRY HIT type, the target direction may be determined to be toward the non-door associated with the second corridor. The length of the past segment may be adjusted by: a fixed amount, an adaptive amount, a percentage amount, and/or another amount, so that the end of the current segment may steer in general in the target direction. If the arc-hitting type is NON-DOOR ENTRY HIT type, the target checkpoint may be determined as a point associated with a non-door associated with the second corridor. The length of the past segment may be adjusted by: a fixed amount, an adaptive amount, a percentage amount, and/or another amount, so that the end of the current segment may steer in general towards the target checkpoint.

An (2D, 3D and/or higher dimension) array of map points associated with the map may be determined. At least one corridor associated with the map may be determined. At least one map point associated with each corridor may be determined. Map points associated with the estimated trajectory may also be determined. At least one map point may be determined to be associated with each corridor based on at least one boundary rectangle associated with the corridor. At least one map point associated with a corridor may be tagged by a user.

A virtual gate associated with: a map, a corridor, a door, and/or a non-door may be determined. During a correction, an estimated trajectory near the virtual gate may be adjusted to go through the virtual gate. A checkpoint associated with: a map, corridor, door, and/or non-door may be determined. During correction, an estimated trajectory near the virtual gate may be adjusted to steer towards the checkpoint. A virtual gate may be determined to be associated with: the map, a corridor, junction, T-junction, cross road, cross-junction, angled junction, corner, opening, path, lift, elevator, entrance, exit, ramp, gate, pavement, walkway, checkpoint, heavy-traffic area, window, door, non-door, waiting area, seat, chair, sofa, garage, parking space, transition area, common area, public area, kitchen, toilet, room, house, building, stairs, compartment, office, and/or home. A segment of the estimated trajectory near the virtual gate may be adjusted so that the adjusted segment may go through the virtual gate.

In one example, there may be at least one threshold to be determined. A quantity (e.g. similarity score, signal, function, function of the signal, component of CI, function of CI, component of channel state information (CSI), function of CSI, component of power information (PI), function of PI, output of operation, time quantity, frequency quantity, spatial-temporal quantity, etc. may be compared with the threshold. The at least one threshold may be determined adaptively. Train data of the quantity may be obtained for at least one target case (e.g. target case of “door open”, target case of “door close”, target case of “door half-open”, etc.). The at least one threshold may be determined adaptively such that there would be at least one of: positive response for first percentage of first target case, positive response for second percentage of second target case, negative response for third percentage of third target case, and negative response for fourth percentage of fourth target case.

In one example, a first target case may be “someone walking (or something moving) inside a protected region” (e.g. the protected region may be a house, office, an apartment, and/or any area). A third target case may be “someone walking (or something moving) outside a protected region” (e.g. the someone may be walking outside the house, the office, the apartment, and/or the area). The threshold may be adaptively adjusted such that most (e.g. 99.99%) of the first target case is detected while most of (or a maximum amount of) the third target case is not detected.

A pair of device (namely, a first device and a second device) may perform a task jointly using CI obtained/extracted from a wireless signal transmitted between the pair of devices. Directional antenna, which radiates/receives greater power in specific directions for increased performance and reduced interference from unwanted sources, may be used in the pair of devices. The pair of device may comprise: a device, wireless transmitter (e.g. 108), wireless receiver (e.g. 109), Type1 heterogeneous wireless device, Type2 heterogeneous wireless device, and/or another device.

The first device may comprise at least one directional antenna (e.g. a phase array) which is steered (e.g. mechanically, electronically and/or digitally) to aim at a particular direction. The directional antenna and/or the particular direction may be adjusted/steered/changed over time, perhaps adaptively in response to at least one factor (e.g. external factor such as a movement of an object and/or the second device, possible location of the object and/or the second device, location/direction associated with map, characteristics/status (e.g. battery level, distance, relative direction) of the second device, direction with possibly less interference, and/or internal factor such as battery level, timed delay, etc.). The directional antenna and/or the particular direction may be adjusted/steered/changed over time, in a pre-programmed manner.

In an example, the directional antenna of the first device may be aimed at a particular area (e.g. a conference room, a bedroom, a living room, a dining area, an office, a walkway, a waiting area, an entrance/exit area, a high security area, etc.) in the venue. The directional antenna (and associated CI) may enable detection of an event happening in the particular area (but not outside the particular area, e.g. the conference room, the bedroom, the living room, the dining area, the office, the walkway, the waiting area, the entrance/exit area, the high security area, etc.) and/or in the direction of the particular area.

The event may include an object moving, an object undergoing certain motion sequence, periodic motion, transient motion, door opening/closing, window opening/closing, man falling down, machine undergoing motion sequence, robot doing motion sequence (e.g. robotic arm performing task in assembly line), mammal doing certain motion sequence, person walking/jogging/running, baby crying, old man leaving/entering facility, patient/doctor/nurse moving in medical facility, security personnel patrolling, person (e.g. carrying the second device) appearing at checkpoint (the particular area), delivery person making delivery, postman dropping mail items, janitor doing janitorial tasks, etc.

The pair of device (the first device and the second device) may perform a task jointly using the CI obtained/extracted from the wireless signal transmitted between the pair of devices. The power/power gain of an antenna of a wireless transmitter, a wireless receiver, a wireless device, a Type1 heterogeneous wireless device, a Type2 heterogeneous wireless device and/or another device may be controlled/adjusted such that the task is restricted to a particular area (e.g. conference room, bedroom, living room, dining area, office, walkway, waiting area, entrance/exit area, high security area, etc.) in the venue. The task may be restricted to the particular area but not outside the particular area.

In an example, training data for the task (e.g. motion detection) happening in the particular area (e.g. training data for "detection of motion in a conference room") may be used in conjunction with training data for the task happening outside the particular area (e.g. training data for "detection of motion outside the conference room"). The two types of training data may be used jointly to determine at least one threshold such that the task (e.g. motion detection) is restricted to the particular area but not outside the particular area.

The features described above involving data processing can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; optical disks; solid state drives; and the like. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the disclosure have been described. Nevertheless, it will be understood that various modifications can be made without departing from the spirit and scope of the disclosure. For example, the wireless transmitter, the wireless receiver, the antenna, the directional antenna, the wireless transmission, the multipath channel, the wireless signal, the object, the object, the processor, the memory, the set of instructions, the CI, the channel state information (CSI), the power information (PI), the format/features/components/contexts of CI/CSI/PI, the compression/representation/storage/transmission/encryption/processing/preprocessing/post-processing of CI/CSI/PI, the time series format/order/sequencing, the extraction of CI from the wireless signal, the spatial-temporal information, the past information, the initial information, the time quantities, the spatial quantities, the spatial-temporal quantities, the estimated direction, the similarity score, the object, the distance, the movement of the object, the characteristics points, the local device, and/or the computational workload sharing can be different from those described above.

An exemplary flow chart of antenna matching based speed estimation is shown in FIG. 6. In step 1302, the detailed formulation of the CFR concatenation for the leading antennas is $H_{lead}(t_1)=[H_2(t_1), H_3(t_1), H_2(t_1+\Delta t), H_3(t_1+\Delta t), \ldots, H_2(t_1+(N-1)\Delta t), H_3(t_1+(N-1)\Delta t)]$; In step 1304, the detailed formulation of the CFR concatenation for the following antennas is $H_{follow}(t_2)=[H_1(t_2), H_2(t_2), H_1(t_2+\Delta t), H_2(t_2\Delta t), \ldots, H_1(t_2+(N-1)\Delta t), H_2(t_2-(N-1)\Delta t)]$; In step 1306, for each time slot $t_1$, the TRRS $\gamma(t_1, t_2)$ between the two CFR fingerprint $H_{lead}(t_1)$ and $H_{follow}(t_2)$ is computed for different $t_2$'s nearby $t_1$; In step 1308, it can determined the $t_2$ that gives the maximum value of $\gamma(t_1, t_2)$ and then the delay $\tau$ between the group of leading antennas and the group of following antennas is thus $\tau=t_2-t_1$; In step 1310, the speed estimation is thus v=d/T, where d the distance between any two adjacent uniformly separated antennas. Accordingly, other embodiments are within the scope of the following claims.

Timestamps of CI of a portion of a TSCI may be irregular and may be corrected so that corrected timestamps of time-corrected CI may be uniformly spaced in time. In the case of multiple Type1 devices and/or multiple Type2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time. The at least one TSCI may correspond to various antenna pairs between the Type1 device and the Type2 device. The Type1 device may have at least one antenna. The Type2 device may also have at least one antenna. Each of the at least one TSCI may be associated with one of the at least one antenna of the Type1 device and one of the at least one antenna of the Type2 device. The averaging over antenna links may be performed. It may be averaging over the at least one TSCI. The averaging may optionally be performed on a subset of the at least one TSCI corresponding to a subset of the antenna pairs.

In the case of at least one Type1 devices interacting with at least one Type2 devices, the processing, preprocessing, post-processing, and/or other processing may be different for different devices. The processing/preprocessing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

Particle Filter Based Tracking

Another embodiment is a method/apparatus/device/system/software of a wireless monitoring system comprising (1) transmitting a series of probe signals by an antenna of a first wireless device using a processor, a memory and a set of instructions to at least one heterogeneous target wireless receiver through a wireless multipath channel in a venue, (2) obtaining asynchronously by each of the at least one heterogeneous target wireless receiver at least one TSCI (TSCI) from the series of probe signals, the CI being of the wireless multipath channel between the heterogeneous target wireless receiver and the first wireless device, (3) monitoring iteratively asynchronously a respective motion associated with a respective object relative to a respective map based on respective at least one TSCI obtained from the series of probe signals by respective heterogeneous target wireless receiver, (4) determining iteratively a respective incremental distance (D) travelled by the respective object in a respective incremental time period (T) based on the respective at least one TSCI, and (5) computing iteratively a respective next location of the respective object at a respective next time (T1) in the respective map based on at least one of: a respective current location of the respective object at a respective current time (T2), the respective incremental distance (D), and/or a respective direction (theta) of the respective motion during the respective incremental time period.

A particular motion of a particular object may be being monitored based on TSCI obtained by more than one heterogeneous target wireless receivers. For example, TSCI obtained by all the heterogeneous target wireless receivers may be used to monitoring a common motion of a common object. The monitoring may be individual monitoring and/or joint monitoring. The TSCI obtained by all the heterogeneous target wireless receiver may be asynchronous and/or synchronous.

More than one respective motions associated with more than one respective objects may be monitored relative to a particular (common) map. For example, motions of different objects may be monitored with respect to a common map. Alternatively, more than one respective motions associated with more than one respective objects may be monitored relative to more than one maps that share at least one common location.

The incremental time period (T) may be time difference between two probe signals of the series of probe signals. For example, the increment time period may be time difference between two consecutive probe signals (e.g. one with time index=10 and the other with time index=11) in the series of probe signals. It may also be time difference between a probe signal (e.g. time index=10) and another probe signal (e.g. time index=13, or time index=20, or time index=1000) in the series of probe signals.

The respective incremental time period may be the time difference between the respective next time and the respective current time (T=T1−T2). The current time associated with different objects may be different. They may be asynchronous. The next time associated with different objects may be different. They may be asynchronous. The respective incremental time period may be different for different objects. The respective incremental time period may be time varying. The respective incremental time period may have a duration of 1 unit of time, 1 year, 1 quarter of a year, 1 month, 1 week, 1 day, 1 hour, 1 minute, 1 second, 0.1 second, 0.01 second, 0.001 second, 0.0001 second, 0.00001 second, 0.000001 second, and/or a smaller time unit. There may be 0, 1, 2, or more probe signals of the series of probe signals in the incremental time period. Different incremental time periods of an object may have different duration.

The respective direction (theta) of the respective motion during the respective incremental time period may be a respective function of the respective direction of the respective motion at the respective current time (T2), the respective direction of the respective motion at the respective next time (T1) and/or the respective direction of the respective motion at the another time. For example, the respective direction may be an average and/or a weighted average of instantaneous direction at T1 and instantaneous direction at T2. The respective direction may also be an average direction of the respective incremental time period. It may also be a weighted averaged of sampled directions in the respective incremental time period.

The respective next location of the respective object at a respective next time in the respective map may be computed using particle filter. A respective initial number of respective initial candidate locations of the respective object may be initialized at a respective initial time (T0). For example the respective initial number may be 1000, 100, or 10. Each initial candidate location may be sampled randomly according to some probability density function. The probability density function (pdf) may be a symmetric distribution such as Gaussian distribution, Laplacian distribution, uniform distribution, another pdf, the another pdf restricted to a certain region, and/or the another pdf subjected to constraints associated with the respective multi-dimensional map. An example of the constraints may be that unreachable locations of the multi-dimensional map will have zero probability. A partially reachable location with an associated array element a may have the pdf reduced at the location based on the array element a. For example, the pdf may be Gaussian. At unreachable locations, the pdf may be forced to be zero. At a partially reachable location with associated array element a–0.3, a transformation may be applied to the Gaussian pdf value at that location. Suppose the Gaussian pdf value is b. The transformed pdf value may be a*b, or (aˆ2)*b, or (aˆc)*b, for some real value c, and/or f(a,b), for some function.

A first dynamic number (N1) of respective first candidate locations of the respective object may be computed iteratively at the next time based on a second dynamic number (N2) of respective second candidate locations of the respective object at the current time. The respective next location at the next time may be computed based on the N1 respective first candidate locations. The respective current location at the respective current time may be computed based on the N1 respective first candidate locations. The N2 respective second candidate locations may be used to compute the respective current location at the current time. As first candidate locations may be defined, added and/or created one at a time, the instantaneous N1 may change over time (i.e. change dynamically). The final N1 may or may not be the same as the final N2. In other words, the number of candidate locations may change over time (i.e. change dynamically).

The first candidate locations may be related to the second candidate locations. Some first candidate locations may be the next locations of some corresponding second candidate locations. The next location may be the end point of moving from the second candidate location in the respective direction (theta) by the respective incremental distance ( D). Some first candidate locations may be new locations pared with the second candidate locations) generated based on some pdf. The pdf may be related to the second candidate locations.

The respective next location of the respective object at the respective next time may be computed based on at least one of: the first dynamic number of respective first candidate locations at the respective next time, and/or the second dynamic number of respective second candidate locations at the respective current time. The respective object may move during the respective incremental time period in a respective region represented by the respective multi-dimensional map. The respective multi-dimensional map may be represented as a respective multi-dimensional array A, such that reachability of each location of the respective region may be represented by corresponding array element, a, which may have/may be a logical value (or a probability value) between 0 and 1. For example, the array element a may take on value between 0 to 10, which is logically equivalent to a logical value between 0 and 1. The array element a associated with a location may define a probability of reaching the location. The location may be unreachable and forbidden if the array element a=0 (zero probability, which may imply restricted location or forbidden location). The location may be fully reachable if a=1(unity probability which may imply an unrestricted location that can be accessed freely at any time). The location may be partially reachable if 0<a<1. A larger array element a may imply the location may be more reachable or accessible.

Each of the respective next location, the respective current location, the N1 respective first candidate locations, and/or the N2 respective second candidate locations, may be a point in the respective region and may be represented as a corresponding array element a, with a>0. Each of the respective next location, the respective current location, the N1 respective first candidate locations, and/or the N2 respective second candidate locations, may be a fully reachable and/or partially reachable, but may not be forbidden.

The respective direction of the respective motion of the respective object at any respective location may be locally represented as one of a number of allowable directions. For example, the map may be a 2-dimensional map which may be represented as a 2-dimensional array. The allowable directions may comprise the 4-connected directions: left, right, top and bottom. The allowable directions may comprise other directions. For example, the allowable directions may comprise the 8-connected directions: left, right, top, bottom, top-right, top-left, bottom-right and bottom-left.

In another example, the map may be a 3-dimensional map represented as a 3-dimensional array. The allowable local directions may comprise some directions parallel to one of the axis, such as left, right, top, bottom, up, and down. The allowable directions may comprise other directions. For example, the allowable directions may comprise some 45 degree directions, such as top-right, top-left, bottom-right, bottom-left, top-up, top-down, bottom-up, bottom-down, left-up, left-down, right-up, right-down, top-right-up, top-right-down, top-left-up, top-left-down, bottom-left-up, bottom-left-down, bottom-right-up, and/or bottom-right-down.

The map may be time varying and thus 4-dimensional. The allowable local direction may be change with time (e.g. time adaptive), and thus 4-dimensional also. The map may also be higher-dimensional, and the allowable local directions may be of a dimensional less than or equal to the dimension of the map. For example, the map may be 3-dimensional, but the allowable directions may be defined in a 2-D plane (e.g. horizontal plane).

A total of N1 (the first dynamic number) weights may be computed. Each weight may be associated with a respective first candidate location. The weight may be a function of at least one of: the respective current location, the respective first candidate location, a corresponding respective second candidate location associated with the respective first candidate location, the respective direction of the respective motion, and/or a distance between the respective first candidate location and the first unreachable array element a in the respective direction.

The respective next location of the respective object may be computed based on the first dynamic number (N1) of respective first candidate locations, and the associated first dynamic number (N1) of weights. Each weight may be a monotonic non-decreasing function of the distance between the respective first candidate location and the first unreachable array element a in the respective direction. In general, the weight may be larger for larger distance. Each weight may be a bounded function of the distance. The weights may be normalized. The respective next location of the respective object may be computed as a weighted average of the first dynamic number of respective first candidate locations, based on the weights. The respective next location of the respective object may be computed as one of the respective first candidate location. Weighted cost of each respective first candidate location with respect to the rest of the first dynamic number of respective first candidate location may be computed. The weighted cost may be a weighted sum of pairwise distance between the respective first candidate location and each of the rest of the respective first candidate locations. The set of weights associated with each first candidate location may be different. Each set of weights may be normalized. The respective next location of the respective object may be chosen as the respective first candidate location with minimum weighted cost.

The weight for the pairwise distance between the respective first candidate location and another first candidate location may be a function of the weight (W1) associated with the first candidate location and/or the weight (W2) associated with the another first candidate location. The function may be W1, W2, W1*W2, W1+W2, a*W1+b*W2, (W1)^a*(W2)^b, a hybrid of these, and/or another function of W1 and W2.

The pairwise distance may be Euclidean distance (L2 distance), absolute distance (L1 distance), a robust distance, and/or another distance. The robust distance may be basically one distance function (e.g. Euclidean distance) for small magnitude, and another distance function will a slower rate of increase (e.g. linear, similar to L1 distance) for large magnitude. The distance may be a monotonic increasing function of Euclidean distance (L2 distance), absolute distance (L1 distance), and/or another distance. The multi-dimensional map may be 2-dimensional. The array A may be a 2-dimensional array. Each array element a may have two indices. The multi-dimensional map may also be 3-dimensional. The array A may be a 3-dimensional array. Each array element a may have 3 indices.

A predicted value may be computed for each of the second candidate location of the respective object based on at least one of: the second candidate location, the respective incremental distance ( D), and/or the respective incremental time period ( T). If the predicted value of the second candidate location is fully reachable (with associated array element a=1), a first candidate location of the respective object may be created based on the predicted value of the second candidate location. If the predicted value of the second candidate location is forbidden with associated array element a=0, the second candidate location may be labeled as "rejected" without creating any first candidate location. If the predicted value of the second candidate location is partially reachable with associated array element $0<a<1$, a random number between 0 and 1 may be generated. A first candidate location of the respective object may be created based on the predicted value of the second candidate location if the random number is less than a.

If the amount of first candidate locations is smaller than a threshold, a new first candidate location of the respective object may be created probabilistically, taking on the predicted values of second candidate locations that are not rejected, with a probability distribution based on at least one of: weights associated with the predicted values, weights associated with the second candidate locations, array elements of the multi-dimensional array A associated with the predicted values, array elements of the multi-dimensional array A associated with the second candidate locations, and/or another probability distribution, If the amount of first candidate locations is smaller than a threshold, a new first candidate location of the respective object may be created probabilistically taking on the second candidate locations that are not rejected, with a probability based on weights associated with the predicted values of the second candidate locations that are not rejected. If the amount of first candidate locations is smaller than a threshold, a tentative next location may be computed based on the amount of first candidate locations and/or a new first candidate location of the respective object may be created probabilistically in a neighborhood of the tentative next location based on a probability distribution. If the amount of first candidate locations is smaller than a threshold, a new first candidate location of the respective object may be created probabilistically as a predictor of a location sampled in a neighborhood of the respective current location based on a probability distribution.

The neighborhood may comprise at least one of the second candidate locations that are not rejected. The neighborhood may comprise most of or all of the second candidate locations that are not rejected. The probability distribution may be a weighted sum of a set of pdf centered at various second candidate locations that are not rejected. Two, or some, or all of the set of pdf may be a common pdf. The common probability may be a 1 dimensional pdf such as Gaussian, Laplacian, or uniform. The another probably may be a 2-dimensional pdf It may be product of 1-dimensional pdf. It may be a circularly symmetric pdf. It may be product of Gaussian, bi-variate Gaussian, circularly symmetric Gaussian, etc. It may be 3-dimensional, or higher dimensional. The weight of each pdf associated with a second candidate location in the weighted sum may be a function of the array element associated with the second candidate location. A dynamic number of respective candidate locations may be maintained at any time. The dynamic number of respective candidate locations may be changed by at least one of: initializing at least one respective candidate location, updating at least one respective candidate location, adding at least one respective candidate location, pausing at least one respective candidate location, resuming at least one paused respective candidate location, stopping at least one respective candidate location, reinitializing at least one stopped respective candidate location, and/or removing at least one respective candidate location.

The respective next location of the respective object at the respective next time may be computed based on at least one of: the dynamic number of respective candidate locations at the respective next time, and/or the dynamic number of respective candidate locations at another time. The respective next location of the respective object at the respective next time may be computed based on some or all of: the dynamic number of respective candidate locations at the respective next time, the dynamic number of respective candidate locations at one or more past time, the dynamic number of respective candidate locations at one or more future time. The respective next location of the respective object at the respective next time may be computed as a weighted average of the candidate locations. The weight associated with each respective candidate location may be computed based on the respective candidate location and a distance between the respective candidate location and the first unreachable array element a in the respective direction. The respective next location of the respective object may be computed based on the first dynamic number of respective first candidate locations and associated weights. For example, the respective next location of the respective object may be computed as a weighted average of the dynamic number of respective candidate locations.

The total number of respective candidate locations may be maintained to be bounded by an upper limit, at some time, at the respective current time, at the respective next time, or at all respective time. The total number of respective candidate locations may be maintained to be bounded by a lower limit, at some time, at the respective current time, at the respective next time, or at all respective time. The upper lime and/or the lower limit may be time varying. The upper lime and/or the lower limit may be adjusted according to at least one of: a user input, a system condition and/or another condition. When the total number of respective candidate locations goes below the lower bound, some candidate locations may be added. The average number of candidate locations may be controlled around a steady state number.

In another example, the respective next location of the respective object may be computed as one of the candidate locations. The respective next location of the respective object may be computed as the particular candidate location with minimum normalized weighted distance from other candidate locations.

The normalized weighted distance may be weighted sum of distance between the particular candidate location and each of the rest of candidate locations. The weight for the distance between the particular candidate location and another candidate location may be a function of the weight (W1)associated with the particular candidate location and/or the weight (W2) associated with the another candidate location. It may be W1, W2, W1*W2, W1+W2, a*W1+b*W2, (W1)^a*(W2)^b, a hybrid of these, and/or another function of W1 and W2. The weights may be normalized. They may be normalized such that they sum to unity. The weights W2 may/may not be normalized for each candidate location. The W1 may/may not be normalized also.

The distance may be Euclidean distance (L2 distance), absolute distance (L1 distance), robust distance, and/or another distance. The robust distance may be basically one distance function (e.g. Euclidean distance) for small magnitude, and another distance function (e.g. linear, similar to L1 distance) for large magnitude. The distance may be a monotonic increasing function of Euclidean distance (L2 distance), absolute distance (L1 distance), and/or another distance.

Map Engine

At least part of the venue may be scanned using at least one scanning device. At least one scanned multi-dimensional images may be obtained. The at least one scanning device may be heterogeneous, using different scanning modalities, with heterogeneous resolutions/characteristics. A map (e.g. street map, Google map, hand drawn map, indoor layout map, construction blueprint/layout/map, fireman's map, maintenance map, sewage map, piping map, ventilation map, navigation map, etc.) may be obtained and scanned/captured. At least one scanned/captured multi-dimensional images of the venue associated with the multi-dimensional map may be obtained. The multi-dimensional array A may be generated based on the at least one scanned multi-dimensional image of the respective multi-dimensional map. The scanned image may be 1-dimensional, 2-dimensional, 3-dimensional, 4-dimensional or higher-dimensional.

The scanned image may be captured/scanned/sampled using a camera, 2D scanner, photo/picture scanner, 3D scanner, LIDAR (light detection and ranging), depth sensor, a sensor/scanner using infra-red, ultra-sound, UWB, sonar, radar, laser, etc. Image preprocessing may be applied, including denoising, restoration, enhancement, correction, color correction, geometric correction, transformation, rotation, scaling, resampling, feature extraction, etc. Sensor fusion may be applied. Signal conditioning, signal processing, training, classification, recognition, verification, clustering, computer vision, machine learning, coding, compression/decompression, error correction, encryption/decryption, scrambling, descrambling, transmission, storage may be applied.

The scanned multi-dimensional image may be subdivided into a multi-dimensional array of multi-dimensional patches. The shape of the patches may be regular or irregular. The shape of some patches may be circular, elliptical, rectangular, symmetric, asymmetric, elongated, star-shaped with local concave and convex curves/surfaces/manifolds, etc. The patch may be hallow. Morphological operation associated with the patches (e.g. patch shapes, boundary width, location, etc.) may be applied.

The multi-dimensional patches may be overlapping, or non-overlapping. Each multi-dimensional patch may be associated with an array element a of the multi-dimensional array A. Each array element a may thus have multi-dimensional indices. At least one feature of each multi-dimensional patch may be extracted. The array element a may be computed based on the at least one feature. One of the at least one feature of the multi-dimensional patch may be a feature, a histogram, a low-pass feature of the patch, a rotation invariant feature, a scale-invariant feature, and another feature.

A second series of probe signals may be transmitted by an antenna of a second wireless device at a known location in the venue using a processor, a memory and a set of instructions of the second wireless device. At least one second. TSCI (TSCI) may be obtained asynchronously by each of the at least one heterogeneous target wireless receiver from the second series of probe signals, the CI being of the wireless multipath channel between the heterogeneous target wireless receiver and the second wireless device.

The respective initial number of respective initial candidate locations of the respective object at the respective initial time may be initialized based on the at least one second TSCI. The initial candidate locations may be near the known location of the second wireless device. The initial candidate locations may be sampled probabilistically in a neighborhood of the known location of the second wireless device based on a probability density function (pdf). The neighborhood may have regular or irregular shape. The shape of the neighborhood may be locally concave, locally convex, circular, rectangular, star-shaped, elliptical, elongated, symmetric, symmetric, and/or hallow. The pdf may be a uniform distribution, Gaussian distribution, Laplacian distribution, delta function (indicator pdf), or another distribution restricted to the neighborhood. A center of the pdf may be near/at the known location of the second wireless device A closest approach of the respective object to the second wireless device may be determined based on the second TSCI. The respective initial time may be determined based on the time associated with the closest approach. The center of the pdf may be determined based on the closest approach. A series of features of the second TSCI may be computed. The closest approach may be determined as the feature being (achieving) local maximum (or minimum). The respective initial time may be determined as the time when the feature is locally maximum. The pdf and the center of the pdf may be determined based on the magnitude of the feature when it is maximum. An initial speed of the respective object at the respective initial time may be estimated based on at least one of: the second TSCI, and the series of features of the second TSCI. A length of estimated trace of the respective object at the respective initial time may be estimated based on at least one of: the second TSCI, and the series of features of the second TSCI:. The location of the respective object may be displayed on a GUI, with the location of the respective object overlay on the map. When the locations of the respective object over a short sliding time period are displayed simultaneously in real time, an estimated trace of the respective object may be displayed. The estimated trace may be moved and updated in real time.

An initial direction of the respective object at the respective initial time may be estimated based on at least one of: the second TSCI, the series of features of the second TSCI, the known location, the venue and an installation setup information of the second wireless device. Each of the second series of probe signals may comprise at least one of: an identity of the second wireless device, the known location of the second wireless device, and/or an orientation of the second wireless device. The identity of the second wireless device, the known location of the second wireless device, and/or the orientation of the second wireless device may be obtained/stored/transmitted/received/compressed/encrypted/signaled/.

Tracker Bot

The respective direction (theta) may be captured by a respective direction device with a respective facing direction. For example, the direction device may be a gyroscope (gyro) of a smart phone, which has a natural forward facing direction. Sometimes, the user may hold the smart phone upright and walk forward, with the direction (theta) same as the facing direction. The user may also hold the smart phone horizontally and walk forward, with the direction (theta) very different from the facing direction. The gyro and other sensors may have different characteristics when the motion direction differs from the facing direction. Titus correction may be needed. The respective facing direction of the respective direction device may be determined. Correction may be applied (e.g. to gyro output, accelerometer output, etc.) based on at least one of: the respective direction and the facing direction, when the respective facing direction is determined to be different from the respective direction.

Improved Straight-hit Map Correction

In one example, there may be only one candidate location at all time. There may be only one first candidate location for the respective next time with N1=1, and only one second candidate location for the respective current time with N2=1. Each candidate location may be a predicted value computed based on at least one previous candidate location. The first candidate location may be a predicted value computed based on the second candidate location.

A segment may be formed based on at least one of: the first candidate location, the second candidate location, at least one past candidate location before the respective current time, and at least one future candidate location after the respective next time. The candidate locations in the segment may form a trace. Correction may be applied to the candidate locations in the segment. The respective next location of the respective object at the respective next time in the respective map may be computed based on the corrected first candidate location. If all the candidate locations in the segment are fully reachable, no correction may be needed/applied. If any candidate location in the segment is unreachable and/or forbidden, correction may be applied to the segment. The correction may be applied jointly to the candidate locations in the respective segment and candidate locations in another segment. The at least one respective future candidate location may be added to the respective segment.

One of the candidate locations of the segment may be unreachable. For example, the first candidate location may be unreachable (forbidden). The unreachable candidate location may be part of a locally flat forbidden structure with a normal direction at the unreachable candidate location with respect to the locally flat forbidden structure. For example, the forbidden location may be part of a forbidden wall/surface/line of considerable length/area. The forbidden location may be part of a long, straight forbidden structure. A normal direction may be defined at the forbidden location with respective to the forbidden wall or the long, straight/flat forbidden structure (e.g. a straight line, a plane, a hyperplane). The normal may be perpendicular to the locally flat forbidden structure.

In some situations, the problem of hitting the forbidden location may be due to an inaccurate estimate of length/distance (i.e. the respective incremental distance ( D) may be inaccurate). In this situation, the length may be corrected. A straight portion of the segment may be identified and the length of the straight portion/segment may be increased or decreased. In other situations, the problem of hitting the forbidden location may be due to an inaccurate direction (i.e. the respective direction (theta) may be inaccurate). In this situation, an angle of the trace may be correction. A straight portion of the segment may be identified and the angle of the straight portion may be adjusted to be locally parallel to the forbidden wall or the long, straight/flat forbidden structure. The angle may be adjusted by rotating the straight portion of the segment while remaining connected to the past traces. "Future" traces may be rotated with the straight portion so that the future traces remain connected to the straight portion.

A straight portion of the candidate directions of the respective segment may be determined by at least one of: waiting for a straight portion of the segment to be identified, adding future candidate location if necessary, and/or identifying the straight portion of the segment. The correction may be applied to the respective segment by at least one of: adjusting a length of the straight portion, and/or adjusting an angle of the straight portion. The rest of the segment may be adjusted so that the rest of the segment remain connected to the adjusted straight portion and remain in same relative position to the straight portion. The angle of the straight portion may be adjusted by rotating the straight portion of the segment. The length of the straight portion may be adjusted by at least one of: removing a candidate location from the straight portion, and/or adding a candidate location to the straight portion.

Let the angle between the trace of the segment and the normal of the forbidden wall be the "hitting angle". If the hitting angle is larger than a first threshold (e.g. 30°, 40°, 45°, 50°, 60°), it may be classified as a "parallel-cut-in" case. This may be due to inaccurate direction and the angle correction may be applied to the straight portion of the segment. A parallel-cut-in correction may be applied to the segment. If the hitting angle is smaller than a second threshold (e.g. 30°, 40°, 45°, 50°, 60°), it may be classified as "orthogonal hit" case. This may be due to inaccurate length/distance. The length correction may be applied to the straight portion of the segment. An orthogonal-cut-in correction may be applied to the segment. A straight portion of the segment may be identified. At least one future candidate locations may be added to the segment, if necessary, until the straight portion may be identified (i.e. waiting may happen).

The orthogonal-cut-in correction may comprise correcting the segment by: adjusting a length of the straight portion of the segment by at least one of: removing a candidate location from the straight portion, and/or adding a candidate location to the straight portion. The rest of the segment may be adjusted so that the rest of the segment remain connected to the adjusted straight portion, and in same relative position to the adjusted straight portion. The parallel-cut-in correction may comprise correcting the segment by adjusting an angle of the straight portion of the segment, and rotating the straight portion of the segment. The rest of the segment may be adjusted so that the rest of the segment remain connected to the adjusted straight portion and remain in same relative position to the adjusted straight portion. The parallel-cut-in correction may also comprise correcting the segment by moving the candidate locations of the segment in a direction perpendicular to a principle direction of the segment to ensure all the moved candidate locations are not unreachable. The principle direction may be the direction of motion if the whole segment is straight. The principle direction may be the direction of the straight portion of the segment. Signed distance from at least one of the candidate locations of the segment to any forbidden boundary points in a neighborhood of the unreachable location may be computed. The candidate locations of the segment may be moved in a direction perpendicular to a straight portion of the segment to ensure all the signed distance are not negative.

Navigation Module

A path from the respective current location (or the respective next location) to a target location of the venue may be determined. An updated path from the respective next location to the target location of the venue may be computed. The updated path from the respective next location to the target location of the venue may be displayed on a display device of a user. The display device may be a smart phone, a tablet, a laptop, a PC, a smart device with display, a smart device with voice synthesis. For example, the updated path may be verbally described (displayed) in a smart speaker.

A path may be determined on the multi-dimensional array A from the respective current to a target location of the venue. An updated path from the respective next location to the target location of the venue may be computed. At least one venue feature in the venue may be detected based on the scanned multi-dimensional image. The at least one venue feature may be marked on the multi-dimensional array A. At least one venue feature may be marked on the multi-dimensional array A, wherein information associated with the at least one venue feature may be inputted by a user. The at least one venue feature may comprise at least one of: a wall, a door, a corner, a corridor, a window and another feature. At least one venue feature on the multi-dimensional array A may be identified. Lines of each venue feature in the multi-dimensional array may be extended until they intersect with another line. Rectangular blocks of array elements of the multi-dimensional array A may be determined based on the lines extended from the at least one venue feature. A rectangular block of array elements of A may be divided into two or more smaller rectangular blocks. Each rectangular block of array elements of A may be associated as a "super" array element of a "super" array B. A cost may be associated with each super array element of super array B. A cost may be associated with each pair of adjacent super array element of super array B.

A super path with minimum cost may be determined on the super array B from the respective current location to a target location of the venue. An updated super path on the super array B from the respective next location to the target location of the venue with minimum cost may be computed. A path on the array A corresponding to the super path on the super array B may be determined. An updated path on the array A corresponding to the updated super path on the super array B may be determined.

Handover for Smart Tracking

In the following, an example of a Receive Signal Strength Indicator/Signal Strength Level (RSSI/SSL)-based handover algorithm to extend the coverage of an indoor object tracking system is presented. As shown in FIG. 27.

Start: the start of the handover module.

Initialization state: wait for the first incoming packet, and select the satellite with the highest median value of the RSSI/SSL during a preset period, e.g., 100 ms, as the current satellite.

Availability Check of the Current Satellite: during the runtime, check the availability of the current satellite based on the time interval between two adjacent incoming packets. If the interval is beyond a preset value, then empty the CSIs in the queue corresponding to the current satellite and go to the "Initialization State" module; otherwise, when the queue of the CSI of the current satellite is full, move to "Link Quality Check of the Current Satellite" module.

Link Quality Check of the Current Satellite: if the quality of the RSSI/SSL of the current satellite is low, then go to "Satellite Switching Algorithm" and the details are described in the next section. If the quality is good, then return to "Availability Check of the Current Satellite" module. Note that the system updates the queues of the alternative satellites according to the time difference between two adjacent packets as well.

Satellite Switching Algorithm as shown in FIG. 28. At time slot n, let S denote the set of observable Origins for the current tracker Bot. Let riraw[n] denote the raw RSSI/SSL readings at time n from Origin Satellite i in its corresponding queue. One can smooth the RSSI/SSL readings by applying a median filter and a moving average filter to riraw[n] and obtain the filtered value ri[n]. Let cur stand for the index of the Origin Satellite that the Bot is associated with now, and rcurmax[n] denotes the maximum RSSI/SSL in its queue. When rcurmax[n] drops below a preset threshold Y, then compute the maximum of the minimum RSSI/SSL, i.e., raltermin[n]→max{min{ri[n−m], m=0, . . . , M−1}, i≠}, of the other alternative satellites with full queues. If raltermin[n]≥rcurmax[n], then the Bot switches to that new satellite, otherwise still stays with the previous satellite.

As an example, the tracking of the object may be achieved by obtaining an initial location of the object at time T, and then computing an updated location of the object at time T+T based on the at least one TSCI.

The initial location of the object at time T may be obtained by installing some directional antennas at an entrance such that when the object moves under the directional antenna, a wireless signal may be received indicating that the object is at the location associated with the directional antenna.

The updated location of the object may be computed by computing a distance travelled by the object in the incremental time T and combining the distance with an object motion direction (e.g. obtained from a gyroscope associated with the object) to obtain a displacement vector. The displacement vector may be added to the location at time T to obtain the updated location of the object at time T+T.

The Type1 heterogeneous wireless device is a heterogeneous wireless device of a first type (e.g. a wireless transmitter that sends a first probing signal (such as an impulse), a wireless receiver that receives a second probing signal, a wireless device functioning as a Bot, or a wireless device functioning as an Origin) and the Type2 heterogeneous wireless device is a heterogeneous wireless device of a second type (e.g. a wireless receiver that receives the first probing signal, a wireless transmitter that sends the second probing signal, or a wireless transceiver, or a wireless device functioning as an Origin, or a wireless device functioning as a Bot). The Type1 device may work in collaboration with a Type2 device such that one sends a probing signal and the other receives it. A Type1 device and/or a Type2 device may be smart speaker, smart phone, attachment to phone, portable dongle to plug into another device, USB dongle, computer, WiFi router, LTE base station, WiFi repeater, LTE repeater, TV, DVD player, HiFi, audio equipment, lighting equipment, clock, lamp, refrigerator, microwave oven, appliance, utensil, torch, security camera, dedicated security box, ornament, etc.

According to various embodiments of the present teaching, an Origin may be a transceiver and a Bot may be another transceiver in the system for object tracking and navigation. Each of the Origin and the Bot may be a Type1 or Type2 heterogeneous wireless device. Each CI may be associated with a timestamp, at least one first antenna of Type1 device, ID of the Type1 device, at least one second antenna of Type2 device, at ID of the Type2 device, SSID, MAC address, internet protocol (IP) address, venue, spatial location, geotag, environmental information, frequency, frequency band, frequency channel, WiFi frequency channel, LTE channel, mobile channel, frequency characteristics of decomposition, object, ID of the object, user, ID of the user, venue, ID of the venue, local area network (LAN), ID of the LAN, SSID observable by the Type1 device and/or Type2 device.

FIG. 17 illustrates an exemplary method for object tracking, according to one embodiment of the present teaching. At operation 1702, at least one TSCI of a wireless multipath channel is obtained, using a processor, a memory and a set of instructions stored in the memory. The at least one TSCI is extracted from a wireless signal transmitted between a Type1, heterogeneous wireless device at a first position in a venue and a Type2 heterogeneous wireless device at a second position in the venue through the wireless multipath channel. The wireless multipath channel is impacted by a current movement of an object in the venue. At operation 1704, a spatial-temporal information of the object is determined based on at least one of: the at least one TSCI, a time parameter associated with the current movement, and a past spatial-temporal information of the object. At operation 1706, a task is performed based on the spatial-temporal information.

FIG. 18 illustrates examples of the spatial-temporal information 1802, according to one embodiment of the present teaching. Accordingly, FIG. 19 illustrates examples of task 1804 performed based on spatial-temporal information, according to one embodiment of the present teaching.

FIG. 20 illustrates another exemplary method for object tracking, according to one embodiment of the present teaching. As shown in FIG. 20, TSCI 111A/111B may be obtained to determined distance at operation 2002, such that distance information 2004 of the current movement of the object may be obtained. In parallel, some mechanism may be used to obtain an estimated direction 2006 of the current movement of the object. As such, the spatial-temporal information may be determined, similar to the operation 1704 as shown in FIG. 17, based on the distance information 2004 and the estimated direction 2006, to obtain the spatial-temporal information 1802 as illustrated in FIG. 18.

In general, a task may be performed based on the spatial-temporal information, as shown in operation 1706 of FIG. 17. In one embodiment, the task may comprise a presentation of the spatial-temporal information. It may be presented in an audio-visual way, a graphical way, a textual way, symbolic way or mechanical way. For example, the spatial-temporal information may be a detection of motion of the object in different rooms of a house. A graphical user interface (GUI) may be constructed to show that the whereabout of the object in a house. For example, the object may be a person. The location or approximate location of the object may be shown/marked. And the GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated also. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, “abnormal” or “unexpected” motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area, living room, bedroom1, etc. The GUI may be a software for a computer/a tablet, an app on a smart phone (e.g. iPhone, Android phone, etc.), an app in a smart device (e.g. smart glass, smart watch, etc.

FIG. 21 illustrates an exemplary presentation of the spatial-temporal information in a venue, according to one embodiment of the present teaching. For example, as shown in FIG. 21, in a 2-bedroom apartment 2100, Origin 2101 may be placed in the living-room area 2102, Bot 1 2110 may be placed in a bedroom1-area 2112, and Bot 2 2120 may be placed in the dining-room area 2122. If both Bot 1 2110 and Bot 2 2120 detect motion/activity, the activity/motion/person/user may be in the living-room area 2102. If only Bot 1 2110 detects motion/activity, the activity/motion/person/user may be in the bedroom-1 area 2112. If only Bot 2 2120 detects motion/activity, the activity/motion/person/user may be in the dining-room area 2122. If neither of the two Bots detects motion/activity, then nobody may be in the apartment 2100. The corresponding area where the activity/motion/person/user is detected may be marked with a predetermined pattern or color. A number of implementations of the disclosure have been described. Nevertheless, it will be understood that various modifications may be made without departing from the spirit and scope of the disclosure. For example, the wireless transmitter, the wireless receiver, the antenna, the directional antenna, the wireless transmission, the multipath channel, the wireless signal, the object, the object, the processor, the memory, the set of instructions, the CI, the channel state information (CSI), the power information (PI), the format/features/components/contexts of CI/CSI/PI, the compression/representation/storage/transmission/encryption/processing/preprocessing/post-processing of CI/CSI/PI, the time series format/order/sequencing, the extraction of CI from the wireless signal, the spatial-temporal information, the past information, the initial information, the time quantities, the spatial quantities, the spatial-temporal quantities, the estimated direction, the similarity score, the object, the distance, the movement of the object, the characteristics points, the local device, and/or the computational workload sharing may be different from those described above. The spatial-temporal information may be speed. An exemplary explanation of a speed estimation method is as below. The three receive antennas may be aligned in a line parallel to the moving direction as shown in FIG. 22. FIG. 22 is an exemplary illustration of antenna matching based speed estimation, according to one embodiment of the present teaching. Furthermore, the speed of the receive antennas may change slowly in time, i.e., within a short period, the speed may be approximated to be a constant value v. One may group the receive antennas Rx2 and Rx3 together and call them the leading antennas, and group the receive antennas Rx1 and Rx2 together and call them the following antennas or trailing antennas. This is because the following antennas (or trailing antennas) may go through the same trajectory as the leading antennas, but with an unknown delay $\tau$. The speed may be estimated by the relation: $\hat{v}=d/\tau$, where d is the separation between adjacent antennas (equal separation). Therefore, the speed estimation problem may be transformed to the estimation of $\tau$. In the following, the TRRS may be used to estimate $\tau$. Let $H_i(t)$ denote the CSI (or CI CI) measured at the i-th receive antenna at time t and let $\Delta t$ stand for the duration between two adjacent CSI measurement. For each time $t_1$, one may form the reference CSI, which is measured by the leading antennas, as $H_{lead}(t_1)=[H_2(t_1), H_3\ (t_1), H_2(t_i+\Delta t), H_3(t_i+\Delta t), \ldots, H_2(t_1+(N-1)\Delta t), H_3(t_1+(N-1)\Delta t)]$, where N may be 1, 2, 3 . . . , and form the CSI for comparison, which is measured by the following antennas (or trailing antennas), as $H_{follow}(t)=[H_1(t), H_2(t), H_1(t+\Delta t), H_2(t+\Delta t), \ldots, H_1(t+(N-1)\Delta t), H_2(t+(N-1)\Delta t)]$. The TRRS $\gamma(t_1, t)$ value and/or some similarity measure and/or some distance measure between $H_{lead}(t_1)$ and $H_{follow}(t)$ may be computed. When the following antennas reach the location of the leading antennas corresponding to time $t_1$, $\gamma(t_1, t)$ may achieve its maximum over the variable t. In the example of FIG. 1, one may have $t=t_2$ and thus one may have the estimation $\hat{\tau}=t_2-t_1$.

An exemplary flow chart of antenna matching based speed estimation is shown in FIG. 11. In operation 1102, the detailed formulation of the CFR concatenation for the leading antennas is $H_{lead}(t_1)=[H_2(t_1), H_3(t_1), H_2(t_1+\Delta t), H_3(t_1+\Delta t), \ldots, H_2(t_1+(N-1)\Delta t), H_3(t_1\text{-}+(N-1)\Delta t)]$. In operation 1104, the detailed formulation of the CFR concatenation for the following antennas is $H_{follow}(t_2)=[H_1(t_2), H_2(t_2), H_1, (t_2+\Delta t), H_2(t_2+\Delta t), \ldots, H_1(t_2+(N-1)\Delta t), H_2(t_2+(N-1)\Delta t)]$. In operation 1106, for each time slot $t_1$, the TRRS $\gamma(t_1, t_2)$ between the two CFR fingerprint $H_{lead}(t_1)$ and $H_{follow}(t_2)$ is computed for different $t_2$'s nearby $t_1$. In operation 1108, it may determine the $t_2$ that gives the maximum value of $\gamma(t_1, t_2)$ and then the delay $\tau$ between the group of leading antennas and the group of following antennas is thus $\tau=t_2-t_1$. In operation 1110, the speed estimation is thus $v=d/\tau$, where d the distance between any two adjacent uniformly separated antennas. Accordingly, other embodiments are within the scope of the following claims.

Motion Detection

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching discloses systems, devices, and methods for detecting object motion in a venue based on CI of a wireless multipath channel that is impacted by the object motion. In one embodiment, the motion of the object is detected based on motion information computed based on a TSCI of the wireless multipath channel. The motion information may include a heterogeneous similarity score between a current time window and a past time window of the TSCI.

In one embodiment, the disclosed system comprises a first wireless device configured for transmitting a wireless signal through a wireless multipath channel impacted by a motion of an object in the venue; and a second wireless device that has a different type from that of the first wireless device. The second wireless device is configured for: receiving the wireless signal through the wireless multipath channel impacted by the motion of the object in the venue, and obtaining a TSCI of the wireless multipath channel based on the wireless signal. The disclosed system further comprises a motion detector configured for detecting the motion of the object in the venue based on motion information related to the motion of the object. The motion information associated with the first and second wireless devices is computed based on the TSCI by at least one of: the motion detector and the second wireless device.

The motion detector may be coupled to at least one of: the first wireless device; the second wireless device; a third wireless device having a same type as that of the first wireless device; a fourth wireless device having a same type as that of the second wireless device; a cloud server; a fog server; a local server; and an edge server. In one embodiment, the first wireless device is a Type1 device having a Type1; the second wireless device is a Type2 device having a Type2; the system further comprises at least one of: at least one additional Type1 device, and at least one additional Type2 device; the Type1 devices and the Type2 devices form a plurality of pairs of Type1 and Type2 devices. For each pair of Type1 and Type2 devices comprising a Type1 device and a Type2 device: the respective Type1 device may be configured for transmitting a respective wireless signal through the wireless multipath channel impacted by the motion of the object in the venue, the respective Type2 device may be configured for receiving the respective wireless signal through the wireless multipath channel and obtaining a respective TSCI of the wireless multipath channel based on the respective wireless signal, and at least one of the motion detector and the respective Type2 device may be configured for asynchronously computing respective heterogeneous motion information related to the motion of the object based on the respective TSCI; and at least one of the motion detector and the Type2 devices is configured for performing at least one of: monitoring the motion of the object in the venue individually and asynchronously based on the asynchronously computed heterogeneous motion information associated with a pair of Type1 and Type2 devices, monitoring the motion of the object in the venue jointly and asynchronously based on the asynchronously computed heterogeneous motion information associated with any pair of Type1 and Type2 devices comprising a particular Type2 device, monitoring the motion of the object in the venue jointly and asynchronously based on the asynchronously computed heterogeneous motion information associated with any pair of Type1 and Type2 devices comprising a particular Type1 device, and monitoring the motion of the object in the venue globally and asynchronously based on the asynchronously computed heterogeneous motion information associated with any pair of Type1 and Type2 devices.

According to various embodiments of the present teaching, an Origin may be a transceiver and a Bot may be another transceiver in the disclosed system for object motion detection and monitoring. Each of the Bot and the Origin may be a Type1 or Type2 heterogeneous wireless device.

In one embodiment, each CI of the respective TSCI may have at least one respective component. For each Type2 device, and for each of the at least one respective particular pair of Type1 and Type2 devices comprising the Type2 device, and for each of the at least one respective component, the following may be done: (a) a respective current component window of the component of the respective TSCI may be determined asynchronously based on the respective current window; (b) a respective past component window of the component of the respective TSCI may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously. The motion of the object may be detected based on the asynchronous component-wise comparing.

In one embodiment, the disclosed system has hardware components (e.g. wireless transmitter/receiver with antenna, analog circuitry, RF/IF/baseband elements, low-noise amplifier, power supply, processor, memory, etc.) working in pairs (a Type1 device and a Type2 device) and corresponding software components. The disclosed system is capable of detecting object motions in a venue, with a very high detection rate and a very low false alarm rate. In particular, the disclosed system is much better than an existing passive infra-red (PIR) sensor which is a widely used motion sensor in security systems.

First, the disclosed system has a much larger motion detection range. In one embodiment, the disclosed wireless motion detection system uses wireless signals (such as Wi-Fi or LTE) to probe the environment (venue) and have a large inherent range of about 10,000 square feet due to Wi-Fi. PIR has a much smaller range of about 100-200 square feet by using an infra-red signal.

Second, the disclosed system can detect motion around corners. While a PIR sensor relies on line-of-sight (LOS) operation, it cannot detect motion behind a wall or around a corner or behind an obstacle (e.g. TV, sofa, window, partitions, etc.). In contrast, the disclosed system works in both line-of-sight (LOS) and non-line-of-sight (NLOS) conditions. The disclosed system is fully capable of detecting motion behind multiple walls, around multiple corners and behind obstacles. In security applications, being able to detect motion around corners and behind walls is extremely important because intruders may exactly be hiding there in the dark waiting to do bad things.

Third, the disclosed system has a much better false alarm rate. A false alarm means that a system detects a motion when there is actually no motion. Such false alarms are very annoying to the operators and police. The disclosed system has a very low false alarm rate of even less than 0.1% while the false alarm rate of a PIR based detector is in the range of 10% or more. While a PIR based detector is sensitive to temperature change due to e.g. a strong sunshine, the disclosed system is not sensitive to sunshine or temperature change.

Fourth, the disclosed system does not need special installation like a PIR based detector. PIR based detectors need special installation. Once installed, they cannot be moved around. As the PIR based detector has very limited range, many PIR devices are labor intensive, time consuming and expensive. In addition, replacement of faulty PIR devices requires additional effort. The disclosed system can use existing Wi-Fi or LTE to perform motion detection. In other words, no special installation is needed. The disclosed system may just use some existing Wi-Fi-compliant device such as Wi-Fi router, smart phone, smart speaker Amazon Echo, Google Home, etc.), smart devices (e.g. smart thermometer, smart camera, smart TV, smart set-top box, smart refrigerator, etc.). Type1 devices and Type2 devices may be plug-and-play devices without a requirement of special installation. Due to the plug-and-play nature, the disclosed wireless motion detection system still works when the devices are moved around by consumers (e.g. from living room to family room, or from one plug to another plug).

Moreover, the disclosed system can exploit existing standard-compliant mass-market infrastructure such as Wi-Fi and LTE. Thus many components of the disclosed system are typically mass-produced and thus have a low cost, suitable for the consumer market as well as niche markets.

In one embodiment, a task related to object motion may be performed based on some spatial-temporal information (e.g. location, speed, velocity, acceleration, a periodic motion, a time trend, a transient motion, a period, a characteristic, etc.) of an object based on at least one TSCI, a time parameter associated with a current movement, and/or a past spatial-temporal information of the object. The one or more TSCI may be preprocessed. In one embodiment, the task may comprise a presentation of the spatial-temporal information. It may be presented in an audio-visual way, a graphical way, a textual way, symbolic way or mechanical way. For example, the spatial-temporal information may indicate a detection of motion of an object in different rooms of a house. A graphical user interface (GUI) may be constructed to show that the where-about of the object in a house. For example, the object may be a person. The location or approximate location of the object may be shown or marked.

The GUI may partition a house into living-room area, family-room area, dining-room area, bedroom1-area, bedroom2-area, etc. Each area may be assigned a color and/or shaded with the color. Each area may be animated (e.g. size of the area, shape of the area, color of the area, intensity of the color of the area, text display, symbol display, etc.). Or, the GUI may have separate representation of each area with or without a map. The representation may be animated. The animation may be in real time, or at a later time. Predicted object (user) behavior/activity may be animated as well. The presentation may also be in the form of vibration, mechanical feedback, physical feedback, haptic feedback, light, shade, shape, etc. to reflect the spatial-temporal information. The spatial-temporal information may include more than one analytics, e.g. number of people, existence of motion, motion intensity, motion duration, motion frequency, "abnormal" or "unexpected" motion, vital sign, alive/death, motionless, asleep, suspicious event, and/or fall-down, etc. For example, if motion is large, the color may be darker (more black/grey element) or more saturated or brighter. If motion is small, the color may be lighter or less saturated or dimmer. When the person enters a house, the GUI may show that he is at the front foyer area, living room, bedroom1, etc. The GUI may be implemented by software for a computer/a tablet, an app on a smart phone (e.g. iPhone, Android phone, etc.), an app in a smart device (e.g. smart glass, smart watch, etc.).

FIG. 9 illustrates an exemplary scenario where object motion is detected based on spatial-temporal information in a venue, according to one embodiment of the present teaching. FIG. 9 also illustrates an exemplary presentation of the spatial-temporal information in the venue. For example, as shown in FIG. 9, in a 2-bedroom apartment 900, Origin 901 may be placed in the living-room area 902, Bot 1 910 may be placed in a bedroom1-area 912, and Bot 2 920 may be placed in the dining-room area 922. Each of Bot 1 910 and Bot 2 920 can transmit a wireless signal to the Origin 901, which can obtain CI of a wireless multipath channel based on the wireless signal. The Origin 901, by itself or through a third device like a motion detector, can compute motion information based on the CI and detect object motion/activity based on the motion information. That is, the Origin 901, by itself or through a third device like a motion detector, can detect object motion/activity based on wireless signals transmitted by Bot 1 910 and/or Bot 2 920. If object motion/activity is detected based on wireless signals transmitted by both Bot 1 910 and Bot 2 920, the activity/motion or the object (e.g. person/user) may be in the living-room area 902. If object motion/activity is detected based only on wireless signals transmitted by Bot 1 910, the activity/motion or the object (e.g. person/user) may be in the bedroom-1 area 912. If object motion/activity is detected based only on wireless signals transmitted by Bot 2 920, the activity/motion or the object (e.g. person/user) may be in the dining-room area 922. If object motion/activity cannot be detected based on wireless signals transmitted by either Bot 1 910 or Bot 2 920, then it may be determined that nobody and no object is in the apartment 900. The corresponding area where the activity/motion/person/user is detected may be marked with a predetermined pattern or color.

FIG. 2 illustrates a flowchart of an exemplary method for motion detection performed by a motion detector based on wireless CI, according to one embodiment of the present teaching. At operation 202, a wireless signal is received through a wireless multi path channel impacted by a motion of an object. At operation 204, a TSCI that has at least one component of the channel is obtained based on the wireless signal. A respective current component window of the component is determined asynchronously, at operation 206, based on a current time window. A respective past component window of the component is determined asynchronously, at operation 208, based on a past time window. At operation 210, the respective current component window is compared component-wise with the respective past component window asynchronously to generate a comparison result. At operation 212, object motion is detected based on the asynchronous component-wise comparison result. Optionally at operation 214, the motion of the object is monitored based on the continuously generated comparison results.

FIG. 15 illustrates an exemplary block diagram of a first wireless device, e.g. a Bot 1500, according to one embodiment of the present teaching. The Bot 1500 is an example of a device that can be configured to implement the various methods described herein. As shown in FIG. 15, the Bot 1500 includes a housing 1540 containing processor 1502, memory 1504, transceiver 1510 comprising transmitter 1512 and receiver 1514, synchronization controller 1506, power module 1508, carrier configurator 1520 and wireless signal generator 1522.

In this embodiment, the processor 1502 controls the general operation of the Bot 1500 and can include one or more processing circuits or modules such as central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1504, which can include both read-only memory (ROM) and random access memory (RAM), can provide instructions and data to the processor 1502. A portion of the memory 1504 can also include non-volatile random access memory (NVRAM). The processor 1502 typically performs logical and arithmetic operations based on program instructions stored within the memory 1504. The instructions (a.k.a., software) stored in the memory 1504 can be executed by the processor 1502 to perform the methods described herein. The processor 1502 and the memory 1504 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1510, which includes the transmitter 1512 and receiver 1514, allows the Bot 1500 to transmit and receive data to and from a remote device (e.g., an Origin or another Bot). An antenna 1550 is typically attached to the housing 1540 and electrically coupled to the transceiver 1510. In various embodiments, the Bot 1500 includes (not shown) multiple transmitters, multiple receivers, and multiple transceivers. In one embodiment, the antenna 1550 is replaced with a multi-antenna array 1550 that can form a plurality of beams each of which points in a distinct direction. The transmitter 1512 can be configured to wirelessly transmit signals having different types or functions, such signals being generated by the processor 1502. Similarly, the receiver 1514 is configured to receive wireless signals having different types or functions, and the processor 1502 is configured to process signals of a plurality of different types.

The Bot 1500 in this example may serve as Bot 1 110 or Bot 2 120 in FIG. 1 for detecting object motion in a venue. For example, the wireless signal generator 1522 may generate and transmit, via the transmitter 1512, a wireless signal through a wireless multipath channel impacted by a motion of an object in the venue. The wireless signal carries information of the channel. Because the channel was impacted by the motion, the CI includes motion information that can represent the motion of the object. As such, the motion can be indicated and detected based on the wireless signal. The generation of the wireless signal at the wireless signal generator 1522 may be based on a request for motion detection from another device, e.g. an Origin, or based on a system pre-configuration. That is, the Bot 1500 may or may not know that the wireless signal transmitted will be used to detect motion.

In one embodiment, the Bot 1500 may be a particular asynchronous heterogeneous Type1 device of a radio monitoring system. The radio monitoring system may comprise at least one asynchronous heterogeneous Type1 device and at least one asynchronous heterogeneous Type2 device. The radio monitoring system may comprise at least one combination of Type1 and Type2 devices, each combination comprising one of the at least one Type1 device, and one of the at least one Type2 device. The particular asynchronous heterogeneous Type1 device is in at least one particular combination of Type1 and Type2 devices of the radio monitoring system. The particular Type1 device is paired with at least one particular Type2 device through the at least one particular combination of Type1 and Type2 devices. The particular asynchronous heterogeneous Type1 device comprises a wireless circuitry; a first processor communicatively coupled with the wireless circuitry; a first memory communicative coupled with the first processor; and a first set of instructions stored in the first memory which, when executed, cause the first processor to transmit asynchronously using the wireless circuitry an asynchronous heterogeneous wireless signal from the particular Type1 device to the at least one particular Type2 device through a wireless multipath channel impacted by a dynamics of a substance in a site. For each of the at least one particular Type2 device: at least one series of CI (TSCI) of the wireless multipath channel gleaned from the asynchronous heterogeneous wireless signal transmitted by the wireless circuitry is fetched by the Type2 device using a second processor, a second memory and a second set of instructions of the Type2 device. In one example, the dynamics of the substance in the site is tracked individually and asynchronously, using a third processor, a third memory and a third set of instructions of a Type 3 device, based on TSCI associated with a combination of Type1 and Type2 devices comprising the particular Type1 device. In another example, the dynamics of the substance is tracked jointly and asynchronously based on TSCI associated with any combinations of Type1 and Type2 devices comprising the particular Type1 device. In another example, the dynamics of the substance is tracked jointly and asynchronously based on TSCI associated with any combinations of Type1 and Type2 devices comprising one of the at least one particular Type2 device. In another example, the dynamics of the substance is tracked globally and asynchronously based on TSCI associated with any combinations of Type1 and Type2 devices.

In another embodiment, for each Type1 device, and for each of the at least one combination of Type1 and Type2 devices comprising the Type1 device, a respective heterogeneous similarity score associated with the respective combination of Type1 and Type2 devices is computed asynchronously based on comparing a respective current window and a respective past window of at least one respective TSCI associated with the respective combination of Type1 and Type2 devices. In one example, the dynamics of the substance in the site is tracked individually and asynchronously based on asynchronously computed heterogeneous similarity score associated with the combination of Type1 and Type2 devices comprising the particular Type1 device. In another example, the dynamics of the substance in the site is detected individually and asynchronously when a heterogeneous similarity score associated with the combination of Type1, and Type2 devices comprising the particular Type1 device is greater than and/or equal to an individual threshold. In another example, the dynamics of the substance in the site is tracked jointly and asynchronously based on asynchronously computed heterogeneous similarity score associated with any combination of Type1 and Type2 devices comprising the particular Type1 device. In another example, the dynamics of the substance in the site is detected jointly and asynchronously when a first joint score computed based on heterogeneous similarity score associated with any combination of Type1 and Type2 devices comprising the particular Type1 device is at least one of: greater than, and equal to, a first joint threshold. In another example, the dynamics of the substance in the site is tracked jointly and asynchronously based on asynchronously computed heterogeneous similarity score associated with any combination of Type1 and Type2 devices associated with one of the at least one particular Type2 device. In another example, the dynamics of the substance in the site is detected jointly and asynchronously when a second joint score computed based on heterogeneous similarity score associated with any combination of Type1 and Type2 devices associated with one of the at least one particular Type2 device is at least one of: greater than, and equal to, a second joint threshold. In another example, the dynamics of the substance in the site is tracked globally and asynchronously based on asynchronously computed heterogeneous similarity score associated with any combination of Type1 and Type2 devices. In another example, the dynamics of the substance in the site is detected globally and asynchronously when a third joint score computed based on heterogeneous similarity score associated with any combination of Type1 and Type2 devices is greater than and/or equal to a third joint threshold.

The synchronization controller 1506 in this example may be configured to control the operations of the Bot 1500 to be synchronized or un-synchronized with another device, e.g. an Origin or another Bot. In one embodiment, the synchronization controller 1506 may control the Bot 1500 to be synchronized with an Origin that receives the wireless signal transmitted by the Bot 1500. In another embodiment, the synchronization controller 1506 may control the Bot 1500 to transmit the wireless signal asynchronously with other Bots. In another embodiment, each of the Bot 1500 and other Bots may transmit the wireless signals individually and asynchronously.

The carrier configurator 1520 in this example may configure transmission resources, e.g. time and carrier, for transmitting the wireless signal generated by the wireless signal generator 1522. In one embodiment, each CI of the TSCI has one or more components each corresponding to a carrier or sub-carrier of the transmission of the wireless signal. The detection of the motion may be based on motion detections on any one or any combination of the components.

The power module 1508 can include a power source such as one or more batteries, and a power regulator, to provide regulated power to each of the above-described modules in FIG. 15. In some embodiments, if the Bot 1500 is coupled to a dedicated external power source (e.g., a wall electrical outlet), the power module 1508 can include a transformer and a power regulator. The various modules discussed above are coupled together by a bus system 1530. The bus system 1530 can include a data bus and, for example, a power bus, a control signal bus, and/or a status signal bus in addition to the data bus. It is understood that the modules of the Bot 1500 can be operatively coupled to one another using any suitable techniques and mediums. Although a number of separate modules or components are illustrated in FIG. 15, persons of ordinary skill in the art will understand that one or more of the modules can be combined or commonly implemented. For example, the processor 1502 can implement not only the functionality described above with respect to the processor 1502, but also implement the functionality described above with respect to the wireless signal generator 1522. Conversely, each of the modules illustrated in FIG. 15 can be implemented using a plurality of separate components or elements.

FIG. 16 illustrates a flowchart of an exemplary method 1600 performed by a first wireless device, e.g. the Bot 1500 in FIG. 15, in accordance with some embodiments of the present disclosure. Optionally at operation 1602, the Bot receives a request for motion detection in a multipath channel environment. At operation 1604, the Bot determines carriers or sub-carriers for a wireless transmission through the wireless multipath channel. At operation 1606, the Bot may determine synchronization information for the wireless transmission. At operation 1608, the Bot may generate a heterogeneous wireless signal for the wireless transmission. At operation 1610, the Bot transmits the heterogeneous wireless signal through the wireless multipath channel.

FIG. 17 illustrates an exemplary block diagram of a second wireless device, e.g. an Origin 1700, according to one embodiment of the present teaching. The Origin 1700 is an example of a device that can be configured to implement the various methods described herein. As shown in FIG. 17, the Origin 1700 includes a housing 1740 containing a processor 1702, a memory 1704, a transceiver 1710 comprising a transmitter 1712 and a receiver 1714, a power module 1708, a synchronization controller 1706, a CI extractor 1720, and an optional motion detector 1722.

In this embodiment, the processor 1702, the memory 1704, the transceiver 1710 and the power module 1708 work similarly to the processor 1502, the memory 1504, the transceiver 1510 and the power module 1508 in the Bot 1500. An antenna 1750 or a multi-antenna array 1750 is typically attached to the housing 1740 and electrically coupled to the transceiver 1710.

The Origin 1700 may be a second wireless device that has a different type from that of the first wireless device (the Bot 1500). In particular, the CI extractor 1720 in the Origin 1700 is configured for receiving the wireless signal through the wireless multipath channel impacted by the motion of the object in the venue, and obtaining a TSCI of the wireless multipath channel based on the wireless signal. The CI extractor 1720 may send the extracted CI to the optional motion detector 1722 or to a motion detector outside the Origin 1700 for detecting object motion in the venue.

The motion detector 1722 is an optional component in the Origin 1700. In one embodiment, it is within the Origin 1700 as shown in FIG. 17. In another embodiment, it is outside the Origin 1700 and in another device, which may be a Bot, another Origin, a cloud server, a fog server, a local server, and an edge server. The optional motion detector 1722 may be configured for detecting the motion of the object in the venue based on motion information related to the motion of the object. The motion information associated with the first and second wireless devices is computed based on the TSCI by the motion detector 1722 or another motion detector outside the Origin 1700.

In one embodiment, the Origin 1700 is a particular asynchronous heterogeneous Type2 device of a radio monitoring system. The radio monitoring system may comprise at least one asynchronous heterogeneous Type1 device and at least one asynchronous heterogeneous Type2 device. The radio monitoring system may comprise at least one pairing of Type1 and Type2 devices, each pairing comprising one of the at least one Type1 device, and one of the at least one Type2 device. The particular asynchronous heterogeneous Type2 device is in at least one particular pairing of Type1 and Type2 devices of the radio monitoring system. The particular Type2 device is grouped with at least one particular Type1 device through the at least one particular pairing of Type1 and Type2 devices. In one example, the particular asynchronous heterogeneous Type2 device comprises: a wireless circuitry to receive asynchronously at least one asynchronous heterogeneous radio signal, a second heterogeneous processor communicatively coupled with the wireless circuitry, a second heterogeneous memory communicative coupled with the second heterogeneous processor, and a second heterogeneous set of instructions stored in the second heterogeneous memory. Each asynchronous heterogeneous radio signal is transmitted asynchronously by one of the at least one particular Type1 device using a respective first heterogeneous processor, a respective first heterogeneous memory and a respective first heterogeneous set of instructions of the Type1 device to at least one asynchronous heterogeneous Type2 device through a wireless multipath channel influenced by a movement of a mass in a site. The second heterogeneous set of instructions, when executed, cause the second heterogeneous processor to secure asynchronously at least one respective series of CI (TSCI) of the wireless multipath channel, for each of the at least one particular pairing of Type1 and Type2 devices.

In one embodiment, the at least one respective TSCI associated with the particular pairing of Type1 and Type2 devices is being derived asynchronously from the respective asynchronous heterogeneous radio signal received asynchronously by the wireless circuitry. In one example, the movement of the mass in the site is monitored individually and asynchronously, using a third processor, a third memory and a third set of instructions of a Type 3 device, based on TSCI associated with a pairing of Type1 and Type2 devices comprising the particular Type2 device. In another example, the movement of the mass is monitored jointly and asynchronously based on TSCI associated with any pairings of Type1 and Type2 devices comprising the particular Type2 device. In another example, the movement of the mass is monitored jointly and asynchronously based on TSCI associated with any pairings of Type1 and Type2 devices comprising one of the at least one particular Type1 device. In another example, the movement of the mass is monitored globally and asynchronously based on TSCI associated with any pairings of Type1 and Type2 devices.

In one embodiment, for each Type2 device, and for each of the at least one pairing of Type1 and Type2 devices comprising the Type2 device, a respective heterogeneous similarity score associated with the respective pairing of Type1 and Type2 devices is computed asynchronously based on comparing a respective current window and a respective past window of at least one respective TSCI associated with the pairing of Type1 and Type2 devices. In one example, the movement of the mass in the site is monitored individually and asynchronously based on asynchronously computed heterogeneous similarity score associated with the pairing of Type1 and Type2 devices comprising the particular Type2 device. In another example, the movement of the mass in the site is detected individually and asynchronously when a heterogeneous similarity score associated with the pair of Type1 and Type2 devices comprising the particular Type2 device is at least one of: greater than, and equal to, an individual threshold. In another example, the movement of the mass in the site is monitored jointly and asynchronously based on asynchronously computed heterogeneous similarity score associated with any pairing of Type1 and Type2 devices comprising the particular Type2 device. In another example, the movement of the mass in the site is detected jointly and asynchronously when a first joint score computed based on heterogeneous similarity score associated with any pairing of Type1 and Type2 devices comprising the particular Type2 device is at least one of: greater than, and equal to, a first joint threshold. In another example, the movement of the mass in the site is monitored jointly and asynchronously based on asynchronously computed heterogeneous similarity score associated with any pairing of Type1 and Type2 devices associated with one of the at least one particular Type1 device. In another example, the movement of the mass in the site is detected jointly and asynchronously when a second joint score computed based on heterogeneous similarity score associated with any pairing of Type1 and Type2 devices associated with one of the at least one particular Type1 device. In another example, the movement of the mass in the site is monitored globally and asynchronously based on asynchronously computed heterogeneous similarity score associated with any pairing of Type1 and Type2 devices. In another example, the movement of the mass in the site is detected globally and asynchronously when a third joint score computed based on heterogeneous similarity score associated with any pairing of Type1 and Type2 devices is at least one of: greater than, and equal to, a third joint threshold.

The synchronization controller 1706 in this example may be configured to control the operations of the Origin 1700 to be synchronized or un-synchronized with another device, e.g. a Bot, another Origin, or an independent motion detector. In one embodiment, the synchronization controller 1706 may control the Origin 1700 to be synchronized with a Bot that transmits a wireless signal. In another embodiment, the synchronization controller 1706 may control the Origin 1700 to receive the wireless signal asynchronously with other Origins. In another embodiment, each of the Origin 1700 and other Origins may receive the wireless signals individually and asynchronously. In one embodiment, the optional motion detector 1722 or a motion detector outside the Origin 1700 is configured for asynchronously computing respective heterogeneous motion information related to the motion of the object based on the respective TSCI. In one example, the optional motion detector 1722 or a motion detector outside the Origin 1700 is configured for monitoring and/or detecting the motion of the object in the venue individually and asynchronously based on the asynchronously computed heterogeneous motion information associated with a pair of Type1 and Type2 devices. In another example, the optional motion detector 1722 or a motion detector outside the Origin 1700 is configured for monitoring and/or detecting the motion of the object in the venue jointly and asynchronously based on the asynchronously computed heterogeneous motion information associated with any pair of Type1 and Type2 devices comprising a particular Type1 device. In another example, the optional motion detector 1722 or a motion detector outside the Origin 1700 is configured for monitoring and/or detecting the motion of the object in the venue jointly and asynchronously based on the asynchronously computed heterogeneous motion information associated with any pair of Type1 and Type2 devices comprising a particular Type1 device. In another example, the optional motion detector 1722 or a motion detector outside the Origin 1700 is configured for monitoring and/or detecting the motion of the object in the venue globally and asynchronously based on the asynchronously computed heterogeneous motion information associated with any pair of Type1 and Type2 devices. A detailed structure of the optional motion detector 1722 or a motion detector outside the Origin 1700 will be described with respect to FIG. 19.

The various modules discussed above are coupled together by a bus system 1730. The bus system 1730 can include a data bus and, for example, a power bus, a control signal bus, and/or a status signal bus in addition to the data bus. It is understood that the modules of the Origin 1700 can be operatively coupled to one another using any suitable techniques and mediums. Although a number of separate modules or components are illustrated in FIG. 17, persons of ordinary skill in the art will understand that one or more of the modules can be combined or commonly implemented. For example, the processor 1702 can implement not only the functionality described above with respect to the processor 1702, but also implement the functionality described above with respect to the CI extractor 1720. Conversely, each of the modules illustrated in FIG. 17 can be implemented using a plurality of separate components or elements, in one embodiment, in addition to the Bot 1500 and the Origin 1700, the system may also comprise: a third wireless device, e.g. another Bot, configured for transmitting an additional heterogeneous wireless signal through an additional wireless multipath channel impacted by the motion of the object in the venue, and a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional CI of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 1722 or a motion detector outside the Origin 1700 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

FIG. 18 illustrates a flowchart of an exemplary method performed by a second wireless device, e.g. the Origin 1700 in FIG. 17, in accordance with some embodiments of the present disclosure. At operation 1802, the Origin receives and analyzes a wireless signal through a wireless multipath channel impacted by a motion of an object. At operation 1804, the Origin obtains a TSCI of the channel based on the wireless signal. Optionally at operation 1806, the Origin determines at least one time window and/or at least one component of the TSCI. Optionally at operation 1808, the Origin computes motion information related to the motion of the object based on the TSCI. Optionally at operation 1810, the Origin detects the motion of the object based on the computed motion information. Optionally at operation 1812, the Origin estimates a location associated with the motion of the object.

FIG. 19 illustrates an exemplary motion detector 1900, according to one embodiment of the present teaching. The motion detector 1900 may serve as a motion detector (e.g. the optional motion detector 1722) in an Origin, or an independent motion detector outside any Origin. As shown in FIG. 19, the motion detector 1900 in this example includes a motion information determiner 1902, a motion determiner 1906, a time window determiner 1904, and an optional motion location estimator 1908. According to various embodiments, the motion detector 1900 may be coupled to at least one of: the first wireless device; the second wireless device; a third wireless device having a same type as that of the first wireless device; a fourth wireless device having a same type as that of the second wireless device; a cloud server; a fog server; a local server; and an edge server, for detecting and monitoring object motions.

In one embodiment, the motion detector 1900 may receive the TSCI from the CI extractor 1720, and compute motion information based on the TSCI. For example, the motion information determiner 1902 may receive the respective TSCI from an Origin, and asynchronously compute respective heterogeneous motion information related to the motion of the object based on the respective TSCI. In one example, the motion information determiner 1902 may compute a heterogeneous similarity score between a current time window and a past time window of the TSCI, based on at least one of: a distance score, absolute distance, Euclidean distance, norm, metric, statistical characteristic, time reversal resonating strength (TRRS), cross-correlation, auto-correlation, covariance, auto-covariance, inner product of two vectors, preprocessing, signal conditioning, denoising, phase correction, timing correction, timing compensation, phase offset compensation, transformation, projection, filtering, feature extraction, finite state machine, history of past similarity score, another past window of the at least one TSCI, component-wise operation, machine learning, neural network, deep learning, training, discrimination, weighted averaging, and another operation, such that the motion of the object in the venue is detected based on the computed heterogeneous similarity score. The motion information determiner 1902 may send the computed motion information to the motion determiner 1906 for detecting and monitoring object motions.

In one embodiment, the time window determiner 1904 can determine a current window and a past window of the TSCI, and send the current time window and the past time window to the motion information determiner 1902. Then the motion information determiner 1902 can compute asynchronously a heterogeneous similarity score between the current window and the past window of the TSCI, such that the motion of the object in the venue is detected based on the motion information and the heterogeneous similarity score.

The motion determiner 1906 in this example may receive the computed motion information from the motion information determiner 1902, and detect the motion of the object in the venue based on motion information related to the motion of the object. In one embodiment, for each of the at least one component, the time window determiner 1904 can determine asynchronously a respective current component window of the component based on a current time window, determine asynchronously a respective past component window of the component based on a past time window, and send the information about the respective current component window and the respective past component window to the motion determiner 1906. The motion determiner 1906 may compare component-wise the respective current component window with the respective past component window asynchronously to generate a comparison result, monitor component-wise the motion of the object based on the comparison result, and detect the motion of the object in the venue based on the asynchronous component-wise comparing.

In one embodiment, for each of the at least one component, the motion information determiner 1902 can compute asynchronously a component similarity score associated with the respective current component window and the respective past component window, based on at least one of: a distance score, norm, metric, statistical characteristic, time reversal resonating strength (TRRS), cross-correlation, autocorrelation, covariance, auto-covariance, inner product of two vectors, preprocessing, signal conditioning, denoising, phase correction, timing correction, timing compensation, phase offset compensation, transformation, projection, filtering, feature extraction, finite state machine, history of past similarity score, another past window of the at least one TSCI, component-wise operation, machine learning, neural network, deep learning, training, discrimination, weighted averaging, and another operation. The motion information determiner 1902 may then compute asynchronously heterogeneous similarity score based on heterogeneous function of the at least one component similarity score. The heterogeneous function comprises at least one of: a representative value, typical value, weighted average, percentile, maximum, minimum, 40% quartile, 50% quartile, 60% quartile, mean, median, mode, sum, product, root, arithmetic mean, geometric mean, harmonic mean, generalized mean, ordered statistic, trimmed mean, statistical function, expected value, variance, selected one, and another function. The motion determiner 1906 may detect the motion of the object in the venue when the heterogeneous similarity score is greater than or equal to a first threshold.

In another embodiment, for each of the at least one component, the motion information determiner 1902 may compute asynchronously a component similarity score associated with the respective current component window and the respective past component window, based on at least one of: a distance score, norm, metric, statistical characteristic, time reversal resonating strength (TRRS), cross-correlation, auto-correlation, covariance, auto-covariance, inner product of two vectors, preprocessing, signal conditioning, denoising, phase correction, timing correction, timing compensation, phase offset compensation, transformation, projection, filtering, feature extraction, finite state machine, history of past similarity score, another past window of the at least one TSCI, component-wise operation, machine learning, neural network, deep learning, training, discrimination, weighted averaging, and another operation. Then for each of the at least one component, the motion determiner 1906 may detect component-wise the motion of the object asynchronously when the respective component similarity score is greater than or equal to a respective component threshold, and detect the motion of the object in the venue when a percentage of component-wise motion detection in a selected group of components is greater than or equal to a second threshold.

In one embodiment, the first wireless device is a Type1 device having a Type1; the second wireless device is a Type2 device having a Type2. In one example, the motion determiner 1906 may monitor and/or detect the motion of the object in the venue individually and asynchronously based on the asynchronously computed heterogeneous motion information associated with a pair of Type1 and Type2 devices. In another example, the motion determiner 1906 may monitor and/or detect the motion of the object in the venue jointly and asynchronously based on the asynchronously computed heterogeneous motion information associated with any pair of Type1 and Type2 devices comprising a particular Type2 device. In another example, the motion determiner 1906 may monitor and/or detect the motion of the object in the venue jointly and asynchronously based on the asynchronously computed heterogeneous motion information associated with any pair of Type1 and Type2 devices comprising a particular Type1 device. In another example, the motion determiner 1906 may monitor and/or detect the motion of the object in the venue globally and asynchronously based on the asynchronously computed heterogeneous motion information associated with any pair of Type1 and Type2 devices.

In one embodiment, for each pair of Type1 and Type2 devices comprising a Type1 device and a Type2 device, the respective Type2 device or the motion information determiner 1902 in the motion detector 1900 is configured for computing asynchronously a respective heterogeneous similarity score between a respective current window and a respective past window of the respective TSCI. Then the motion determiner 1906 or the Type2 device may detect the motion of the object in the venue individually and asynchronously when a first function of the respective heterogeneous similarity score associated with a pair of Type1 and Type2 devices is greater than or equal to a respective individual threshold, detect the motion of the object in the venue jointly and asynchronously when a second function of the heterogeneous similarity scores associated with any pair of Type1 and Type2 devices comprising a particular Type2 device is greater than or equal to a respective joint threshold, detect the motion of the object in the venue jointly and asynchronously when a third function of the heterogeneous similarity scores associated with any pair of Type1 and Type2 devices comprising a particular Type1 device is greater than or equal to another respective joint threshold, and/or detect the motion of the object in the venue globally and asynchronously when a fourth function of the heterogeneous similarity scores associated with any pair of Type1 and Type2 devices is greater than or equal to a respective global threshold.

The optional motion location estimator 1908 in this example is an optional component in the motion detector 1900. In one embodiment, the optional motion location estimator 1908 may be outside the motion detector 1900 and serve as a supervisory device, that is configured for: partitioning a map of the venue into a plurality of regions; and/or associating asynchronously the motion of the object with at least one of the plurality of regions of the map of the venue based on heterogeneous motion information received from the Type2 wireless devices. In one embodiment, at least one of the motion detector 1900 and the Type2 devices is configured for performing at least one of: partitioning a respective feature space of each of the heterogeneous motion information into a plurality of respective feature segments; constructing a respective mapping that associates each respective feature segment with at least one of the plurality of regions of the map of the venue; associating asynchronously the motion of the object individually with at least one of the plurality of regions of the map of the venue based on the respective mapping; partitioning a joint feature space of heterogeneous motion information associated with a plurality of pairs of Type1 and Type2 devices into a plurality of joint feature segments; constructing a joint mapping that associates each joint feature segment with at least one of the plurality of regions of the map of the venue; and associating asynchronously the motion of the object jointly with a particular one of the plurality of regions of the map of the venue based on the joint mapping.

In one embodiment, the motion detector 1900 may serve as a Type 3 device of a radio monitoring system. The radio monitoring system may comprise at least one asynchronous heterogeneous Type1 device and at least one asynchronous heterogeneous Type2 device. The radio monitoring system may comprise at least one doublet of Type1 and Type2 devices, each doublet comprising one of the at least one asynchronous heterogeneous Type1 device, and one of the at least one asynchronous heterogeneous Type2 device. The Type 3 device may comprise a third processor communicatively coupled with at least one of: at least one asynchronous heterogeneous Type1 device, and at least one asynchronous heterogeneous Type2 device; a third memory communicative coupled with the third processor; and a third set of instructions stored in the third memory. The third set of instructions, when executed, cause the third processor to: for each Type2 device, and for each of the at least one doublet of Type1 and Type2 devices comprising the Type2 device, receive asynchronously at least one respective TSCI (TSCI) of a wireless multipath channel influenced by a motion of an item in a place received asynchronously by the Type2 device using a respective second processor, a respective second memory and a respective second set of instructions of the Type2 device. The at least one respective TSCI associated with the respective doublet of Type1 and Type2 devices is obtained asynchronously from a respective asynchronous heterogeneous radio signal transmitted from a respective Type1 device of the respective doublet using a respective first processor, a respective first memory and a respective first set of instructions of the respective Type1 device to at least one asynchronous heterogeneous Type2 device through the wireless multipath channel. In addition, the third set of instructions, when executed, cause the third processor to perform at least one of the following: tracking the motion of the item in the place individually and asynchronously, based on TSCI associated with a particular doublet of Type1 and Type2 devices comprising a particular Type2 device and a particular Type1 device, tracking the motion of the item jointly and asynchronously based on TSCI associated with any of the at least one doublet of Type1 and Type2 devices associated with the particular Type2 device, tracking the motion of the item jointly and asynchronously based on TSCI associated with any of the at least one doublet of Type1 and Type2 devices associated with the particular Type1 device, and tracking the motion of the item globally and asynchronously based on TSCI associated with any of the at least one doublet of Type1 and Type2 devices.

In one embodiment, the system may comprise a monitoring device configured for signaling asynchronously information associated with at least one of: the map of the venue, the plurality of partitioned regions of the map, regions associated with any detected motion of the object, heterogeneous motion information associated with at least one pair of Type1 and Type2 devices, the component-wise similarity score, the heterogeneous similarity score, past motion information, past similarity score, another past information, Type1 devices, and Type2 devices. In one example, the monitoring device may be a mobile phone running an app or GUI to display the detection or monitoring result. In other examples, the monitoring device may be a desktop, a laptop, a tablet, an IoT device, or a smart speaker.

FIG. 20 illustrates an exemplary algorithm of motion detection, according to one embodiment of the present teaching. In FIG. 20, G(f; t) may denote the CSI (or CI) amplitude of subcarrier f at time slot t . For a system with M by N antenna configuration, the total number of subcarriers is F=MNL, where L is the number subcarrier for each antenna pair. For each subcarrier f, one may compute a motion statistic as the first order of the sample auto-correlation coefficient, where T is the length of the time window to compute the motion statistic. The physical meaning of the motion statistic is that the higher the motion statistic, the stronger the motion is. On each subcarrier, there is a motion statistic calculated for detecting a motion, e.g., when its sample auto-correlation coefficient is larger than a predefined threshold. A majority vote may be applied to fuse all the decisions from F subcarriers of the system. When more than half of the total number of the available subcarriers detect the human motion inside the elevator, then the system detects the motion; otherwise, no motion is detected. In another embodiment, G(f; t) may be defined as another function of the CI on subcarrier f at time slot t, for example, (CSI amplitude)^2, (CSI amplitude)^4, real/imaginary part of the CSI after phase offset cleaning. The motion static may also be defined as the sample auto-correlation coefficient with another order, if the order is less than a quarter of the time window length T. Other decision fusion rule such as weighted combining of the individual decision may also be adopted.

FIG. 21 illustrates an exemplary method for object motion detection, according to one embodiment of the present teaching. At operation 2102, at least one TSCI of a wireless multipath channel is obtained, using a processor, a memory and a set of instructions stored in the memory. The at least one TSCI is extracted from a wireless signal transmitted between a Type1 heterogeneous wireless device at a first position in a venue and a Type2 heterogeneous wireless device at a second position in the venue through the wireless multipath channel. The wireless multipath channel is impacted by a motion of an object in the venue. At operation 2104, a spatial-temporal information of the object is determined based on at least one of: the at least one TSCI, a time parameter associated with the motion, and a past spatial-temporal information of the object. At operation 2106, a task is performed based on the spatial-temporal information. The spatial-temporal information may be a form of motion information, and motion information may be a form of spatial-temporal information. A Type1 device may be the First Device, the Type2 device may be the Second Device. The "task" mentioned above may be to "monitor motion" and/or to "detect motion".

FIG. 22 illustrates an exemplary flowchart for a method of object motion localization, according to one embodiment of the present teaching. The object motion localization in FIG. 22 is based on 2 Bots (Type1 Devices), paired with a particular Origin (Type2 Device). First, for each Bot, the motion information/statistics associated with each Bot-Origin pair (2202A and 2202B) is calculated. Then each of the calculated motion information is passed through a denoising processor (e.g. a low pass filter) to remove noise (2204A and 2204B). Then a motion likelihood (1006) is calculated according to some function. The motion likelihood may denote a probability of motion occurring near a Bot or near an Origin. Since the likelihood may also be noisy, e.g., change rapidly when motion occurs, the likelihood values may go through another denoising processor 2208. Finally, a decision of motion localization is made on where the motion happens.

An example function of mapping motion information to likelihood may be defined as follows. Denote $m_i(t)$ as the motion information calculated for Bot i-Origin pair at time t. An example of motion likelihood near Bot i at time t may be calculated as $$L_i(t) = \begin{cases} 1, & \begin{matrix}\text{Bot } i \text{ detects motion,} \\ \text{the other Bot doesn't detect motion;}\end{matrix} \\ 0, & \begin{matrix}\text{Bot } i \text{ doesn't detect motion,} \\ \text{the other Bot detects motion;}\end{matrix} \\ \dfrac{m_i^p}{\sum_i m_i^p}, & \text{Both Bots detect motion.} \end{cases}$$

$L_i(t)$ is undefined when neither of the bots detect motion.

Denote $\tilde{L}_j(t)$ as the likelihood after denoising an example of motion localization decision rule can be $$MLoc(t) = \begin{cases} \text{Near Bot 1,} & \text{when } \tilde{L}_1(t) > \eta_1 \\ \text{Near Bot 2,} & \text{when } \tilde{L}_2(t) > \eta_2 \\ \text{Near the common area,} & \begin{matrix}\text{when } \tilde{L}_1(t) < \eta_1 \text{ and} \\ \tilde{L}_2(t) < \eta_2\end{matrix} \end{cases}$$

When both $\tilde{L}_1(t)$ and $L\tilde{L}_2(t)$ are undefined, then no motion exists in the monitored area.

Different embodiments of the present disclosure will now be described in detail hereinafter. It is noted that the features of the embodiments and examples in the present disclosure may be combined with each other in any manner without conflict.

In one embodiment, a wireless radio (or radio or RF) monitoring system comprises at least one asynchronous heterogeneous Type1 wireless (or radio or RF) device (or apparatus) and at least one asynchronous heterogeneous Type2 wireless (or radio or RF) device. The wireless (or radio or RF) monitoring system also comprises at least one pair (or pairing, or couple, or duo, or combination, or doublet, or combo, or match, or team) of Type1 and Type2 devices, each pair comprising one of the at least one asynchronous heterogeneous Type1 device, and one of the at least one asynchronous heterogeneous Type2 device. Each of the at least one Type2 device is in at least one respective particular pair of Type1 and Type2 devices. Each Type2 device is associated (or grouped or coupled or paired or conjoined or combined or affiliate or partnered) with at leak one respective particular Type1 device through the at least one respective particular pair of Type1 and Type2 devices.

In one embodiment, a disclosed method of the wireless (or radio or RF) monitoring system comprises obtaining (or receiving, or getting, or collecting, or retrieving, or securing, or fetching) asynchronously at least one respective TSCI (or channel data) of a wireless multipath channel impacted (or influenced) by a motion (or movement, or act, or gesture, or change, or drift, or dynamics, or flow, or fluctuation, or flux, or gesticulation, or kinetics, or locomotion, or mobility, or movement, or oscillation, or passing, or progressing, or stirring, or swaying) of an object (or article, or body, or commodity, or gadget, or item, or matter, or substance, or entity, or mass) in a venue (or locale, or place, or site, or setting, or ground) for each Type2 device and for each of the at least one respective particular pair of Type1 and Type2 devices comprising the Type2 device. The at least one respective TSCI (TSCI) associated with the particular pair of Type1 and Type2 devices is extracted (or obtained or derived or gleaned or collected or garnered) asynchronously from a respective asynchronous heterogeneous wireless (or radio or RF) signal. The respective asynchronous heterogeneous wireless (or radio or RF) signal is transmitted asynchronously from a respective one of the at least one respective particular Type1 device using a respective first heterogeneous processor, a respective first heterogeneous memory and a respective first heterogeneous set of instructions of the Type1 device to at least one asynchronous heterogeneous Type2 device through the wireless multipath channel.

The motion of the object in the venue is monitored (or tracked or checked or observed or overseen or observed or surveyed) using a third processor, a third memory and a third set of instructions of a Type 3 device in at least one of the four following ways: (a) the motion of the object in the venue is monitored individually and asynchronously, based on TSCI associated with a pair of Type1 and Type2 devices comprising a particular Type2 device; (b) the motion of the object is monitored jointly and asynchronously based on TSCI associated with any of the at least one pair of Type1 and Type2 devices associated with the particular Type2 device; (c) the motion of the object is monitored jointly and asynchronously based on TSCI associated with any of the at least one pair of Type1 and Type2 devices associated with one of the at least one respective particular Type1 device, and (d) the motion of the object is monitored globally and asynchronously based on TSCI associated with any of the at least one pair of Type1 and Type2 devices.

For example, more than one asynchronous heterogeneous Type1 devices may transmit asynchronously their respective asynchronous heterogeneous wireless (or radio or RF) signals to the same Type2 devices. (Some Type1 device may be transmitting to more than one Type2 devices.) Their transmission may be synchronized momentarily. Their transmission may be asynchronous, but sometimes the wireless (or radio or RF) signals of two of the Type1 devices may overlap in time. Their transmission may be coordinated. The motion of the object may be jointly monitored based on TSCI associated pairs of Type1 and Type2 devices comprising the Type2 device and one of the more than one asynchronous Type1 devices.

In another example, an asynchronous heterogeneous Type1 devices may transmit the asynchronous heterogeneous wireless (or radio or RF) signal to more than one asynchronous heterogeneous Type2 devices. The asynchronous heterogeneous wireless (or radio or RF) signal may be received asynchronously, or near synchronously, or simply synchronously. TSCI may be extracted asynchronously from the received asynchronous heterogeneous wireless (or radio or RF) signal. The motion of the object may be jointly monitored based on the TSCI associated pairs of Type1 and Type2 devices each comprising the asynchronous heterogeneous Type1 device and one of the more than one asynchronous heterogeneous Type2 devices.

A CI may be extracted from a received probe signal (with multi-path) by a Type2 device, an integrated circuit (IC, or chip) of the Type2 device (e.g. a Wi-Fi chip, an LTE chip, a cellular network chip, a wireless network chip, a mesh network chip, a Bluetooth chip, a UWB chip, etc). The probe signal may/may not contain data. More than one CI may be extracted from a received probe signal. One CI may be extracted for each pair of transmitting antenna and receiving antenna. For example, for a Type1 device with 3 transmitting antennas and a Type2 device with 2 receiving antennas, a total of 6 CI may be extracted from each probe signal.

A CI may comprise information of the channel from more than one pairs of transmitting antennas and receiving antennas. A CI may be sent from the Type2 device to another device (e.g. neighboring device, companion device, paired device, edge device, cloud device). The another device may be communicatively coupled with the Type2 device. The another device may be another Type2 device, the Type1 device and/or another Type1 device. The CI obtained by different heterogeneous Type2 devices may be different because different heterogeneous Type2 devices may be at different locations within the venue such that they may experience different multipath patterns. In other words, the respective wireless multipath channel experienced by respective heterogeneous Type2 device may be different. The CI may capture information (e.g. motion, periodic motion, shape, size, volume, path, direction, distance, speed, acceleration, change, rate of change, etc.) of the venue and/or any object (people, pet, creature, machine, device with movable parts, door, window, wall, partitioning, furniture, fixture, piping, air conditioning, heating, fan, etc.) in the venue. The CI may have some inherent imperfection such as noise, phase error, timing error, etc. The CI may be preprocessed, processed and/or post-processed.

In the case of at least one Type1 devices interacting with at least one Type2 devices, the processing, preprocessing, post-processing, and/or other processing may be different (heterogeneous) for different devices. The processing/preprocessing/post-processing/other processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

Any preprocessing, processing and/or postprocessing may require one or more thresholds. Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

The wireless (or radio or RF) signal transmitted from the heterogeneous Type1 device to the heterogeneous Type2 device may be a series of probe signals. Each probe signal may be an impulse, a number (e.g. 2, 3, 4, or more) of impulses, or another signal waveform. The another signal waveform may be based on the wireless multipath channel. The time separation of the number of impulses may be changed over time. (For example, the time separation between the second and third impulses may be different from the time separation between the first and second impulses). The magnitude of different impulses may be different (e.g. the first impulse may be stronger or weaker than the second impulse). The shape of different impulses may be different. (e.g. the first impulse may have a narrow, triangular waveform while the second impulse may have yet another waveform). The probe signal may be adaptive changed over time. The probe signal(s) may be different for different channels, different space-time-frequency channels, different antenna, etc. The probe signal(s) may be different for different Type1 devices and/or Type2 devices. The probe signal may be changed based on a feedback signal (e.g. from one or more Type2 devices). The probe signal(s) may/may comprise data. Some probe signals may comprise data while some other probe signals may not comprise data.

The series of probe signals may be at regular intervals (e.g. 40 probe signals per second, with an interval of 25 ms (1/40 second) between adjacent probe signals), or irregular intervals (e.g. probe signals sent when the wireless channel is less busy or not busy, or probe signals sent in short/longer/long bursts adaptively or on demand). The regular intervals and/or waveform associated with each probe signal may be changed over time. For example, the probe signals may be 40 probe signals per second for a period of time (e.g. 1 day, 1 hour, or 20 seconds), and changed to 2200 probe signals per second for another period of time. The change may be based on a user input, a system command, a task, a change in the task, the venue, a change of the venue, the respective object, a change of the respective object, the respective motion of the respective object, a change of the respective motion of the respective object, and/or the monitoring of the respective object/the respective motion of the respective object. Two of the respective objects may be the same object. Any of the respective objects may be the same object.

There may be more than one heterogeneous Type1 device. The Type1 devices (and/or Type2 devices) may be heterogeneous. For example, a Type1 device (and/or Type2 devices) may be a Wi-Fi access point, another Type1 device (and/or Type2 device) may be a smart TV, and/or yet another Type1 device may be a simple device dedicated to sending the series of probe signals (and/or yet another Type2 device may be a simple device dedicated to receiving the series of probe signals and passing them on). Different Type1 devices (and/or Type2 devices) may have different functionalities, brands (e.g. Sony, Samsung, Philips, Apple, etc), models, size, form factors, shape, color, modules, antennas, circuitry, logic circuits, processors, clock, bus, memory, memory buses, storage, sets of instructions, power (e.g. AC or DC, rechargeable battery, etc), chips (IC), chip sets, firmware, software, network connection, priorities, access rights, security settings, etc. A device may function as a Type1 device and a Type2 device. The device may function as Type1 device at a time and as Type2 device at a different time. The device may function as Type1 device and Type2 device simultaneously.

A heterogeneous Type1 device and/or a heterogeneous Type2 device may comprise an integrated circuits (IC). The IC may be standard compliant. The IC may support more than one standards/protocols 802.11a/b/e/g/n/ac/ax, 2G/2.5G/3G/3.5G/4G/LTE/5G/6G, 802.16, mesh network, adhoc network, beyond 4G, Bluetooth, BLE, another network, UWB, RFID, etc). The Type1 or Type2 device may detect a motion and control another device (e.g. TV, fan, radio, speaker, light, air conditioner, heater, electrical appliance, security system, etc). A heterogeneous Type1 device and/or a Type2 device may comprise more than one antenna. The antennas may be heterogeneous. An antenna may be directional or omni-directional. The antennas may be arranged in a circle/ellipse, in a straight line, in a lattice, or another pattern, or another placing order. A particular heterogeneous Type1 device may/may not establish communication link with a particular Type2 device. The Type 3 device may be a networked server, a cloud server, a fog server, an edge server, a local server, a local client, a smart device, a smart phone, an internet-of-thing device. The Type 3 processor may be a heterogeneous Type1 device, or a heterogeneous Type2 device.

For each Type2 device, and for each of the at least one respective particular pair of Type1 and Type2 devices comprising the Type2 device, at least one respective heterogeneous motion information associated with the motion of the object may be computed (or obtained or calculated or estimated or determined or evaluated) asynchronously based on the at least one respective TSCI associated with the respective particular pair of Type1 and Type2 devices.

The motion of the object in the venue may be monitored individually and asynchronously based on asynchronously computed heterogeneous motion information associated with the pair of Type1 and Type2 devices comprising the particular Type2 device. The motion of the object may be monitored jointly and asynchronously based on asynchronously computed heterogeneous motion information associated with any of the at least one pair of Type1 and Type2 devices associated with the particular Type2 device. The motion of the object may be monitored jointly and asynchronously based on asynchronously computed heterogeneous motion information associated with any of the at least one pair of Type1 and Type2 devices associated with the respective particular Type1 device. The motion of the object may be monitored globally and asynchronously based on asynchronously computed heterogeneous motion information associated with any of the at least one pair of Type1 and Type2 devices. For example, at least one combined score may be computed based on all the scores and the motion of the object may be monitored jointly based on the at leak one combined score. Computation may be shared among the first processor, the second processor, the third processor, a companion processor, a cloud server, a fog server, and/or a local server.

For each Type2 device, and for each of the at least one respective particular pair of Type1 and Type2 devices comprising the Type2 device, a respective heterogeneous similarity score between a respective current window and a respective past window of the at least one respective TSCI associated with the respective particular pair of wireless devices may be computed asynchronously.

The motion of the object in the venue may be monitored individually and asynchronously based on asynchronously computed heterogeneous similarity score associated with the pair of Type1 and Type2 devices comprising the particular Type2 device. The motion of the object may be monitored jointly and asynchronously based on asynchronously computed heterogeneous similarity score associated with any of the at least one pair of Type1 and Type2 devices associated with the particular Type2 device. The motion of the object may be monitored jointly and asynchronously based on asynchronously computed heterogeneous similarity score associated with any of the at least one pair of Type1 and Type2 devices associated with the respective particular Type1 device. The motion of the object may be monitored globally and asynchronously based on asynchronously computed heterogeneous similarity score associated with any of the at least one pair of Type1 and Type2 devices.

Each of the current window and the past window of a (or more than one, or all) TSCI may be represented as or transformed into a vector. The similarity score may be a distance between the two vectors such as absolute distance, Euclidean distance or other distance. The CI (or windows of CI, or sliding window of CI) may be considered a stochastic process. The similarity measure may be a cross-covariance, or auto-covariance. A covariance close to 1 may mean two CIs (or two windows of CI) being very similar (or highly correlated). In the case of CI with zero mean, covariance may become correlation. Inner product may be a way to compute correlation.

The inner product of two vectors: Assuming N components for each CI. A vector associated with a CI may be an N-tuple containing the N components. There may be more than one TSCI, say M time series, with M>=1. A vector associated with the M CI time series, at a particular time, may be a K-tuple, with K=M*N, containing the N components of the M CI at the particular time. Consider a window of a TSCI containing P CI, with P>=1. A vector associated with the window may be a K-tuple, with K=P*N, containing the N components of the P CI of the window. Consider a composite window of M CI time series containing a window of P CI, with P>=1 of each TSCI. A vector associated with the composite window may be a K-tuple, with K=P*M*N, containing the N components of the P CI of the window of each of the M time series. Consider a composite window of M CI time series containing a window of P_i CI, with P_i>=1, of the i^{th} TSCI, for i=1, . . . , M. A vector associated with the composite window may be a K-tuple, with K=(P_1+P_2+ . . . .+P_M)*N, containing the N components of the P_i CI of the window of the i^{th} TSCI, i=1,2, . . . , M.

Each CI of the at least one respective TSCI may have at least one respective component. For each Type2 device, and for each of the at least one respective particular pair of Type1 and Type2 devices comprising the Type2 device, and for each of the at least one respective component, the following may be done: (a) a respective current component window of the component of the at least one respective TSCI may be determined asynchronously based on the respective current window; (b) a respective past component window of the component of the at least one respective TSCI may be determined asynchronously based on the respective past window; (c) the respective current component window may be compared component-wise with the respective past component window asynchronously; and (d) the motion of the object may be monitored component-wise based on the component-wise comparing of the respective current component window and the respective past component window asynchronously.

The motion of the object in the venue may be monitored individually and asynchronously based on asynchronous component-wise comparing associated with the pair of Type1 and Type2 devices comprising the particular Type2 device. The motion of the object may be monitored jointly and asynchronously based on asynchronous component-wise comparing associated with any of the at least one pair of Type1 and Type2 devices associated with the particular Type2 device. The motion of the object may be monitored jointly and asynchronously based on asynchronous component-wise comparing associated with any of the at least one pair of Type1 and Type2 devices associated with the respective particular Type1 device. The motion of the object may be monitored globally and asynchronously based on asynchronous component-wise comparing associated with any of the at least one pair of Type1 and Type2 devices.

For example, each CI may comprise a set/record with N elements (components), a collection of N items/features/characteristics/behavioral measures (components), an N-tuple, a matrix with N columns (with each column being a component), a matrix with N rows (with each row being a component), an N-component vector, an N-component channel response, an N-component time signal, an N-component channel, an N-component channel impulse response (CIR), an N-component frequency signal, an N-component channel frequency response (CFR), etc. The N components may be homogeneous or heterogeneous.

Each component may be different. For example, one component may be a complex number and another component may be a logical value. Each component may be associated with at least one of: frequency, frequency subcarrier, frequency band, time, time lag, time window, time period, and/or count. The amount of CI in the current window (or current component window) and/or the amount of CI in the past window (or past component window) may be the same, or different. The amount of CI in the current window and/or the past window may be time varying. Complex conjugation may be applied.

The comparing may comprise preprocessing, signal conditioning, denoising, phase correction, timing correction, timing compensation, phase offset compensation, transformation, projection, filtering, feature extraction, finite state machine, machine learning, neural network, deep learning, training discrimination, weighted averaging, etc. For example, the past motion information may be past CI, past CI associated with the motion of the object, past comparing, past motion decision, past motion statistics, past scores, past similarity scores, past component similarity scores, past device-wise similarity scores, etc.

For each Type2 device, and for each of the at least one respective particular pair of Type1 and Type2 devices comprising the Type2 device, for each of the at least one component, a component similarity score may be computed asynchronously based on the respective current component window and the respective past component window.

A respective heterogeneous similarity score may be computed asynchronously as a heterogeneous function of the at least one component similarity score. The heterogeneous function may comprise at least one of: representative value, typical value, weighted average, percentile, maximum, minimum, 40% quartile, 50% quartile, 60% quartile, mean, median, mode, sum, product, root, an arithmetic mean, geometric mean, harmonic mean, generalized mean, an ordered statistic, trimmed mean, statistical function, an expected value, variance, selected one, and/or another function.

The motion of the object in the venue may be monitored individually and asynchronously based on at least one of: heterogeneous similarity score, and at least one component similarity score, associated with the pair of Type1, and Type2 devices comprising the particular Type2 device. The motion of the object may be monitored jointly and asynchronously based on at least one of: heterogeneous similarity score, and at least one component similarity score, associated with any of the at least one pair of Type1 and Type2 devices associated with the particular Type2 device. The motion of the object may be monitored jointly and asynchronously based on at least one of: heterogeneous similarity score, and at least one component similarity score, associated with any of the at least one pair of Type1 and Type2 devices associated with the respective particular Type1, device. The motion of the object may be monitored globally and asynchronously based on at least one of: heterogeneous similarity score, and at least one component similarity score, associated with any of the at least one pair of Type1 and Type2 devices.

The function may comprise at least one of: representative value, typical value, weighted average, percentile, maximum, minimum, 10% quartile, 20% quartile, 30% quartile, 40% quartile, 50% quartile, 60% quartile, 70% quartile, 80% quartile, 90% quartile, mean, median, mode, sum, product, root, an arithmetic mean, geometric mean, harmonic mean, generalized. mean, an ordered statistics, trimmed mean, statistical function, an expected value, variance, thresholding, counting, and/or selected one.

The feature extraction may comprise at least one of: sampled feature, statistical feature, time domain feature, frequency domain feature, decomposition, singular value decomposition, principal component analysis, an independent component analysis, preprocessing, signal processing, postprocessing, transformation, linear processing, nonlinear processing, signal conditioning, signal processing, representative value, typical value, weighted average, percentile, maximum, minimum, 10% quartile, 20% quartile, 30% quartile, 40% quartile, 50% quartile, 60% quartile, 70% quartile, 80% quartile, 90% quartile, mean, median, mode, sum, product, root, an arithmetic mean, geometric mean, harmonic mean, generalized mean, an ordered statistics, trimmed mean, statistical function, an expected value, variance, thresholding, clustering, training, machine learning, neural network, deep learning, counting, and/or robust processing, etc.

For each Type2 device, and for each of the at least one respective particular pair of Type1 and Type2 devices comprising the Type2 device, for each of the at least one component, the motion of the object may be detected component-wise asynchronously when the respective component similarity score is at least one of: greater than, and equal to, a respective component threshold.

The motion of the object in the venue may be detected individually and asynchronously when at least one of: a first function of heterogeneous similarity score associated with the pair of Type1 and Type2 devices comprising the particular Type2 device is at least one of: greater than, and equal to, a respective first individual threshold, and/or a first percentage of component-wise motion detection in a first selected group of components associated with the pair of Type1 and Type2 devices comprising the particular Type2 device is at least one of: greater than, and equal to, a respective second individual threshold. The motion of the object may be detected jointly and asynchronously when at least one of: a second function of heterogeneous similarity scores associated with any of the at least one pair of Type1 and Type2 devices comprising the particular Type2 device is at least one of: greater than, and equal to, a respective first joint threshold, and/or a second percentage of component-wise motion detection in a second selected group of components associated with any of the at least one pair of Type1 and Type2 devices comprising the particular Type2 device is at least one of: greater than, and equal to, a respective second joint threshold. The motion of the object may be detected jointly and asynchronously when at least one of: a third function of heterogeneous similarity scores associated with any of the at least one pair of Type1 and Type2 devices associated with the respective particular Type1 device is at least one of: greater than, and equal to, a respective third joint threshold, and/or a third percentage of component-wise motion detection in a third selected group of components associated with any of the at least one pair of Type1 and Type2 devices associated with the respective particular Type1 device is at least one of: greater than, and equal to, a respective fourth joint threshold. The motion of the object may be detected globally and asynchronously when at least one of: a fourth function of heterogeneous similarity scores associated with any of the at least one pair of Type1 and Type2 devices is at least one of: greater than, and equal to, a respective first global threshold, and/or a fourth percentage of component-wise motion detection in a fourth selected group of components associated with any of the at least one pair of Type1 and Type2 devices is at least one of: greater than, and equal to, a respective second global threshold.

The first function, second function, third function and/or fourth function may be a linear function, nonlinear function, an average, weighted average, an arithmetic mean, geometric mean, harmonic mean, generalized mean, trimmed mean, robust mean, weighted mean, median, a mode, and/or another function. Two or more of the first function, second function, third function and/or fourth function may be mathematically similar. The individual threshold and/or the joint threshold may be 0.1, 0.2, 0.3, 0.4, 0.5, 0.6, 0.7, 0.8, 0.9 and/or another threshold. It may be time varying. Two or more thresholds may be the same or different for some current time.

The motion of the object in the venue may be monitored asynchronously further based on another TSCI of another wireless multipath channel impacted by the motion of the object in the venue. The another TSCI may be extracted from another asynchronous heterogeneous wireless (or radio or RF) signal transmitted from an asynchronous heterogeneous Type 3 wireless device to an asynchronous heterogeneous Type 4 wireless device through the another wireless multipath channel. For example, Type1 and Type2 devices may be Wi-Fi devices, while Type 3 and Type 4 devices may be LTE, BLE, RFID or a another Wi-Fi devices. For example, Type1 and Type2 may be Wi-Fi at 2.4 GHz while Type 3 and Type 4 devices may be Wi-Fi 5 GHz.

The selected group of components (e.g. First, second, third, fourth selected group of components) may be a group of significant components, a group of insignificant components, important components, un-important components, improving components, decaying components, good components, bad components, components with certain behavior/trend, opinion-influencing components, targeted components, components with significant energy, a group of decomposition components with significant energy, a group of components significant/useful/sensitive for the monitoring, a group of components learned in a training stage, a group of components selected in some ways. For example, the selected component may be sensitive/revealing/differentiating/discriminating to some targeted event to be monitored. Two or more of the first, second, third, fourth selected group of components may overlap, and/or be the same. For example, majority vote may be performed with the threshold being 0.5 (50%). The motion may be detected if the percentage is greater than 50%.

For each Type2 device, and for each of the at least one respective particular pair of Type1 and Type2 devices comprising the Type2 device, at least one respective heterogeneous motion information associated with the motion of the object may be computed asynchronously based on the at least one respective TSCI associated with the respective particular pair of Type1 and Type2 device.

A respective current window of the at least one respective TSCI associated with the respective particular pair of wireless devices with a respective past window of the at least one respective TSCI may be compared asynchronously. A respective heterogeneous similarity score between the respective current window and the respective past window of the at least one respective TSCI may be computed asynchronously.

The motion of the object in the venue may be monitored individually and asynchronously based on asynchronously computed heterogeneous motion information and heterogeneous similarity score associated with the pair of Type1 and Type2 devices comprising the particular Type2 device. The motion of the object may be monitored jointly and asynchronously based on asynchronously computed heterogeneous motion information and heterogeneous similarity score associated with any of the at least one pair of Type1 and Type2 devices associated with the particular Type2 device. The motion of the object may be monitored jointly and asynchronously based on asynchronously computed heterogeneous motion information and heterogeneous similarity score associated with any of the at least one pair of Type1 and Type2 devices associated with the respective particular Type1 device. The motion of the object may be monitored globally and asynchronously based on asynchronously computed heterogeneous motion information and heterogeneous similarity score associated with any of the at least one pair of Type1 and Type2 devices.

For example, the Type1 and Type2 devices may be Wi-Fi devices (with the wireless (or radio or RF) signal being a Wi-Fi signal), while the Type 3 and Type 4 devices may be LTE devices (with the another wireless (or radio or RF) signal being an LTE signal). In another example, the Type1 and Type2 devices may be Wi-Fi devices using a Wi-Fi network with a first SSID (e.g. “my home network”), while the Type 3 and Type 4 devices may be Wi-Fi devices using a Wi-Fi network with a second SSID (e.g. “Your Neighborhood”). In another example, the Type1, Type2, Type 3 and Type 4 devices may be in the same Wi-Fi network. The Type1 and Type2 devices may be using 20 MHz bandwidth, while the Type 3 and Type4 devices may be using 40 MHz bandwidth.

The Type1 device and the Type 3 device may be the same device, or different devices. A Type2 device and a Type 4 device may be the same device. Type1 devices may be Type 3 devices, and vice versa. Type2 devices may be Type 4 devices, and vice versa.

A map of the venue may be partitioned into more than one regions. The motion of the object may be associated asynchronously with at least one of the more than one regions of the map of the venue based on at least one of: (a) asynchronously computed heterogeneous motion information associated with the pair of Type1 and Type2 devices comprising the particular Type2 device, (b) asynchronously computed heterogeneous motion information associated with any of the at least one pair of Type1 and Type2 devices associated with the particular Type2 device, (c) asynchronously computed heterogeneous motion information associated with any of the at least one pair of Type1 and Type2 devices associated with the respective particular Type1 device, and (d) asynchronously computed heterogeneous motion information associated with any of the at least one pair of Type1 and Type2 devices.

The respective similarity score may be one of the at least one respective motion information. The respective current window may have same or different duration (or length) as the respective past window. Current windows associated with different Type2 devices may be different. Past windows associated with different Type2 devices may also be different. The current window and the past window may have same amount of CI, same time duration, same pre-processing, same processing, same post-processing, and/or same settings. The current window and the past window may have different amount of CI, different time duration, different pre-processing, different processing, different post-processing, and/or different settings.

For each respective pair of Type1 and Type2 devices, a respective feature space of the at least one respective heterogeneous motion information may be partitioned associated with the respective pair of Type1 and Type2 devices into more than one respective feature segments. A respective mapping that associates each respective feature segment with at least one of the more than one regions of the map of the venue may be constructed. The motion of the object may be associated asynchronously individually with at least one of the more than one regions of the map of the venue based on the respective mapping. A joint feature space of heterogeneous motion information associated with more than one pairs of Type1 and Type2 devices may be partitioned into more than one joint feature segments. A joint mapping that associates each joint feature segment with at least one of the more than one regions of the map of the venue may be constructed. The motion of the object may be associated with the particular one of the more than one regions of the map of the venue based on the joint mapping.

Two or more of the more than one regions may overlap. A region may be a subset of another region. A region may be a union of more than one other regions. A location of a region may be related to a location of one or more Type2 device. The map and/or the regions may be 1-dimensional, 2-dimensional, 3-dimensional or higher-dimensional. A 2D region may be a rectangular, square, circle, ellipse or other shapes. A region may be concave, or convex. Some regions may be large. Some may be small. The more than one regions may comprise a decomposition (e.g. multi-resolution decomposition) of the venue into disjoint regions or overlapping regions. The more than one regions may be regular or irregular.

For each respective pair of Type1 and Type2 devices, a respective heterogeneous similarity score between a respective current window and a respective past window of the at least one respective TSCI associated with the respective pair of Type1 and Type2 devices may be computed asynchronously.

The motion of the object in the venue may be detected individually and asynchronously when a first function of heterogeneous similarity score associated with the pair of Type1 and Type2 devices comprising the particular Type2 device is at least one of: greater than, and equal to, a respective individual threshold. The motion of the object in the venue may be detected jointly and asynchronously when a second function of heterogeneous similarity scores associated with any of the at least one pair of Type1 and Type2 devices comprising the particular Type2 device is at least one of: greater than, and equal to, a respective joint threshold. The motion of the object in the venue may be detected jointly and asynchronously when a third function of heterogeneous similarity scores associated with any of the at least one pair of Type1 and Type2 devices associated with the respective particular Type1 device is at least one of: greater than, and equal to, another respective joint threshold. The motion of the object in the venue may be detected globally and asynchronously when a fourth function of heterogeneous similarity scores associated with any of the at least one pair of Type1 and Type2 devices is at least one of: greater than, and equal to, a respective global threshold.

A feature may be a motion information, or a feature/characteristics/a function of one or more motion information. The features may be heterogeneous. For example, one feature may be a real number, another feature may be a boolean, another may be a complex number/vector, another may be a set, and yet another may be a collection of things. A feature may be obtained by applying an operation on one or more motion information. A feature space may be a space or a subspace. A feature space may be spanned by one or more of the features. Some feature segments may be partitioned/bound/defined by hyperplanes and/or manifolds. Some feature segments may be partitioned/defined by scalar quantization and/or vector quantization. The feature space may be decomposed/divided into cells (e.g. "rectangular" cell of unity length in all dimensions). A feature segment may be a union of adjacent cells or non-adjacent cells. The joint feature space may be a union of the respective feature space. The dimension of the feature space of different Type2 devices may be different. The respective mapping or the joint mapping may be one-to-one, many-to-one, one-to-many, or many-to-many. The mapping may be onto.

An information may be signaled, presented, displayed, played, transmitted, stored asynchronously by a monitoring device. The information may be associated with at least one of: the map of the venue, the more than one partitioned regions of the map, regions associated with any detected motion of the object, heterogeneous motion information associated with at least one pair of Type1 and Type2 devices, component similarity score, heterogeneous similarity score, past motion information, past similarity score, another past information, Type1 devices, Type2 devices, Type 3 devices, and/or Type 4 devices. The signaling may comprise analysis, decomposing, transforming, processing, filtering, ordering, arranging, formating, organizing, presenting, displaying, playing, transmitting, and/or storing.

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, a status of a device/machine, remaining power of a device, a status of the device, etc). The rate of change, the size, the orientation, the color, the intensity and/or the symbol may reflect the respective motion. The information may be described verbally (e.g. using pre-recorded voice, or voice synthesis). The information may be described in text. The information may also be presented in a mechanical way (e.g. an animated gadget, a movement of a movable part).

The user-interface (UI) device may be smart phone (e.g. an iPhone, an Android phone), tablet (e.g. iPad), laptop (e.g. notebook computer), personal computer (PC), device with graphical user interface (GUI), smart speaker, device with voice/audio/speaker capability, virtual reality (VR) device, an augmented reality (AR) device, smart car, display in the car, voice assistant, voice assistant in car, The map may be 2-dimensional map, 3-dimensional map and/or higher-dimensional map. (e.g. time varying 2D/3D map) Walls, windows, doors, entrances, exits, forbidden areas may be marked on the map. The map may comprise floor plan of facility. The map may have one or more layers (overlays). The map may be maintenance map comprising at least one of: water pipes, gas pipes, wiring, cabling, air ducts, crawl-space, ceiling layout, underground layout.

In another embodiment, a wireless (or radio or RF) monitoring system comprises at least one asynchronous heterogeneous Type1 wireless (or radio) device and at least one asynchronous heterogeneous Type2 wireless (or radio or RF) device. The wireless (or radio or RF) monitoring system comprises at least one pair of Type1 and Type2 devices, each pair comprising one of the at least one Type1 device, and one of the at least one Type2 device.

A particular asynchronous heterogeneous Type2 device is in at least one particular pair of Type1 and Type2 devices of the wireless (or radio or RF) monitoring system. The particular Type2 device is associated with at least one particular Type1 device through the at least one particular pair of Type1 and Type2 devices.

The particular asynchronous heterogeneous Type2 device of the wireless (or radio) monitoring system comprises a wireless circuitry, a second heterogeneous processor, a second heterogeneous memory and a second heterogeneous set of instructions.

The wireless circuitry receives asynchronously at least one asynchronous heterogeneous wireless (or radio or RF) signal. Each asynchronous heterogeneous wireless (or radio or RF) signal is transmitted asynchronously by one of the at least one particular Type1 device using a respective first heterogeneous processor, a respective first heterogeneous memory and a respective first heterogeneous set of instructions of the Type1 device to at least one asynchronous heterogeneous Type2 device through a wireless multipath channel impacted by a motion of an object in a venue.

The second heterogeneous processor is communicatively coupled with the wireless circuitry. The second heterogeneous memory is communicative coupled with the second heterogeneous processor. The second heterogeneous set of instructions is stored in the second heterogeneous memory which, when executed, cause the second heterogeneous processor to, for each of the at least one particular pair of Type1 and Type2 devices, obtain asynchronously at least one respective series of CI (TSCI) of the wireless multipath channel. The at least one respective TSCI associated with the particular pair of Type1 and Type2 devices is being extracted asynchronously from the respective asynchronous heterogeneous wireless (or radio or RF) signal received asynchronously by the wireless circuitry.

One of the following is performed: (a) the motion of the object in the venue is monitored individually and asynchronously, using a third processor, a third memory and a third set of instructions of a Type 3 device, based on TSCI associated with a pair of Type1 and Type2 devices comprising the particular Type2 device; (b) the motion of the object is monitored jointly and asynchronously based on TSCI associated with any pairs of Type1 and Type2 devices comprising the particular Type2 device; (c) the motion of the object is monitored jointly and asynchronously based on TSCI associated with any pairs of Type1 and Type2 devices comprising one of the at least one particular Type1 device; and/or (d) the motion of the object is monitored globally and asynchronously based on TSCI associated with any pairs of Type1 and Type2 devices.

In another embodiment, a wireless (or radio or RF) monitoring system comprises at least one asynchronous heterogeneous Type1 wireless (or radio or RF) device and at least one asynchronous heterogeneous Type2 wireless (or radio or RF) device. The wireless (or radio) monitoring system comprises at least one pair of Type1 and Type2 devices, each pair comprising one of the at least one Type1 device, and one of the at least one Type2 device.

The particular asynchronous heterogeneous Type1 device is in at least one particular pair of Type1 and Type2 devices of the wireless (or radio) monitoring system. The particular Type1 device is associated with at least one particular Type2 device through the at least one particular pair of Type1 and Type2 devices.

A particular asynchronous heterogeneous Type1 device of a wireless (or radio) monitoring system comprises: a wireless circuitry, a first processor, a first memory and a first set of instructions. The first processor is communicatively coupled with the wireless circuitry. The first memory is communicative coupled with the first processor. The first set of instructions is stored in the first memory which, when executed, cause the first processor to transmit asynchronously using the wireless circuitry an asynchronous heterogeneous wireless (or radio or RF) signal from the particular Type1 device to the at least one particular Type2 device through a wireless multipath channel impacted by a motion of an object in a venue.

For each of the at least one particular Type2 device, at least one series of CI (TSCI) of the wireless multipath channel extracted from the asynchronous heterogeneous wireless (or radio or RF) signal transmitted by the wireless circuitry is obtained by the Type2 device using a second processor, a second memory and a second set of instructions of the Type2 device.

At least one of the following is performed: (a) the motion of the object in the venue is monitored individually and asynchronously, using a third processor, a third memory and a third set of instructions of a Type 3 device, based on TSCI associated with a pair of Type1 and Type2 devices comprising the particular Type1 device, (b) monitoring the motion of the object jointly and asynchronously based on TSCI associated with any pairs of Type1 and Type2 devices comprising the particular Type1 device, (c) monitoring the motion of the object jointly and asynchronously based on TSCI associated with any pairs of Type1 and Type2 devices comprising one of the at least one particular Type2 device, and (d) monitoring the motion of the object globally and asynchronously based on TSCI associated with any pairs of Type1 and Type2 devices.

In another embodiment, a wireless (or radio or RF) monitoring system comprises at least one asynchronous heterogeneous Type1 wireless (or radio or RF) device and at least one asynchronous heterogeneous Type2 wireless (or radio or RF) device. The wireless (or radio) monitoring system comprises at least one pair of Type1 and Type2 devices, each pair comprising one of the at least one asynchronous heterogeneous Type1 device, and one of the at least one asynchronous heterogeneous Type2 device.

A Type 3 device of the wireless (or radio) monitoring system comprises a third processor, a third memory and a third set of instructions. The third processor is communicatively coupled with at least one of: at least one asynchronous heterogeneous Type1 device, and at least one asynchronous heterogeneous Type2 device. The third memory is communicative coupled with the third processor. The third set of instructions is stored in the third memory.

When executed, the third set of instructions causes the third processor to, for each Type2 device, and for each of the at least one pair of Type1 and Type2 devices comprising the Type2 device, receive asynchronously at least one respective TSCI (TSCI) of a wireless multipath channel impacted by a motion of an object in a venue.

Each TSCI is obtained asynchronously by the Type2 device using a respective second processor, a respective second memory and a respective second set of instructions of the Type 2 device. The at least one respective TSCI associated with the respective pair of Type1 and Type 2 devices is extracted asynchronously from a respective asynchronous heterogeneous wireless (or radio or RF) signal. The respective asynchronous heterogeneous wireless (or radio or RF) signal is transmitted from a respective Type1 device of the respective pair using a respective first processor, a respective first memory and a respective first set of instructions of the respective Type1 device to at least one asynchronous heterogeneous Type2 device through the wireless multipath channel. When executed, the third set of instructions further causes the third processor to do at least one of the following: (a) monitor the motion of the object in the venue individually and asynchronously, based on TSCI associated with a particular pair of Type1 and Type2 devices comprising a particular Type2 device and a particular Type1 device, (b) monitor the motion of the object jointly and asynchronously based on TSCI associated with any of the at least one pair of Type1 and Type2 devices associated with the particular Type2 device, (c) monitor the motion of the object jointly and asynchronously based on TSCI associated with any of the at least one pair of Type1 and Type2 devices associated with the particular Type1 device, and/or (d) monitor the motion of the object globally and asynchronously based on TSCI associated with any of the at least one pair of Type1 and Type2 devices.

In addition, sleep monitoring acts as a critical and challenging task that attracts increasing demands and interests. The present teaching discloses the model, design, and implementation of SMARS (Sleep Monitoring via Ambient Radio Signals), which is the first practical Sleep Monitoring system that exploits Ambient Radio Signals to recognize sleep stages and assess sleep quality. This will enable a future smart home that monitors daily sleep in a ubiquitous, non-invasive and contactless manner, without instrumenting the subject's body or the bed. Different from previous RF-based approaches, the present teaching devises a statistical model that accounts for all reflecting and scattering multipaths, allowing highly accurate and instantaneous breathing estimation with ever best performance achieved on commodity devices. On this basis, SMARS then recognizes different sleep stages, including wake, REM, and NREM, which is previously only possible with dedicated hardware. A real-time system is implemented on commercial WiFi chipsets and deployed in 6 homes with 6 participants, resulting in 32 nights of data in total. The results demonstrate that SMARS yields a median error of 0.47 bpm and a 95% error of only 2.92 bpm for breathing estimation, and detects breathing robustly even when a person is 10 m away from the link, or behind a wall. SMARS achieves sleep staging accuracy of 85%, outperforming advanced solutions using contact sensor or radar. Furthermore, SMARS is evaluated upon a recently released dataset that measures 20 patients' overnight sleep, which confirms the performance. By achieving promising results with merely a single commodity RF link, SMARS will set the stage for a practical in-home sleep monitoring solution.

Sleep plays a vital role in an individual's health and well-being, both mentally and physically. It is well recognized that sleep quantity and quality is fundamentally related to health risks like cardiovascular decease, stroke, kidney failure, diabetes, and adverse mental conditions, etc. Unfortunately, in modern society, a number of people suffer from sleep disorders. As recently reported, 10% of the population suffers from chronic insomnia (which is even higher among elders), and ⅓ of Americans do not get sufficient sleep. Monitoring sleep emerges as an essential demand to help, manage, diagnose, and treat the growing group of sleep disorders as well as to keep regular tabs on personal health.

Sleep monitoring, however, is a challenging task that has drawn tremendous efforts for decades. Generally, it measures sleep time, recognizes different sleep stages, e.g., wake, REM (Rapid Eye Movement) and NREM (Non-REM), and accordingly assesses an individual's sleep quality. Various solutions have been proposed. The medical gold standard relies on Polysomnography (PSG), which monitors various physiological parameters such as brain activities, respirations, and body movements by a number of wired sensors attached to the patient. Albeit accurate and comprehensive, PSG is usually expensive and cumbersome with the invasive sensors that may cause sleep difficulties, limiting itself to clinical usage for confirmed patients. Other approaches including photoplethysmography (PPG) and actigraphy (ACT) require users to wear dedicated sensors during sleep. Ballistocardiogram (BCG) needs to instrument the mattress with an array of EMFi sensors to measure ballistic force. Despite of the costs, these approaches provide suitable solutions for those who need special cares but are less-than-ideal for the public. Recent efforts in mobile computing envision in-home sleep monitoring using smartphones and wearables. These methods, however, only provide coarse-grained, less accurate measurements and fail to monitor vital signs like respiratory rate. In addition, mobiles and wearables are undesirable for especially elders and those with dementia.

Different from prevailing solutions, the disclosed solution looks forward to a future smart home that monitors daily sleep in a ubiquitous, non-invasive, contactless, and accurate manner, without instrumenting the body or the bed. One can observe an opportunity towards such a system by two perspectives: 1) Clinical study has shown that physiological activity varies among different sleep stages. For example, breathing rate becomes irregular and fast since brain oxygen consumption increases during REM sleep, and is more stable and slower during NREM sleep, rendering the feasibility of sleep staging based on breathing monitoring. 2) Recent advances in wireless technology have demonstrated non-contact sensing of body motions in the environments. Chest and abdomen motions caused by breathing can alter radio signal propagations and thus modulate the received signals, from which it is then possible to decipher breathing. One can explore a synergy between the two perspectives, resulting in a system to leverage ambient radio signals (e.g., WiFi) to capture a person's breathing and motion during sleep and further monitor the sleep behaviors.

While early works have investigated the feasibility of RF-based breathing estimation and sleep monitoring, they either rely on specialized hardware like FMCW radar, or only work in controlled environments. Solutions based on dedicated radios are usually expensive and not ubiquitously applicable. Others using commodity devices typically require the user to lay still on a bed with radios exceedingly close to his/her chest and fail in presence of extraneous motions or in Non-Line-Of-Sight (NLOS) scenarios. In addition, none of them can identify different sleep stages due to their limited accuracy in breathing estimation. Such limitations prevent them from application for practical in-home sleep monitoring.

The present teaching disclose the model, design, and implementation of SMARS, the first practical Sleep Monitoring system that exploits commodity Ambient Radio Signals to recognize sleep stages and assess the otherwise elusive sleep quality. SMARS works in a non-obtrusive way without any body contact. All that a user needs to do is to set up one single link between two commodity radios by, e.g., simply placing a receiver if a wireless router is already installed inside the home. SMARS advances the literature by a novel statistical model that allows highly accurate and instantaneous breathing estimation. On this basis, SMARS is able to distinguish different sleep stages, which is previously only obtainable by expensive dedicated hardware. Specifically, SMARS excels in three unique aspects to deliver practical sleep monitoring. First, one can devise a statistical model on motion in Channel State Information (CSI) that leverages all reflection and scattering multipaths indoors. Existing works usually assume a geometrical model with a few multipaths and one major path reflected off the human body (e.g., using a 2-ray model developed for outdoor space). Under real-world indoor environments, however, there could be as many as hundreds of multipaths, and signals not only reflect but also scatter off a person's body and other objects in the space. As a consequence, previous approaches fail in NLOS environments and for minute motions due to the lack of a dominant reflection path. In contrast, the disclosed model investigates the statistical characteristics of motion in CSI without making such unrealistic assumptions, underlying robust detection of arbitrary motions including breathing.

Second, SMARS achieves accurate respiratory rate estimation instantaneously and robustly. Most of previous breathing estimation schemes assume constant breathing rate during a relatively large time window to gain sufficient frequency resolution, losing fine-grained breathing variations during sleep. In addition, minute breathing motions can be easily buried in CSI measurement noises, rendering existing philosophies effective only in extraordinary close proximity (typically within 2~3 m) without any extraneous motions. To improve time resolution, SMARS exploits the time-domain Auto-Correlation Function (ACF) to estimate breathing rate, which can report real-time breathing rates as frequent as every one second and make it possible to capture instantaneous breathing rate changes. By using ACF, SMARS also circumvents the use of noisy phase and the usually handcrafted CSI denoising procedure. More importantly, by eliminating the frequency offsets and thus synchronizing breathing signal over different subcarriers, ACF allows one to perform Maximal Ratio Combining (MRC) to combine multiple subcarriers to combat measurement noises and maximize breathing signals in an optimal way. By doing so, one can push the limit of the breathing signal to noise ratio (SNR) and thus significantly increase the sensing sensitivity for larger coverage as well as weaker breathing. Specifically, SMARS can reliably detect breathing when a person is 10 m away from the link, or behind a wall, which is even better than specialized low-power radars.

Finally, based on the extracted breathing rates and motion statistics during sleep, one can recognize different sleep stages (including wake, REM and NREM) and comprehensively assess the overall sleep quantity and quality. Based on in-depth understanding of the relationship between breathing rates and sleep stages, one can extract distinctive breathing features for classification for sleep staging. None of existing works using off-the-shelf devices can achieve the same goal of staging sleep.

A real-time system has been implemented on different commercial WiFi chipsets and its performance is evaluated through extensive experiments. The evaluation includes two parts: 1) One can deploy SMARS in 6 homes with 6 healthy subjects and collect 32 nights of data, 5 out of which have PSG data recorded by commercial devices. The results show that SMARS achieves great performance, with a median breathing estimation error of 0.47 breath per minute (bpm) and a 95% tile error of 2.92 bmp. Regarding sleep staging, SMARS produces a remarkable accuracy of 85.2%, while commercial solutions, e.g., EMFIT based on contact sensors and ResMed using radar, have accuracies of only 69.8% and 83.7% respectively. 2) One can further validate SMARS on a recently released dataset on RF-based respiration monitoring. The dataset collected 20 patients' overnight sleep for comparative evaluation of four state-of-the-art breathing monitoring systems, using clinically labeled PSG data as ground truths. All the four systems (based on ZigBee, Sub-RSS radio, UWB radar, and WiFi CSI, respectively) produce significant median errors of about 2~3 bpm and 95% tile errors of around or above 10 bpm. As comparison, SMARS achieves significant improvements by decreasing the median error to 0.66 bpm and the 95% tile error to 3.79 bpm. By achieving promising performance, SMARS can deliver clinically meaningful sleep monitoring for daily and regular use in practice and takes an important step towards a future smart home that monitors personal health everyday life.

In a nutshell, the core contribution here is SMARS, the first system that enables a smart home to stage an inhabitant's sleep using commodity off-the-shelf WiFi devices, by achieving highly accurate and instantaneous breathing estimation in the wild. SMARS also contributes the first statistical model for understanding and capturing motions in CSI, which will renovate various applications in wireless sensing.

In one embodiment, the present teaching discloses a method, apparatus, and a system for sleep monitoring. The disclosed method comprises: obtaining a TSCI of a wireless multipath channel using a processor, a memory communicatively coupled with the processor and a set of instructions stored in the memory, and monitoring the sleep-related motion of the user based on the TSCI. The TSCI is extracted from a wireless signal transmitted between a Type1 heterogeneous wireless device and a Type2 heterogeneous wireless device in a venue through the wireless multipath channel. The wireless multipath channel is impacted by a sleep-related motion of a user in the venue.

Monitoring the sleep-related motion comprises monitoring at least one of the following of the user: sleep timings, sleep durations, sleep stages, sleep quality, sleep apnea, sleep problems, sleep disorders, breathing problems, gasping, choking, teeth-grinding, pause of sleep, absence of sleep, insomnia, restlessness during sleep, hypersomnia, parasomnia, day-time sleepiness, sleep locations, sleep-while-driving, sleep disruptions, nightmares, night terrors, sleep walking, REM sleep behavior disorder, Circadian rhythm disorder, non-24-hour sleep-wake disorder, periodic limb movement disorder, shift-work sleep disorder, narcolepsy, confusional arousals, sleep paralysis, another sleep-related condition, and/or another sleep-related behavior. Sleep timings comprises timings of at least one of: go-to-bed, sleep-onset, wake-up, REM-onset, NREM-onset, onset of sleep stage transitions, sleep disorders, sleep problems, breathing problems, insomnia, hypersomnia, parasomnia, sleep hypnogram-related events, sleep disruptions, sleep apnea, snoring during sleep, sleeping-not-on-a-bed, day-time sleep, sleep-walking, sleep-related events, sleep-related condition, and/or, sleep-related behavior, etc. Sleep stages comprises at least one of: wake-up, rapid-eye-movement (REM) and/or non-REM (NREM). At least one of: a time function of breathing rate, and a time function of motion statistics, of the user may be computed based on the TSCI. If breathing is not detected at time t, the breathing rate at time t may be computed as zero. The sleep-related motion of the user may be monitored based on at least one of: the time function of breathing rate, and/or the time function of motion statistics, of the user.

At least one of: a time function of breathing ratio, and a time function of motion ratio, of the user may be computed based on the TSCI. The breathing ratio at time t may be computed as percentage of time when the time function of breathing rate is non-zero in a first time window comprising the time t. The motion ratio at time t may be computed as percentage of time when the time function of motion statistics is larger than a first threshold within a second time window comprising the time t. The sleep-related motion of the user may be monitored based on at least one of: the time function of breathing ratio, and/or the time function of motion ratio, of the user.

A sleep stage may be classified as "awake" if at least one of: the motion ratio is greater than a second threshold, and/or the breathing ratio is less than a third threshold. The sleep stage may be classified as "asleep" if at least one of: the motion ratio is less than the second threshold, and/or the breathing ratio is greater than the third threshold. The "asleep" stage may comprise at least one of: rapid-eye-movement (REM) stage, and/or non-REM (NREM) stage.

A breathing rate trend function may be computed by low-pass filtering the time function of breathing rate. A detrended breathing rate function may be computed by subtracting the breathing rate trend function from the time function of breathing rate. A time function of breathing rate variance may be computed by computing variance of the detrended breathing rate function within a sliding time window. The sleep-related motion of the user may be monitored based on the time function of breathing rate variance.

An average NREM breathing rate may be computed by identifying a peak of a histogram of the time function of breathing rate in "asleep" stage in an overnight period. (e.g. the whole night, or the whole night subtracting any "awake" periods). A time function of breathing rate deviation may be computed by computing a distance between the average NREM and a percentile of the breathing rate within a sliding time window. The sleep stage may be classified as at least one of: REM stage and/or NREM stage, based on the time function of breathing rate deviation.

A time function of breathing rate variance may be computed by computing variance of a detrended breathing rate function within a first sliding time window. A time function of breathing rate deviation may be computed by computing a distance between an average NREM and a percentile of the breathing rate within a second sliding time window. The sleep stage may be classified as at least one of: REM stage, and/or NREM stage, based on the time function of breathing rate variance and the time function of breathing rate deviation.

A classifier may be trained based on at least one of: breathing rate variance, and breathing rate deviation, using machine learning. The machine learning may comprise at least one of: supervised learning, unsupervised learning, semi-supervised learning, active learning, reinforcement learning, support vector machine, deep learning, feature learning, clustering, regression, and/or dimensionality reduction. The sleep stage may be classified as at least one of: REM stage, and/or NREM stage, based on the classifier.

A quantity related to the sleep-related motion of the user may be computed based on the TSCI. The sleep-related motion of the user may be monitored based on the quantity. The quantity may comprise at least one of: the time the user goes to bed, the time the user gets out of bed, the sleep onset time, total time it takes the user to fall asleep, the wake up time, sleep disruption time, number of sleep disruption period, mean disruption duration, variance of disruption duration, total time in bed, total time the user is asleep, time periods of REM, time periods of NREM, time periods of awake, total time of REM, total time of NREM, number of REM periods, number of NREM periods, time of toss and turn in bed, duration of tossing and turning, hypnogram, periods of apnea, periods of snore, total duration of apnea, number of apnea periods, average duration of apnea period, periods of breathing problems, sleep quality score, daytime sleep, time periods of daytime sleep, total duration of daytime sleep, number of period of daytime sleep, average duration of period of daytime sleep, and another quantity.

FIG. 29 summarizes a proposed scheme for breathing signal extraction and maximization. The left part of FIG. 29 shows the decomposition of the measured ACF of the channel power response when a person breathes normally in the monitored area, and the right part shows the MRC scheme for boosting the SNR of the ACF of the breathing signal. FIG. 30 depicts an illustrative example based on real-world measurements, where the SNR of the breathing signal is amplified by 2.5 dB compared to the best subcarrier indicated by largest variance and by 3.7 dB compared to directly averaging all subcarriers. FIG. 31 further demonstrates the gains of the disclosed ACF-based MRC scheme and confirms the observations herein that amplitudes and their variances are not effective metrics for subcarrier selection. As seen, the subcarrier that is the most sensitive to motion (i.e., holding the largest motion statistic) could experience very small amplitude and low variance.

Sleep Stage Recognition

SMARS divides the continuous motion and breathing estimates of overnight sleep into 300-second epochs. For each epoch, SMARS recognizes three different sleep stages, i.e., wake, REM sleep and NREM sleep. The staging is performed in two steps: First, SMARS differentiates wake from sleep mainly by body motions; Second, REM and NREM stages are further identified during sleep period.

Sleep/Wake Detection, SMARS first implements a sleep-wake detector to identify the sleep and wake states. The key insight is that, more frequent body movements will be observed when a subject is awake, while mainly breathing motion presents when he/she is asleep. Since bodily movements are significantly stronger than breathing motions, and both of them can be easily captured and quantified by the motion statistic defined herein, SMARS utilizes it to distinguish between sleep and wake states.

Specifically, one can define motion ratio as the percentage of time when the motion statistic, $\hat{\rho}_b(1/F_s)$ is larger than a preset threshold. Thus for the wake state, a higher motion ratio is expected, as shown in FIG. 32A. Similarly, one can also define breathing ratio as the percentage of time when the breathing signal is detected. Since bodily movements destroy the periodicity of the environmental dynamics, the breathing ratio will be lower when a subject is awake, as shown in FIG. 32B.

Combining the above two features, SMARS identifies an epoch as sleep only when the motion ratio is smaller than the predefined threshold and the breathing ratio is larger than the other threshold. Both thresholds are empirically determined as in FIG. 32A and FIG. 32B. Since the disclosed model statistically considers all multipaths indoors, the values of both thresholds generalize to different environments and subjects.

REM/NREM Recognition. SMARS exploits the following clinical facts and accordingly extracts two distinctive features from breathing rate estimates for REM/NREM stages classification: Breathing rate is usually faster and presents higher variability and irregular patterns for REM stage, while more stable and slower for NREM stage.

Since NREM stage constitutes the majority (about 75% to 80%) of total sleep for typical healthy adults, the average breathing rate during NREM stage can be estimated by localizing the peak of the histogram of overnight breathing rate estimates, as shown in FIG. 33A. On this basis, one can define breathing rate deviation, the distance between the estimated average NREM breathing rate and the 90% tile of the breathing rate for each epoch, to quantify the deviation of the breathing rate during REM stage from that during NREM stage.

To extract the variability of the breathing rate for each epoch, one can first estimate the trend of breathing rate by applying a low pass filter to the breathing estimates of the whole night, and obtain the detrended breathing rate estimates by subtracting the trend from the original breathing rate estimates. Then, the breathing rate variability is defined and calculated for each epoch as the variance of the detrended estimates normalized by the length of epoch.

FIG. 33B visualizes the distribution of the proposed two features under NREM and REM sleep, respectively. As one can see from FIG. 33B, the majority of the breathing rate variability and breathing rate deviation of NREM sleep are much smaller than those of REM sleep. Based on these two features, one can train a support vector machine (SVM), a widely used binary classifier, to differentiate between REM and NREM sleep.

Sleep Quality Assessment

When one obtains the estimates of wake, REM, and NREM stages of a whole sleep, one can assess the elusive sleep quality for a user by following standard approach used in clinical practice. In particular, one can calculate the sleep score for each night based on the recognized sleep stages as follows. Let $T_N$, $T_R$ and $T_W$ denote the durations (measured in hours) of NREM sleep, REM sleep and wake, respectively. Since there is no standard formula for sleep score calculation, a simple formula for the sleep score is applied in SMARS:

$$S=10*T_N+20*T_R-10*T_W,$$

which means that the more you sleep, the more you have REM sleep, the less you keep awake in the bed, the better your sleep score is. According to recent research, REM sleep is crucial for mental recovery, and thus a higher weight has been assigned to REM sleep.

SMARS envisions a practical sleep monitoring for daily in-home use. Although it does not make much sense to compare the sleep score among different users, the trend or history of the sleep score for a particular user would reflect the changes of his/her sleep quality. Such results provide clinically meaningful evidences to help diagnose sleep disorders and manage personal health, in an attractive way. FIG. 34 illustrates an exemplary network environment for sleep monitoring, according to one embodiment of the present teaching. FIG. 35 illustrates an exemplary algorithm design for sleep monitoring, according to one embodiment of the present teaching.

FIG. 36 illustrates an exemplary interior bird-view of a car for seat occupancy detection and people counting, according to one embodiment of the present teaching. In an example, one or more Type1 devices and multiple Type2 devices (e.g. N=4) may be placed in a confined area (e.g. closed area such as a car, conference room, bus, an airplane, or cinema, semi-open area such as bus with windows open, or balcony with 8 outdoor chairs around an outdoor table) with multiple "seats" at fixed locations (may be space for standing, sitting, kneeling, lying down, etc.,) that may hold a person. A presence of a person at one or more "seats" may be detected based on TSCI extracted from wireless signals sent from the Type1 devices to the Type2 devices.

FIG. 36 shows a particular example of a car with 4 seats, two in front row and two in back row. Note that each seat has a "seat bed" for a person to sit on and a "seat back" for a person to lean back on. The Type1 device may be placed in the front, on the dash board. Four Type2 devices may be deployed, one at each of the 4 seats (e.g. in/on/under the seat bed, or in/on/under the seat bed). When a seat A (e.g. driver seat, or right seat on front row, or back row left seat, etc.) is occupied by the driver or a passenger or a baby in a car-seat, the CI (CI) associated with the occupied seat A may behave differently (e.g. become smaller or bigger) from the CI associated with an empty seat A. Thus one can detect the seat occupancy of each seat by examining the CI. By performing such test for all the seats, one can count the amount of people in the car. If a person sits at non-standard locations (e.g. between two seats, in the center of back row, in the center of front row, or a baby in a car seat), CI associated multiple Type2 devices can be analyzed jointly to determine if there is a person there. As signature of a baby in car-seat may be different from an adult or a children, adult/children/baby classification may be performed based on the CI.

A task may be performed based on the seat occupancy described above. For example, the task may be to arm an air-bag if a seat is occupied, but disarm the airbag if the seat is not occupied. If a small size person (e.g. a child) instead of a regular-size adult is detected, an air-bag designed for adults may not be armed. The heating/air-condition setting may be adjusted. The task may be to control windows, lighting, audio system, entertainment system (e.g. video), noise cancelling, shock-absorbing system, stabilizing size, car avoidance system, safety features, tire pressure, any other car subsystems, etc. For example, if a passenger is detected at the front right seat, the temperature at that region (front, right) may be controlled to a preset level. If the seat is empty, the temperature may be adjusted differently.

Figure 37A:
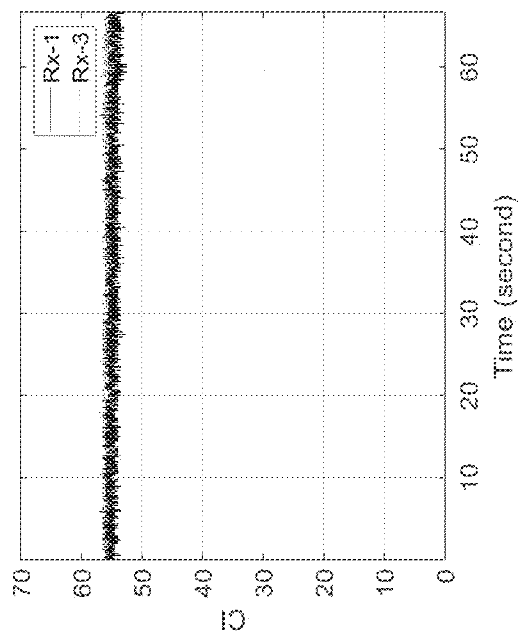
Figure 37B:
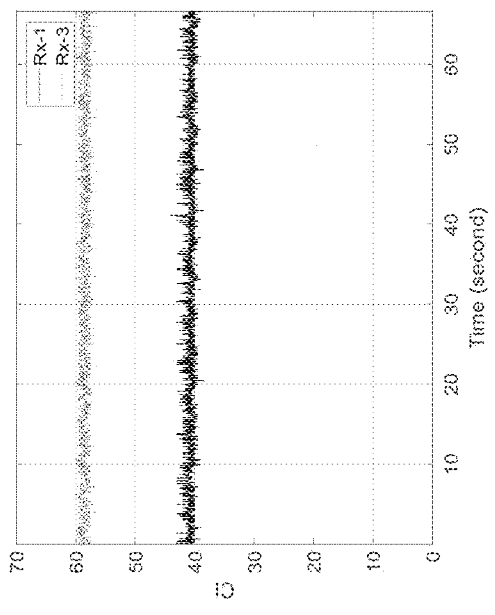
Figure 37C:
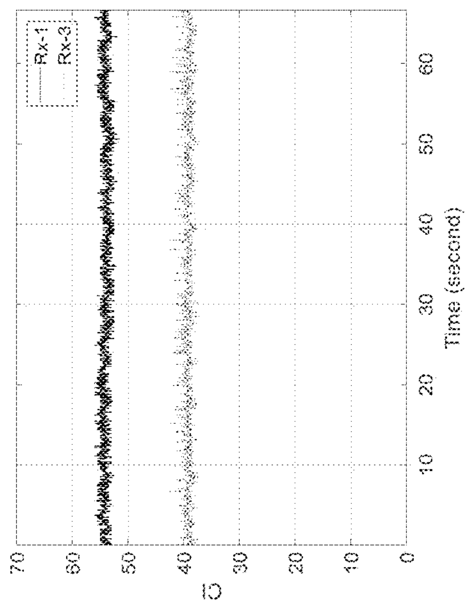
Figure 37D:
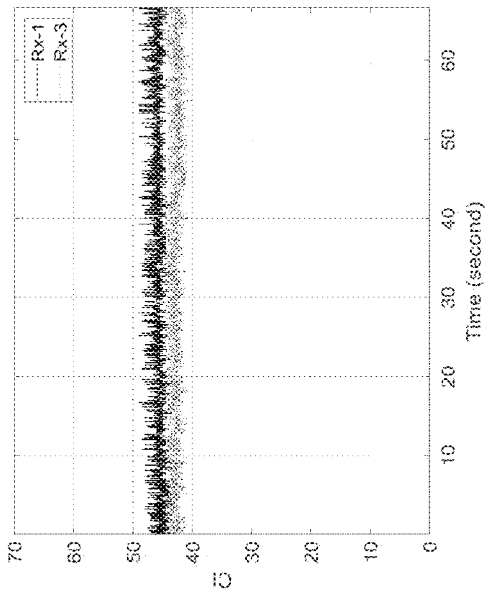

FIGS. 37A-37D illustrate changes of CI according to various seat occupancy situations in a car, according to one embodiment of the present teaching. FIG. 37A shows CI when no seat is occupied. FIG. 37B shows CI when seat 1 (e.g. seat with Bot antenna 1 in FIG. 36) is occupied. FIG. 37C shows CI when seat 3 (e.g. seat with Bot antenna 3 in FIG. 36) is occupied. FIG. 37D shows CI when both seat 1 and seat 3 are occupied.

In one embodiment, the present teaching discloses a method, an apparatus, a device, a system, and/or a software (method/apparatus/device/system/software) of a wireless system which comprises transmitting a series of probe signals (a wireless signal) by an antenna of a first wireless device (e.g. an "Origin Satellite", a dummy bot, a TX wireless device, a Type1 heterogeneous wireless device, a WiFi access point, a 3G/3.5G/4G/LTE/5G/6G/7G base station, a repeater, a WiFi repeater, a BlueTooth device, a BLE device, an Internet-of-Thing (IoT) device, a WiFi-enabled device, a 3G/3.5G/4G/LTE/5G/6G/7G enabled device) in a broadcasting manner to at least one heterogeneous target wireless receiver (e.g. a "Tracker Bot", a dummy bot, an RX wireless device, a Type 2 heterogeneous wireless device) through a wireless multipath channel in a venue. The series of probe signal are transmitted without the first wireless device establishing wireless connection with any of the at least one heterogeneous target wireless receiver.

A heterogeneous target wireless device (RX device) and/or the first wireless device (TX) may each be associated with a MAC address and/or an IP address. The heterogeneous target wireless device and the first wireless device may each be associated with an additional identity or ID (e.g. a "Tracker Bot" ID, a number, a name, an address, a serial number, a representation, a universally unique ID, a MAC address, a IP address, another ID).

A heterogeneous target wireless device (RX device) may be associated with an object. For example, the RX device may be a mobile phone associated with a user. The mobile phone may be carried by the user. Thus by tracking the location of the mobile phone, the location of the user can be tracked. The RX device may be associated with a room/region/zone in the venue such as master bedroom, rest room, hallway, front entrance area, foyer, back/side entrance area, patio, kitchen, living room, dining room, family room, laundry room, garage, basement, attic, office, conference room, a shop, an aisle of a shop, a rack, etc. The transmitting may be using a processor, a memory and a set of instructions. The first wireless device may have a heterogeneous integrated circuit (IC). Each of the at least one heterogeneous target wireless receiver may also have a heterogeneous IC. The heterogeneous IC in different devices may be the same or different.

The method/apparatus/device/system/software of the wireless system may further comprise obtaining by each of the at least one heterogeneous target wireless receiver at least one time series of channel information (e.g. channel state information (CSI), channel impulse response (CIR), channel frequency response (CFR), modem parameters, power parameter, RSSI, etc.) from the series of probe signals. The channel information is channel information of the wireless multi path channel between the heterogeneous target wireless receiver and the first wireless device.

The first wireless device may comprise a heterogeneous integrated circuit (IC) device (e.g. a WiFi chip, a mesh network chip, an LTE chip, a Bluetooth chip, a BLE chip, a UWB chip). Each of the at least one heterogeneous target wireless receiver may comprise a heterogeneous integrated circuit (IC) device.

The method/apparatus/device/system/software of the wireless system may further comprise generating a series of probe signals by and/or generating based on a heterogeneous integrated circuit (IC) of the first wireless device. The method/apparatus/device/system/software of the wireless system may further comprise obtaining by and/or obtaining based on a heterogeneous IC of the heterogeneous target wireless receiver the at least one time series of channel information from the series of probe signals. Each respective may comprise a heterogeneous IC.

The heterogeneous IC of the first wireless device and/or any heterogeneous target wireless receiver may comprise a low-noise amplifier (LNA), a power amplifier, a transmit-receive switch, a media access controller, a baseband radio, a 2.4 GHz radio, a 3.65 GHz radio, a 4.9 GHz radio, a 5 GHz radio, a 5.9 GHz radio, a below 6 GHz radio, a below 60 GHz radio and/or another radio. The heterogeneous IC may comprise a processor, a memory communicatively coupled with the processor, and a set of instructions stored in the memory to be executed by the processor. The IC may be an application specific integrated circuit (ASIC), a field programmable gate array (FPGA), other programmable logic device, discrete logic, and/or a combination. The processor may comprise a general purpose processor, a special purpose processor, a microprocessor, a microcontroller, an embedded processor, a digital signal processor, a multi-processor, a multi-core processor, and/or a processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, a magnetic storage, an optical storage, an organic storage, a storage system, a storage network, network storage, cloud storage, or other form of non-transitory storage medium known in the art. The set of instructions (machine executable code) corresponding to the method steps of this disclosure may be embodied directly in hardware, in software, in firmware, or in combinations thereof. The heterogeneous IC may support a broadband network, wireless network, a mobile network, a mesh network, a cellular network, a wireless local area network (WLAN), a wide area network (WAN), and a metropolitan area network (MAN), a WLAN standard, a 802.11 standard, 802.11a, 802.11b, 802.11g, 802.11n, 802.11ac, 802.11ad, 802.11af, 802.11ah, a mesh network standard, a 802.15 standard, a 802.16 standard, a cellular network standard, 3G, 3.5G, 4G, beyond 4G, 4.5G, 5G, 6G, 7G, 8G, 9G, Bluetooth, Bluetooth Low-Energy (BLE), NFC, Zigbee, WiMax, and/or another wireless network protocol.

The method/apparatus/device/system/software of the wireless system may further comprise performing a task based on the series of probe signals, and/or the at least one time series of channel information obtained by each of the at least one heterogeneous target wireless receiver from the series of probe signals. The task may be performed by the first wireless device, the at least one heterogeneous target wireless receiver, another device, and/or at least one server.

A first part of the task may comprise at least one of: preprocessing, signal conditioning, signal processing, post-processing, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and/or wireless charging.

A second part of the task may comprise at least one of: a smart home task, a smart office task, a smart building task, a smart factory task (e.g. manufacturing using a machine or an assembly line), a smart internet-of-thing (IoT) task, a smart system task, a smart home operation, a smart office operation, a smart building operation, a smart manufacturing operation (e.g. moving supplies/parts/raw material to a machine/an assembly line), an IoT operation, a smart system operation, turning on a light, turning off the light, controlling the light in at least one of: a room, a region, and/or the venue, playing a sound clip, playing the sound clip in at least one of: the room, the region, and/or the venue, playing the sound clip of at least one of: a welcome, a greeting, a farewell, a first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, a heating system, a ventilation system, a lighting system, a heating device, a stove, an entertainment system, a door, a fence, a window, a garage, a computer system, a networked device, a networked system, a home appliance, an office equipment, a lighting device, a robot (e.g. robotic arm), a smart vehicle, a smart machine, an assembly line, a smart device, an internet-of-thing (IoT) device, a smart home device, and/or a smart office device.

The task may include: detect a user returning home, detect a user leaving home (absence/presence of user), detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room, etc.), monitor/detect/track/guide/navigate location of a user/pet, do something automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system, etc.).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/ speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/cloud server/fog server/edge server/home network/mesh network, using messaging tool/notification tool/communication tool/scheduling tool/email, using user interface/GUI, using scent/smell/fragrance/taste, using neural tool/nervous system tool, using a combination, etc.) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc.

Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

The at least one heterogeneous target wireless receiver may obtain the at least one respective time series of channel information from the series of probe signals asynchronously, with respective heterogeneous timing (e.g. starting time, pausing time, resuming time, and/or ending time). The method/apparatus/device/system/software of the wireless system may further comprise transmitting a probe signal with data, and/or replacing a probe signal with a data signal.

The series of probe signals may be transmitted at a pseudo-regular interval (e.g. 100 probe signals per second). The pseudo-regular interval may be changed. The series of probe signals may be scheduled at a regular interval (e.g. 100 probe signals per second), but each probe signal may experience small time perturbation, perhaps due to timing requirement, timing control, network control, handshaking, message passing, collision avoidance, carrier sensing, congestion, availability of resources, and/or another consideration.

The series of probe signals may be transmitted at the pseudo-regular interval for a period of time. The pseudo-regular interval, the duration of the period of time and/or the starting time of the period of time, may be changed over time. For example, it may be 100 probe signals per second (probe/sec in short) for 2 hours and then changed to 1000 probe/sec for 30 minutes, and may change again.

The change may be according to a planned change, a plan, a time table, a rule, a policy, a mode, a condition and/or a change (e.g. once every hour, or changed whenever a certain event occur). For example, the pseudo-regular interval may normally be 100 probe/sec, but will be changed to 1000 probe/sec in some demanding situations, and may be changed to 10 probe/sec in some low power and/or standby situation. The probe signals may be sent in burst also, e.g. at 100 probe/sec for 1 minute and no signal for some time before and after the burst. Or, the probe signal may be sent at 100 probe/sec and then momentarily at a burst rate of 1000 probe/sec for 1 minute and then back to 100 probe/sec. In another example, the probe signal may be sent at 1 probe/sec in a low power mode, at 10 probe/sec in a standby mode, at 100 probe/sec in a normal mode, and at 1000 probe/sec in an armed mode, etc.

The change based on at least one task performed by the at least one heterogeneous target wireless receiver. For example, the task of one receiver may need 10 probe/sec while the task of another receiver may need 1000 probe/sec. The pseudo-regular interval may be increased to 1000 probe/sec to satisfy the most demanding receiver. In one example, the receivers, the tasks associated with the receivers and/or the wireless multipath channel as experienced by the receivers may be divided into at least one class (e.g. a low priority class, a high priority class, an emergency class, a critical-task class, a regular class, a privileged class, a non-subscription class, a subscription class, a paying class, a non-paying class, etc.) and the pseudo-regular interval may be adjusted for the sake of some selected class (e.g. the high priority class). When the need of that selected class is less demanding, the pseudo-regular interval may be changed (increased or decreased). When a receiver has critically low power, the pseudo-regular interval may be reduced to reduce the power consumption of the receiver to respond to the probe signals.

In one example, the probe signals may be used to transfer power wirelessly to a receiver, and the pseudo-regular interval may be adjusted to control the amount of power being wirelessly transferred to the receiver. The pseudo-regular interval may be changed by and/or based on a server, the first wireless device and/or the heterogeneous target wireless receivers. The server may be communicatively coupled with the first wireless device and/or the heterogeneous target wireless receivers. The change may be communicated between the server, the first wireless device and/or the heterogeneous target wireless receivers. For example, the server may monitor, track, forecast and/or anticipate the needs of the heterogeneous target wireless receivers and/or the tasks performed by the receivers, and may decide to change the pseudo-regular interval accordingly. The server may send the change request to the first wireless device (immediately or with some time delay) and the first wireless device may then make the change. The server may keep track of a time table and may make scheduled changes to the pseudo-regular interval according to the time table. The server may detect an emergency situation of a receiver and change the pseudo-regular interval immediately. The server may detect a slowly happening condition (and/or an evolving condition) associated with a receiver and gradually adjust the pseudo-regular interval accordingly.

The method/apparatus/device/system/software of the wireless system may further comprise transmitting the series of probe signals by the antenna of the first wireless device to a particular destination media access control (MAC) address (e.g. a predetermined MAC address, a globally unique MAC address) common for the at least one heterogeneous target wireless receiver. It may further comprise setting MAC address of each of the at least one heterogeneous target wireless receiver to the particular MAC address.

The method/apparatus/device/system/software of the wireless system may further comprise identifying the venue by the first wireless device, another device, and/or a heterogeneous target wireless receiver based on at least one of: an association with the first wireless device, a region associated with the first wireless device, the particular destination MAC address, the series of probe signals, and the at least one time series of channel information from the probe signals. For example, a receiver may be moved to a new location in the venue. And the first wireless device may be newly set up in the venue such that the first wireless device and the receiver are not aware of the existence of each other, and they may not establish wireless connection at all. During set up, the first wireless device may be instructed/guided/caused/controlled to send the series of probe signals to the particular destination MAC address (e.g. using a dummy receiver, using a hardware pin setting/connection, using a stored setting, using a local setting, using a remote setting, using a downloaded setting, or using a server). Upon power up, the receiver may scan for probe signals according to a table of destination MAC addresses that may be used at different locations (e.g. different MAC address for different venue such as house, office, enclosure, floor, multi-storey building, store, airport, mall, stadium, hall, station, subway, lot, area, zone, region, district, city, country, continent). When the receiver detects the probe signals sent to the particular destination MAC address (e.g. a predetermined MAC address, a globally unique MAC address), the receiver can use the table to identify the venue based on the particular destination MAC address.

The method/apparatus/device/system/software of the wireless system may further comprise computing a location of a heterogeneous target wireless receiver in the venue based on at least one of: the particular destination MAC address, the series of probe signals, and the at least one time series of channel information obtained by heterogeneous target wireless receiver from the probe signals. The computing may be performed by the heterogeneous target wireless receiver. The method/apparatus/device/system/software of the wireless system may further comprise (a) scanning at least one candidate wireless broadcasting channel (e.g. those in the information association table or) for active broadcasting of probe signals by one of the at least one heterogeneous target wireless receiver, (b) receiving the series of probe signals actively broadcasted by the first wireless device through the wireless multipath channel in the venue, and (c) obtaining a location of the first wireless device and/or the heterogeneous target wireless receiver based on a first information of the series of probe signals, a second information of the wireless multipath channel, a third information of the at least one time series of channel information, an information association table (e.g. look-up table, a designated source), and/or a region associated with the first wireless device. The information association table may be stored in a designated source, a server, a cloud server.

For example, Janet arrives at ABC airport which is very large with multiple terminals. When she gets out of her car, she is lost and does not know where she is. She remembers that the ABC airport has a state-of-the-art wireless indoor locationing system called XYZ based on the current disclosure. The XYZ system has more than 1000 Origin Satellites each broadcasting probe signals to respective destination MAC address in respective channel. The XYZ system partitions the ABC airport into 1000+ zones (e.g. each zone being in proximity to an Origin Satellite). The XYZ system maintains a lookup table (information association table) in the XYZ server (e.g. local server or a cloud server) containing the destination MAC addresses associated with the 1000+ zones.

Janet turns on her smart phone and starts the XYZ app which turns her phone into one of the heterogeneous target wireless receiver. Her phone (and the XYZ app) connects to the XYZ server to download the lookup table. Then it scans the 1000+ channels (each with respective MAC address) of the lookup table in some order. It manages to receive probe signal in channel 37. From the lookup table, channel 37 is in Terminal 2 near the main entrance. The XYZ app displays the map of the ABC airport and shows her location in real time on the map. She enters her destination to the XYZ app which then navigates her to Terminal 5 Arrival Area to pick up her parents. She finds the app very helpful because GPS does not work indoors and the XYZ system shows her a detailed path to her destination bypassing the crowd. It also shows restaurants and other places of interest, and even provides discount coupons of many restaurants. She loves the XYZ system, especially when she is lost and in a rush.

The information association table (e.g. lookup table) may be stored in the first wireless device, the heterogeneous target wireless receiver, and/or a server. The information association table may be retrieved from memory, downloaded from the server, updated based on the server, downloaded over the air, updated over the air, etc. The particular destination address may be communicated between the first wireless device and a server communicatively coupled with the first wireless device through a network. The particular destination address may be communicated between each respective heterogeneous target wireless receiver and a server communicatively coupled with the respective heterogeneous target wireless receiver. The particular destination MAC address may be chosen by a server or the first wireless device. The particular destination MAC address may be signaled in an announcement channel by the first wireless device and/or a server.

The particular destination MAC address may be changed over time. It may be changed according to a time table, a rule, a policy, a mode, a condition, a situation and/or a change. The particular destination MAC address may be communicated. Before the particular destination MAC address is being communicated, it may be pre-processed. The preprocessing may comprise scrambling, encryption, compression, coding, error protection, forward error correction, transformation and/or another operation.

The particular destination MAC address may be selected (e.g. by the first wireless device, a server, a heterogeneous target wireless receiver, or a high priority heterogeneous target wireless receiver) based on availability of the MAC address, a pre-selected list, collision pattern, traffic pattern, data traffic between the first wireless device and another device, effective bandwidth, random selection, and/or a MAC address switching plan. The particular destination MAC address may be the MAC address of a second wireless device (e.g. a dummy receiver, or a receiver that serves as a dummy receiver).

The method/apparatus/device/system/software of the wireless system may further comprise transmitting each probe signal by the first wireless device in a channel selected from a set of channels. The at least one channel information of the selected channel may be obtained by a respective heterogeneous target wireless receiver from the probe signal transmitted in the selected channel. An information of the selected channel is communicated between the first wireless device (TX device) and a server communicatively coupled with the first wireless device through a network (e.g. internet). For example, the selected channel may be selected/controlled by the server. The server may send the information of the selected channel (e.g. a control signal) to the TX device so that the TX device may start using (or change to) the selected channel. The control signal may specify the timing for the TX device to commence using the selected channel.

Alternatively, the TX device may send a request for a new channel to the server. The server may manage the destination MAC address and/or channels that may be used by the TX device and other similar wireless broadcasting transmitters. The server may select/allocate the selected channel to the TX device and respond to the TX device by sending the information of the selected channel. The timing to use the selected channel may be coordinated between the server and the TX device.

Alternatively, the TX device may select the selected channel by itself. It may send an information of the selected channel to the server, so that the information may be accessible to the at least one heterogeneous target wireless receiver (RX device). The server may be the TX device, or a RX device. The server may send the information to the at least one RX device.

An RX device may join the TX device broadcasting by obtaining the selected channel and/or the particular destination MAC address used by the TX device from the server. The RX device may send a request to the server to join a broadcasting service. The RX device may have some requirement towards the broadcasting service (e.g. at least 50 Hz, switchable up to 500 Hz, no changing of the probing frequency, high timing accuracy, etc.). The server may select the broadcasting service associated with the TX device for the RX device and select the selected channel used by the TX device. For example, the server may use some method to find/estimate a location of the RX device, and then may select the TX device which happens to be close to the RX device. Alternatively, the server may choose the TX device based on a requirement of the broadcasting service requested by the RX device, and/or a characteristics associated with the broadcasting service of the TX device. The selected channel may simply be the channel used by the TX device. The server may reply to the request with the selected channel and the destination MAC address of the selected TX device. The server may be the TX device.

The RX device may share the broadcasting information (e.g. the selected channel and the destination MAC address of the selected TX device) with another RX device. The another RX device may obtain broadcasting information from yet another RX device (e.g. via mesh network, Bluetooth, BLE, WiFi, etc.) and then choose to join the broadcasting service associated with either the RX device or the yet another RX device.

An information of the selected channel may be communication between the first wireless device and a server communicatively coupled with the first wireless device through a network. An information of the selected channel may be communication between each respective heterogeneous target wireless receiver and a server communicatively coupled with the receiver through a respective network. An information of the selected channel may be signaled in an announcement channel by the first wireless device and/or a server. The information of the selected channel may be communicated. Before the information of the selected channel is communicated, the information may be preprocessed. The preprocessing may comprise scrambling, encryption, compression, coding, error protection, forward error correction, transformation and/or another operation.

The selected channel may be changed over time. The change may be according to a time table, a rule, a policy, a mode, a condition, a situation, and/or a change. The selected channel may be selected based on availability of channels, a pre-selected list, co-channel interference, inter-channel interference, channel traffic patterns, data traffic between the first wireless device and another device, effective bandwidth associated with channels, a security criterion, random selection, a channel switching plan, a criterion, and/or a consideration.

The method/apparatus/device/system/software of the wireless system may further comprise using another device (e.g. one of the at least one heterogeneous target wireless receiver, a temporal heterogeneous target wireless receiver (temporary RX device), a dedicated RX device, a dummy RX device, a dummy "Tracker Bot", a one-time RX device) to play the role of RX device, at least temporarily, to establish a one-to-one communication link with the first heterogeneous wireless device (TX device so that the TX device would commence sending/broadcasting the series of probe signal to the MAC address of the temporary RX device or the another device (which is the particular destination MAC address). Any RX device (e.g. any of the at least one heterogeneous target wireless receiver) can "tune in" (by setting its MAC address to the particular destination MAC destination) to receive the broadcasting from the TX device. The one-to-one communication link may be established by the TX device sending a first signal to the temporary RX device and the temporary RX device sending a second signal in reply to the first signal. Alternatively, the one-to-one communication link may be established by the temporary RX device sending a first signal to the TX device and the TX device sending a second signal in reply to the first signal.

The establishment of the one-to-one communication between the TX device and the temporary RX device may be done once, multiple times, periodically, occasionally, and/or at a reset. It may be done whenever the destination MAC address or the selected channel of the TX device is changed. The temporary RX device may be used to trigger or "initiate" more than one TX devices to broadcast in respective destination MAC address (e.g. in a sequentially manner or a parallel manner or a hybrid manner). Each time, the temporary RX device may set its MAC address to the respective destination MAC address.

In the sequential manner, a second TX device may be triggered or initiated after a first TX device is triggered or initiated. In the parallel manner, the triggering or initiating of a second. TX device may commence between the triggering or initiating of a first TX device is fully completed. For example, the temporary RX device may set its MAC address to a first destination MAC address and send a first signal to a first TX device (which may be known to be slow in replying). Before the first TX device replies, the temporary RX device may set its MAC address to a second destination MAC address and send the first signal to a second TX device (which may be equally slow as the first TX device). And so on. Then, the temporary RX device may set its MAC address back to the first destination MAC address to receive a second signal from the first TX device (which may now be "triggered" or "initiated" to broadcast to the first destination MAC address). Then, the temporary RX device may set its MAC address to the second destination MAC address to receive the second signal from the second TX device (which may now be "triggered" or "initiated" to broadcast to the second destination MAC address). And so on. The hybrid manner may be a combination of sequential manner and parallel manner.

The method/apparatus/device/system/software of the wireless system may further comprise establishing wireless connection between the first wireless device and another wireless device. It may further comprise sending a first wireless signal (e.g. a sounding frame, a probe signal, a request-to-send RTS, a standard signaling signal, a WiFi signaling signal, a first handshake signal, etc.) between the first wireless device and the another wireless device and sending a second wireless signal (e.g. a command, an acknowledgement, an ACK, or a clear-to-send CTS, a standard signaling signal, a WiFi signaling signal, a second handshake signal, etc.) in reply to the first wireless signal and triggering the first wireless device to transmit the series of probe signals in the broadcasting manner to the at least one heterogeneous target wireless receiver without establishing wireless connection with any of the at least one heterogeneous target wireless receiver. The second wireless signal may be an acknowledge to the first wireless signal. The another wireless device may be a dummy wireless device with a purpose (e.g. a primary purpose, a secondary purpose) to establish the wireless connection with the first wireless device (TX device), to communicate (e.g. receiver, or transmit) the first wireless signal, and/or the second wireless signal. For example, the dummy device may transmit the first signal to the TX device and receive the second signal from the TX device. Alternatively, the dummy device may receive the first signal from the TX device and transmit the second signal to the TX device. The another wireless device may be physically attached to the first wireless device.

The another wireless device may not communicate further with the first wireless device after establishing the connection, except when the destination MAC address or the channel of the first wireless device (TX device) is changed. The destination MAC address and/or the channel of the TX device may be changed over time (e.g. according to a time table, a rule, a policy, a mode, a condition, a situation, and/or a change). The another wireless device may suspend communication with the first wireless device after establishing the connection. The communication may be resumed in the future. The another wireless device may enter an inactive mode, a hibernation mode, a sleep mode, a stand-by mode, a low-power mode, an OFF mode and/or a power-down mode, after establishing the wireless connection with the first wireless device. The another wireless device (temporal RX device) may have a MAC address configured/set to be the particular destination MAC address. It may use the wireless connection to trigger the first wireless device to send the at least one series of probe signals in a broadcasting manner to each of the at least one heterogeneous target wireless receiver. Each of the at least one heterogeneous target wireless receiver may set its MAC address to the particular destination MAC address to receive the at least one series of probe signals. There may be more than one TX devices. The destination MAC address and/or channel of the temporary RX device may be changed sequentially to the destination MAC address and/or channel of each of the more than one TX devices over time. A change may be according to a time table, a rule, a policy, a mode, a condition, a situation, and/or a change.

Both the first wireless device and the another wireless device may be controlled and/or coordinated by at least one of: a first processor associated with the first wireless device, a second processor associated with the another wireless device, a third processor associated with a designated source, and/or a fourth processor associated with yet another device. The first processor and the second processor may coordinate with each other.

The method/apparatus/device/system/software of the wireless system may comprise the first wireless device (TX device) broadcasting to two groups of at least one heterogeneous wireless receivers (RX devices), either simultaneously or contemporaneously. The TX device may broadcast to a first group in a first venue by transmitting to a first destination MAC address in a first selected channel, and may broadcast to a second group in a second venue by transmitting to a second destination MAC address in a second selected channel. The first venue and the venue may overlap (e.g. both venue may include the immediate space around the TX device. The method/apparatus/device/system/software of the wireless system may further comprise transmitting a first series of probe signals by a first antenna of the first wireless device in a broadcasting manner to at least one first heterogeneous target wireless receiver through a first wireless multipath channel in a first venue. It may further comprise transmitting a second series of probe signals by a second antenna of the first wireless device in a broadcasting manner to at least one second heterogeneous target wireless receiver through a second wireless multipath channel in a second venue.

The first wireless device may send the two separate series of probe signals to two separate group of heterogeneous target wireless receivers located in two venues. The first set of receivers may experience the first wireless multipath channel in the first venue. The second set of receivers may experience the second wireless multipath channel in the second venue. The two venues may have different sizes, shape, multipath characteristics. The first venue and the second venue may overlap at least partially. The immediate area around the first antenna and second antenna may be part of the overlapped area. The first venue may be a subset of the second venue. The first venue may be the second venue.

The first wireless device may not establish wireless connection with any of the at least one first and second heterogeneous target wireless receivers. The two series of probe signals may be sent in broadcasting manners to the two sets of respective heterogeneous target wireless receivers without any wireless connections established among them.

The method/apparatus/device/system/software of the wireless system may further comprise obtaining by each of the at least one first heterogeneous target wireless receiver at least one time series of channel information from the first series of probe signals, the channel information being of the first wireless multipath channel between the first heterogeneous target wireless receiver and the first wireless device. It may further comprise obtaining by each of the at least one second heterogeneous target wireless receiver at least one time series of channel information from the second series of probe signals, the channel information being of the second wireless multipath channel between the second heterogeneous target wireless receiver and the first wireless device.

The first antenna may be the second antenna. The at least one first heterogeneous target wireless receiver may be the same as the at least one second heterogeneous target wireless receiver. A particular first heterogeneous target wireless receiver may be the same as a particular second heterogeneous target wireless receiver. The first and second series of probe signals may not be synchronous. The transmission of the first series of probe signals may not be synchronous to the transmission of the second series of probe signals. A probe signal may be transmitted with data. A probe signal may be replaced by a data signal.

The first wireless device (TX device) may provide two simultaneous broadcasting service, each with respective destination MAC address and channel. Each of the target wireless receiver (RX device) may choose one of the two broadcasting services of the TX device and set its MAC address and channel according to the chosen broadcasting service.

The first series of probe signals may be transmitted at a first pseudo-regular interval. The second series of probe signals may be transmitted at a second pseudo-regular interval. The first pseudo-regular interval may be different from the second pseudo-regular interval. Each of the pseudo-regular interval may be changed over time. The change may be according to at least one of: a planned change, a time table, a rule, a policy, a mode, (in response to) a condition, a situation, and/or a change. The first series of probe signals may be synchronous or asynchronous with respect to the second series of probe signals. The TX device may provide two (or more than two) levels of broadcasting service: the first series of probe signals at a "normal" probing rate (e.g. 50 Hz), and the second series of probe signals at a "special" probing rate (e.g. 1000 Hz for demanding/advanced applications, 1 Hz (or even 0.011 Hz) for power-saving applications). Each RX device may choose the broadcasting service according to its need/requirement/condition, and may set its MAC address and channel accordingly.

The first series of probe signals may be transmitted to a first destination MAC address. The second series of probe signals may be transmitted to a second destination MAC address. The two destination MAC addresses may be different. Any of the two destination MAC addresses may be changed over time. The change may be according to at least one of: a time table, a rule, a policy, a mode, a condition, a situation, and/or a change. The first series of probe signals may be transmitted in a first channel. The second series of probe signals may be transmitted in a second channel. The first channel and the second channel may be different, or the same. The first channel and/or the second channel may be changed over time. The change may be according to at least one of: a time table, a rule, a policy, a mode, a condition, a situation, and/or a change.

The method/apparatus/device/system/software of the wireless system may further comprise, for a heterogeneous target wireless receiver, choosing between the first series of probe signals and the second series of probe signals based on: respective pseudo-regular intervals, respective destination MAC addresses, respective channels, respective characteristics/properties/states, a respective task to be performed by the heterogeneous target wireless receiver, and/or another consideration.

The method/apparatus/device/system/software of the wireless system may further comprise establishing a first wireless connection between the first wireless device and another wireless device. The first wireless device may establish the first wireless connection with the another wireless device. A first wireless signal and a second wireless signal may be communicated between the first wireless device and the another wireless device in the first wireless connection. The second wireless signal may be in reply to the first wireless signal. Either the first signal or the second wireless signal may trigger the first wireless device to transmit the first series of probe signals in the broadcasting manner (to a first destination address in a first selected channel). The second wireless signal may be an acknowledge to the first wireless signal.

The method/apparatus/device/system/software of the wireless system may further comprise establishing a second wireless connection between the first wireless device and yet another wireless device. The first wireless device may establish the second wireless connection with the yet another wireless device. A third wireless signal and a fourth wireless signal may be communicated between the first wireless device and the vet another wireless device in the second wireless connection. The fourth wireless signal may be in reply to the third wireless signal. Either the third wireless signal or the fourth wireless signal may trigger the first wireless device to transmit the second series of probe signals in the broadcasting manner. The third wireless signal may be similar to the first wireless signal. The fourth wireless signal may be similar to the second wireless signal. The second wireless signal may be an acknowledgement to the first wireless signal. The fourth wireless signal may be an acknowledgement to the third wireless signal. The yet another wireless device and the another wireless device may be the same, and/or may be in a common device, or on the common device, or of the common device. The first wireless device may first establish the first wireless communication with the another wireless device, and then establish the second wireless communication with the yet another wireless device. The first wireless device may start establishing the second wireless communication with the yet another wireless device before the first wireless communication is fully established. The first wireless device may start establishing the second wireless communication with the yet another wireless device while the first wireless communication is being established.

The another wireless device may set its MAC address to a first destination MAC address and establish the first wireless connection with the first wireless device using the first destination MAC address. The yet another wireless device may set its MAC address to a second destination MAC address and establish the second wireless connection with the first wireless device using the second destination MAC address.

To establish the first wireless communication, the first wireless device may send a first wireless signal to the first destination MAC address of the another wireless device in the first wireless connection. The another wireless device may send a second wireless signal to the first wireless device in the first wireless connection. The second wireless signal may be in reply to the first wireless signal. The second wireless signal to the first wireless device may trigger the first wireless device to transmit the first series of probe signals in the broadcasting manner. The second wireless signal may be an acknowledge to the first wireless signal.

To establish the second wireless communication, the first wireless device may send a third wireless signal to the second destination MAC address of the another wireless device in the second wireless connection. The another wireless device may send a fourth wireless signal to the first wireless device in the second wireless connection. The fourth wireless signal may be in reply to the third wireless signal. The fourth wireless signal to the first wireless device may trigger the first wireless device to transmit the second series of probe signals in the broadcasting manner. The fourth wireless signal may be an acknowledge to the third wireless signal. The third wireless signal may be similar to the first wireless signal. The fourth wireless signal may be similar to the second wireless signal.

The another wireless device may establish the first wireless connection with the first wireless device using a first channel selected from a first set of channels. The yet another wireless device may establish the second wireless connection with the first wireless device using a second channel selected from a second set of channels.

To establish the first wireless communication, the first wireless device may send a first wireless signal in the first selected channel in the first wireless connection. The another wireless device may send a second wireless signal in the first selected channel to the first wireless device in the first wireless connection. The second wireless signal may be in reply to the first wireless signal. The second wireless signal to the first wireless device may trigger the first wireless device to transmit the first series of probe signals in the broadcasting manner. The second wireless signal may be an acknowledgement to the first wireless signal. To establish the second wireless communication, the first wireless device may send a third wireless signal in the second selected channel to the yet another wireless device in the second wireless connection. The yet another wireless device may send a fourth wireless signal in the second selected channel to the first wireless device in the second wireless connection. The fourth wireless signal may be in reply to the third wireless signal. The fourth wireless signal to the first wireless device may trigger the first wireless device to transmit the second series of probe signals in the broadcasting manner. The fourth wireless signal may be an acknowledgement to the third wireless signal.

The third wireless signal may be similar to the first wireless signal. The fourth wireless signal may be similar to the second wireless signal. The yet another wireless device may be the another wireless device. The third wireless signal may be sent by the first wireless device before the first wireless communication is fully established and/or completed.

The first wireless device, the another wireless device and/or the yet another wireless device may be coordinated, physically attached, or may be of/in/of a common device. At least two of the first wireless device, the another wireless device and/or the yet another wireless device may be controlled by/connected to a common data processor, or may be connected to a common bus interconnect/network/LAN/Bluetooth network/BLE network/wired network/wireless network/mesh network/mobile network/cloud, or may share a common memory, or may be associated with a common user/user profile/user account/identity (ID)/household/house/physical address/location/geographic coordinate/IP subnet/SSID/user device/home device/office device/manufacturing device.

The first wireless device, the another wireless device and/or the yet another wireless device may each be associated a processor, a memory communicatively coupled with the processor, and a set of instruction stored in the memory to be executed by the processor. The first wireless device, the another wireless device and/or the yet another wireless device may each comprise a processor, a memory communicatively coupled with the processor, and a set of instruction stored in the memory to be executed by the processor. When executed, the set of instructions may cause the device to perform an operation described in the present teaching. Their processors may be coordinated.

In another embodiment, the present teaching discloses a method, an apparatus, a device, a system, and/or a software (method/apparatus/device/system/software) of a wireless system which comprises transmitting at least one series of probe signals asynchronously and contemporaneously by each of more than one Type 1 heterogeneous wireless devices. Each respective series of probe signals is transmitted by an antenna of respective Type 1 heterogeneous wireless device in a broadcasting manner to a respective set of Type 2 heterogeneous target wireless receivers through a wireless multipath channel, without the respective Type 1 device establishing wireless connection with any of the respective set of Type 2 receivers. The transmitting may be using a respective processor, a respective memory and a respective set of instructions. Each of the more than one Type 1 heterogeneous wireless devices may have a heterogeneous integrated circuit (IC). Each of the respective set of Type 2 heterogeneous target wireless receiver may have a respective heterogeneous IC.

The method/apparatus/device/system/software comprises choosing the respective Type 1 device asynchronously among the more than one Type 1 devices as signal source by each of the respective set of Type 2 receivers. Each Type 2 receiver may choose asynchronously (at different time). It also comprises obtaining by each of the respective set of Type 2 receivers at least one time series of channel information from the respective series of probe signals from the respective chosen Type 1 device, the channel information being of the wireless multipath channel between the Type 2 receiver and the respective chosen Type 1 device.

It may further comprise choosing the respective Type 1 device among the more than one Type 1 devices as signal source by each of the respective set of Type 2 receivers based on at least one of: identity (ID) of respective Type 1 device and/or respective Type 2 receiver, one of {information (info) of a user, info of an account, access info, a parameter, a characteristics, a signal strength} associated with respective Type 1 device and/or respective Type 2 receiver, a task to be performed by respective Type 1 device and/or respective Type 2 receiver, whether respective Type 1 device is the same as a past signal source, a history (of the past signal source, the respective Type 1 device, the more than one Type 1 devices, the respective Type 2 receiver, and another Type 2 receiver), and/or at least one threshold for switching signal source.

The respective Type 1 device may be chosen among the more than one Type 1 devices as initial signal source by each of the respective set of Type 2 receivers. The signal source (Type 1 device) of a particular Type 2 receiver may be changed when at least one of the following occurs: (1) a time interval between two adjacent probe signals (e.g. between the current probe signal and an immediate past probe signal, or between the next probe signal and the current probe signal, etc.) received from the current signal source of the particular Type 2 receiver exceeds a first threshold, (2) a signal strength associated with the current signal source of the Type 2 receiver is below a second threshold at the respective current time, (3) a processed signal strength associated with the current signal source of the Type 2 receiver is below a second threshold at the respective current time after the signal strength is processed with at least one of: a low pass filter, a band pass filter, a median filter, a moving average filter, a weighted averaging filter, a linear filter and a non-linear filter, and/or (4) the signal strength (or processed signal strength) associated with the current signal source of the Type 2 receiver is below a fourth threshold for a significant percentage of a recent time window (e.g. 70%, 80%, 90%, etc.). The percentage may exceed a fifth threshold. Any of the first threshold, second threshold, third threshold, fourth threshold and fifth threshold may be time varying.

Condition (1) may occur when the Type 1 device and the Type 2 receiver become progressively far away from each other, such that some probe signal from the Type 1 device becomes too weak and is not received by the Type 2 receiver. Conditions (2)-(4) may occur when the two devices become far from each other such that the signal strength becomes very weak. The signal source of the particular Type 2 receiver may not change if the other Type 1 devices have signal strength weaker than the current signal source (current selected Type 1 device). In another example, the signal source of the particular Type 2 receiver may also not change if the other Type 1 devices have signal strength weaker than a factor (e.g. 1.1, 1.2, or 1.5, etc.) of signal strength of the current signal source.

If the signal source is changed, the new signal source may take effect at a near future time (e.g. the respective next time). The new signal source may be the Type 1 device with strongest signal strength. The new signal source may also be the Type 1 device with strongest processed signal strength, wherein the signal strength of each Type 1 device may be processed with at least one of: a low pass filter, a band pass filter, a median filter, a moving average filter, a weighted averaging filter, a linear filter and a non-linear filter.

Initializing a list of available Type 1 devices. The list of available Type 1 devices may be updated by examining the respective set of Type 1 devices and respective signal strength associated with each Type 1 device. The list of available Type 1 devices may also be updated by examining the respective set of Type 1 devices and respective processed signal strength associated with each Type 1 device. The list may be maintained/updated by a Type 1 device, a Type 2 device, a server, or another device. The respective chosen Type 1 device may/may not be different from the current signal source.

A task may be performed by at least one of: a Type 2 receiver, a respective Type 1 device, another device and/or at least one server. The task may be performed based on the at least one series of channel information obtained by the Type-2 receiver. A probe signal may be transmitted with data. A probe signal may be replaced by a data signal. A Type 2 receiver may change its choice of signal source over time. Each respective series of probe signals may be transmitted by the respective Type 1 device at a pseudo-regular time interval. At least two series of probe signals may be transmitted at different pseudo-regular time intervals asynchronously and contemporaneously. Each respective series of probe signals may be transmitted by the respective Type 1 device at pseudo-regular interval for a respectively period of time. The pseudo-regular interval may be changed over time.

The method/apparatus/device/system/software of the wireless system may further comprise transmitting each respective series of probe signals by the respectively Type 1 device to a respective destination MAC address common for the respective set of Type 2 receivers. Each of the respective set of Type 2 receivers may set its MAC address to the respective destination MAC address so as to receive the respective series of probe signals.

The method/apparatus/device/system/software of the wireless system may further comprise transmitting each probe signal by respective Type 1 device in a channel selected from a respective set of channels. At least one channel information of the selected channel is obtained from the probe signal by a respective Type 2 receiver. The method/apparatus/device/system/software of the wireless system may further comprise establishing wireless connection between another wireless device and one of the more than one Type 1 devices. A first wireless signal and a second wireless signal may be communicated between the Type 1 device to the another wireless device. A second wireless signal may be sent from the another wireless device to the Type 1 device, triggering the Type 1 device to transmit the series of probe signals in the broadcasting manner.

This may be repeated to trigger more than one Type 1 devices to broadcast (i.e. communicating more than one pairs of first wireless signals and second wireless signals, each pair between the another wireless device and a respective Type 1 device). The another wireless device may be used to establish multiple wireless connections with multiple of the more than one Type 1 devices. The another wireless device may be used sequentially to establish the multiple wireless connections, one after another. The method/apparatus/device/system/software of the wireless system may comprise establishing wireless connection between the another wireless device and each of the more than one Type 1 devices in at least one of: a sequential manner, a parallel manner and a mixed manner (partially sequential, partially parallel). A respective first wireless signal and a respective second wireless signal may be communicated between each respective Type 1 device and the another wireless device, in at least one of: a sequential manner, a parallel manner and a mixed manner. The signal communication may be in a sequential manner, a parallel manner and a mixed manner to trigger the respective Type 1 device to transmit the respective at least one series of probe signals in the broadcasting manner.

The method/apparatus/device/system/software of the wireless system may comprise establishing more than one wireless connections sequentially between another wireless device and one of the more than one Type 1 devices. More than one respective first wireless signals may be sent from the Type 1 device sequentially to the another wireless device. Each respective first wireless signal may correspond to a respective wireless connection. More than one respective second wireless signals may be sent from the another wireless device to the Type 1 device. Each respective second wireless signal may be in reply to a respective first wireless signal corresponding to a respective wireless connection. Each respective second wireless signal may trigger the Type 1 device to transmit at least one respective series of probe signals in the broadcasting manner.

The at least one time series of channel information obtained by respective heterogeneous target wireless receiver from the series of probe signals may be preprocessed. The processing, preprocessing, and/or postprocessing may comprise: doing nothing, zero-padding, time-domain processing, frequency domain processing, time-frequency processing, spatially varying processing, temporally varying processing, adaptive processing, denoising, smoothing, conditioning, enhancement, restoration, feature extraction, weighted averaging, averaging over antenna links, averaging over selected frequency, averaging over selected components, filtering, linear filtering, nonlinear filtering, low-pass filtering, bandpass filtering, high-pass filtering, median filtering, ranked filtering, quartile filtering, percentile filtering, mode filtering, linear filtering, nonlinear filtering, finite impulse response (FIR) filtering, infinite impulse response (IIR) filtering, moving average (MA) filtering, auto-regressive (AR) filtering, auto-regressive moving average (ARMA) filtering, thresholding, soft thresholding, hard thresholding, soft clipping, local maximization, local minimization, optimization of a cost function, neural network, machine learning, supervised learning, unsupervised learning, semi-supervised learning, transform, inverse transform, integer transform, power-of-2 transform, real transform, floating-point transform, fixed-point transform, complex transform, fast transform, Fourier transform, Laplace transform, Hadamard transform, Hilbert transform, sine transform, cosine transform, triangular transform, wavelet transform, transformation, decomposition, selective filtering, adaptive filtering, derivative, first order derivative, second order derivative, higher order derivative, integration, zero crossing, indicator function, absolute conversion, convolution, multiplication, division, another transform, another processing, another filter, a third function, and/or another preprocessing.

Any processing, preprocessing, and post-processing may comprise: normalization, temporal normalization, frequency normalization, magnitude correction, phase correction, phase cleaning, cleaning a phase associated with the channel information, normalizing components associated with the channel information, cleaning a phase of frequency components of the channel information, normalizing the frequency components, re-sampling, labeling, tagging, training, sorting, grouping, folding, thresholding, matched filtering, spectral analysis, clustering, quantization, vector quantization, time correction, time base correction, time stamp correction, sampling rate up-conversion/down-conversion, interpolation, intrapolation, extrapolation, subsampling, decimation, compression, expansion, encryption decryption, coding, storing, retrieving, transmitting, receiving, representing, merging, combining, splitting, tracking, monitoring, and another operation etc.

Any thresholds may be pre-determined, adaptively determined and/or determined by a finite state machine. The adaptive determination may be based on time, space, location, antenna, path, link, state, battery life, remaining battery life, available power, available computational resources, available network bandwidth, etc.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for tracking a plurality of objects in a venue, comprising:

a transmitter configured for transmitting a series of probe signals in a broadcasting manner through a wireless multipath channel, wherein the wireless multipath channel is impacted by a movement of at least one of the plurality of objects in the venue; and a plurality of heterogeneous target wireless receivers each of which is associated with an object of the plurality of objects in the venue and is configured for:

receiving the series of probe signals through the wireless multipath channel between the heterogeneous target wireless receiver and the transmitter, obtaining at least one time series of channel information (TSCI) of the wireless multipath channel based on the series of probe signals received by the heterogeneous target wireless receiver, wherein each channel information (CI) comprises at least one of:

a signal strength, a signal amplitude, a signal phase, a received signal strength indicator (RSSI), a channel state information (CSI), a channel impulse response (CIR), a channel frequency response (CFR), a channel characteristics, and a channel filter response, and tracking the object associated with the heterogeneous target wireless receiver based on the at least one TSCI, wherein the plurality of heterogeneous target wireless receivers respectively obtain the at least one TSCI from the series of probe signals asynchronously, with respective heterogeneous starting times.

2. The system of claim 1, wherein:

there is no established wireless connection between the transmitter and any of the plurality of heterogeneous target wireless receivers;

tracking the object comprises at least one of: determining a map location of the object, tracking the location of the object, guiding movement of the object along a trajectory, guiding the movement of the object to avoid an obstacle, tracking motion of the object, tracking behavior of the object, object behavior identification, detecting the motion of the object, detecting a vital sign of the object, detecting a periodic motion associated with the object, detecting breathing of the object, detecting an event associated with the current movement of the object, detecting a fall-down movement of the object, presenting the location of the object, and graphical display of the location of the object; and at least one of the transmitter and the plurality of heterogeneous target wireless receivers comprises a heterogeneous integrated circuit (IC).

3. The system of claim 1, wherein at least one of the plurality of heterogeneous target wireless receivers is further configured for:

performing a task based on at least one of: the series of probe signals received by the at least one heterogeneous target wireless receiver, and the at least one TSCI obtained by the at least one heterogeneous target wireless receiver, wherein a first part of the task comprises at least one of:

preprocessing, signal conditioning, signal processing, post-processing, calibrating, denoising, feature extraction, coding, encryption, transformation, mapping, linear processing, nonlinear processing, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection, repeated motion estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and wireless charging, wherein a second part of the task comprises at least one of:

a smart home task, a smart office task, a smart building task, a smart factory task, an internet-of-things (IoT) task, a smart system task, a smart home operation, a smart office operation, a smart building operation, a smart manufacturing operation, an IoT operation, a smart system operation, turning on a light, turning off the light, controlling the light in at least one of: a room, a region, and the venue, playing a sound clip, playing the sound clip in at least one of: the room, the region, and the venue, playing the sound clip of at least one of: a welcome, a greeting, a farewell, a first message, and a second message associated with the first part of the task, turning on an appliance, turning off the appliance, controlling the appliance in at least one of: the room, the region, and the venue, turning on an electrical system, turning off the electrical system, controlling the electrical system in at least one of: the room, the region, and the venue, turning on a security system, turning off the security system, controlling the security system in at least one of: the room, the region, and the venue, turning on a mechanical system, turning off a mechanical system, controlling the mechanical system in at least one of: the room, the region, and the venue, and controlling at least one of: an air conditioning system, a heating system a ventilation system, a lighting system, a heating device, a stove, an entertainment system, a door, a fence, a window, a garage, a computer system, a networked device, a networked system, a home appliance, an office equipment, a lighting device, a robot, a smart vehicle, a smart machine, an assembly line, a smart device, an internet-of-thing (IoT) device, a smart home device, and a smart office device.

4. The system of claim 1, wherein:

at least one probe signal of the series of probe signals includes data from the transmitter.

5. The system of claim 1, wherein:

the series of probe signals is transmitted at a pseudo-regular interval; and the pseudo-regular interval is changed over time based on at least one of: a planned change, a plan, a time table, a rule, a policy, a mode, a condition, a situation, a change, at least one task performed by the plurality of heterogeneous target wireless receivers, and a request from a server communicatively coupled with the transmitter.

6. The system of claim 1, wherein:

the series of probe signals is transmitted to a destination MAC address that is shared by the plurality of heterogeneous target wireless receivers; and each of the plurality of heterogeneous target wireless receivers configures its MAC address to the destination MAC address.

7. The system of claim 6, further comprising a server configured for:

receiving a request from one of the plurality of heterogeneous target wireless receivers for a broadcasting service;

selecting the transmitter for the heterogeneous target wireless receiver; and transmitting an information of the transmitter in response to the request.

8. The system of claim 7, wherein:

the destination MAC address is communicated between the transmitter and the server;

the destination MAC address is indicated to each respective heterogeneous target wireless receiver by at least one of: the transmitter and the server; and the destination MAC address is changed over time according to at least one of: a planned change, a plan, a time table, a rule, a policy, a mode, a condition, a situation, a change, at least one task performed by the plurality of heterogeneous target wireless receivers, and a request.

9. The system of claim 7, wherein:

each probe signal of the series of probe signals is transmitted in a channel selected from a set of channels;

the selected channel is selected based on at least one of: availability of channels, a pre-selected list, co-channel interference, inter-channel interference, channel traffic patterns, data traffic between the transmitter and another device, effective bandwidth associated with channels, a security criterion, random selection, and a channel switching plan;

an information of the selected channel is communicated between the transmitter and a server communicatively coupled with the transmitter;

the information of the selected channel is indicated to each respective heterogeneous target wireless receiver by at least one of: the transmitter and the server;

the selected channel is changed over time according to at least one of: a planned change, a plan, a time table, a rule, a policy, a mode, a condition, a situation, a change, at least one task performed by the plurality of heterogeneous target wireless receivers, and a request.

10. The system of claim 6, wherein each of the plurality of heterogeneous target wireless receivers is further configured for:

identifying the venue based on at least one of: an association with the transmitter, a region associated with the transmitter, the destination MAC address, the series of probe signals, and the at least one TSCI;

scanning at least one candidate wireless broadcasting channel for active broadcasting of probe signals; and computing a location of at least one of the transmitter and the heterogeneous target wireless receiver based on information related to at least one of: the series of probe signals, the wireless multipath channel, the at least one TSCI, an information association table, the region associated with the transmitter, and the destination MAC address.

11. The system of claim 6, further comprising a wireless device configured for:

setting its MAC address to be the destination MAC address;

exchanging wireless signals with the transmitter to establish a wireless connection between the transmitter and the wireless device;

triggering the transmitter to transmit the series of probe signals in the broadcasting manner to the destination MAC address; and suspending communication with the transmitter after triggering the transmitter to
broadcast the series of probe signals.

12. The system of claim 1, further comprising an additional plurality of heterogeneous target wireless receivers each of which is associated with a corresponding object of an additional plurality of objects in an additional venue that overlaps at least partially with the venue, wherein:

the transmitter is further configured for transmitting an additional series of probe signals in a broadcasting manner through an additional wireless multipath channel;

the additional wireless multipath channel is impacted by a movement of at least one of the additional plurality of objects;

the series of probe signals and the additional series of probe signals are not synchronous;

the series of probe signals is transmitted in a first channel selected from a first set of channels at a first pseudo-regular interval to a first destination MAC address;

the additional series of probe signals is transmitted in a second channel selected from a second set of channels at a second pseudo-regular interval to a second destination MAC address;

each of the additional plurality of heterogeneous target wireless receivers is configured for:

receiving the additional series of probe signals through the additional wireless multipath channel between the additional heterogeneous target wireless receiver and the transmitter, obtaining at least one additional TSCI of the additional wireless multipath channel based on the additional series of probe signals received by the additional heterogeneous target wireless receiver, and tracking the corresponding object associated with the additional heterogeneous target wireless receiver based on the at least one additional TSCI; and each of the plurality of heterogeneous target wireless receivers and the additional plurality of heterogeneous target wireless receivers is configured for:

choosing between the series of probe signals and the additional series of probe signals based on at least one of: their respective pseudo-regular intervals, their respective destination MAC addresses, their respective selected channels and a respective task to be performed by the heterogeneous target wireless receiver.

13. The system of claim 1, further comprising:

an additional transmitter configured for transmitting an additional series of probe signals in a broadcasting manner through an additional wireless multipath channel, wherein the additional wireless multipath channel is impacted by a movement of at least one of an additional plurality of objects in the venue; and an additional plurality of heterogeneous target wireless receivers each of which is associated with a corresponding object of the additional plurality of objects in the venue and is configured for:

receiving the additional series of probe signals through the additional wireless multipath channel between the additional heterogeneous target wireless receiver and the additional transmitter, obtaining at least one additional TSCI of the additional wireless multipath channel based on the additional series of probe signals received by the additional heterogeneous target wireless receiver, and tracking the corresponding object associated with the additional heterogeneous target wireless receiver based on the at least one additional TSCI, wherein the series of probe signals and the additional series of probe signals are transmitted at different pseudo-regular intervals asynchronously and contemporaneously.

14. The system of claim 13, wherein each receiver of the plurality of heterogeneous target wireless receivers and the additional plurality of heterogeneous target wireless receivers is configured for:

choosing asynchronously between the transmitter and the additional transmitter as a signal source based on at least one of:

identity (ID) of at least one of: the transmitter, the additional transmitter and the receiver, information of a user associated with at least one of: the transmitter, the additional transmitter and the receiver, information of an account associated with at least one of: the transmitter, the additional transmitter and the receiver, access information associated with at least one of: the transmitter, the additional transmitter and the receiver, a parameter associated with at least one of: the transmitter, the additional transmitter and the receiver, a characteristics associated with at east one of: the transmitter, the additional transmitter and the receiver, a signal strength associated with at least one of: the transmitter. the additional transmitter and the receiver, a task to be performed by at least one of: the transmitter, the additional transmitter and the receiver, a history of at least one of: a past signal source, the transmitter, the additional transmitter, the receiver, and another receiver, and at least one threshold for switching signal source; and changing the signal source of the receiver when at least one of the following happens:

a time interval between two adjacent probe signals received by the receiver from a current signal source of the receiver exceeds a first threshold, a signal strength associated with the current signal source of the receiver is below a second threshold, a processed signal strength associated with the current signal source of the receiver is below a third threshold, wherein the processed signal strength is generated by processing the signal strength with at least one of: a low pass filter, a band pass filter, a median filter, a moving average filter, a weighted averaging filter, a linear filter and a non-linear filter, and the processed signal strength is below a fourth threshold for a significant percentage of a recent time window, wherein the percentage is greater than a fifth threshold.

15. The system of claim 1, wherein:

each of the plurality of heterogeneous target wireless receivers is further configured for continuously computing a distance of a current movement of the object based on a similarity score between a pair of temporally adjacent CI of the at least one TSCI associated with the current movement of the object; and the object is tracked based on the continuously computed distance.

16. A transmitter, comprising:

a processor;

a memory communicatively coupled with the processor; and a set of instructions stored in the memory which, when executed, causes the processor to generate at least one series of probe signals; and a wireless circuitry configured for transmitting the at least one series of probe signals in a broadcasting manner through at least one wireless multipath channel, wherein the at least one wireless multipath channel is impacted by a movement of at least one of a plurality of objects, wherein:

each of a plurality of heterogeneous target wireless receivers is associated with an object of the plurality of objects and is configured for:

receiving one of the at least one series of probe signals through a corresponding one of the at least one wireless multipath channel between the heterogeneous target wireless receiver and the transmitter, obtaining at least one time series of channel information (TSCI) of the corresponding wireless multipath channel based on the series of probe signals received by the heterogeneous target wireless receiver, wherein each channel information (a) comprises at least one of: a signal strength, a signal amplitude, a signal phase, a received signal strength indicator (RSSI), a channel state information (CSI), a channel impulse response (CIR), a channel frequency response (CFR), a channel characteristics, and a channel filter response, and performing a task related to the object associated with the heterogeneous target wireless receiver based on the at least one TSCI, wherein the wireless circuitry is configured for:

transmitting a first series of probe signals in a broadcasting manner to the plurality of heterogeneous target wireless receivers through a first wireless multipath channel in a first venue, and transmitting a second series of probe signals in a broadcasting manner to the plurality of heterogeneous target wireless receivers through a second wireless multipath channel in a second venue that overlaps at least partially with the first venue.

17. The transmitter of claim 16, wherein:

the first series of probe signals is transmitted in a first channel selected from a first set of channels at a first pseudo-regular interval to a first destination MAC address; and the second series of probe signals is transmitted in a second channel selected from a second set of channels at a second pseudo-regular interval to a second destination MAC address.

18. The transmitter of claim 17, wherein each of the plurality of heterogeneous target wireless receivers is configured for:

choosing between the first series of probe signals and the second series of probe signals based on at least one of: their respective pseudo-regular intervals, their respective destination MAC addresses, their respective selected channels and a respective task to be performed by the heterogeneous target wireless receiver.

19. The transmitter of claim 17, wherein:

the first series of probe signals and the second series of probe signals are not synchronous;

a transmission of the first series of probe signals and a transmission of the second series of probe signals are not synchronous; and at least one of: the first pseudo-regular interval, the second pseudo-regular interval, the first destination MAC address, the second destination MAC address, the first channel and the second channel, is changed over time according to at least one of: a planned change, a plan, a time table, a rule, a policy, a mode, a condition, a situation, a change, at least one task performed by the plurality of heterogeneous target wireless receivers, and a request.

20. The transmitter of claim 17, wherein the wireless circuitry is further configured for:

exchanging wireless signals with at least one wireless device to establish wireless connection between the transmitter and the at least one wireless device, wherein the at least one wireless device is configured for:

triggering the transmitter to transmit the at least one series of probe signals in the broadcasting manner, and suspending communication with the transmitter after establishing the wireless connection with the transmitter, wherein:

both the transmitter and the at least one wireless device are coordinated by at least one of: a first processor associated with the transmitter, a second processor associated with the at least one wireless device, a third processor associated with a designated source, and a fourth processor associated with yet another device.

21. The transmitter of claim 20, wherein the at least one wireless device is a single wireless device configured for:

setting its MAC address to the first destination MAC address;

establishing a first wireless connection with the transmitter using the first destination MAC address in the first channel;

changing its MAC address to the second destination MAC address; and establishing a second wireless connection with the transmitter using the second destination MAC address in the second channel.

22. A system, comprising:

a plurality of sets of heterogeneous target wireless receivers; and a plurality of transmitters configured for transmitting respectively a plurality of series of probe signals asynchronously and contemporaneously, wherein:

each respective series of probe signals is transmitted by a respective transmitter in a broadcasting manner through a respective wireless multipath channel to a respective set of heterogeneous target wireless receivers, the respective wireless multipath channel is impacted by a movement of at least one of a plurality of objects, and each of the respective set of heterogeneous target wireless receivers is associated with an object of the plurality of objects and is configured for:

choosing asynchronously the respective transmitter as a signal source, receiving the respective series of probe signals through the respective wireless multipath channel between the respective heterogeneous target wireless receiver and the respective transmitter, obtaining at least one time series of channel information (TSCI) of the respective wireless multipath channel based on the respective series of probe signals received by the respective heterogeneous target wireless receiver, and performing a task related to the object associated with the respective heterogeneous target wireless receiver based on the at least one TSCI.

23. The system of claim 22, wherein each receiver of the respective set of heterogeneous target wireless receivers is configured for changing the signal source of the receiver when at least one of the following happens:

a time interval between two adjacent probe signals received by the receiver from a current signal source of the receiver exceeds a first threshold, a signal strength associated with the current signal source of the receiver is below a second threshold, a processed signal strength associated with the current signal source of the receiver is below a third threshold, wherein the processed signal strength is generated by processing the signal strength with at least one of: a low pass filter, a band pass filter, a median filter, a moving average filter, a weighted averaging filter, a linear filter and a non-linear filter, and the processed signal strength is below a fourth threshold for a significant percentage of a recent time window, wherein the percentage is greater than a fifth threshold.

24. The system of claim 22, wherein at least one of the plurality of sets of heterogeneous target wireless receivers is configured for:

updating a respective list of available transmitters based on the plurality of transmitters and respective signal strength associated with each of the plurality of transmitters.

25. The system of claim 22, wherein:

each respective series of probe signals is transmitted by the respective transmitter to a destination MAC address that is shared by the respective set of heterogeneous target wireless receivers; and each of the respective set of heterogeneous target wireless receivers is configured to have the destination MAC address.

26. The system of claim 25, further comprising at least one wireless device configured for:

exchanging wireless signals with the plurality of transmitters to establish wireless connection between each of the plurality of transmitters and the at least one wireless device, in at least one of: a sequential manner, a parallel manner and a mixed manner;

triggering each of the plurality of transmitters to transmit respective series of probe signals in the broadcasting manner; and suspending communication with the plurality of transmitters after the triggering, wherein:

the at least one wireless device has at least one MAC address configured to be the destination MAC address associated with the respective transmitter, and the at least one MAC address is changed sequentially to other destination MAC addresses of other transmitters of the plurality of transmitters.

27. A method, comprising:

transmitting, by a transmitter, a series of probe signals in a broadcasting manner through a wireless multipath channel, wherein the wireless multipath channel is impacted by a movement of at least one object;

receiving, by each of a plurality of heterogeneous target wireless receiver, the series of probe signals through the wireless multipath channel between the heterogeneous target wireless receiver and the transmitter, wherein each of the plurality of heterogeneous target wireless receivers is associated with an object of the at least one object;

obtaining, by each of the plurality of heterogeneous target wireless receivers, at least one time series of channel information (TSCI) of the wireless multipath channel based on the series of probe signals received by the heterogeneous target wireless receiver, wherein each channel information (CI) comprises at least one of: a signal strength, a signal amplitude, a signal phase, a received signal strength indicator (RSSI), a channel state information (CSI), a channel impulse response (CIR), a channel frequency response (CFR), a channel characteristics, and a channel filter response, and the plurality of heterogeneous target wireless receivers respectively obtain the at least one TSCI from the series of probe signals asynchronously, with respective heterogeneous starting times; and performing a task related to the object associated with the heterogeneous target wireless receiver based on at least one of: the series of probe signals received by the heterogeneous target wireless receiver, and the at least one TSCI obtained by the heterogeneous target wireless receiver.

28. The method of claim 27, wherein:

the task is performed by at least one of: the transmitter, the at least one heterogeneous target wireless receiver, another device, and at least one server;

a first part of the task comprises at least one of:

preprocessing, signal conditioning, signal processing, post-processing, calibrating, denoising, feature extraction, coding, encryption, transformation, mapping, linear processing, nonlinear processing, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection, repeated motion estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and wireless charging and a second part of the task comprises at least one of:

a smart home task, a smart office task, a smart building task, a smart factory task, an internet-of-things (IoT) task, a smart system task, a smart home operation, a smart office operation, a smart building operation, a smart manufacturing operation, an IoT operation, a smart system operation, turning on a light, turning off the light, controlling the light in at least one of: a room, a region, and the venue, playing a sound clip, playing the sound clip in at least one of: the room, the region, and the venue, playing the sound clip of at least one of: a welcome, a greeting, a farewell, a first message, and a second message associated with the first part of the task, turning on an appliance, turning off the appliance, controlling the appliance in at least one of: the room, the region, and the venue, turning on an electrical system, turning off the electrical system, controlling the electrical system in at least one of: the room, the region, and the venue, turning on a security system, turning off the security system, controlling the security system in at least one of: the room, the region, and the venue, turning on a mechanical system, turning off a mechanical system, controlling the mechanical system in at least one of: the room, the region, and the venue, and controlling at least one of: an air conditioning system, a heating system, a ventilation system, a lighting system, a heating device, a stove, an entertainment system, a door, a fence, a window, a garage, a computer system, a networked device, a networked system, a home appliance, an office equipment, a lighting device, a robot, a smart vehicle, a smart machine, an assembly line, a smart device, an internet-of-thing (IoT) device, a smart home device, and a smart office device.

* * * * *